United States Patent

Kuehl

[11] Patent Number: 5,307,424
[45] Date of Patent: Apr. 26, 1994

[54] CHARACTER RECOGNITION SYSTEM

[76] Inventor: Eberhard Kuehl, Solzing St., No. 8, Munich 8000, Fed. Rep. of Germany

[21] Appl. No.: 626,517

[22] Filed: Dec. 12, 1990

[51] Int. Cl.$^5$ .......................... G06K 9/48; G06K 9/46; G06K 9/44
[52] U.S. Cl. ........................................ 382/21; 382/22; 382/26; 382/55
[58] Field of Search ....................... 382/10, 25, 26, 21, 382/22, 49, 27, 56, 55

[56] References Cited

U.S. PATENT DOCUMENTS

| | | | |
|---|---|---|---|
| Re. 30,048 | 7/1979 | Moss | 340/146.3 |
| 3,303,468 | 2/1967 | Liebson et al. | 340/146.3 |
| 3,559,170 | 1/1971 | Barnes | 340/168 |
| 3,870,865 | 3/1975 | Schneiderhan et al. | 235/61.11 |
| 3,872,433 | 3/1975 | Holmes et al. | 340/146.3 |
| 3,944,977 | 3/1976 | Holmes | 340/146.3 |
| 3,969,700 | 7/1976 | Ballinger et al. | 340/146.3 |
| 3,999,161 | 12/1976 | Van Bilzem et al. | 382/25 |
| 4,029,414 | 6/1977 | Rubenstein | 355/112 |
| 4,066,998 | 1/1978 | Lidkea | 340/146.3 |
| 4,104,616 | 8/1978 | Ishiti | 340/146.3 |
| 4,119,946 | 10/1978 | Taylor | 340/146.3 |
| 4,180,798 | 12/1979 | Komori et al. | 340/146.3 |
| 4,201,978 | 5/1980 | Nally | 340/146.3 |
| 4,415,880 | 11/1983 | Scott | 382/27 |
| 4,495,646 | 1/1985 | Gharachorloo | 382/13 |
| 4,561,106 | 12/1985 | Yoshida | 382/25 |
| 4,611,346 | 9/1986 | Bednar | 382/9 |
| 4,628,532 | 12/1986 | Stone et al. | 382/21 |
| 4,654,875 | 3/1987 | Shrihair | 382/40 |
| 4,776,464 | 10/1988 | Miller et al. | 209/3.3 |
| 4,777,651 | 10/1988 | McCann et al. | 382/56 |
| 4,786,896 | 11/1988 | Harte | 340/712 |
| 4,804,949 | 2/1989 | Faulkerson | 340/710 |
| 4,831,550 | 5/1989 | Katz | 364/513.5 |
| 4,837,842 | 6/1989 | Holt | 382/26 |
| 4,903,312 | 2/1990 | Sato | 382/21 |
| 4,921,107 | 5/1990 | Hofer | 209/546 |
| 4,941,195 | 7/1990 | Tenakos et al. | 382/61 |
| 4,959,870 | 9/1990 | Tachikawa | 382/56 |
| 4,982,342 | 1/1991 | Moribe et al. | 382/21 |

Primary Examiner—David K. Moore
Assistant Examiner—Michael Cammarata
Attorney, Agent, or Firm—M. Lukacher

[57] ABSTRACT

Characters to be recognized and which may be handwritten are each described by a pattern of one bit thresholded pixel data which follows the center line of the character and encoded into strings of digital data signals (bytes) which represent the shape of the pattern from three aspects, namely the top view, the front edge and the rear edge thereof, thereby providing low level recognition information in the form of three digital data strings. From these strings, the characters are recognized by finding high level recognition strings of digital signals which correspond to different characters in the character set to be recognized. This high level recognition is carried on in two steps, namely allocating the high level recognition strings which correspond to the low level strings for each aspect of the character and then finding combinations of high level strings reflecting the same character, thereby accounting for variations in the shapes in which the same character can be written. The high level strings and the combinations are stored in tables to enable recognition of characters in a character set.

28 Claims, 13 Drawing Sheets

LOW LEVEL RECOG. STRING IS ANNEX OF CODE BY CODE. IN THIS CASE, STRING FOR FRONT EDGE WOULD HAVE BEEN 111111113332

LOW LEVEL RECOG. STRING IS ANNEX OF CODE BY CODE. IN THIS CASE, STRING FOR REAR EDGE WOULD HAVE BEEN 11111322211

(CHART I)

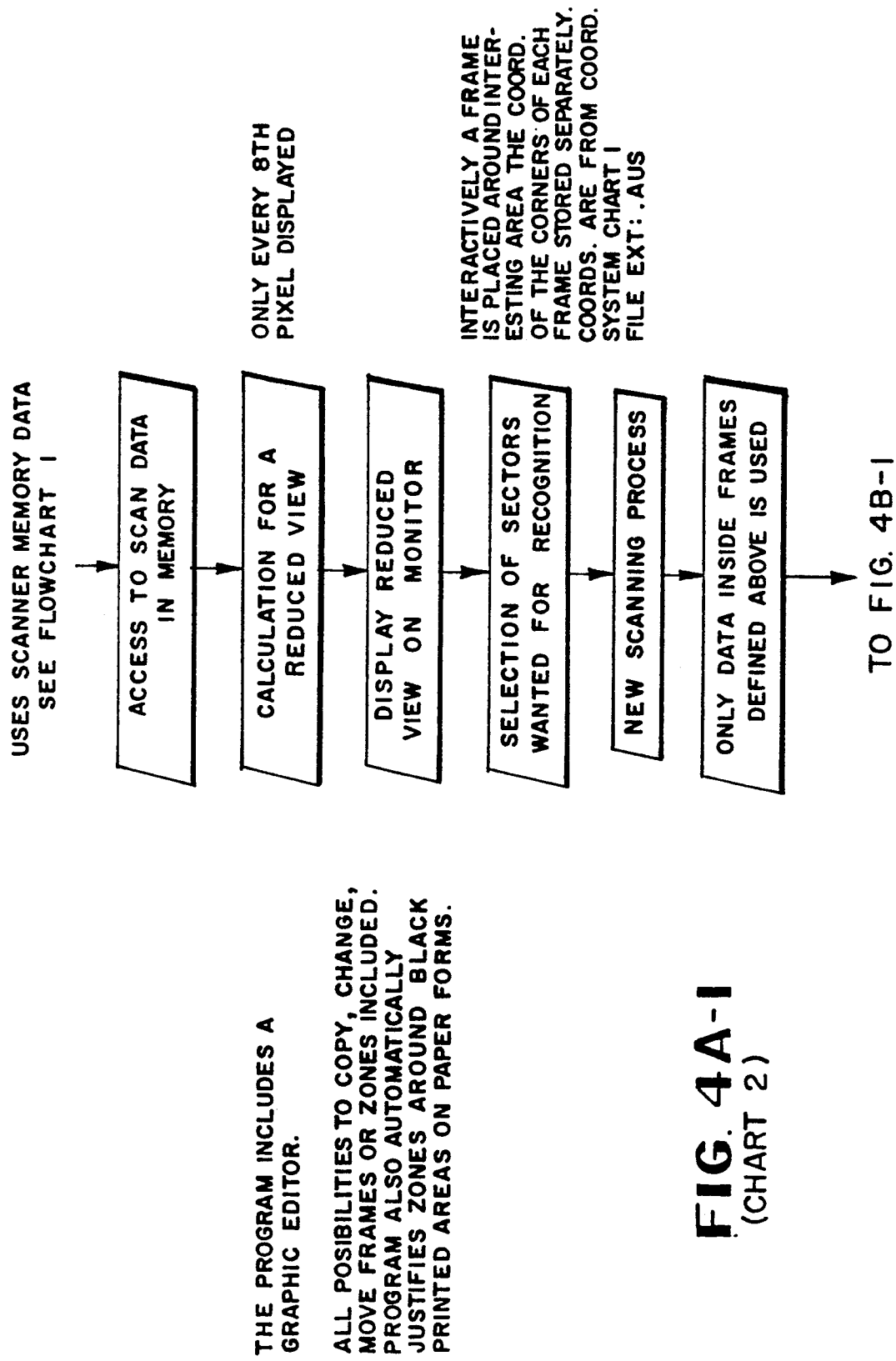

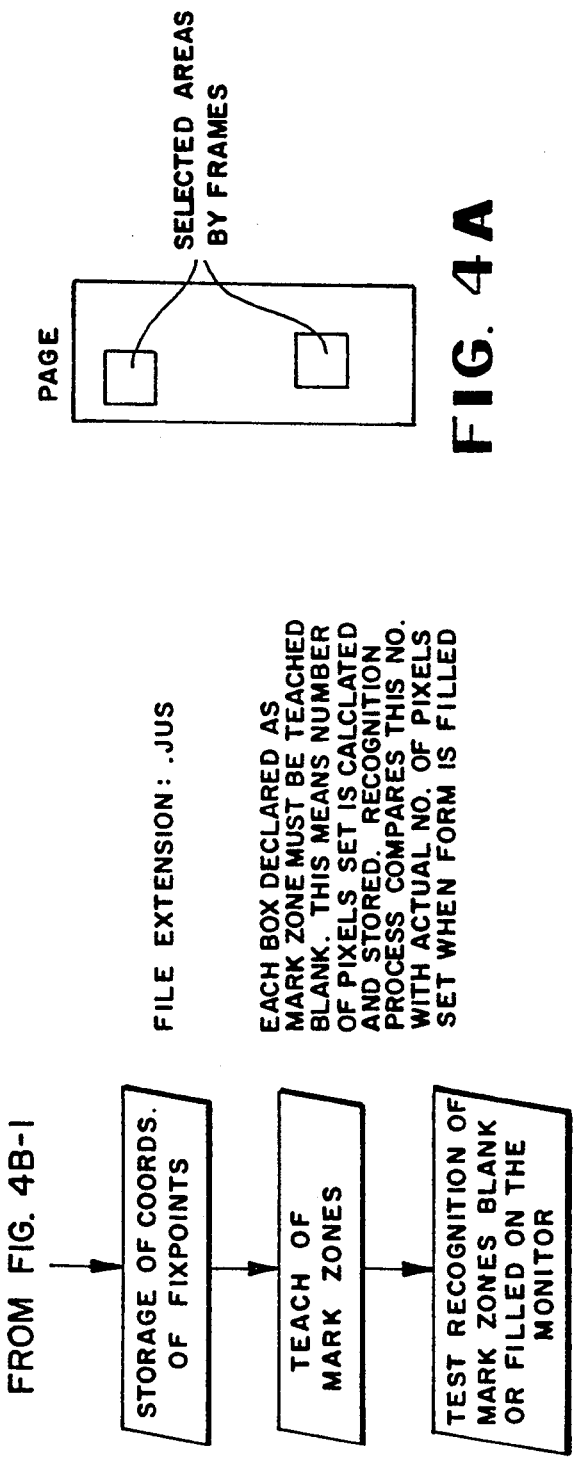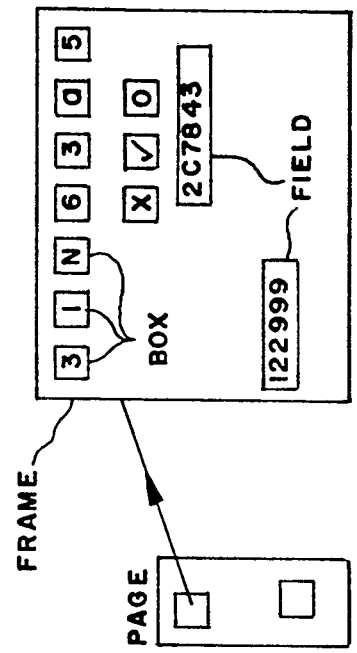
FIG. 4A
FIG. 4B
FIG. 4C-1

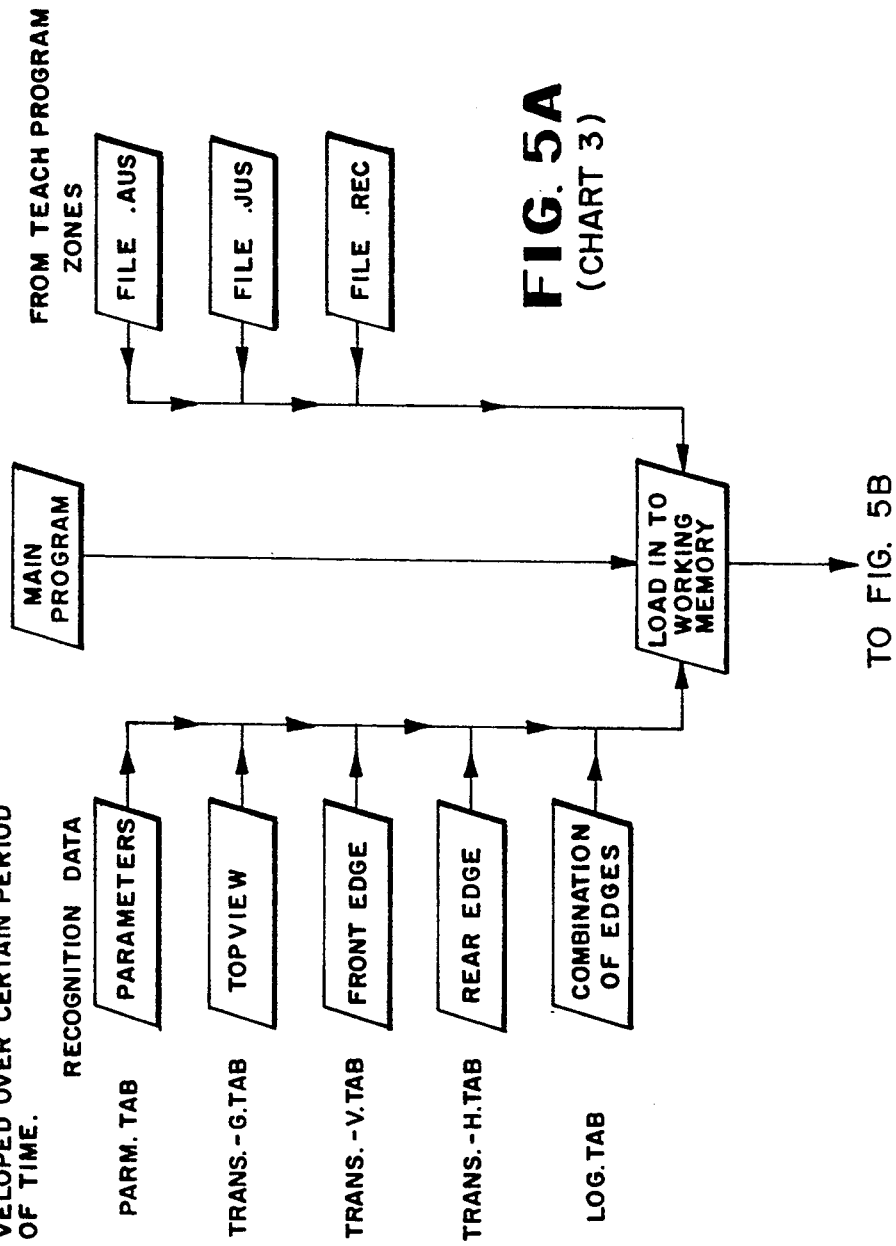

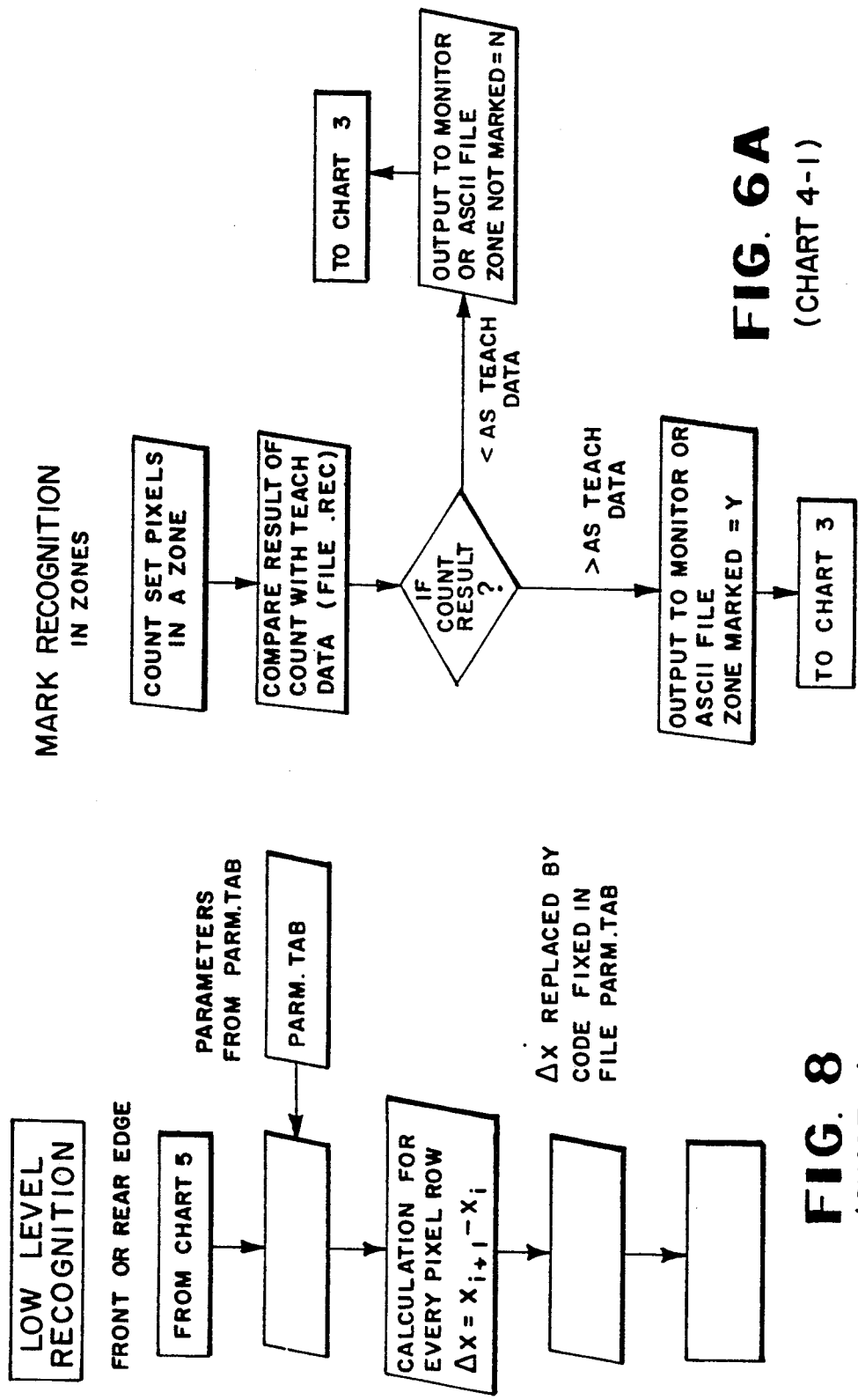

(CHART 4.2)

(CHART 7)

LOW LEVEL RECOG. STRING IS ANNEX OF CODE BY CODE. IN THIS CASE, STRING FOR FRONT EDGE WOULD HAVE BEEN
111111 3332

LOW LEVEL RECOG. STRING IS ANNEX OF CODE BY CODE. IN THIS CASE, STRING FOR REAR EDGE WOULD HAVE BEEN
1111132 2211

CHARACTER RECOGNITION SYSTEM

FIELD OF THE INVENTION

The present invention relates to a character recognition system, and particularly to an optical character recognition system which is capable of automatic recognition of characters in a character set, which characters may be hand written without restriction as to their shape or format.

While the invention is especially suitable for the recognition of characters, such as letters of the alphabet, numerals and marks, (such as punctuation marks), the invention is generally applicable for the recognition of symbols, which includes characters, and may include other configurations which represent or communicate information by way of observable patterns.

BACKGROUND

Although optical recognition of characters which may be hand written has long been desired for the flexibility which automatic recognition provides to the handling of information, workers in the art have not as yet brought any such system to the point where it is commercially exploitable. From time to time patents have issued which relate to optical character recognition of hand written characters (see U.S Pat. Nos. 4,066,998; 4,628,532; and 4,837,842). The principal problems which have faced the workers in the optical character recognition art appear to be in the need for an immense memory of data which map variations in the shapes of hand drawn versions of the same character and the requirement to restrict the form and Placement of the character (the way it is drawn) in order to have a reasonable chance of recognition.

SUMMARY OF THE INVENTION

It is a feature of this invention to overcome these problems and provide an improved character recognition system (method and apparatus) which is capable of recognizing hand written characters which may be written with a large number of variations on a Page (e.g., a business form), whether individually or in words or multi-digit numbers, with high probability of recognition and without the need for super computers, computers which are ultra fast, or which have enormous memory capacity.

It is a feature of this invention to provide and improved character recognition system which may be implemented in a computer of relatively small size such as a personal computer (e.g., the IBM PC/AT).

Another feature of the invention is that it enables the computer to be provided with digitized characters from relatively low cost optical scanners, for example which have a resolution of 200 dots or pixels per inch.

It is a further feature of the invention to provide an improved optical character recognition system which can handle the recognition of hand written or hand printed characters through the use of a computer having a memory of reasonable size, for example with a capacity of a few megabytes (MB), for example 2 MB of RAM (Random Access Memory); the computer not requiring any specially designed operating system for the purpose so that the recognition operations can be accomplished under the operating system already designed for the computer, such as DOS or UNIX.

It is a further feature of the invention to provide an improved optical character recognition system which is not sensitive to, and is tolerant of, variations in gray scale of the dots or Pixels of the characters to be recognized as they are printed on the page which is optically scanned.

Briefly described, the invention provides optical character recognition of characters in a set of characters in which a pattern of pixels corresponding to the character to be recognized is provided, preferably by optically scanning the character to generate digital information corresponding to the pixels, which are inputted into memory of a computer. In the computer, the pattern of pixels is encoded into a plurality of first strings of digital signals (bytes) having values dependant upon the shape of the pattern corresponding to views of the character from a plurality of aspects. The strings may, for example, correspond to the view of the character from the top, the right side and the left side. Encoding the aspects of the character into strings is called low level recognition. High level recognition is accomplished by translating the first (low level) strings into a plurality of second (high level) strings of digital signals each representing a different aspect of the different characters in the set, thereby accounting for variations in the shape of patterns for the same character as can arise when the character is handwritten or printed. The pattern is recognized as representing a character in the set when the second strings constitute a combination of strings which correspond to that character. Thus, in high level recognition, the plurality of second strings is related to pluralities of third strings which correspond to characters in the set. When a relationship exists, the character is recognized with a high degree of assurance as to veracity of recognition and without having to disregard many patterns as being unrecognizable.

BRIEF DESCRIPTION OF THE DRAWINGS

The foregoing and other features, objects and advantages of the invention, as well as a presently preferred embodiment thereof and the best mode now known for carrying out the invention will become more apparent from reading of the following description in connection with the accompanying drawings in which:

FIG. 4 is another flow chart, also designated Chart 2 and corresponding to the area of FIG. 1 denoted as Chart 2, which shows the "Teach" program which defines the zones where characters are placed in memory;

FIG. 4A is a diagramatic view of a page or paper sheet showing selected areas wherein characters are located by frames;

FIG. 8 is a flow chart called Chart 6 which illustrates the programming of the computer to develop the digital signal strings for the left or right aspects (edges) of the character.

DETAILED DESCRIPTION

Figure 1:
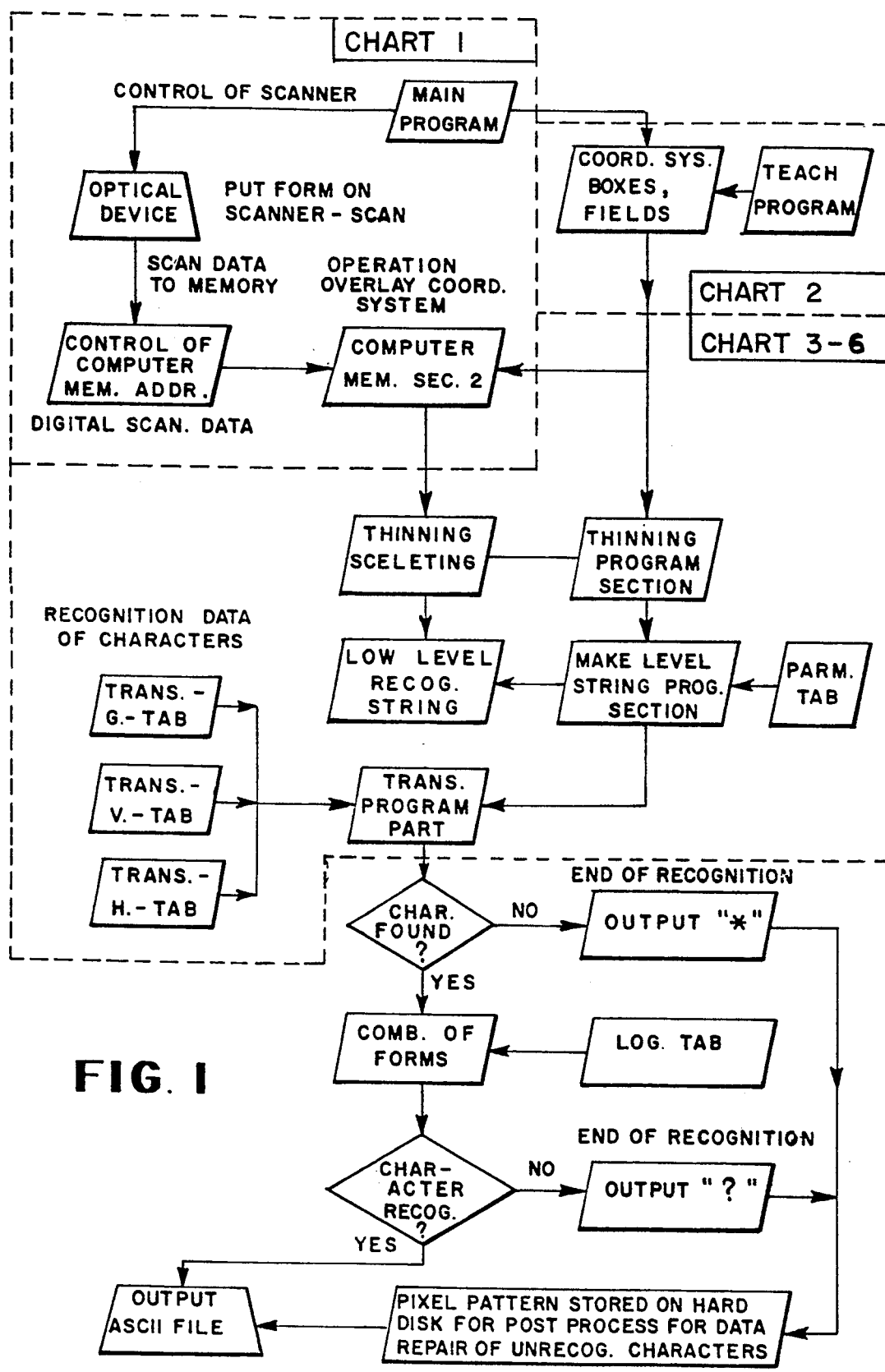
FIG. 1 is a block diagram and flow chart showing the system and the programming of the computer in which the system is implemented, on an overall basis.
Figure 2:
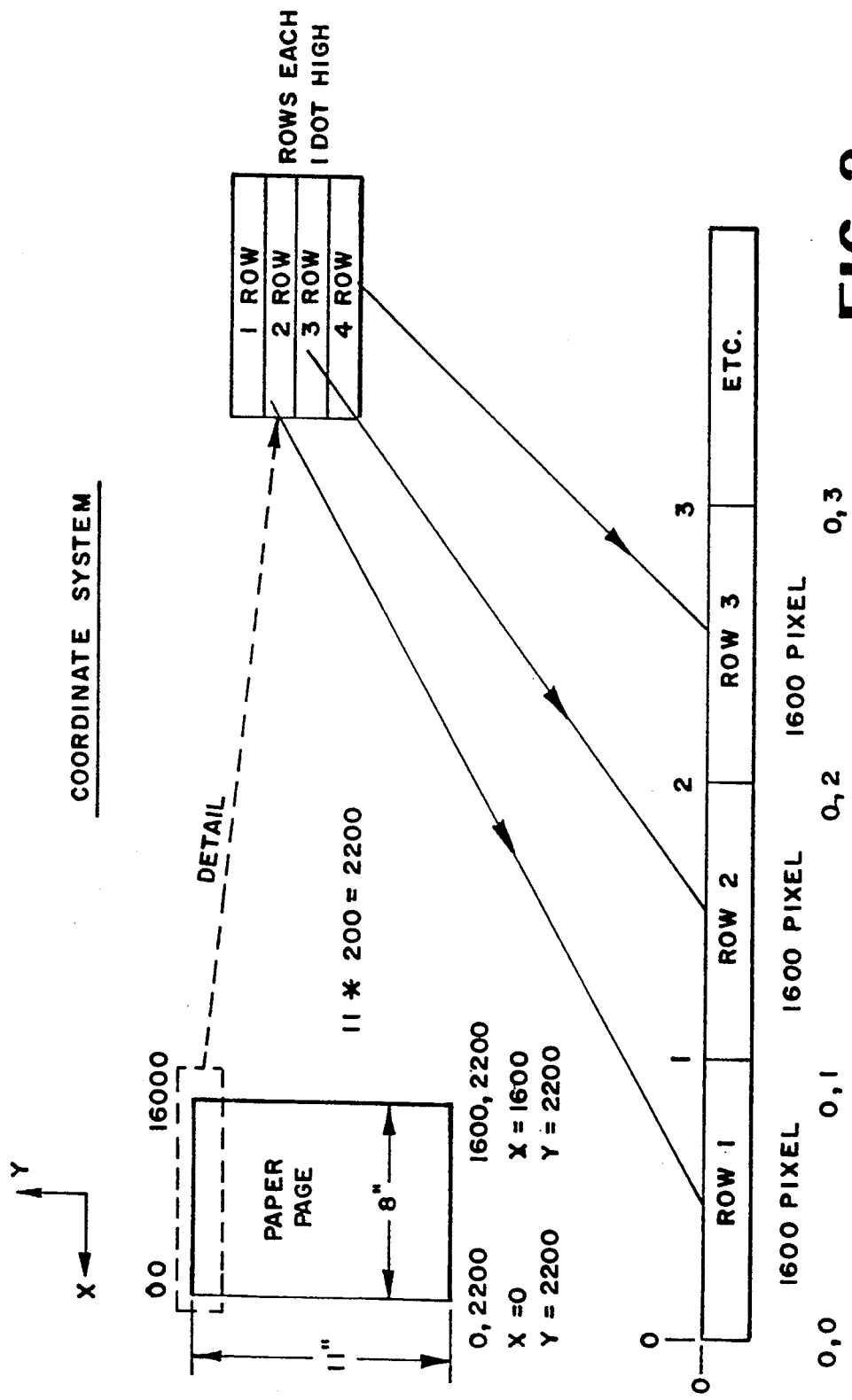
FIG. 2 is a diagram schematically showing the scanning of a page on which the characters to be recognized are written and showing the organization and allotment of computer memory space.

As shown in FIGS. 1 and 2 the program is loaded (booted) into the working memory (RAM) of the computer and the scanning process is carried out by a scanner which may be a low cost scanner having a resolution of 200 dots (pixels) per inch. The scanner is indicated as the optical device in FIG. 1 and provides digitized scanner data where each row is one pixel high and the length is equal to the width of the scanned paper page. The operation of control of the computer memory addresses, which in effect overlays a coordinate system of rows and columns ("x" in the row direction and "y" in the column direction) in computer memory, is shown in greater detail in FIGS. 2 and 3.

The data input may be a multi-bit byte or may be thresholded so that the intensity of any dot is marked as set for a black point or non-set for a white point of intensity less than the threshold level. If a page is eight inches wide and the resolution of the scanner is 200 dots (pixels) per inch, each row contains eight times 200 or 1,600 pixels. Since one 8 bit byte of memory can carry eight pixels, one scanned row requires only 1,600 divided by 8 or 200 bytes of RAM. The digitized, scanned data, is organized in the memory by locating the scanned rows, one after another in memory. For a typical character one millimeter in height and a 200 dots per inch resolution, eight rows of pixels are needed. Therefore if a character is, for example 4 mm high it needs 4×8 or 32 rows to be stored in memory. Thus, a page 11 inches in length contains 11 ×200 or 2,200 rows in the "y" direction and if eight inches wide contains 8×200 or 1,600 pixels per row in the "x" direction, the total capacity to store an 8×11 sheet is then approximately 440 kb of memory space. Such memory space is well within the capacity of RAM and certainly well within the capacity of hard disk memories which are commercially available at low cost.

Figure 3:
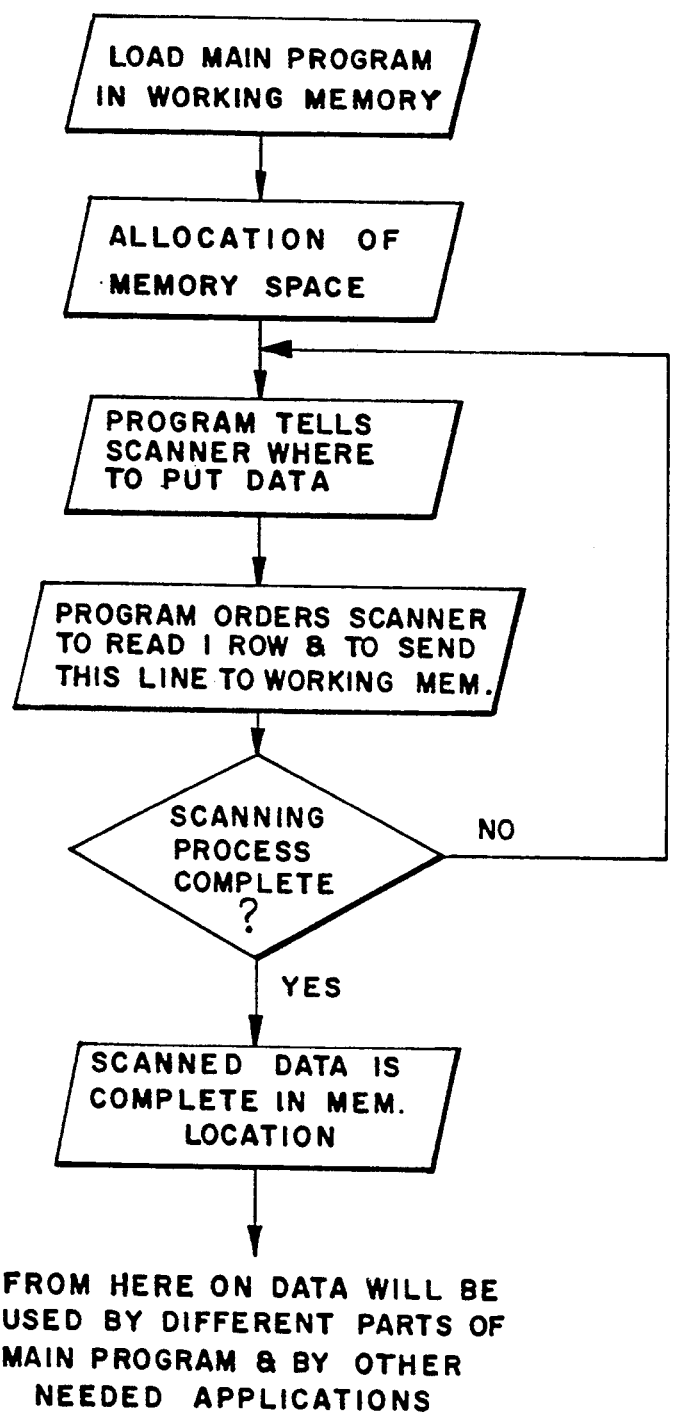
FIG. 3, which is also labeled Chart 1, is a flow chart showing the program of the scanning process.

As shown in FIG. 3 (Chart 1) the scanning program first allocates memory space. The operating system gives the start address where the data is stored. Then the digitized data is transferred from the scanner. The transfer continues one row at a time until all the data is stored. For example, if the start address for the first row is 1,000 then the next row will start at the start address plus the length of one line in bytes of 1,000 plus 200 which equals 1,200. Because the knowledge of the length of each line, the digitized pattern is effectively drawn in a x, y coordinate system. This coordinate system in the above example has its base point at the memory address 1,000 where the pixel information for the upper left hand corner of the sheet may be found. Generally, the addresses of a pixel in the memory is equal to the start address plus the number of the column multiplied by the length of the row plus the number of the row divided by eight. The position of the pixel in the eight bit byte (the bit position) equals the row number (MOD) 8.

Figures 1, 4B:
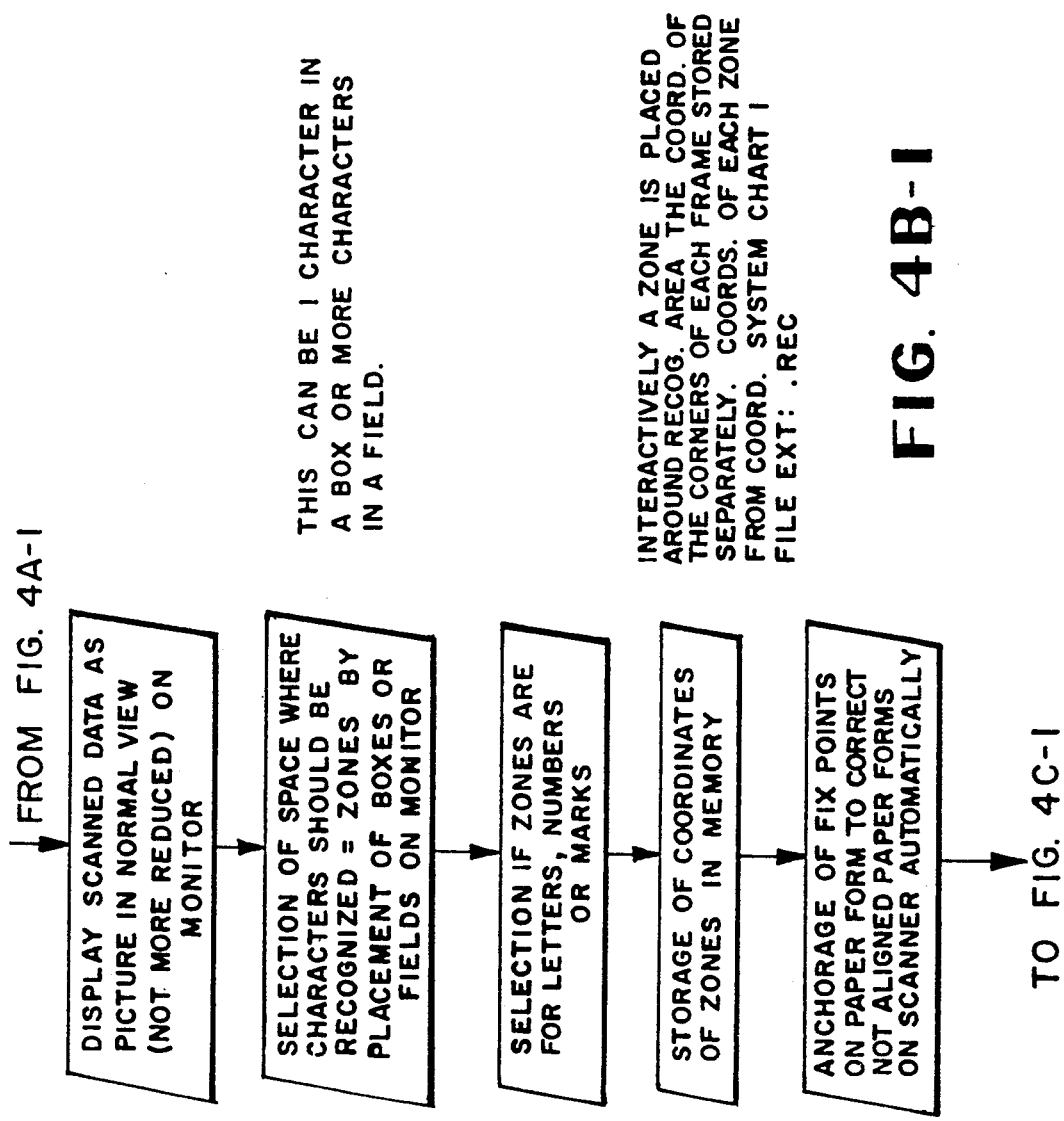
FIG. 4B shows an expanded view of the zones (boxes or fields) in a frame.

Next, consider the teach program as shown in FIG. 4 (Chart 2) provides information as to where on the page numbers, characters or marks are written. The teach program marks the areas where frames and zones (boxes or fields) containing the characters to be recognized are located. FIGS. 4A and 4B illustrate the frames, zones and boxes or fields. One character is in a box and more than one character is in a field as designated on FIG. 4B which shows one of the frames, which is illustrated in FIG. 4A. The teach program uses the digitized page in memory. The page is displayed in reduced form on a monitor. The reduced form contains only every eighth pixel, thus only every eighth pixel is displayed. In this reduced form the operator can define the zones by interactively putting frames around the parts containing characters utilizing a graphics program the coordinates of the frames are stored in a file with the extension (name) "aus". This file consists of coordinates for the upper left corner and the lower right corner of each frame. In the file, the coordinates can be separated by semi colons. The file therefore has the coordinates of the "x" upper left corner; "y" upper left corner; "x" lower right; and "y" lower right. An example of an aus file is the addresses 524; 638; 1200; 920. Another aus file say for the second frame may be 767; 170; 845; 250.

After the aus file is developed, another scan of the page is completed. Now the display shows the defined areas on the monitor and boxes or fields (zones) can be interactively placed around the areas in which characters are located. The zone marking step is used to mark and define the zones in memory. Every frame is thus more specifically defined by the type of entry. Possible types are: 1) for a marked area; 2) for numbers; 3) for letters; 4) for a field of numbers; and 5) for a field of letters. If the field type is a mark field, the program for recognition is somewhat different than for other characters. The number of pixels in the field is counted (see FIG. 6A Chart 4-1). The recognition of marked fields is carried out by counting the pixels in the zone and to compare it to stored information. It is also possible to combine a textstring for every defined area.

The information about the zones is stored in a file which is called by the name (extension) "rec". Each line of the file "rec" has the following structure: "x" upper left; "y" upper left; "x" lower right; "y" lower right; average pixel count (only for marked fields); minimum pixel count (only for marked fields); maximum pixel count (only for marked fields); teach count (how often has the field been taught); textstring; field type. By how often the field is teached is meant, how many times it is scanned in the operation of the scanner. It may be desirable to scan each zone ten or fifteen times and to get the average count of the area in maximum pixels which can be contained in a zone. An example of a rec file is as follows:

```
1783; 243; 1833; 276; −1; −1; 10000; 0; 525; 1;
1783; 202; 1831; 236; −1; −1; 10000; 0; 526; 1;
1783; 164; 1832; 197; −1; −1; 10000; 0; 527; 1;
1783; 123; 1834; 160; −1; −1; 10000; 0; 528; 1;
```

Field type one means that the field is a number field −1; −1; in this example, are initialized values for the average values for the pixel count since this example is for number fields. 10000 is the initialized value for the peak pixel count. The numbers refer to the coordinate system which is designated by the addresses in memory from the rec file, i.e., the part of the page (image) to be recognized is designated.

Another feature of the teach program is to define fixed points (anchors) on the paper which may not always be in the same position due to skew in the scanner. To correct displacement due to skew, the program calculates the distance from an anchor point to a fixed point on the paper. This distance is stored in a file with the name "jus". When the recognition program to be discussed hereinafter scans a pattern, this anchoring file is checked and a correction of the coordinate system is calculated for both the x and y directions.

The recognition program is indicated in charts 3-6 as defined in the program section of FIG. 1. There is a thinning program which detects the skeleton or center line of the pattern. There is a program which develops the low level recognition strings. This program uses a file indicated as "PARM.TAB". This file is a file of parameters which are used to designate various features of the pattern aspects. For example, the length of a line, the length of a short line, the length of a long line, a jump or a hole by a discrete number of positions. The file PARM.TAB for example, may denote a line whenever a movement is one column along a row, a short line as a movement for four columns and a long line as a movement of seven columns. A jump may be where lines are spaced by three columns. A hole may be where lines are spaced by two columns. These parameters may be varied depending upon the scanner and experience with the system as it is used in the recognition of the characters.

High level recognition involves the translation of recognition data or strings of characters (bytes) from files of strings corresponding to different aspects, namely the top view (which is the translation file named G.TAB) the left or front edge view which is in the translation table named V.TAB, and the right edge or rear view which is contained in the translation table called H.TAB. There is still another file used in the recognition process which is called LOG.TAB which relates combinations of the high level strings obtained from the translation files G.TAB, V.TAB and H.TAB. The location of the files in the program is shown in FIG. 1 (the main or general flow chart).

Figure 5B:
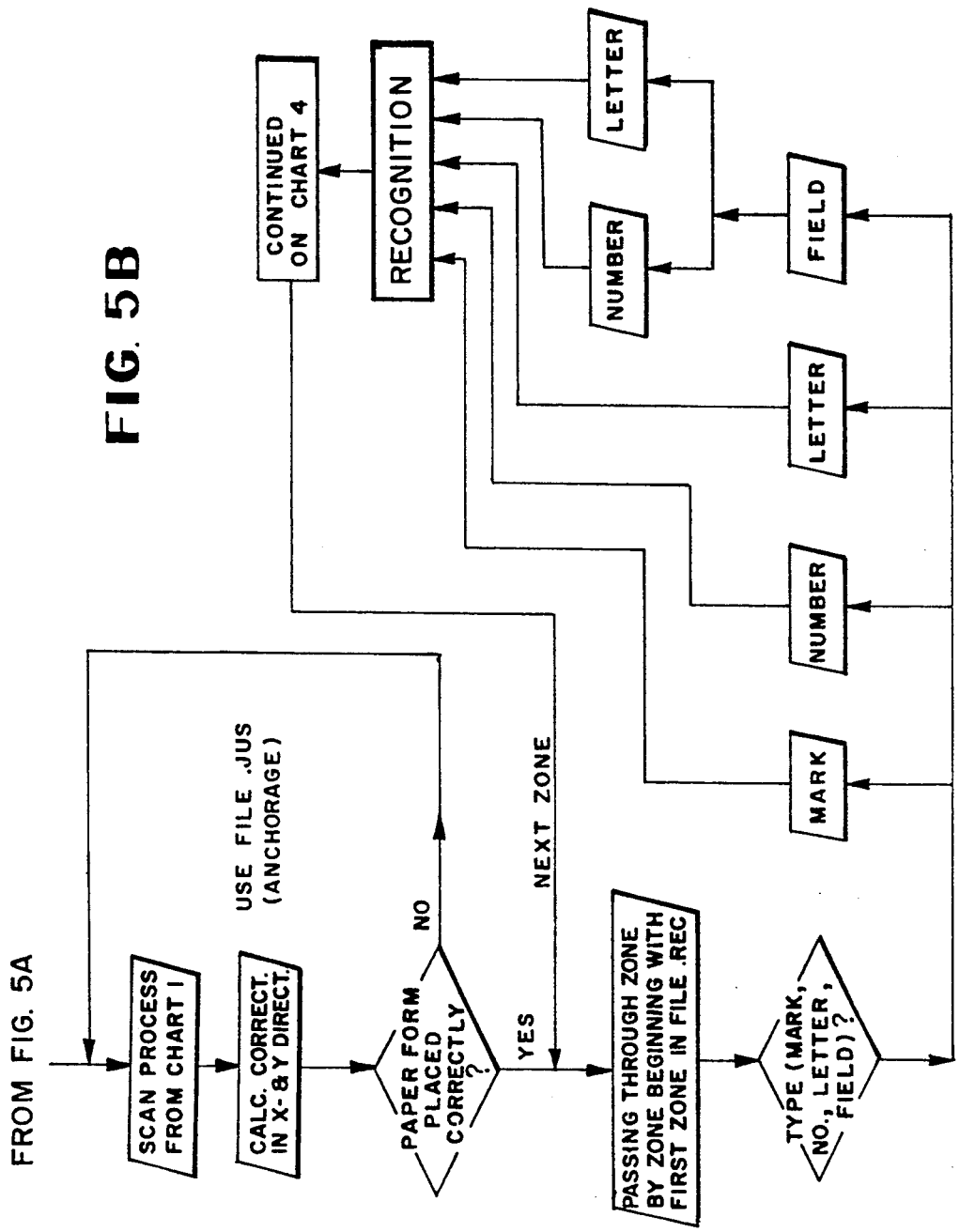
FIG. 5 is a flow chart showing the programming of the recognition section of the main program which is illustrated in FIG. 1., the flow chart of FIG. 5 also being denoted as chart 3.

At the start of the recognition process as shown in FIG. 5 (Chart 3) these tables are loaded into memory. In addition, the files aus, rec and jus are loaded into memory to identify the areas that have to be recognized. Then the scan process is carried out and the justification process to correct for skew is carried out. The recognition process starts with the first defined field, the field being defined in the rec file. The recognition depends upon the field type which is shown in FIG. 5 by separate processes for marks, numbers, letters and fields containing numbers and letters which are then separately recognized. The process called recognition is shown in FIG. 6A for the mark fields (Chart 4-1). To recognize whether a marked field is marked or not, the program counts the pixels which are set in the defined area. This calculated number is compared to the number calculated unmarked in the teach program If the number of pixels which is set is bigger than the number of unmarked pixels, the field is recognized as marked. The process of calculation of the pixels which are set is not just an addition. The pixels in the middle of a marked field are preferably multiplied by four to prevent errors due to variations in the scanning process. The number of pixels can differ from one scanning process (each time the page is scanned) to the next. To be independent from this effect, a sensitivity factor is introduced. This factor is used to describe how many more pixels have to be set than unset in carrying out the teach program to recognize a marked field as marked. This process is indicated in the last two blocks in FIG. 4. The output for the recognition process is "Y" if the field is marked and "N" if the field is not marked. The recognition of number fields is now discussed by way of example. As noted above, other characters, such as letters and symbols may similarly be recognized. In the case of a number or any other symbol for that matter, the pixel pattern is normalized for recognition. The defined area or zone of the scanned image in memory is then converted into a matrix of 128 rows by 128 columns. If the pixel bytes have not already been thresholded then the thresholding is now carried out and in this matrix a binary one bit is represented by a byte having the value above the threshold and a zero if the value (corresponding to light intensity) in the pixel position is below the pre-set threshold.

A suitable program for converting the zones into the matrix is called "PIX to M.C.". This program is written in C and is presented in Appendix A.

Figure 7:
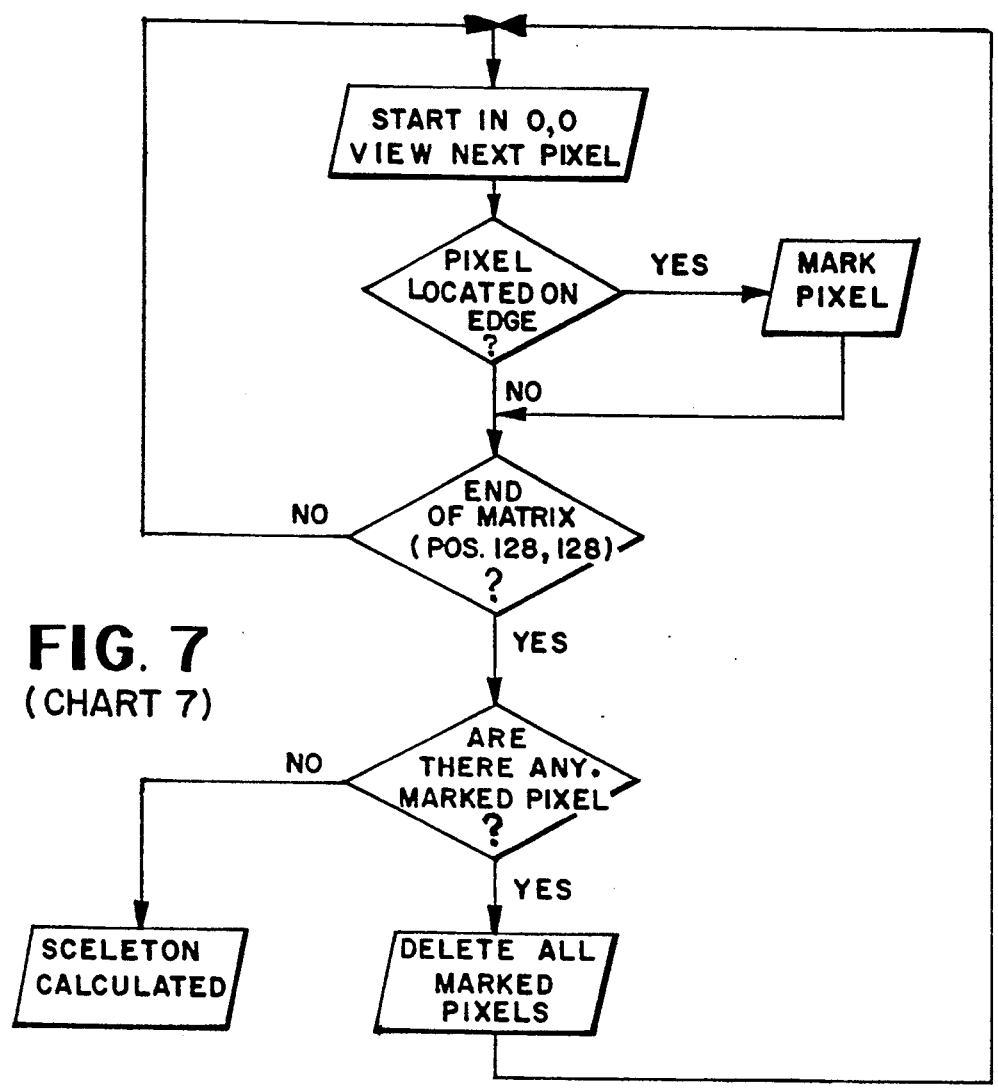
FIG. 7 is a flow chart, also called Chart 5, which illustrates the program for thinning the pixel pattern of a character in an exemplary 128 by 128 matrix in rectangular coordinates wherein the direction of movement in the matrix is from the upper left corner to the lower right corner, the thinning process providing a skeleton following the center line of the pixel pattern.

The next process is thinning the pattern to a pixel skeleton. What is thinned is that pattern in the 128 by 128 matrix The thinning process calculates the center line of the pixel pattern and is one pixel thick. The thinning program is illustrated in FIG. 7 (Chart 5) and follows the algorithm reported in the text authored by Theo Pavlidis entitled "Algorithms for Graphics and Image Processing" which was initially published by Computer Science Press, Rockville, Md., U.S.A. in 1982. The German edition was published by Heinz Heise GmbH of Hanover, West Germany and the algorithm is in Section 9.2 of the text.

A program written in C language and called DUENN (German for thinned) which is suitable for thinning and which follows the Theo Pavlidis algorithm appears in Appendix B.

Figure 6B:
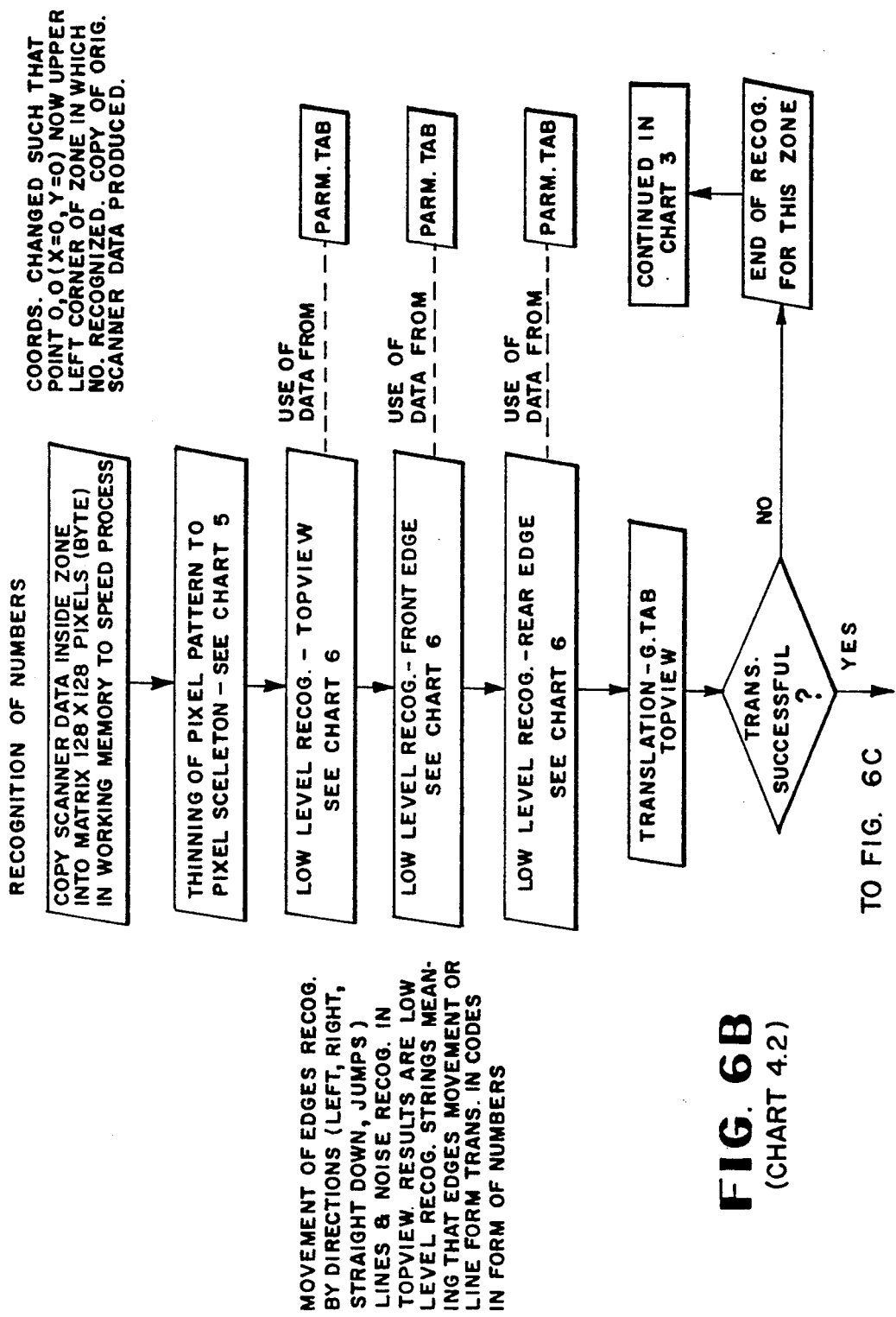
FIG. 6B is a flow chart, also designated Chart 4-2, showing the program for recognition of numbers which is carried out in accordance with the embodiment of the invention illustrated herein; it being be appreciated that the restriction of the description to marks and numeral recognition does not imply that the system is limited to the recognition of marks and numerals and that the recognition of other characters (including letters) and other symbols may also be Provided utilizing the principles and concepts of the invention as described herein.
Figure 6C:
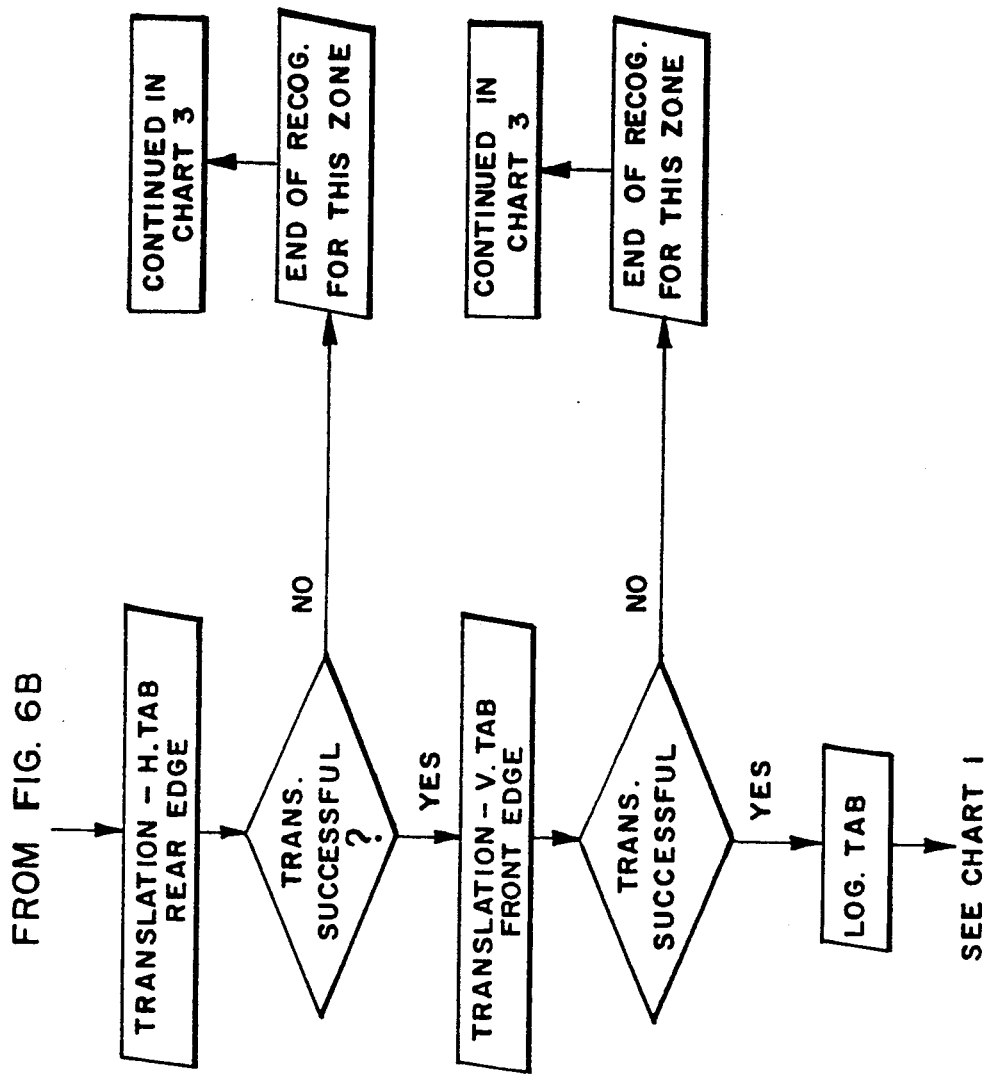
FIG. 6A shows Chart 4-1 of the program for recognition of marks in the zones which are denoted in the Teach program.

The next process is called low level recognition. In this process the pixel skeleton is described from different aspects. The file PARM.TAB is used as shown in FIG. 6B. The aspects are the too view the front edge or left and rear edge or right aspect. Briefly, the movement of edges is recognized by directions (right, left, straight down, jumps). Lines and holes are recognized in the top view. The results are low level recognition strings. In other words, the movement of the edges or line form is encoded into strings of numbers, which are contained in the computer and are thereafter used in the high level recognition process which involves the translation of the low level strings for each aspect into high level strings which correspond to characters in each aspect. Finally, the strings of high level data are correlated with strings in the file LOG.TAB. As a result of such correlation, characters are recognized with a high degree of certainty that none are missed and of veracity of recognition. As shown at the bottom of FIG. 1 the recognized characters can be stored in ASCII code and correlated with pixel patterns on hard disk for post processing of data to repair unrecognized characters if any.

Figure 9B:
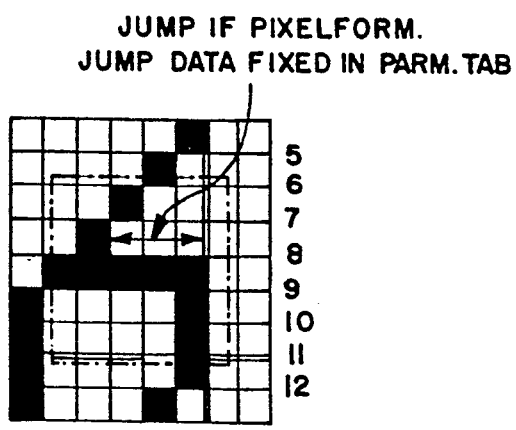
FIGS. 9A–C is a series of tables and charts showing how the character strings for a typical numeral 6, which may be hand written, are derived.
Figures 9A, 9C:
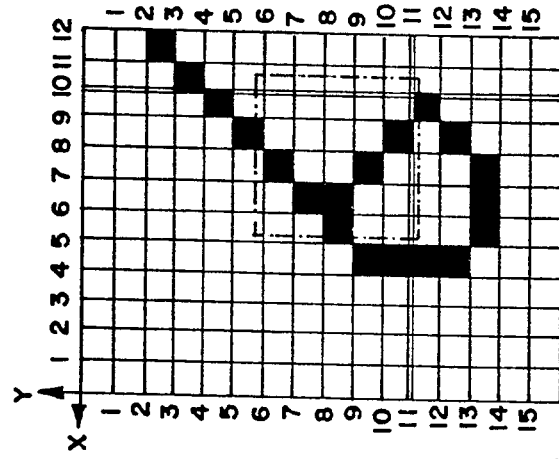

The development of the low level strings is illustrated for an exemplary form of the numeral 6 in FIGS. 9A-C. The front edge and the rear edge codes are shown in tables labeled front edge and rear edge in FIG. 9A. The top view table is shown in FIG. 9C below the pattern. Exemplary codes are indicated.

Consider the top view aspect. From the top view the skeleton is described row by row. The elements which describe a skeleton row are: line, short line, long line and hole. The parameters that indicate when a line is short or long are stored in the file PARM.TAB. This file contains all the parameters needed to build the low level recognition string for the top view. For example, the first line in PARM.TAB is the value for the length of a line. A possible entry is 1. This means that there is only one pixel set in one row. Then low level recognition translates this information to code for a line. If the parameter is three, then every combination of three pixels would be read as a line. The translation process uses certain value bytes (a code) to describe each line. For example, a short line may be represented by "8" and a long line by "7". Each line is separated by a dash. If there is a hole in a line (e.g., the bit or pixel pattern in a row being 10001), the low level recognition would be -88-. It will be noted that in low level recognition, the number of dashes should be the same as the number of rows in the matrix in which the pixel skeleton is located.

The front edge or left edge is described by the movement of the pixels in adjacent rows. The distance between the left most point of each row and the left most point of the succeeding or adjacent row is calculated. The program for calculating this movement is illustrated in FIG. 8 (Chart 6). Where delta x is the displacement and $x_{i-1}$ is the position in the matrix of the left most pixel in the next lower row and $x_i$ is the position of the pixel which is set in the immediately adjacent upper row which contains a pixel. The delta x value is replaced by a code in the PARM.TAB file.

The possible movements are: movement to the left; movement to the right; movement straight down; jump to the left; jump to the right. A jump is a movement over a certain distance. This distance is fixed in the PARM.TAB file. Every distance that is smaller than the jump distance is described as a normal movement (either to the left or right). The movements are represented by codes. For example, movement to the left by a one; movement to the right by a 2; movement straight down by a 3; jump to the left by a 5; and jump to the right by a 4. The number of bytes in a low level recognition string is the same as the number of rows of the pixel skeleton.

The rear or right edge string is developed in the same way as the front or left edge string. However, the movement of the right edge of the skeleton is determinative of the bytes or data signals in the string. The codes are the same as in the case of the front or left edge string. The result of low level recognition are three low level recognition strings representing the top view and representing the front and rear views (edges) of the skeletal pattern.

A program written in C by which the pattern of pixel can be translated into the low level strings is called KENN and appears in Appendix C.

High level recognition connects the low level recognition strings to characters in the set. The connections are represented by high level strings which are developed experimentally. These experimentally developed strings, corresponding to each of the characters, is contained in the translation tables G.TAB, V.TAB and H.TAB. These translation tables for an exemplary system which identifies a character set including the numerals 0 to 9 are contained in Appendix D, E and F, respectively. In effect, a separate language called a high level recognition language is used to represent the form of the characters. This language enables the shape of the characters to be related to the information developed in low level recognition. Accordingly, numerical values are generated which can be manipulated and handled in a computer with a reasonable amount of memory, say 100 Kbytes.

The language is therefore a numerical way of representing the pixel pictures which are obtained from the various aspects in low level recognition.

For example, the language may define the beginning and end of a string with edge form numbers. The beginning of the string may be a (upside down carat, sign, ∧,) and the end by a dollar sign, $. Each of the edge form numbers like 1, 2, 3, etc. which are placed at the beginning or at the end of a character are therefore clearly identified by the carat sign or the dollar sign. The language uses the number of edge form numbers which are allowed in different positions on the string. For example, 1, 3; 10, 20 means that a 1 (left movement) or a 3 (down movement) should be on the character string with at least a total amount of 10 and not more than 20. For example, 1, 1, 1, 3, 1, 3, 1, 3, 1 or 11 numbers satisfies this rule. The language can depend upon whether other certain edge form numbers appear in a string. For example, where, a 1 (left movement) is required. In other words, the edge form numbers which move in a particular direction characterize a particular character. For example, if the edge is moving to the left, the criteria can be that there can be a 2 (right movement) once. This allows the exclusion of pixels which are erroneously added in scanning. Another criteria may be that a special edge form number has to appear between other edge form numbers, but not at the end of a string. For example, 1, 3, %; 10, 20 means that a 2 can appear but not at the end of a left moving string.

Any string part is separated from the other string parts by asterisk marks (*). For example, ! 1, 3; 10, 20! 2, 3; 10, 20 means that the edge moves first to the left and then to the right. As another example, 1, 3; 10, 20! 2, 3; 0, 20 means that the second movement (to the right) can exist on a character. This allows the recognition of numerous edge forms of the same character.

Another relationship in the development of the translation tables is the form of inclination of the edges of the characters. Consider two possibilities: first, 1, 3 (>30); 10, 20. This is a number which has to have more than 30% of the 3s (down movement) on the string. Next consider a string 1, 3 [<30]. This shows that this part of the string has to have an inclination of less than 30° towards the y axis to the left. Then for a string showing an inclination to the right would be 2, 3 [< −30]. It will be seen, therefore, that the translation tables relate the low level strings to the shape of characters and which allow for a large variation in the shape of the characters is permitted. Therefore, the system has the capability of recognizing handwritten and handprinted characters which can be written in a variety of shapes depending upon the handwriting of the individual who writes the character.

is too short and 1, 2, 3, 1, 2, 1, 1 because 3 is not an allowed element of the string. The high level strings are assembled using the concentration factors as discussed above and shown in the table. To the right of each line is a + then a carat upward to indicate the start and a dollar sign to indicate the end. Briefly, an example from the tables is:

```
^*S;1,15**S(=4),!L;!Z;6,20**S;1,20*$              +  ^ALS-4/1$
^*S;0,30**Z;4,30*L*S;1,30*$                       +  ^ALS-4/2$
^*S;0,30**Z;4,30**!L,Z(+4),!D(=6),S(+2);1,10**S;1,30*$   +  ^ALS-4/3$
^*S;0,15**Z;4,25**!L,Z;2,6**S;1,30*$              +  ^ALS-4/4$
```

There is reproduced now below the various translation tables.

The G.TAB table contains the high level strings for the top view. The V.TAB table contains the high level strings for the front or left edge and the HTAB table contains the high level strings for the right or rear edge. At the beginning of each table is a series of conversions of the movement codes into concentrated codes which appear in the table. Thus various combinations are represented by different codes. Consider that 5,8 is represented by a code for F, 48 a code for V, 38 as D. There can be some duplication, for example, L can be different combinations, K other different combinations. There are also reductions by the location in the string (the carat and dollar sign). These then are represented by various strings which are grouped first in general and then in correspondence with successive numeral. For example, the German word "aus" means "for". Thus there are a multiplicity of high level strings corresponding to low level strings for the zero. Immediately above the aus zero grouping, there are strings which can correspond to different numerals. It will be noted that there are no corresponding strings for the numeral 1 in the top view G.TAB file, as would be expected.

In effect, the translation program part which is shown in Chart 4-2 (FIG. 6B) is a replacement of high level for low level strings for corresponding aspects. As noted above the header of each translation table contains some simple replacements. For example, 244 24, which means replace all substrings 244 by the string 24 of the actual low level string.

It will be seen from the table that the high level strings have the following structure: *[n]x, [n]y, . ., [n]z[range of angle], start, end*; the x, y and z codes are allowed substrings of the string. Start means a minimum length of a string and end means the maximum length of the string. [n]denote certain characteristics, for example, ! means that the substring has to exist and a % means that the substring may not be the last. The range of an angle is written in ° and means the angle of a connecting line between the start and end points of the string.

It is believed that the foregoing description and the description which follows will make the language from which the high level strings are constructed more apparent to those skilled in the art. Take the example of a high level string then *1, 2; 3, 20*. This means that an allowed string would be every string that consists of movements 1 or 2, and has a length between 3 and 20 pixels. Examples for such allowed strings are: 1, 2, 1, 2, 2, 1, 2, 2, 2, 1, 2, 1, 2, 2, 1 and 1, 1, 1, 1, and 2, 2, 2, 2, 2, 2, 2, 2, 2, 2, 2, 2, 2, 2, 2. Examples with strings that are not allowed then would be 2, 1 for a string that The result of the HIGH-LEVEL-RECOGNITION are then three short strings. e.g.+ ^AL-4/1$ for the topview.

The program which carries out the translation from the high level tables in accordance with the low level strings is called UMTAB. This program written in C is presented in Appendix G.

There are then available as a result of the translation three high level strings for each view, namely, the top view, the rear edge and the front edge, all as shown in FIG. 6B. There is a possibility that each of these strings does not correspond to this same character. Thus using the high level strings alone can result in a number of characters on a page remaining unrecognized. This problem is solved by using the LOG.TAB table. An exemplary file for the character set of numerals 0 to 9 is contained in Appendix H.

The LOG.TAB table relates different combinations of high level strings to other combinations of high level strings which are consistent in that they represent the same character. In the LOG.TAB table some letter designations which correspond to numerals are used interchangeably with numeral designation. For example, E means eins in German which is 1. Z means zwei in German or 2, D means three or drei, the 4, or vier and 5, F or funf. The LOG.TAB table therefore relates different combination of the high level strings with other combinations of the high level strings. By way of example, the LOGTAB table may contain

| KAK-0    | 1212-8 | 21-0 | KAK-0 | 12-0 |
| KAK-0    | 1412-Z | 21-0 | KAK-0 | 12-0 |
| KAKAK-AC | 12-0   | 21-0 | KAK-0 | 12-0 | if the result of the HIGH-LEVEL-RECOGNITION is

| topview   | KAK-0  |
| frontedge | 1212-8 |
| rearedge  | 21-0   | then three 3 strings are replaced by

| topview   | KAK-0 |
| frontedge | 12-0  |
| rearedge  | 21-0  |

The LOGTAB table is accessed by a program. This program makes the correlations between the different combinations of high level strings and valid combination for the same character, as shown at the bottom of FIG. 1. An exemplary computer program written in C and called LOGTAB is contained in Appendix I.

After the LOGTAB process and returning to FIG. 1, the character is recognized. Recognition is a compare operation for the 3 recognition strings which are derived from the LOG.TAB table. In the example given above, for 0 to be recognized, the top view string is KAK-0; the front edge 12-0, and the rear edge 21-0. These three strings would be recognized as 0. An exemplary computer program for carrying out this recognition process is written in C and is called ERK.C and is presented in Appendix J.

As noted above, the recognized characters can be outputted as an ASCII file. The data that is not recognized can be stored as a pixel pattern on disk and can be post-processed off-line manually by observing the pattern on the monitor.

From the foregoing description, it will be apparent that there has been provided an improved character recognition system exemplary programs have been described and exemplary tables have been presented which are used in connection with the programs for character recognition of handwritten characters. As noted above, the description has been for identification of Arabic style numerals. The principle of the invention are, of course, applicable to other characters and symbols and variations and modifications in the herein-described system within the scope of the invention will undoubtedly suggest themselves to those skilled in the art. Accordingly, the foregoing description should be taken as illustrative and not in a limiting sense.

APPENDIX A

PIX_TO_M.C

```
1       /*
2       **      pix_to_m.c
3       **
4       **      functions to get a defined area of the total scanned image
5       **      in a matrix of the size 128 * 128. Each Pixel of the scanned
6       **      image is represented by 1 Byte in the matrix. All Operations of
7       **      recognition work on this matrix. The information about the areas
8       **      is stored in the file :::::..rec. There are the absolute coordinates
9       **      for all readareas.
10      **
11      */
12      #include <z_erk.h>
13
14      extern unsigned char huge * get_line(int i) ;
15
16      extern int              start_scan_line;
17
18      /*
19      **      pix_to_matrix
20      **              read a scanned area in the matrix. Turn around the picture if
21      **              necessary.
22      **      result
23      **              Number of black pixels
24      */
25      int             pix_to_matrix(struct points * h_ptr, int * xmin,int * ymin,int * xmax,int * ymax)
```

```
26    {
27            unsigned int
28                    p_x_start,
29                    p_y_start,
30                    p_x_end,
31                    p_y_end;
32
33            register unsigned int i, j ;
34            int ixmin, ixmax, iymin, iymax ;
35
36            unsigned char    * screen_ptr;
37            unsigned char    * xptr ;
38            int                      x, y, anzahl(number) = 0 ;
39
40            p_x_start = h_ptr->x_o_r + x_korrektur(correction);
41            p_y_start = h_ptr->y_o_r - y_korrektur - start_scan_line;
42            p_x_end = h_ptr->x_u_1 + x_korrektur(correction);
43            p_y_end = h_ptr->y_u_1 - y_korrektur - start_scan_line;
44
45            p_x_end = min(p_x_end,p_x_start + 99) ;
46            p_y_end = min(p_y_end,p_y_start + 99) ;
47
48            clearpixel( ) ;
49            ixmin = iymin = 100 ;
50            ixmax = iymax = 0 ;
51
52            if (quer)
53            {
54                    /*** das Ganze fr quer(the total from side to side) ***/
55                    for (i=p_y_start ; i<=p_y_end ; i++)
56                    {
57                            screen_ptr = get_line(i);
58                            for (j=p_x_start ; j<=p_x_end ; j++)
59                            {
60                                    xptr = screen_ptr +(j>>3) ;
61                                    if (*xptr & (0x80 >> (j & 0x0007)))
62                                    {
63                                            anzahl(number) ++ ;
64                                            /*** vertaus chen ***/
65                                            y = j-p_x_start+1 ;
66                                            x = p_y_end-i+1 ;
```

```
67                              makepixel(x,y) ;
68                              if (x < ixmin)
69                                      ixmin = x ;
70                              if (x > ixmax)
71                                      ixmax = x ;
72                              if (y < iymin)
73                                      iymin = y ;
74                              if (y > iymax)
75                                      iymax = y ;
76                      }
77              }
78      }
79  }
80  else
81  {
82      /*** das gleiche fr nicht quer(the same for not side to side) ***/
83      for (i=p_y_start ; i<=p_y_end ; i++)
84      {
85              screen_ptr = get_line(i);
86              for (j=p_x_start ; j<=p_x_end ; j++)
87              {
88                      xptr = screen_ptr + (j>>3) ;
89                      if (*xptr & (0x80 >> (j & 0x00007)))
90                      {
91                      anzahl(number) ++ ;
92                      /*** normal ***/
93                      x = j-p_x_start+1;
94                      y = i-p_y_start+1 ;
95                      makepixel(x,y) ;
96
97                      if (x < ixmin)
98                              ixmin = x ;
99                      if (x > ixmax)
100                             ixmax = x ;
101                     if (y < iymin)
102                             iymin = y ;
103                     if (y > iymax)
104                             iymax = y ;
105                     }
106             }
107     }
```

```
108        }
109
110        *xmin = ixmin ;
111        *xmax = ixmax ;
112        *ymin = iymin ;
113        *ymax = iymax ;
114
115        return(anzahl(number)) ;
116    }
117
```

APPENDIX B

DUENN.C

```
1   /*
2   **      duenn.c
3   **              Thinning of a pixelpattern to a pixelskeleton
4   **              algorithm by Theo Pavlidis
5   */
6
7   #include <z_erk.h>
8
9   #define setskelpixel(x,y)           (matrix[x][y] = 0x08)
10  #define setwegpixel(x,y)        setkillpixel(x,y)
11  #define clrwegpixel(x,y)            (matrix[x][y] &= ~0x04)
12
13  /*
14  **      lim_pix
15  **              calculates the new end of the matrix
16  **      result
17  **              void
18  */
19  void            lim_pix(int *xmin, int *ymin, int *xmax, int *ymax)
20  {
21          int     x,y,fertig(finish),xxmin,xxmax ;
22
23          xxmin = *xmin ;
24          xxmax = *xmax ;
25
26          /*** zuerst werden die erste und letzte Zeil e bestimmt(at the
    first and last row) ***/
27          for (y=*ymin , fertig=0 ; y<=*ymax && !fertig(finish); y++)
```

```
28                    for (x=xxmin ; x<=xxmax ; x++)
29                            if (ispixel(x,y))
30                            {
31                                    fertig(finish) = 1 ;
32                                    *ymin = y ;
33                                    break ;
34                            }
35            for (y=*ymax , fertig=0 ; y>=*ymin && !fertig(finish); y--)
36                    for (x=xxmin ; x<=xxmax ; x++)
37                            if (ispixel(x,y))
38                            {
39                                    fertig(finish) = 1 ;
40                                    *ymax = y ;
41                                    break ;
42                            }
43
44            /*** fr jede Zeile min und max bestimmen(calculate for each row, min and max) ***/
45            for (y=*ymin ; y<=*ymax ; y++)
46            {
47                    kant_v[y] = -1;
48                    kant_h[y] = -1;
49                    for (x=xxmin ; x<=xxmax ; x++)
50                            if (ispixel(x,y))
51                            {
52                                    kant_v[y] = x ;
53                                    break ;
54                            }
55                    for (x=xxmax ; x>=xxmin ; x--)
56                            if (ispixel(x,y))
57                            {
58                                    kant_h[y] = x ;
59                                    break ;
60                            }
61            }
62
63            return ;
64    }
65
66    /*
67    **      match
```

```
68      **                      Pruefen ob es passt(check if it fits)
69      **                              in a muss einer gesetzt sein(in a must one be
            placed)
70      **                              in b muss einer gesetzt sein(in b must one be
            placed)
71      **                              in f darf keiner gesetzt sein(in f no one should
            be placed)
72      **          Ergebnis(Result)
73      **                  1       passt(fits)
74      **                  0       passt nicht(does not fit)
75      **          Beachte:
76      **                  dies ist ein Makro(this is a macro)
77      */
78      #define match(nb,a,b,f)   ( !((nb) & (f)) && ((nb) & (a)) && ((nb) & (b))
            )
79
80      #define match1(nb,a,f)    ( !((nb) & (f)) && !( (-(nb)) & (a)) )
81
82      /*
83      **      duenn_richt(thin direction)
84      **              Ausdnnung in einer von vier Richtungen(thinning in one of
            four directions)
85      **          Ergebnis(Result)
86      **          1       eine pixel zum Lschen gefunden(found one pixel to be
            erased)
87      **          0       nix mehr zum Lschen gefunden(nothing more to be
            erased)
88      */
89      Static int              duenn_richt(int xmin, int ymin, int xmax, int
            ymax, int xr, int yr)
90      {
91              int     x,y, skel, remain = 0 ;
92              unsigned char   nachbarn ;
93
94              for (y=ymin ; y<=ymax ; y++)
95                      for (x=kant_v[y] ; x<=kant_h[y] ; x++)
96                              if (matrix[x][y] == 1 && matrix[x+xr][y+yr] ==
            0)
97                                      {
98                                              /* die Nachbarschaft(neighborhood) als
            Maske */
```

```
 99                              nachbarn(neighbor) = nb_mask(x,y) ;
100
101                              skel = 0 ;
102
103                              /* 1. Muster und um 90 Grad gedreht */
104                              if (match(nachbarn, NB_OBEN, NB_UNTEN,
     NB_RE_MI|NB_LI_MI))(neighbor below)
105                                   skel = 1 ;
106                              else if (match(nachbarn, NB_LINKS,
     NB_RECHTS, NB_MI_OB|NB_MI_UN))(neighbor left, right)
107                                   skel = 1 ;
108
109                              /* 2. Muster mit 3 D (examples) rehungen
     */
110                              else if (match(nachbarn,(neighbor above,
     left) NB_OBEN|NB_LINKS, NB_RE_UN, NB_RE_MI|NB_MI_UN))
111                                   skel = 1 ;
112                              else if (match(nachbarn,(neighbor above,
     right) NB_OBEN|NB_RECHTS, NB_LI_UN, NB_LI_MI|NB_MI_UN)
113                                   skel = 1 ;
114                              else if (match(nachbarn,(neighbor below,
     left) NB_UNTEN|NB_LINKS, NB_RE_OB, NB_RE_MI|NB_MI_OB)
115                                   skel = 1 ;
116                              else if (match(nachbarn,(neighbor below,
     right) NB_UNTEN|NB_RECHTS, NB_LI_OB, NB_LI_MI|NB_MI_OB))
117                                   skel = 1 ;
118                              else
119                                   skel = 0 ;
120
121                              if (skel)
122                                   setskelpixel (x,y) ;
     /* Skelett(skeleton) */
123                              else
124                              {
125                                   setkillpixel (x,y) ;/* kann
     weg(can be erased) */
126                                   remain = 1 ;
127                              }
128                         }
129           shiftpixel(xmin,ymin,xmax,ymax) ;
130           return(remain) ;
```

```
131     }
132
133     /*
134     **      duenn(thin)_pix
135     **              Ausdnnung
136     **      Ergebnis
137     **              void
138     */
139     void            duenn_pix(int xmin, int ymin, int xmax, int ymax)
140     {
141             int     remain,x,y ;
142
143             if (kloss)
144                     do_kloss(xmin,ymin,xmax,ymax) ;
145
146             do
147             {
148                     remain = 0 ;
149                     remain += duenn_richt(xmin,ymin,xmax,ymax,1,0) ;
150                     remain += duenn_richt(xmin,ymin,xmax,ymax,0,-1) ;
151                     remain += duenn_richt(xmin,ymin,xmax,ymax,-1,0) ;
152                     remain += duenn_richt(xmin,ymin,xmax,ymax,0,1) ;
153             } while(remain) ;
154
155             for (y=ymin ; y<=ymax ; y++)
156                     for (x=kant_v[y] ; x<=kant_h[y] ; x++)
157                             matrix[x][y] >>= 3 ;
158             return ;
159     }
```

APPENDIX C

KENN.C

```
1    /*
2    **   -Kenn.c
3    **        functions to build a low-level description of the pixelpattern
4    **        depending of the point of view (front, rear and top).
5    */
6
7    #include <z_erk.h>
8
9    #define K_DIREKT
```

```
10
11   #define KANTEN 0(Border)
12   #define VORNE 1(Front)
13   #define HINTEN 2(Back)
14   #define GRUPPEN 3(Group)
15
16   #define SPRUNG_RECHTS       '4'
17   #define SPRUNG_LINKS        '5'
18   #define SPRUNG_LEER_RECHTS       'A'
19   #define SPRUNG_LEER_LINKS        'B'
20
21
22   int ausgabe ;
23
24   /*
25   **   kant_fass
26   **        translate the low-level strings of the front view and the rearview
27   **        to a high-level recognition string
28   **        put identical signs together
29   */
30   static char *   kant_fass(char * kenn, void * p_um,int was)
31   {
32           kenn = umtab_sch(p_um,kenn,was) ;
33           if (kenn != NULL)
34                   kenn = ident_fass(kenn) ;
35           return(kenn) ;
36   }
37
38   /*
39   **   kenn_fass
40   **        translate the low-level recognition string of the topview
41   **        to a high-level recognition string
42   **        put identical signs together
43   */
44   static char *   kenn_fass(char * kenn, void * p_um)
45   {
46           if (debug > 4)
47                   printf("I : %s\n",kenn) ;
48           kenn = umtab_sch(p_um,kenn,GRUPPEN) ;
49           if (kenn != NULL)
```

```
50              kenn = ident_fass(kenn) ;
51          return(kenn) ;
52  }
53
54  /*
55  **  kenn_g
56  **      build the low-level description of the topview
57  */
58
59  char *   kenn_g(void * p_um)
60  {
61          static char     zus[100[ ;
62          int             y ;
63          int             cc ;
64          struct grp *    pg ;
65          struct grp *    lpg = NULL;(zero)
66          struct grp *    lpg1 = NULL;(zero)
67          struct grp *    lpg2 = NULL;(zero)
68          struct grp *    npg = NULL;(zero)
69          char            kenn[200] ;
70          char *                  pk ;
71          char *          t;
72
73          /*** Kennziffern fuer Gruppen ermitteln(calculate ID for groups)
    ***/
74          pk = kenn ;
75          *(pk++) = '^' ;
76          y = -1 ;
77
78          for (pg = grp_first(),cc = 0 ; pg ; pg = grp_next())
79          {
80                  if (pk > kenn + sizeof(kenn) -5 )
81                          break ;
82
83                  if (pg->zeile != y)
84                  {
85                          *(pk++) = '-' ;
86                          lpg = NULL;
87                          cc++;
88                  }
89                  switch (grp_was(pg))
```

```
 90                    {
 91                    case ST_LANG:(long)
 92                    case ST_LANG_KURZ:(long-short)
 93                            y = pg->zeile ;
 94                            *(pk++) = '7' ;
 95                            break
 96                    case ST_KURZ:(short)
 97                    case ST_KURZ_DICK:(short thick)
 98                            y = pg->zeile ;
 99                            *(pk++) = '6' ;
100                            /* Neun unten und Eins(nine below and one) ...
       */
101                            if(!lpg)
102                                    npg = pg;
103                            break ;
104                    case ST_DICK:
105                    case ST_DICK_NIX:
106                            y = pg->zeile ;
107                            * (pk++) = '8' ;
108
109                            /* Neun unten und Eins(nine below and one) ...
       */
110                            if (!lpg && npg)        /* N eue Zeile */
111                            {
112                                    if ((pg->links - npg->rechts) > 6)
113                                    {
114                                            *(pk-2) = 'E';
115                                            *(pk-1) = 'E';
116                                    }
117                            }
118                            npg = NULL;
119
120                    /* Neun oben und Vier(nine above and four) .. */
121                    if (cc == 2)
122                    {
123                                    if(lpg && ((pg->links - lpg->rechts)
       (left, right)> 4))
124                                    {
125                                            if (strncmp(kenn,"^-8-88",6)
       == 0)
126                                            {
```

```
127                                              *(pk-2) = '9';
128                                              *(pk-1) = '9';
129                                       }
130                                }
131                         }
132
133                         /* Unterer Strich bei Neun(lower line on nine) */
134                         if(lpg && ((pg->links(left) - lpg->rechts) < 5))
135                         {
136                                /* Ist es eine 88(is an 88) Gruppe */
137                                if (*(pk-2) == '8' && *(pk-3) == '-')
138                                {
139                                       *(pk-2) = 'C';
140                                       *(pk-1) = 'C';
141                                }
142
143                         }
144
145                         if (lpg1)
146                                lpg2 = lpg;
147                         if (lpg)
148                                lpg1 = lpg;
149                         lpg = pg;
150
151                         break ;
152                  case ST_NIX:
153                         break ;
154                  }
155         }
156         /* 1. Schluẞbetrachtung(termination) */
157         if (strncmp("88-8",(pk-4),4) == 0)
158         {
159                if(lpg && ((lpg1->links - lpg2->rechts(right)) > 4))
160                {
161                       *(pk-4) = '9';
162                       *(pk-3) = '9';
163                }
164         }
165
166         *(pk++) = '$' ;
```

```
167             *pk = '\0' ;
168
169             ausgabe = atoi (getenv("AUSGABE"));(output)
170             if (ausgabe == GRUPPEN)(output group)
171                     printf("#s\n",kenn);
172
173             if (debug > 4)
174                     printf("I : %s\n",kenn) ;
175
176             /*** Zusammmenfassen(resume) ***/
177             t = kant_fass(kenn,p_um,GRUPPEN) ;
178
179             if (t == NULL)
180             {
181                     grp_free();
182                     return(NULL);
183             }
184
185             memset(zus,'\0',sizeof(zus));
186             strcpy(zus,t) ;
187
188             return(zus) ;
189     }
190
191     /*
192     **  kenn_diff
193     **      calculate the difference of to lines
194     **      Ergebnis
195     **              1       links(left)
196     **              2       rechts(right)
197     **              3       gerade(straight)
198     **              4       Sprung rechts(jump right)
199     **              5       Sprung links(jump left)
200     */
201     char    kenn_diff(int diff, int spr)
202     {
203             if (diff == 0)
204                     return('3') ;
205             else
206             {
207                     if (diff > 0)
```

```
208                 {
209                         if (diff >= spr)
210                                 return('4') ;
211                         else
212                                 return('2') ;
213                 }
214                 else
215                 {
216                         if (diff <= -spr)
217                                 return('5') ;
218                         else
219                                 return('2') ;
220                 }
221         }
222 }
223
224 /*
225 ** kenn_v
226 **      build the low-level description of the front view
227 */
228
229 char * kenn_v(void * p_um, int spr,int ymin,int ymax)
230 {
231         static char     zus[100] ;
232         char            vkante[100] ;
233         struct grp *    p1 ;
234         struct grp *    p2 ;
235         char *          kp ;
236         int                     y ;
237         char            *t;
238         char            * vptr;
239
240         /*** Kennziffern fuer Vorderkante ermitteln(calculate ID for front) ***/
241         kp = vkante ;
242         * (kp++) = '^' ;
243
244         for (y=ymin ; y < ymax ; y++)
245         {
246                 if (kp > vkante+sizeof(vkante)-5)
247                         break ;
```

```
248              if (kant_v[y] == -1 || kant_v[y+1] == -1)
249                     * (kp++) = '0';
250              else
251                     * (kp++) = kenn_diff(kant_v[y+1]-kant_v[y],spr);
252              /************/
253              if (*(kp-1) == SPRUNG_RECHTS)(jump right)
254              {
255                     if (!(ispixel(kant_v[y+1]-2,y)))
256                             *(kp-1) = SPRUNG_LEER_RECHTS;(jump various right)
257              }
258              if (*(kp-1) == SPRUNG-LINKS)(jump left)
259              {
260                     if (!(ispixel(kant_v[y]-2,y+1)))
261                             *(kp-1) = SPRUNG_LEER_LINKS;(jump various left)
262              }
263
264              /************/
265         }
266
267         * (kp++) = '$' ;
268         *kp = '\0' ;
269
270         if (debug > 4)
271                 printf("II : %s\n",vkante) ;
272
273
274         ausgabe = atoi(getenv("AUSGABE"));(output)
275         if (ausgabe == VORNE)(output front)
276                 printf("%s\n",vkante);
277
278         /*** Zusammmenfassen(resume) ***/
279         t = kant_fass(vkante,p_um,VORNE)(front) ;
280
281         if (t == NULL)
282         {
283                 grp_free();
284                 return(NULL);
285         }
```

```
286
287             strcpy(zus,t) ;
288
289             return(zus) ;
290     }
291
292     /*
293     **  kenn_h
294     **      build the low-level description of the rearview
295     */
296     char * kenn_h(void * p_um,int spr,int ymin, int ymax)
297     {
298             static char     zus[100] ;
299             char            hkante[100] ;
300             struct grp *    p1 ;
301             struct grp *    p2 ;
302             char *          kp ;
303             int                             y ;
304             char            *t;
305             char            *hptr;
306
307             /*** Kennziffern fuer Hinterkante ermitteln(calculate ID for Back) ***/
308             kp = hkante ;
309             * (kp++) = '^' ;
310
311             for (y=ymin ; y < ymax ; y++)
312             {
313                     if (kp > hkante+sizeof(hkante)-5)
314                             break ;
315
316                     if (kant_h[y] == -1 || kant_h[y+1] == -1)
317                             * (kp++) = '0';
318                     else
319                             * (kp++) = kenn_diff(kant_h[y+1]-kant_h[y],spr) ;
320
321                     if (*kp-1) == SPRUNG_RECHTS)(jump right)
322                     {
323                             if (!(ispixel(kant_h[y+1]-2,y+1)))
```

```
324                            *(kp-1) = SPRUNG-LEER_RECHTS(jump
        various to left):
325                }
326                if (*(kp-1) == SPRUNG_LINKS)
327                {
328                        if (!(ispixel(kant_h[y]-2,y)))
329                                *(kp-1) = SPRUNG-LEER_LINKS;
330                }
331         }
332
333         *(kp++) = '$' ;
334         *kp = '\0' ;
335
336         if (debug > 4)
337                 printf("III : %s\n",hkante) ;
338
339         ausgabe = atoi(getenv("AUSGABE"(output))) ;
340         if (ausgabe == HINTEN(output-back))
341                 printf("%s\n",hkante);
342
343
344         /*** Zusammmenfassen ***/
345         t = kant_fass(hkante,p_um,HINTEN);
346
347         if (t == NULL)(zero)
348         {
349                 grp_free();
350                 return(NULL);
```

APPENDIX D

Translation G-Tab

|  | ^-8-88   ^K |
|---|---|
| ^-8-99 | ^-8-88 : hier Differenz > als (einstellbar)(Here difference > as (changeable)} 2 Pixel |
| -99-8$ | L$ |
| -CC | L |
| -68-8$ | L$ |
| -88-68-8 | -88-8 |
| -68-8 | L |
| -EE | -88 |

| | |
|---|---|
| -88888 | F |
| -8888 | V |
| -888 | D |
| -8D | KD |
| :-88 | U |
| -87 | L |
| -78 | L |
| -86 | K |
| -68 | K |
| -7 | L |
| -6 | K |
| 8888 | F |
| -8888 | V |
| -8868 | K |
| -8878 | L |
| -7888 | L |
| -8788 | L |
| -8787 | L |
| -8786 | L |
| -8687 | L |
| -6888 | K |
| -8688 | K |
| -8686 | K |
| -688 | K |
| -667 | L |
| -668 | K |
| -676 | K |
| -677 | L |
| -678 | L |
| -686 | K |
| -687 | L |
| -688 | K |
| -766 | L |
| -767 | L |
| -768 | L |
| -776 | L |
| -777 | L |
| -778 | L |
| -786 | L |
| -787 | L |
| -788 | L |

| | |
|---|---|
| -866 | K |
| -867 | L |
| -868 | K |
| -876 | L |
| -877 | L |
| -878 | L |
| -886 | K |
| -887 | L |
| -888 | D |
| -666 | K |
| -66 | K |
| -67 | L |
| -68 | K |
| -76 | L |
| -77 | L |
| -78 | L |
| -86 | K |
| -87 | L |
| -88 | Z |
| -8L | L |
| -L8 | L |
| # | |
| -8 | S |
| -6 | K |
| -7 | L |
| -7-7 | -7 |
| -6-6 | -6 |
| KKK | L |
| KK | L |
| L | L |
| KLK | L |
| LK | L |
| KK6 | KKK |
| K6 | KK |
| 6K | KK |
| KK8 | KKK |
| K8 | K |
| 8K | K |
| L6 | L |
| 6L | L |
| L8 | L |

```
8L          L
Z6          Z
Z8          Z
D6          D
D7          D
K8K         KKK
K7          KK
L7          LL
K7K         KKK
7           L
6           K
8           S
K           L
V           D
F           D
LL          L
LL          L
^SS         ^S
^SL         ^L
^SSL        ^L
LS$         L$
LSS$        L$
LSSS$       L$
$$          $
SS$         $
^LZ         ^L
^LZZ        ^L
^LSL        ^L
^LEE        ^L
LSL         L

:-------------------------------------------------------------------------------
^L*Z;1,60*L$         +^KAK-0/1$      : 0 : 170
^*S;1,6**Z;6,60*L$       +^KAK-0/2$    : 0 : 11
^L*Z,S;1,8**Z;3,40*L$        +^KAK-0/3$    : 0 : 10
:-------------------------------------------------------------------------------
^*S;6,40*$    +^SAS-1/1$      : 1 : 228
:-------------------------------------------------------------------------------
^*L;1,2**Z;1,6**S;1,40**L;1,2*$  +^KASL-2/1$          : 3 : 113
^L*S;6,60*L$       +^KASL-2/2$    : 2 : 82
^L*S;4,40**Z;1,4L$     +^KASL-2/3$    : 3 : 17
^*!L,!Z;1,4**S;2,40**!L,S,!Z;2,8**S;0,3*$  +^KASL-2/4$       : 2 : 17
```

^L*S;4,40!L,Z,!D;1,15S;0,8*$     +^KASL-2/5$      : 2 : 16

^*!L,!Z;1,4S;2,40!L,!Z,S;2,8**S;0,3*$    +^KASL-2/6$      : 2 : 14

^*!L,Z,S;1,4S;2,40!L,Z,!D,S;3,15*$      +^KASL-2/7$      : 2 : 13

:---------------------------------------------------------------

^*S;3,60**!L,Z,S;1,6*$     +^SKSK-3/1$     : 3 : 29

^*L;1,2Z;1,6S;1,30*L*S;1,30*L$    +^SKSK-3/4$     : 3 : 11

^L*S;4,40!L,!S;1,6S;4,40**!L,!%;1,10*$   +^SKSK-3/5$    : 3 : 10

:---------------------------------------------------------------

^*S;1,15S(=4),!L,!Z;6,20S;1,20*$  +^ALS-4/1$       : 4,173

^*S;0,30Z;4,30L*S:1,30*$       +^ALS-4/2$    : 4,112

^*S;0,30Z;4,30!L,Z(=4),!D(=6),S(=2);1,10**S;1,30*$   +^ALS-4/3$   : 4,50

^*S;0,15Z;4,25!L,Z;2,6**S;1,30*$       +^ALS-4/4$     : 4,29

:---------------------------------------------------------------

^L*S;6,30*L*S;2,30**Z;0,10*L$     +^LSAK-5/1$   : 5,194

^*!L,Z;1,2S;6,30!L,Z;1,6S;6,30Z;1,10**L;1,2*$   +^LSAK-5/1b$   : 5,58

^L*S;2,60**L,!Z;2,8*$     +^LSAK-5/3$    : 5,16

:---------------------------------------------------------------

^*S;8,60!L,!Z;1,5Z;3,40*L$     +^SKAK-SE/1$   : 6 : 125

^*S:7,40**L,Z,!D;3,60*$     +^SKAK-SE/2$   : 6 : 122

^*S;8,60!L,!Z;1,5Z;3,40*L$     +^SKAK-SE/3$   : 6 : 47

^*S;7,60*L*Z;3,15*L$     +^SKAK-SE/4$    : 6 : 12

:---------------------------------------------------------------

^*S;0,2!L;1,4Z;0,12**S;6,30*$   +^LSLS-SI/1b$  : 5,58

:---------------------------------------------------------------

^L*Z;2,40L,S;1,10Z;4,40*L$     +^KAKAK-AC/1$   : 8 : 219

^*!L,!Z;1,4!L,!Z,S;2,12Z;1,60*L$     +^KAKAK-AC/2$   : 8 : 50

:---------------------------------------------------------------

^L*Z;2,40*L*S;6,60*$    +^KAKS-9/1$    : 9 : 71

^L*Z;3,60L,!D,Z;3,15S;6,60*$    +^KAKS-9/2$    : 9 : 69

^L*Z;2,40!L,S,Z;3,6S;4,40**L,!Z;2,5*$   +^KAKS-9/3$    : 9 : 38

^*!L,!Z;1,4L,!D,Z;4,15S;2,60*$    +^KAKS-9/4$    : 9 : 24

^L*Z;4,60*L*S;6,60*L$   +^KAKS-9/5$    : 9 : 16

^L*Z;1,40L,!D;2,6S;3,60L,Z;1,8S;0,2*$   +^KAKS-9/6$   : 9 : 14

^L*Z;2,40*L*S;4,40**Z;1,15*L$   +^KAKS-9/7$    : 9 : 10

:---------------------------------------------------------------

::::::::::::::::::::::::::::::::::::::::::::::::::::::::::::::::
:AUS 0(AUS = From)

:---------------------------------------------------------------

:neu

^*!L,!D,!Z;4,8**Z;3,40*L$    +^KAK-0/4a$     : 0 : 7

```
^L*Z;1,6**L,!D,S;3,15**Z;3,40*L$     +^KAK-0/4$         : 0 : 7
^L*Z,!D;1,60*L$          +^KAK-0/5$     : 0 : 5
^L*Z;1,60**L,Z;1,4**S;0,2*$   +^KAK-0/6$        : 0 : 2
^L*L,Z;1,6**Z;3,40*L$         +^KAK-0/7$    : 0 : 6
^*L,!Z;1,4**L,!Z,S;2,12**Z;1,60*L$  +^KAK-0/8$         : 8 : 1 bei 0
^L*L,Z;1,6**L,!D;3,40**Z;3,40*L$    +^KAK-0/9$    : 0 : 1
^L*L,Z,S;1,7**Z,!D;2,60*L$    +^KAK-0/10$   : 0 : 1
^L*L,Z,!D;1,12**Z;6,60*L$     +^KAK-0/11$   : 0 : 2
^*Z;1,6**L,S;1,4**Z;6,60*L$   +^KAK-0/12$   : 0 : 1
^L*Z;3,30**L,!D,S;3,9**Z;1,30*L$    +^KAK-0/13$    : 8 : 1 bei 0
^*S;1,8**Z;6,60*L*Z;6,60*L$   +^KAK-0/14$   : 8 : 1 bei 0
:Krueppel
^*Z;1,10**S;1,6**Z;1,20**S;1,2*$    +^KAK-0/15$
^*S;1,6**Z;1,20**S;1,6**Z;1,10**L;1,1*$   +^KAK-0/16$
^*S;1,6**Z;1,10**S;1,6**Z;1,10**S;1,6**Z;1,10**L;1,1*$  +^KAK-0/17$
^*S;1,6**Z;1,10**S;1,6**Z;1,10**S;1,6**L;1,1*$   +^KAK-0/18$
^*L;1,1**Z;1,30**S;1,6**L;1,1*$   +^KAK-0/19$
^*L;1,1**Z;1,20**S;1,6**Z;1,10**S;1,6*$   +^KAK-0/20$
^*L;1,1**Z;1,20**S;1,6**Z;1,10**L;1,1*$   +^KAK-0/21$
^*L;1,1**Z;1,10**S;1,6**Z;1,10**S;1,6**Z;1,10**L;1,1*$   +^KAK-0/22$
^*L;1,1**S;1,6**Z;1,20**S;1,6**L;1,1*$   +^KAK-0/23$
^*L;1,1**S;1,6**Z;1,20**S;1,6*$   +^KAK-0$
^*L;1,1**S;1,6**D;1,6**L;1,1**Z;1,20**L;1,1*$   +^KAK-0$
^*L;1,1**!D,Z;1,20*$   +^KAK-0$
^*L;1,1**!D,Z;1,15**!L,!D,!Z;1,15*$   +^KAK-0$
:-------------------------------------------------------------
:AUS 1
:-------------------------------------------------------------

:-------------------------------------------------------------
:AUS 2
:-------------------------------------------------------------
^*S;6,60**!L,!D,Z,%S;2,15*L$   +^KASL-2/8$    : 2 : 3
^L*Z;1,15**S;4,30*L*S;0,1*$   +^KASL-2/8$    : 2 : 3

^L*Z;1,6**S;6,60**!L,!D,Z;2,15**S;0,4*$   +^KASL-2/8$    : 2 : 3
^L*Z;1,5**S;4,40*L*Z;3,20*L$   +^KASL-2/9$    : 2 : 1
^L*Z;1,10**S;4,40*L$    +^KASL-2/10$   : 2 : 1
^L*S;6,60**!L,Z,!D;2,16*$   +^KASL-2/11$   : 2 : 1
^L*S;2,60**L,Z;1,2**S;0,2*$   +^KASL-2/12$      : 2 : 3
```

^*S;1,20Z;1,10L;1,2S;1,10L;1,2**Z;1,10*$   +^KASL-2/13$

^*S;1,20Z;1,10L;1,2*$  +^KASL-2/14$

^*S;1,10Z;1,10S;1,30**L;1,2*$   +^KASL-2/15$   +^KASL-2$

^*L;1,3Z;1,10S;1,20L;1,2Z;1,10**L;1,2*$   +^KASL-2/16$

^*L;1,3Z;1,10S;1,20L;1,2Z;1,10*$   +^KASL-2/17$

^*L;1,3Z;1,10L;1,3Z;1,10S;1,20L;1,2D;1,10Z;1,10L;1,2*$   +^KASL-2

^*L;1,3D;1,10S;1,20Z;1,10L;1,2*$   +^KASL-2/19$

:Krueppel

^L*S;1,20!Z,!D;1,20S;1,6*$   +^KASL-Z/20$

:------------------------------------------------------------------------
:AUS 3
:------------------------------------------------------------------------

:^*S;3,60**!L,Z,S;1,6*$    +^SKSK-3/1$    : 3 : 29

:^*L;1,2**S;1,30*$    +^SKSK-3/2$    : 3 : 14

:^*L;1,2Z;1,6S;1,40**L;0,1*$   +^SKSK-3/3$    : 3 : 12

:^*L;1,2Z;1,6S;1,30*L*S;1,30*L$   +^SKSK-3/4$    : 3 : 11

:^L*S;4,40L,S;1,6S;4,40**L,Z;1,10*$   +^SKSK-3/5$    : 3 : 10

^L*Z;1,5S;6,60L,S,Z;1,6S;4,60L,S,Z;1,10*$   +^SKSK-3/6$    : 3 : 5

^L*!Z;2,5S;6,60Z;4,40**L;1,1*$   +^SKSK-3/7$    : 3 : 1

^*S;1,30*L*S;1,30*L$   +^SKSK-3/8$    : 3 : 1

Translation G-Tab

^*L;1,2Z;1,6S;1,30Z;1,8L;0,1*$   +^SKSK-3/10$    : 3 : 3

^*L;1,2**S;1,30*L;0,1*$         +^SKSK-3/12$    : 3 : 1

^*L;1,2**S;1,10*L*S;1,14**Z;1,6*L$   +^SKSK-3/13$    : 3 : 1

^L*S;4,40*L*Z;3,20*L$   +^SKSK-3/14$    : 2 : 2

^*L1,10Z;1,10S;1,20Z;1,10L;1,10*$   +^SKSK-3/15$

:------------------------------------------------------------------------
:AUS 4
:------------------------------------------------------------------------

^*S;1,15!L,!D,Z;2,12S;1,30*$   +^ALS-4/5$    : 4 : 10

^*S;0,20Z;1,20S;1,10*$  +^ALS-4/11$    :4,9

^*S;1,10Z;4,20L,!Z;2,6**S;0,10*$    +^ALS-4/6$   : 4 : 3

^*S;0,15Z;4,25!L,!D,Z;2,6**S;1,30*$    +^ALS-4/7$    : 4 : 3

^*S:1,20**Z;1,20*L$   +^ALS-4/1$    :4,1

^*S;0,20Z;1,20D;3,10**L;1,2*$   +^ALS-4/15$    :4,1

^*L;1,2D;1,10Z;1,10L;1,2S;1,10*$   +^ALS-4/16$   :4,1

:nicht vorhanden

^*!S,!Z;3,15!L,!D,Z;2,20S;1,30*$     +^ALS-4/8$    : 4 : 5

^*S;0,20Z;1,20L;1,3**Z;4,10*$   +^ALS-4/9$

```
^*S;0,20**Z;1,20**L;1,3**Z;4,10**L;1,2**Z;1,20*$    +^ALS-4/10$
^*S;0,20**Z;1,20**D;1,10**L;1,3**Z;4,10**L;1,2*$    +^ALS-4/12$
^*S;0,20**Z;1,20**L;1,2**Z;4,10**L;1,3**D;1,10**L;1,2*$   +^ALS-4/13$
^*S;0,20**Z;1,20**L;1,3**D;1,10**Z;4,10**L;1,2*$    +^ALS-4/14$
:--------------------------------------------------------------------
:AUS 5
:--------------------------------------------------------------------
:^L*S;6,30*L*S;2,30**Z;0,10*L$    +^LSAK-5/1$    : 5,194
:^*!L,Z;1,2**S;6,30**!L,Z;1,6**S;2,30**Z;0,10**L;0,1*$   +^LSAK-5/2$   : 5,58
:^L*S;2,60**L,!Z;2,8*$    +^LSAK-5/3$    : 5,16
^L*S;6,60**L,S,!Z;2,20*$    +^LSAK-5/4$    : 5 : 5
^L*S;4,60**L,!D,Z;2,3**S;2,60**L,!Z;2,20*$    +^LSAK-5/5$    : 5 : 1
^L*S;2,60**L,!Z;2,3**S;5,60**L,!Z;1,15*$    +^LSAK-5/6$    : 5 : 2
^L*S;2,40*L*S;2,40*L$    +^LSAK-5/7$    : 5 : 1
^L*S;2,40**L,Z;1,5**S;2,40**Z;2,20*L$    +^LSAK-5/8$    : 5 : 1
^L*S;1,60*L*S;1,60*$    +^LSAK-5/9$    : 5 : 1
^*S;1,10**Z;1,10**L;1,2**S;3,20**Z;1,10**L;1,2*$    +^LASK-5/10$    : 5 : 1
^*S;1,10**Z;1,10**L;1,2**S;3,20**!L,!Z;1,20*$    +^LSAK-5/11$    : 5 : 1
^*S;1,2**L;1,2**S;2,10**!L,Z;1,10**S;1,10**Z,L;3,15*$   +^LSAK-5/12$   : 5 : 1
^*S;1,10**L;1,2**S;1,10*$    +^LSAK-5/13$    : 5 : 1
^*L;1,2**S;1,20**L;1,2**S;2,10**Z;1,10**!L,!Z;1,10*$   +^LSAK-5/14$   : 5 : 1
^*L;1,2**S;1,10**Z;1,10**!L,!Z;2,10**S;1,10**L;1,2*$   +^LSAK-5/15$   : 5 : 1
^*L;1,2**S;1,10**Z;1,10**!L,!D;1,10**L;1,2**S;3,20**!Z,!L;1,10*S   +^ LSAK-5/16
^*L;1,2**S;1,20**L;1,2**Z;1,10**S;1,10**L;1,2*$   +^LSAK-5/17$   : 5 : 2
^*L;1,2**S;1,10**L;1,2**S;1,10**L,Z;1,10**S;1,10**Z;1,10**L;1,2*$   +^LSAK-5/1
^*L;1,2**S;1,10**L;1,2**S;1,10**L;1,2**S;1,10**L;1,2*$    +^LSAK-5/19$   : 5 :
^*L;1,2**S;1,10**L,!D;1,10**L,Z;1,10**S;3,20**Z,L;1,10*$   +^LSAK-5/20$   : 5 :
^*L,!D;1,10**S;1,10**L;1,2**S;3,20**Z;1,10**L;1,2*$    +^LSAK-5/23$    : 5 : 1
^*L,!Z,S;1,4**S;2,40**L;1,3**S;4,40**Z;2,40*L$   +^LSAK-5/25$   : 5 : 2
^*L,!Z;2,4**S;2,60**L;1,1*$    +^LSAK-5/26$    : 5 : 1
^*L,!Z;2,3**S;2,60**L;1,3**S;6,40**L,!Z;2,15*$   +^LSAK-5/27$   : 5 : 1
^*!L,Z;1,2**S;6,30**!L,Z;0,6**S;0,30**Z;0,15*L$   +^LSAK-5/28$   : 5 : 1
^*Z;1,10**S;3,20**Z;1,10**L;1,2*$  +^LSAK-5/30$
^*Z;1,10**S;1,10**Z;1,10**S;1,10*$  +^LSAK-5/31$
^*Z;1,10**S;1,10**L;1,2**S;1,10**L;1,2*$  +^LSAK-5/32$
^*L;1,2**S;1,10**L;1,2**S;1,20**L;1,2**S;0,10*$  +^LSAK-5/33$
^*L;1,2**S;1,10**L;1,2**D;1,10**L;1,2**S;1,10**Z;1,10**S;1,10**L;1,2*$  +^LSAK-5
:von 3
^*L;1,2**S;1,30**Z;1,10*L$    +^LSAK-5/35$    : 3 : 1
^*S;1,30*L*S;1,30**Z;1,6*L$    +^LSAK-5/36$    : 3 : 3
:--------------------------------------------------------------------
```

:AUS 6

:------------------------------------------------------------------

^*S;7,60L,S;1,6Z;2,40*LS    +^SKAK-SE/5$    : 6 : 2

^*S;7,40**L,Z,!D;3,60*$    +^SKAK-SE/6$    : 6 : 86

^*S:3,60L,S,!D;3,15Z;1,20*L$    +^SKAK-SE/7$    : 6 : 4

^*S;2,20Z;1,6!D;3,40**L,!Z;2,6*$    +^SKAK-SE/8$    : 6 : 1

^*S;3,20Z;1,10S;1,10**Z;1,10*$ +^SKAK-SE/9$

^*S;3,20L;1,2Z;1,10S;1,10Z;1,10**L;1,2*$ +^SKAK-SE/10$

^*S;1,10Z;1,10S;3,20Z;1,10L;1,2D;1,10L;1,2*$ +^SKAK-SE/11$

^*S;1,2L;1,2Z;1,20**L;1,2*$ +^SKAK-SE/12$

^*S;1,10Z;1,10L;1,2Z;1,10L;1,2*$ +^SKAK-SE/13$

^*L;1,2S;3,20L,!D;1,10L;1,2Z;1,20**L;1,2*$ +^SKAK-SE/14$

^*S;3,20Z;1,10!L,!Z;1,10*L$ +^SKAK-SE/15$

^*S;3,20Z;1,10L;1,2S;1,10!D,L;1,10*$ +^SKAK-SE/16$

^*S;1,2L;1,2Z;1,10**L;1,2*$ +^SKAK-SE/17$

^*S;3,20Z;1,10L;1,2Z;1,10L,!Z;1,10*$ +^SKAK-SE/18$

^*L;1,2S;3,20Z;1,10**!D,!Z;1,10*$ +^SKAK-SE/19$

^*S;3,20Z;1,10L;1,2Z;1,10L;1,2*$ +^SKAK-SE/20$

^*S;3,20L,!D,!Z;1,20S;1,10**L;1,2*$ +^SKAK-SE/21$

^*S;3,20**Z;1,10*$ +^SKAK-SE/22$

^*S;1,10Z,!D;1,20L;1,2*$ +^SKAK-SE23$

^*S;1,10!Z,L;1,20S;1,10**L;1,2*$ +^SKAK-SE/24$

^*S;3,20Z,!D,LS;1,10**!D,L;1,10*$ +^SKAK-SE/25$

^*S;3,20Z;1,10!L,!Z;1,10*L$ +^SKAK-SE/26$

^*S;1,10L;1,2Z;1,20**L;1,2*$ +^SKAK-SE/27$

^*S;3,20Z;1,10L;1,2S;1,10!Z,L;1,10*S +^SKAK-SE/28$

^*S;3,20Z;1,10S;1,10**L;1,2*$ +^SKAK-SE/29$

^*S;1,10L,!Z;1,20S;1,10**L;1,2*$ +^SKAK-SE/30$

^*S;1,10Z,!D;1,20S;1,10**L;1,2*$ +^SKAK-SE/31$

:------------------------------------------------------------------

:AUS 7

:------------------------------------------------------------------

^*S;0,2*L*S;3,20*$    +^LSLS-SI/2$    : 7 : 9

^*S;0,2L;0,1Z;1,12**S;3,15*$    +^LSLS-SI/3$    : 7 : 8

^L*S;4,40*$    +^LSLS-SI/5$    : 7 : 1

^*S;2,6L,!Z;1,8S;2,20*$    +^LSLS-SI/6$    : 7 : 1

^*S,L;1,2**Z;1,8*L*Z;2,8**S;3,20*$    +^LSLS-SI/9$    : 7 : 1

^*Z;1,10**S;3,20*$    +^LSLS-SI/10$

^*L;1,2D;1,10L;1,2**S;3,20*$    +^LSLS-SI/21$

:----------------------------------------------------------------

:AUS 8

:----------------------------------------------------------------

^L*Z;3,60L,S,!Z;2,9Z;1,60*L$     +^KAKAK-AC/3$     : 8 : 9

^L*Z;3,60*L*Z;6,60**L,!Z;2,4*L$     +^KAKAK-AC/4$     : 8 : 4

^L*Z;3,60!L,!D,S,Z;2,9Z;1,60*L$     +^KAKAK-AC/5$     : 8 : 2

^L*Z;3,30L,!D,S;3,9Z;1,30*L$     +^KAKAK-AC/6$     : 8 : 2

^L*Z;1,5L,!D,S,Z;2,9Z;1,60S,L;1,6Z;6,60*L$     +^KAKAK-AC/7$     : 8 : 1

^L*Z,D;1,10*L*S;1,1*L*Z;1,20*$     +^KAKAK-AC/8$     : 8 : 1

^L*Z,!D;2,20*L*Z;6,60*L$     +^KAKAK-AC/9$     : 8 : 1

^L*!D,Z;1,8L,S;2,4Z;4,40*L$     +^KAKAK-AC/10$     : 8 : 3

^*S;1,8**Z;6,60*L*Z;6,60*L$     +^KAKAK-AC/11$     : 8 : 8

^*S;1,8Z;6,60L,!S;2,9**Z;6,60*L$     +^KAKAK-AC/12$     : 8 : 2

^*L,!Z;1,6Z;1,60L,S;1,12**Z;6,60*L$     +^KAKAK-AC/13$     : 8 : 3

^*L,!D;2,5Z;6,60L,!S;2,12**Z;6,60*L$     +^KAKAK-AC/14$     : 8 : 4

^*S;1,6Z;1,10S;1,8Z;1,10L;1,2Z;1,20L;1,2*$     +^KAKAK-AC/15$

^*S;1,6Z;1,10S;1,8L;1,2Z;1,10**L;1,2*$     +^KAKAK-AC/16$

^*S;1,6Z;1,10L;1,2Z;1,20L;1,2*$     +^KAKAK-AC/17$

^*S;1,6Z;1,10L;1,2Z;1,10L;1,2S;1,10L;1,2Z;1,10L;1,2*$     +^KAKAK-

^*S;1,6Z;1,10L;1,2S;1,10L;1,2Z;1,10S;1,10*$     +^KAKAK-AC/20$

^*S;1,6Z;1,10L;1,2S;1,10L;1,2*$     +^KAKAK-AC/21$

^*S;1,6L;1,2Z;1,10L;1,2S;1,10L;1,2Z;1,10**L;1,2*$     +^KAKAK-AC/22$

^*L;1,2Z;1,10S;1,10L;1,2Z;1,10S;1,10L;1,2*$     +^KAKAK-AC/23$

^*L;1,2Z;1,10L;1,2Z;1,10S;1,10**L;1,2*$     +^KAKAK-AC/24$

^*L;1,2Z;1,10L;1,2**Z;1,10*$     +^KAKAK-AC/25$

^*L;1,2Z;1,10L;1,2S;3,20L;1,2Z;1,10L;1,2*$     +^KAKAK-AC/26$

^*L;1,2Z;1,10L;1,2S;1,10L;1,2**Z;1,20*$     +^KAKAK-AC/27$

^*L;1,2Z;1,10L;1,2S;1,10L;1,2Z;1,10S;1,10Z;1,10L;1,2*$     +^KAKAK

^*L;1,2Z;1,10L;1,2S;1,10L;1,2Z;1,10S;1,10*$     +^KAKAK-AC/29$

^*L;1,2Z;1,10L;1,2!D,Z;1,20L;1,2S;1,10L;1,2Z;1,10L;1,2*$     +^KAK

^*L;1,2Z;1,10L;1,2D;1,10L;1,2**Z;1,20*$     +^KAKAK-AC/31$

^*L;1,2Z;1,10L;1,2D;1,10L;1,2Z;1,10L;1,2Z;1,10L;1,2*$     +^KAKAK-

^*L;1,2Z;1,10L;1,2D;1,10L;1,2Z;1,10L;1,2S;1,10L;1,2Z;1,20L;1

^*L;1,2Z;1,10D;1,10Z;1,10L;1,2S;1,10L;1,2Z;1,20L;1,2*$     +^KAKAK

^*L;1,2S;1,10Z;1,10L;1,2Z;1,10**L;1,2*$     +^KAKAK-AC/35$

^*L;1,2S;1,10Z;1,10L;1,2S;1,10L;1,2Z;1,10**L;1,2*$     +^KAKAK-AC/36$

^*L;1,2S;1,10L;1,2Z;1,10L;1,2Z;1,10S;1,10L;1,2Z;1,20**L;1,2*$

^*L;1,2D;1,10Z;1,10S;1,10L;1,2Z;1,10L;1,2*$     +^KAKAK-AC/38$

^*L;1,2D;1,10L;1,2Z;1,10S;1,10L;1,2Z;1,10**L;1,2*$     +^KAKAK-AC/39$

^*L;1,2D;1,10L;1,2Z;1,10L;1,2S;1,10L;1,2Z;1,20L;1,2*$     +^KAKAK-

:----------------------------------------------------------------

:AUS 9

:----------------------------------------------------------------------

```
^L*Z;4,40**L,S,!Z;3,6**S;4,40**Z;2,*L$        +^KAKS-9/8$      : 9 : 1

^L*Z;3,60**L,!Z;3,6**S;4,40*$      +^KAKS-9/9$      : 9 : 1

^L*Z;3,60**L,!D,Z;3,15**S;6,60*L$        +^KAKS-9/10$     : 9 : 2

^L*Z;3,60**L,!D,Z;3,15**S;6,60**Z;1,6*L$       +^KAKS-9/11$     : 9 : 1

^L*Z;3,15**L,!Z;2,6**S;6,60*$      +^KAKS-9/12$     : 9 : 8

^L*Z;2,8*L*S;6,60**L,Z;1,3*$       +^KAKS-9/13$     : 9 : 1

^L*Z;2,40*L*S;4,40*$       +^KAKS-9/14$     : 9 : 6

^L*Z;1,60**L,!Z;3,8**S;4,60**L,Z;2,6*$       +^KAKS-9/15$     : 9 : 1

^L*Z;1,60**L,!D,Z;3,12**S;1,60**L,Z;1,6**S;0,2*$        +^KAKS-9/16$     : 9 : 2

^L*Z,!D;6,30*L*S;6,60*$      +^KAKS-9/17$     : 9 : 6

^L*L,!D,Z;1,15**S;2,8**L,!Z;2,6*$        +^KAKS-9/18$     : 9 : 1

^*L,!D;2,5**Z;4,60*L*S;6,60*$      +^KAKS-9/19$     : 9 : 3

^*L,!D;2,5**L,!Z;2,8**S;2,60**L,Z,S;2,4*$       +^KAKS-9/20$     : 9 : 1

^*Z;1,20**S;1,10*$     +^KAKS-9/22$

^*Z;1,10**D;1,10**L;1,2**S;1,10*$       +^KAKS-9/23$

^*S;1,10**Z;1,20**L;1,2**S;1,10**L;1,2*$        +^KAKS-9/24$

^*S;1,10**Z;1,10**S;3,20*$       +^KAKS-9/25$

^*S;1,10**Z;1,10**L;1,2**Z;1,10**S;3,20**Z,L;1,10*$       +^KAKS-9/26$

^*S;1,10**Z;1,10**L;1,2**S;3,20**L;1,2*$        +^KAKS-9/27$

^*S;1,10**Z;1,10**L;1,2**S;1,10**L;1,2**Z;1,10**S;3,20**Z;1,10**L;1,2*$      +^KAKS-

^*S;1,10**Z;1,10**L;1,2**D;1,10**L;1,2**S;3,20**L;1,2*$       +^KAKS-9/29$

^*S;1,10**Z;1,10**D;1,10**L;1,2**Z;1,10**S;1,10**Z;1,10**L;1,2*$       +^KAKS-9/30$

^*S;1,10**Z;1,10**D;1,10**L;1,2**S;1,10**L;1,2*$       +^KAKS-9/31$

^*L;1,2**Z,!D;1,10**L,!Z;1,10**S;0,2*$      +^KAKS-9/32$

^*L;1,2**Z;1,10**S;1,10**Z;1,10**L,S;1,3*$      +^KAKS-9/33$

^*L;1,2**Z;1,10**S;1,10**L;1,2**S;3,20**!Z,L;1,10*$       +^KAKS-9/34$

^*L;1,2**Z;1,10**L;1,2**Z;1,10**S;3,20**!Z,L;1,10*$       +^KAKS-9/35$

^*L;1,2**Z;1,10**L;1,2**Z;1,10**S;3,20**L;1,2*$        +^KAKS-9/36$

^*L;1,2**Z;1,10**L;1,2**Z;1,10**L;1,2**S;1,10**Z;0,10**L;0,2*$       +^KAKS-9/37$

^*L;1,2**Z;1,10**L;1,2**S;3,20**Z;1,10**L;0,2*$       +^KAKS-9/38$

^*L;1,2**Z;1,10**L;1,2**S;1,10**Z;1,10**L,!Z;1,10*$       +^KAKS-9/39$

^*L;1,2**Z;1,10**L;1,2**L;1,2*$        +^KAKS-9/40$

^*L;1,2**Z;1,10**L;1,2**S;1,10**D;1,10**L;1,2**Z;1,10**S;3,20**Z;1,10**L;1,2*$

^*L;1,2**Z;1,10**D;1,10**L;1,2**S;1,10**Z;1,10**S;3,20**Z;1,10**L;1,2*$      +^KAK

^*L;1,2**S;1,10**Z;1,10**S;3,20**L;1,2*$        +^KAKS-9/43$

^*L;1,2**S;1,10**Z;1,10**S;1,10**S;1,10**L;1,2**S;1,10*$       +^KAKS-9/44$

^*L;1,2**S;1,10**Z;1,10**L;1,2**Z;1,10**S;3,20**Z;1,10**L;1,2*$       +^KAKS-9/45$

^*L;1,2**S;1,10**Z;1,10**L;1,2**S;3,20**Z;1,10**L;1,2*$       +^KAKS-9/46$

^*L;1,2**S;1,10**Z;1,10**L;1,2**S;3,20**Z;1,10*$       +^KAKS-9/47$
```

```
^*L;1,2**S;1,10**Z;1,10**L;1,2**S;3,20**L;1,2*$   +^KAKS-9/48$

^*L;1,2**S;1,10**Z;1,10**L;1,2**S;1,10**Z;1,10**L;1,2*$   +^KAKS-9/49$

^*L;1,2**S;1,10**Z;1,10**L;1,2**D;1,10**L;1,2**S;3,20*$   +^KAKS-9/50$

^*L;1,2**S;1,10**Z;1,10**D;1,10**L;1,2**S;3,20**Z;1,10**L;1,2*$   +^KAKS-9/51$

^*L;1,2**S;1,10**Z;1,10**D;1,10**L;1,2**S;3,20**Z;1,10*$   +^KAKS-9/52$

^*L;1,2**D;1,10**Z;1,10**S;1,10**L;1,2**S;3,20**Z;1,10**L;1,2*$   +^KAKS-9/53$

^*L;1,2**D;1,10**Z;1,10**L;1,2**Z;1,10**S;3,20**$   +^KAKS-9/54$

^*L;1,2**D;1,10**Z;1,10**L;1,2**S;3,20*$   +^KAKS-9/55$

^*L;1,2**D;1,10**L;1,2**Z;1,10**S;3,20**L;1,2*$   +^KAKS-9/56$

^*L;1,2**D;1,10**L;1,2**S;3,20**Z;1,10**L;1,2*$   +^KAKS-9/57$
::::::::::::::::::::::::::::::::::::::::::::::::::::::::::::::
:Neuneinsaetze (new enterance)
:------------------------
:------------------------
:------------------------
:-------------------------------------------------------------

^*L;1,2**S;4,20**L;0,1**S;4,20**L,S;1,3*$   +^SKSK-3$

:-------------------------------------------------------------
:------------------------
:------------------------

^*S;1,30**Z;1,20**L;1,2*$   +^SKAK-SE$

^*S;1,30**Z;1,10**D;1,10**L;1,2**Z;1,10**L;1,2**S;1,4*$   +^SKAK-SE$

^*S;1,3**L;1,2**Z;1,10**S;1,10**L;1,2*$   +^SKAK-SE$

^*S;1,30**Z;1,10**D;1,10**Z;1,20**L;1,2*$   +^SKAK-SE$

^*L;1,2**S;1,30**L;1,2**D;1,10**Z;1,20**L;1,2*$   +^SKAK-SE$

:---------------------
:-------------------------

^*L;1,2**S,D;0,5**L;0,1**Z;4,20*L*Z;4,20*L$   +^KAKAK-AC$

^*Z;1,10**L;1,2**S;1,10**D;1,10**Z;1,10**L;1,2**S;1,10**L;1,2**Z;1,20**L;1,2*$

^*Z;1,10**L;1,2**D;1,10**Z;1,10**L;1,2**Z;1,20**L;1,2*$   +^KAKAK-AC$

^*Z;1,10**D;1,10**L;1,2**Z;1,10**L;1,2**S;1,10**L;1,2**Z;1,10**L;1,2*$   +^KAKA

^*S;1,10**Z;1,10**S;1,10**L;1,2**Z;1,10**L;1,2*$   +^KAKAK-AC$

^*S;1,10**Z;1,10**L;1,2**Z;1,10**L;1,2**Z;1,10**L;1,2*$   +^KAKAK-AC$

^*S;1,10**Z;1,10**L;1,2**Z;1,10**L;1,2**S;1,10**L;1,2**Z;1,20**L;1,2*$   +^KAKA

^*S;1,10**Z;1,10**L;1,2**S;1,10**L;1,2**Z;1,20**L;1,2*$   +^KAKAK-AC$

^*S;1,10**Z;1,10**L;1,2**E;1,3**D;1,10**L;1,2**D;1,10**L;1,2**Z;1,10**D;1,20**L;

^*S;1,10**Z;1,10**L;1,2**D;1,10**Z;1,10**L;1,2**Z;1,20**L;1,2*$   +^KAKAK-AC$

^*S;1,10**Z;1,10**L;1,2**D;1,10**Z;1,10**L;1,2**S;1,10**L;1,2**Z;1,10**L;1,2*$

^*S;1,10**Z;1,10**D;1,10**Z;1,10**L;1,2**Z;1,20**L;1,2*$   +^KAKAK-AC$
```

```
^*S;1,10**Z;1,10**D;1,10**Z;1,10**L;1,2**S;1,10**L;1,2**Z;1,10**L;1,2*$    +^KAKA
^*S;1,10**L;1,2**S;1,10**Z;1,10**L;1,2**S;1,10**L;1,2**Z;1,10**L;1,2*$    +^KAKAK
^*L;1,2**Z;1,10**S;1,10**Z;1,20**L;1,2**Z;1,10**L;1,2*$    +^KAKAK-AC$
^*L;1,2**Z;1,10**L;1,2**Z;1,10**S;1,10*$    +^KAKAK-AC$
^*L;1,2**Z;1,10**L;1,2**Z;1,10**L;1,2**S;1,10**L;1,2**Z;1,10**L;1,2*$    +^KAKAK-
^*L;1,2**S;1,20**Z;1,10**L;1,2**Z;1,20**L;1,2*$    +^KAKAK-AC$
^*L;1,2**S;1,20**Z;1,10**L;1,2**Z;1,10**S;1,10**L;1,2**Z;1,20**L;1,2*$    +^KAKA
^*L;1,2**S;1,20**Z;1,10**L;1,2**S;1,10**L;1,2**Z;1,20**L;1,2*$    +^KAKAK-AC$
^*L;1,2**S;1,20**L;1,2**Z;1,10**L;1,2**Z;1,10**L;1,2*$    +^KAKAK-AC$
^*L;1,2**S;1,20**D;1,10**Z;1,10**L;1,2**Z;1,10**L;1,2*$    +^KAKAK-AC$
^*L;1,2**S;1,20**D;1,10**Z;1,10**L;1,2**S;1,10**L;1,2**Z;1,10**L;1,2*$    +^KAKAK
^*L;1,2**D;1,10**Z;1,10**L;1,2**Z;1,10**L;1,2**S;1,10**L;1,2**Z;1,10**L;1,2*$
^*L;1,2**D;1,10**Z;1,10**L;1,2**S;1,10**L;1,2**Z;1,20**L:1,2*$    +^KAKAK-AC$
^*L;1,2**D;1,10**Z;1,10**D;1,10**L;1,2**Z;1,10**L;1,2**S;1,10**L;1,2**Z;1,20**L;
^*L;1,2**D;1,10**L;1,2**D;1,10**Z;1,10**L;1,2**S;1,10**L;1,2**Z;1,10**L;1,2*$

:----------------------------------
^*L;1,2**Z;1,10**L;1,2**D;1,10**L;1,2**Z;1,10**S;1,20*$    +^KAKS-9$
^*L;1,2**Z;1,10**L;1,2**D;1,10**L;1,2**S;1,10**Z;1,10**S;1,20**L;1,2*$    +^KAKS
^*L;1,2**Z;1,10**D;1,10**L;1,2**Z;1,10**S;1,20*$    +^KAKS-9$
^*L;1,2**Z;1,10**D;1,10**L;1,2**S;1,20*$    +^KAKS-9$
^*L;1,2**D;1,10**D;1,10**Z;1,10**S;1,20*$    +^KAKS-9$
^*L;1,2**D;1,10**L;1,2**Z;1,10**S;1,20*$    +^KAKS-9$
:------------------------
:4-bau
^*S;1,10**1;1,10**Z;1,20**L;1,10**Z;1,10**S;1,10*$    +^ALS-4$
^*S;1,10**L;1,10**Z;1,10**L;1,10**S;1,10**D;1,10**L;1,10**S;1,10*$    +^ALS-4$
^*S;1,10L;1,10Z;1,10L;1,10S;1,10*$    +^ALS-4$ :::::::::::::::::::::::::::::::::::::::::::::::::::::::::::::::::::::::
$
^
+
```

APPENDIX E

Translation V. Tab

| | |
|---|---|
| 44 | 4 |
| 434 | 4 |
| 444 | 4 |
| 4444 | 4 |

| | |
|---|---|
| 55 | 5 |
| 535 | 5 |
| 555 | 5 |
| 5555 | 5 |
| 24 | 4 |
| 34 | 4 |
| 224 | 4 |
| 234 | 4 |
| 45 | AB |
| 54 | BA |
| 15 | 5 |
| 35 | 5 |
| 115 | 5 |
| 135 | 5 |
| 4A | A |
| A4 | A |
| 55A | A |
| A55 | A |
| 5B | B |
| B5 | B |
| 55B | B |
| B55 | B |
| ^BA | ^A |
| ^5A | ^A |

```
:-----------------------------------------------------------------
^*!1,3,5(=1);2,60**!2,3,4(=1);2,60*$   ^12-0/1$      : 0 : 159
:-----------------------------------------------------------------
^*1,3[<65];10,40*$    ^141-E/1$    : 1 : 183
:-----------------------------------------------------------------
:zur Abwehr hierher(for defense to this place)
^*!1,3;3,6*A*!1,3;8,30*$   ^2541-7/3c1$    : 2 : 4
^4*!1,3;5,20*5*1,3;5,20*$   ^2541-7/3d$    : 2 : 4
^*!1,3;3,20**!2,3;1,6*A*1,3;4,20**5;0,1*$   ^1241-9/2d$    : 9 : 7

^*!1,5(=1),B,!3;3,10**4,2,!A;1,3**!1,3,5(=1),B[>20];6,60**4,2;1,4*$  ^1412-Z/1$
^*!1,5(=1),B,!3;3,10**4,2,!A;1,3**!1,3,5(=1),B[>40];6,60**4,2;0,4*$  ^1412-Z/1a$
:-----------------------------------------------------------------
^*5,1,B;1,3**A,!2,3,4;2,20**!1,3,5;4,20**!2,3,4,A;2,20*B*1,3,5;1,20**2,3,4,A;0,4
^*5,1,B;1,3**A,!2,3,4;2,20**!1,3,5;4,20**!2,3,4,A;4,20**1,5,3,B;4,20*$   ^2121-
^*A,2,3,4;1,20**!1,3,5;1,20**!2,3,4,A;1,20*B*!1,5,3;1,20**2,3,4,A;0,4*$    ^2121
```

:zur Abwehr hierher (for defense to this place)
```
^*!2,3;4,30**!1,3,2(=1);5,30*$        ^2541-7/3a$       : 2 : 4
^4*!1,3;5,20*52*1,3;5,20*$    ^2541-7/3b$       : 2 : 4
^4*!2,3;4,20**!1,3;4,20*5*2;1,2**1,3;5,20*$    ^2541-7/3c$      : 2 : 4

^*A,!2,3,4;4,20**!1,3,5;3,20**!2,3,4,A;3,20**!1,5,3,B;3,20*$     ^2121-D/4$
^*!A,2,3,4;1,6**!1,3,5;5,20**!2,3,4,A;3,20**!1,5,3,B;3,20*$     ^2121-D/4a$
^*A,2,3,!4;2,10**!1,3,5;5,20**!2,3,4,A;5,20**!1,5,3,B;5,20*$    ^2121-D/4b$
^*B,1,5;1,8*A*!1,3,5(=1);6,30**!2,3,4(=1),A;6,30*B*1,3,5;1,20**A,2,3,4;0,4*$
^*B,1,5;1,8*A*1,3,5(=1);6,30**2,3,4(=1),A;6,30*B*1,3,5;6,30*$   ^2121-D/6$
^*B,5,1,3;1,12*A*3,!1,5,B;4,20**A,4,!2,3;4,20**!1,3;1,20*5*2,3,4,A;0,5*$   ^212
^A*3,!1,5,B;3,20**A,4,!2,3;3,20**!1,3,5;3,20**!2,3,4,A;0,5*$    ^2121-D/8$ : 3 :
:-----------------------------------------------------------------------
^*1,5(=1),3[<25];6,40**2,4,A;2,5**1,3[<25];3,30*$        ^141-V/1$   : 4 : 39
:-----------------------------------------------------------------------
:zur Abwehr hierher (for defense to this place)
^*!1,3,5(=1),B;3,20**!2,!4;3,5**1,3;4,20*$       ^1241-9/2c$    : 9 : 7

^*5,1,3;1,20**2,3;1,15*B*2,3;1,10*$    ^12152-F/1$    : 5 : 22
^*5,!1,3;4,30**!2,3,4(=3);6,30**!1,3,5(=3);5,30*$     ^12152-F/2$   : 5 : 11
:-----------------------------------------------------------------------
^*!1,3,[<50];10,40**!2,3,4;4,10*$    ^12-6/1$    : 6 : 5
^*!1,3,[<50];10,40**!2,3,4,!A;5,10*$    ^12-6/1a$   : 6 : 5
:-----------------------------------------------------------------------
^*!5,1;1,3**!A,4,2;1,3**1,3,2(=1)[<20];4,30*$   ^2541-7/1$      : 7 : 17
^*!5,1;1,3**!A,4,2;1,3**1,3[<20];4,30*$     ^2541-7/1a$     : 7 : 17
^*!5,1;1,3**!A,4,2;1,3**2,3[<-20];4,30*$    ^2541-7/1a1$    : 7 : 17
^*!5,1;1,3**!A,4,2;1,3**2,3[<-20];4,30**1,3[<20];5,40*$    ^2541-7/1a2$    : 7
^*!5,1;1,3**!A,4,2;1,3**1,3[<20];4,30**2,3[<-20];5,40*$    ^2541-7/1a3$    : 7
^1*!A,4,2;1,3**1,3[<25];4,30*$    ^2541-7/1b$    : 7 : 17
^4*1,2,3[<20];10,60**1,3[<20];2,10*$    ^2541-7/2$     : 7 : 12
^4*1,3,2(=1)[<20];6,60*$    ^2541-7/3$     : 7 : 10
^*2,3;4,25**1,3;4,25*$   ^2541-7/3$    : 7 : 10
^4*!2,3.4,30**!1,3,5(=1)[>20];5,30*$   ^2541-7/3a$    : 2 : 4
:USA
^*5,1,3;1,10*A*1,3;6,40*$    ^2541-7/3d$
^*5,1,!3(>20);4,12*A*1,3;6,40*$    ^2541-7/3e$
^*2;0,1*A*1,2,3[<20];10,60*$    ^2541-7/18$     : 7 : 1
^A*2,3[<-20];8,40**1,3[<20];7,40*$    ^2541-7/16$   : 7 : 1
^*1,3;1,12**4;1,4**1,3;3,40**2,1,3;7,40*$  ^2541-7/28$      : 7 : 2
^*5,1;0,3**!A,2;1.2**1,!3;8,40$    ^2541-7/19$     : 7 : 3
```

```
^*5,!1,3;2,20**4,!2,3;3,20**5,!1,3;3,20**4,2,3;2,20*$    ^1212-8$
^*!1,3;2,20**!2,3;2,20**!1,3;2,20**!2,3;2,20*$    ^1212-8/1$    : 8 : 1
^*5;1,2**!1,3;1,10**!2,3;1,10*5*!1,3;1,10**!2;1,10*$    ^1212-8/8$
```

:------------------------------------------------------------------------

:zur Abwehr hierher(for defense to this place)

```
^*1,!3;4,10*A*!2,3[<-25];1,10**!1,3[<25];1,30*$    ^2541-7/168$

^*!1,3,5(=1),B;2,20**!2,4,A,3;5,20**1,3;6,30*$    ^1241-9/1$    : 9 : 7
^*!1,3,5(=1),B;2,20**!2,4,A,3;5,20**2,3;6,30*$    ^1241-9/2$    : 9 : 7
^*!1,3,5(=1),B;2,20**2,!4,A,3;2,10**2,3;6,30*$    ^1241-9/2a$    : 9 : 7
^*!1,3,5(=1),B;2,20**2,4,!A;1,4**1,3;1,20*B*2,3;2,15*$    ^1241-9/2b$    : 9
^*!1,3,5(=1),B;2,20**2,!4,!A;1,4**1,3;1,20*B*2,3;2,15*$    ^1241-9/2b1$    : 9
^*!1,3;3,12**!2,3;2,8*A*1,3;1,20*B*!2,3;4,30*$    ^1241-9/2b2$    : 9 : 7
```
::::::::::::::::::::::::::::::::::::::::::::::::::::::::::::

:AUS 0(AUS = FROM)

:------------------------------------------------------------------------

:neu
```
^5*1,3;3,20*2*1,3;3,20**2,3;2,20*$    ^12-0/6a$
^4B*1,3;3,20**2,3;2,20*4$    ^12-0/6b$
^1B1*2,3;3,20**1,3;2,20*4$    ^12-0/6c$
^*1,3;3,6*B*1,3;2,20**2;1,4*$    ^12-0/6d$
^51B*1,3;3,20*8*2,3;2,10*$    ^12-0/6e$
^1B*1,3;3,20**2,3;2,4*$    ^12-0/6f$
^11A3B*1,3;3,20**2;1,4*$    ^12-0/6f$
^*!1,5,3;1,30**!2,3,4;1,30*$    ^12-0/2$    : 0 : 9
^*2,3;1,6*B*!1,3;1,20**!2,3;1,20*$    ^12-0/3$    : 0 : 3
^*!2,3,4(=1),A;1,6*B*!1,3;2,60**!2,3;3,60*$    ^12-0/4$    : 0 : 6
^*!1,3,5(=1),B;10,60**!2,3;10,60**2,4(=1);1,2*$    ^12-0/5$    : 0 : 1
```
:Krueppel
```
^A*2,3;1,8*B*3,2;1,10**1,3;1,10**2,3;1,10*$    ^12-0/6$
^*B,5;1,1**1,3;1,20**2,3;1,20**A,4;1,1*$    ^12-0/7$
^*2,3;1,8*B*1,3;1,20**2;1,20*$    ^12-0/8$
```

:------------------------------------------------------------------------

:AUS 1

:------------------------------------------------------------------------

```
^*1,3;6,20*$    ^141-E/4a1$    : 1 : 12
```

:------------------------------------------------------------------------

:AUS 2

:------------------------------------------------------------------------

```
^*1;0,1**4;0,1**!2,3;1,20**!1,3,5(=1),B;5,30**2,4(=1),A;0,3*$  ^1412-Z/2a$
^*!2,3;1,20**!1,3;5,30*2B*1;1,3*$  ^1412-Z/2b$      : 2 : 8
^4*!1,3;5,30**5,1;2,6*$  ^1412-Z/2c$     : 2 : 8
^*5,1,3;4,12**!2,3;0,6*A*!1,3,5(=1),B[>20];5,30**2,4(=1),A;0,3*$  ^1412-Z/2d$
^1A*!2,3;5,30*B*1,3;1,20*2$  ^1412-Z/2e$      : 2 : 8

^*1,3,5(=1),B;1,10**4,!A,2;1,4**!2,3;1,20**!1,3,5(=1),B[>20];5,30**2,4(=1),A;0,3
^4*!2,3;4,30**!1,3,5(=1),B[>20];5,30**4;1,2*$  ^1412-Z/3$      : 2 : 4
^4*!2,3;5,30**!1,3[>20];5,30*$  ^1412-Z/4$      : 2 : 1
^2*!2,3;2,20**!1,3,5(=1),B[>20];8,50**2,4(=1),A,3;2,20*$  ^1412-Z/5$      : 2
^*4,A;1,2**!1,3,5(=1),B[>20];8,50**4,2;1,3*$  ^1412-Z/6$      : 2 : 6
^*4,A,2;2,6**!1,3[>20];8,40**5,1;2,5*S  ^1412-Z/7$   : 2 : 1
^*4,A,2;1,3**!2,3;3,20**!1,5(=1),B,3[>20];10,60**4,2;0,4*$ ^1412-Z/8$  : 2
^*4,A,2,3;2,6**!1,3[>20];10,60**2,4(=1),A;1,4*$   ^1412-Z/9$    : 2 : 4
^*!2;1,3**1,3[>20];8,60*$    ^1412-Z/10$   : 2 : 1
^*2,4(=1),A,3;4,20**!1,3[>20];10,60**!2,3,4(=1),A;6,20*$   ^1412-Z/11$      : 2
^*2,4(=1),A,3;4,20**!1,3[>20];10,60**2,3,!4,A;2,10*$   ^1412-Z/11a$     : 2 :
^*!2,3;5,30**!1,3[>20];5,30**5,B;1,3*$    ^1412-Z/12$   : 2 : 1
^*!2,3,4(=1),A;8,40**!1,3[>20];8,50**2,4(=1),A;1,4*$  ^1412-Z/13$      : 2 : 2
^*1;1,1**4,A,!2,3;2,20**!1,3[>20];10,60**2,3;1,6*4$  ^1412-Z/14$      : 2 : 1
^*1;1,3**!4,A,2,3;1,3**!1,3[>20];10,60**4,2;1,3*$   ^1412-Z/15$   : 2 : 2
^*1;1,3**4,!A,2,3;1,3**!1,3[>20];10,60**4,2;1,3*$   ^1412-Z/15$   : 2 : 2
^*1;1,3**2,4(=1),A,3;8,40**!1,3[>20];10,60**2,3;2,8*$   ^1412-Z/16$      : 2 : 1
^*1;1,3**2,3;2,5**1,3[>20];8,40**4,A;1,2**2,3;2,5*$   ^1412-Z/17$      : 2 : 1
^*1,5(=1),B[<70];1,10**2,3;2,6**4,!A,2;1,3**!1,5(=1),B,3,2(=1)[>20];10,60**4,2;0
^*1,3;1,1**1,3,5(=1),B;1,8*A*2,3;1,4**1,3[>20];8,40**B;1,1**1,3;0,30**4,2,A;2,6*
^*1,3,!A(=1),2(=1)[>20];4,60**2,4(=1),A;1,4*$    ^1412-Z/20$   : 2 : 3
^*1,3,5(=1);1,8*A*!2,3[<-25];0,5**1,!3,5(=1)[>20];6,60*B*1,3;0,6**2,3,4(=1),A;0,
^*1,3,5(=1),B;2,10*A*1,3[>20];10,60*B*1;1,20**2,3,4(=1),A;0,20*$   ^1412-Z/22$
^*1,3,5(=1),B;1,10*A*2;1,3**!1,3,5(=1),B[>20];5,30**4;0,2*$    ^1412-Z/23$   :
^*1,3,4(=1),!A,2(=1)[>20];4,60**2,4(=1),A;1,4*$    ^1412-Z/24$   : 2 : 3
^*!2,3;1,5**1,3,5(=1)[>20];4,60*B*1,3;0,6**2,3,4(=1),A;0,6*$  ^1412-Z/25$
^*!2,3;1,5**1,3,5(=1)[>20];4,60**2,3,4(=1),A;1,6*$    ^1412-Z/25$   : 2 : 5
:Krueppel(invalid)
:^*!1,3;5,30*4$    ^1412-Z/27$   : 2 : 1

^A*!2,3,4;1,20**!1,3,5[<40];5,20**2,3,4;1,10*$   ^1412-Z/28$
^B*1,3,5;1,20*BA*!1,3,5[<30];5,20**2,3,4;1,10*$   ^1412-Z/29$
^A*2,3,4[<-10];1,20**!1,3,5[<30];5,20*B*!1,3,5[<30];1,20**2,3,4;1,20*A*2,3,4;1,1
^*5;1,2**1,3,5;1,20*A*!1,3,5[<40];5,20*4$   ^1412-Z/31$
^*5;1,2**1,3,5;1,20*A*!1,3,5[<40];5,20*5*!1,3,5;1,20*A*2,3,4[<40];1,10*$  ^1412
```

```
^*5;1,2**1,3,5[<40];1,20*A*!1,3,5[<30];5,20*B5*1,3,5[<30];1,20**2,3,4;1,20*A*2,3
^*5;1,2**1,3,5[<40];1,20*A*!1,3,5[<30];5,20**2,3,4;1,10*4$   ^1412-Z/34$
^4*!2,3,4[<30];3,20**!1,3,5;5,20**!2,3,4[<-40];1,10*$   ^1412-Z/35$
^4*2,3,4[<-20];1,20**!1,3,5[<40];5,20*BA*2,3,4[<40];1,10*$   ^1412-Z/36$
^4*2,3,4[<-20];1,20**!1,3,5[<40];5,20*B*1,3,5[<30];1,20**2,3,4,A;1,10*$   ^1412-Z
^4*!2,3,4[<-20];3,20**!1,3,5[<40];5,20**!2,3,4;3,20*$   ^1412-Z/38$
^*!2,3,4[<-20];1,20**!1,3,5[<40];5,20*5*2,3,4[<-40];1,20*$   ^1412-Z/39$
^*!2,3,4[<-20];1,20**!1,3,5[<40];5,20**2,3,4;1,20*$   ^1412-Z/40$
^*!1,3,5;5,8*A*!1,3,5[<30];6,30**!2,3,4;3,20*$   ^1412-Z/41$
^*!1,3,5;5,8*A*!1,3,5[<30];6,30**2,3,!4;1,6*$   ^1412-Z/41a$
^*!1,3,5;4,8*A*!1,3,5[<30];5,20*B5*!1,3,5[<30];1,20**2,3,4[<-40];1,20*$   ^1412-Z
^*!1,3,5;4,8*A*!1,3,5[<30];5,20*B*!1,3,5[<30];1,20**2,3,4;1,20*A*2,3,4[<-40];1,2
^*!1,3,5;4,8*A*!1,3,5[<30];5,20*A*2,3,4[<-20];1,20*$   ^1412-Z/45$
^*!1,3,5;4,8*A*!1,3,5[<30];5,20*5*!1,3,5;1,20*A*2,3,4[<-40];1,20*$   ^1412-Z/46$
^*!1,3,5;4,8*A*!1,3,5[<30];5,20**!2,3,4;4,20*$   ^1412-Z/47$
^*!1,3,5;4,8*A*!1,3,5[<30];5,20**2,3,4*$   ^1412-Z/47$
^*!1,3,5;4,8*A*!1,3,5[<30];5,20**2,3,4[<-40];1,20*$   ^1412-Z/48$
^*!1,3,5;4,8*A*!1,3,5[<30];5,20**0;1,20**1,3,5;1,20*A4$   ^1412-Z/49$
^*!1,3,5;4,8*A*!1,3,5[<30];5,30**!2,3,4;3,20*$   ^1412-Z/50$
^*!1,3,5;4,8*A*!1,3,5[<30];5,30**2,3,!4;1,4*$   ^1412-Z/50$
^*!1,3,5[<40];4,8*A*1,3,5[<40];5,20*BA*2,3,4[<-40];1,20*$   ^1412-Z/51$
^*!1,3,5[<40];4,8*A*!1,3,5[<30];5,20*B*1,3,5[<30];1,20**2,3,4;1,20*A*2,3,4;1,20*
^*!1,3,5[<40];4,8*A*!1,3,5[<30];5,20**2,3,4[<-40];1,20*$   ^1412-Z/53$
^*1,3,5[<30];4,20*B*!1,3,5[<30];5,20**2,3,4;1,20*$   ^1412-Z/54$
^*1,3,5;4,8*A*!1,3,5[<40];5,20**0;1,20*5*1,3,5[<40];1,20**2,3,4;1,20*$   ^1412-Z
:neu(new)
^A*2;1,20**1,3;4,20**2;1,10*$   ^1412-Z/56$
^55*1;1,8*A*1,3;4,20*4$   ^1412-Z/57$
^55*1,3;2,10**2;1,5*A*1,3;4,20*5*1,3;1,20*A*2;1,10*$   ^1412-Z/58$
^5*1;1,8*A*2,3;1,10**1,3;1,20*B*1,3;1,10**2;1,10*$   ^1412-Z/59$
^5*1;1,8*A*1,3;1,20*B*1,3;1,10**2;1,10*$   ^1412-Z/60$
^4*!2,3;3,10**!1,3;4,20*BA*!2,3;2,10*$   ^1412-Z/61$
^*2,3;1,10**1;4,20*5$   ^1412-Z/62$
^*2,3;1,10**1,3;4,20*5*2,3;1,10*$   ^1412-Z/63$
^*1;1,8*A*1,3;4,20*5*1,3;1,20*A*2,3;1,10*$   ^1412-Z/64$
^*1;1,2*4*2,3;1,10**1,3;1,20*B*1;1,10*4$   ^1412-Z/65$
^*1;1,2*4*2,3;1,10**1,3;1,20*B*1,3;1,10**2;1,10*A$   ^1412-Z/66$ :Stern(asterisk)
^A*2,3[<-30];1,101,3;1,302;1,10*4$   ^1412-Z$
^A*2,3[<-30];1,10**1,3[<40];1,30**2;1,10*$   ^1412-Z$
```

```
^B4*3;1,10*BA*1,3[<30];1,20**2;1,10*$  ^1412-Z$

^B*2;1,10*A*1,3[<30];1,30**2;1,10*$   ^1412-Z$

^A*1,3[<30];1,20**2;1,10*$  ^1412-Z$

^A*2,3[<-40];1,10**1,3[<40];1,30**2;1,10*4$  ^1412-Z$

^A*1,3[<40];1,30**2;1,10*$  ^1412-Z$

^5*1;3,10*A*1,3[<40];1,30*A*2;1,10*$  ^1412-Z$

^5*1;3,10*A*1,3[<40];1,30**2;1,10**4;0,1*$  ^1412-Z$

^5*1;3,10*A*1,3[<40];1,10*5A*2;1,10*$  ^1412-Z$

^5*1;3,10*A*1,3[<30];1,20*B4*2,3[<-40];1,10*$  ^1412-Z$

^5*1;3,10*A*1,3[<30];1,20*A$  ^1412-Z$

^5*1;3,10*A*1,3[<30];1,10*B4*2;1,10*4$   ^1412-Z$

^5*1;3,10*A*1,3[<40];1,20*4$  ^1412-Z$

^5*1;3,10*A*1,3[<40];1,20**2;1,10*$  ^1412-Z$

^5*1,3[<40];1,10*A*1,3[<30];1,20*A$   ^1412-Z$

^4*1,3[<40];1,30*A5$  ^1412-Z$

^*2,3[<-30];1,10**1;1,10*5$  ^1412-Z$

^*2,3[<-20];1,10**1,3[<30];1,10*BA*2,3[<-30];1,10*$  ^1412-Z$

^*2,3[<-10];1,10**1,3[<30];1,10*B4*2,3[<-40];1,10**1;1,10*$   ^1412-Z$

^*1;1,10*A*1,3[<40];1,30*$   ^1412-Z$

^*1;1,10*A*1,3[<30];1,20*5*1;1,10*4$  ^1412-Z$

^*1;1,10*A*1,3[<20];1,30**2;1,10*$   ^1412-Z$

^*1;1,10*A*1,3[<20];1,20*B*1,3[<40];1,10**2;1,10*A$   ^1412-Z$

^*1;1,10*A*1,3[<20];1,20*A*2,3[<-20];1,10*$  ^1412-Z$

^*1;1,10*A*1,3[<20];1,20**2,3[<-40];1,10*$  ^1412-Z$

^*1;1,10*A*1,3[<20];1,10*B*1,3[<30];1,10**2;1,10*A*2,3[-40];1,10*$  ^1412-Z$

^*1;1,10*A*1,3[<20];1,10**0;1,10**1,3;1,10*A$  ^1412-Z$

^*1;1,10*A*1,3[<30];1,30*$  ^1412-Z$

^*1;1,10*A*1,3[<20];1,10*B*1,3[<20];1,10**2,3[<-40];1,10*$   ^1412-Z$

^*1;1,10*4*1,3[<30];1,30**2;1,10*$  ^1412-Z$

^*1,3;1,10*A*1,3[<40];1,10**0;1,10*5*1,3[<40];1,10**2;1,10*$  ^1412-Z$

^*1,3[<40];1,10*A*1,3[<40];1,20*BA*2,3[<-40];1,10*$  ^1412-Z$

^*1,3[<-40];1,10*A*1,3[<30];1,10*BA*2;1,10*$  ^1412-Z$

^*1,3[<40];1,10*A*1,3[<20];1,20*B*1,3[<20];1,10**2;1,10*$   ^1412-Z$

^5*1;1,10*A*1,3;1,30**2;1,10*$  ^1412-Z$

^*1;1,10*A*3,1[<40];1,20**2;1,10*$  ^1412-Z$

^*1;1,10*A*3,1[<40];1,10*B*1,3[<40];1,10**2;1,10*$  ^1412-Z$

^*1;1,10*A*3,1[<30];1,20*5A*2;1,10*$   ^1412-Z$

^*1;1,10*A*1,3[<40];1,20**2;1,10*$   ^1412-Z$

^*1,3[<40];1,10*A*3,1[<30];1,20*5*1;1,10*A*2;1,10*$  ^1412-Z$

^*1,3[<40];1,10*A*3,1[<30];1,10*5*1,3[<30];1,10*A*3,2[<-40];1,10*$  ^1412-Z$

^A*2,3[<-30];1,10**1,3[<30];1,20**2;1,10*$  ^1412-Z$
```

```
^5*1;1,10*A*3,1[<40];1,20*BA*2;1,10*$   ^1412-Z$

^5*1;1,10*A*3,1[<40];1,20**2,3[<-40];1,10*$   ^1412-Z$

^5*1,3[<40];1,10*A*3,1[<40];1,20**2,3[<-40];1,10*$   ^1412-Z$

^5*1,3[<40];1,10*A*1,3[<40];1,10*5*1;1,10*A$   ^1412-Z$

^4*2,3[<-20];1,10*5*1,3[<20];1,10**2,1,10*$   ^1412-Z$

^4*2,3[<-10];1,10**1,3[<30];1,10*B4*2;1,10*$   ^1412-Z$

^*1;1,10*A*3,1[<30];1,20**2,3[<-30];1,10*$   ^1412-Z$

^*1;1,10*A*3,1[<20];1,10*5A*2;1,10*$   ^1412-Z$

^*1;1,10*A*2,3[<-20];1,10*5*1,3[<40];1,20**2;1,10*$   ^1412-Z$

^*1;1,10*A*1,3[<30];1,30**2;1,10*$   ^1412-Z$

^*17;1,10*4*2,3[<-20];1,10**1,3[<40];1,10*5A$   ^1412-Z$

^*1,3[<40];1,10*A*3,2[<-20];1,10**1,3[<30];1,10**2,3[<-40];1,10*$   ^1412-Z$

^*1;1,10*4*2,3[<-20];1,10**1,3[<40];1,10*5A$   ^1412-Z$

^5*1;1,10*A*3,1[<40];1,20*BA*2[<-50];1,10*$   ^1412-Z$

^*1;1,10*A*3,1[<20];1,10*5A*2[<-50];1,10*$   ^1412-Z$

^A*2,3[<-30];1,10**1,3[<30];1,20**2[<-50];1,10*$   ^1412-Z$

^4*2,3[<-10];1,10**1,3[<30];1,10*B4*2[<-50];1,10*$   ^1412-Z$

^*1[<50];1,10*4*2,3[<-10];1,10**1,3[<40];1,10**2[<-50];1,10*$   ^1412-Z$

^*1[<50];1,10*A*3,1[<30];1,20*B*2[<-50];1,10*4*2[<-50];1,10*$   ^1412-Z$

^*1[<50];1,10*4*3,2[<-20];1,10**1,3[<20];1,20*B*1,3[<30];1,10**2[<-50];1,10*$   ^
:-----------------------------------------------------------------------
:AUS 3
:-----------------------------------------------------------------------
^*1;0,1**4,2,3;1,3**!1,3,5(=2);2,30**!2,3;1,30**1,5,B;1,5**1,3;0,15**2,3;0,15**5

^*1;1,1**!2,3,4(=1),A;6,30**!1,3,5(=1);6,30**!2,3,4,A;6,30**!1,3,4,5,B;6,30**A,2
^*2,3,4(=1),A;6,30**1,3,5(=1);6,30**2,3,4,A;6,30**1,3,4,5,B;6,30**A,2,3,4;0,4*$
^A*!2,3;2,20**!1,3,5(=1);2,20**!2,3;1,20**5;1,4*$   ^2121-D/11$   : 3 : 1
^A*!1,3;2,20**!2,3;2,20*B*2,3;1,4*4$   ^2121-D/12$   : 3 : 1
^A*!1,3;2,20**!2,3;2,20**1,5(=1),B;1,4*$   ^2121-D/13$   : 3 : 3
^*5,1;1,4*A*!1,3;8,40*B*!2,3,4(=1),A;8,40*$   ^2121-D/14$   : 3 : 1
^*5,1;1,10*A*!1,3;2,20**4,2,1;1,4**1,3,5(=1);2,20*B*2,4(=1),A;1,6*$   ^2121-D/1
^*5,1,4;1,6**1,3,5(=1);1,8*A*2,3,4(=1);0,30**1,3,5(=1);6,30**2,3,4(=1);6,30**1,3
^*1,3,5(=1);1,8*A*2,3,4(=1);0,30**1,3,5(=1);6,30**2,3,4(=1);6,30**1,3;6,30*B*1,3
^*4;1,2**!1,3;2,20*B*2,3,4(=1),A;8,40*$   ^2121-D/18$   : 3 : 1
^*4,2,3;1,6**!1,3,5(=1);4,60**4,!2,3;4,60*B*2,3,4(=1),A;1,6*$   ^2121-D/19$
^*!2,3;2,5**!1,!3[<20];8,40*B*!2,!3[<20];6,20*$   ^2121-D/20$   : 3 :1
^*!2,3,4(=1);6,30**!1,3,5(=1);6,30**!2,3,4(=1);6,30**5;1,3*$   ^2121-D/21$
^*!2,3,4(=1);6,30**!1,3,5(=1);6,30**!2,3,4(=1);6,30**!1,3,B;6,30**5;0,3*$ ^2121-
^*1,3,5(=1);2,8*A*!1,4(=1),A,3;1,20**!2,3;1,20**!1,3;1,5**1,5;0,3*$   ^2121-D/23$
```

```
^*!2,3,4(=1);6,30**!1,3,5(=1);6,30**!2,3,4(=1);6,30**5;1,3*$        ^2121-D/24$
^*!1,3;3,8**4,!A,2;1,8**!1,3;3,20**!2,3,A;3,20**!1,3,5(=1);2,20*$   ^2121-D/25$
^*!1,3,5(=1);1,6**4,!A,2,3;1,6**!1,3,5(=1);1,40**4,2,3;1,40**1,3,5;1,40**!2,3,4(

^A*2,3[<-30];3,10**1,3[<40];3,10*A*2,3[<-20];3,10**1,3[<40];3,10*5*2,3,4;3,10*$
^A*2,3[<-20];3,10**1,3[<40];3,10**2,3[<-30];3,10*B*2,3[<-30];3,10*$  ^2121-D/28
^A*1,3[<40];1,20**,3[<-30];3,10**1,3,5;3,10*BA$  ^2121-D$   ^2121-D/29$
^5*1,3,5;3,10*A*1,3[<40];1,20*A*2,3[<-40];3,10*B*2,3[<-30];3,10*$   ^2121-D/30$
^5*1,3,5;3,10*A*1,3[<40];1,20**2,3,4;3,10*4*2,3,4;3,10*B*2,3,4;3,10*4$  ^2121-D/
^5*1,3,5;3,10*A*1,3[<40];1,20**2,3,4;3,10*4*2,3[<-10];3,10*B*2,3[<-40];3,10*$  ^
^5*1,3,5;3,10*A*1,3[<40];3,10**2,3[<-40];3,10*55$  ^2121-D/33$
^5*1,3,5;3,10*A*1,3[<30];1,20**2,3[<-40];1,20*B*2,3[<-40];3,10*$   ^2121-D/34$
^5*1,3,5;3,10*A*1,3[<30];1,20**2,3[<-40];3,10*5$   ^2121-D/35$
^5*1,3,5;3,10*A*1,3[<30];3,10**2,3[<-40];3,10*B*2,3,4;3,10*4$   ^2121-D/36$
^5*1,3,5;3,10*A*1,3[<10];3,10*5*,1,3,5;3,10*A*2,3[<-20];3,10*5*2,3,4;3,10*$  ^21
^5*1,3,5;3,10*A*1,3[<40];3,10**2,3[<-30];3,10*5*1,3,5;3,10*$  ^2121-D/38$
^5*1,3,5;3,10*A*1,3[<20];1,20**2,3,4;3,10*B$  ^2121-D/39$
^*4;1,2**2,3[<-10];3,10**1,3,5;3,10*BA*2,3[<-30];1,20**1,3,5;10*BA$   ^2121-D/
^*4;1,2**2,3,4;3,10**1,3[<20];6,30*B*2,3,4;3,10*$   ^2121-D/41$
^*4;1,2**2,3[<-30];3,10**1,3[<30];3,10*BA*2,3[<-30];3,10**1,3,5;3,10*55$  ^2121-
^*4;1,2**2,3[<-10];3,10**1,3[<40];3,10*BA*2,3[<-30];3,10**1,3,5;3,10*B$  ^2121-D
^*4;1,2**1,3[<40];1,20**2,3[<-40];3,10*B$  ^2121-D/44$
^*2,3,4;3,10*44*2,3[<-30];3,10**1,3[<40];3,10**2,3[<-40];3,10**1,3,5;3,10*B*2,3,
^*1,3,5;3,10*A*2,3[<-30];3,10**1,3[<40];3,1*BA*2,3[<-20];3,10**1,3[<30];3,10*B*
^*1,3,5;3,10*A*1,3[<40];1,20**2,3[<-40];3,10*B*2,3,4;3,10*4$  ^2121-D/47$
^*1,3,5;3,10*A*1,3[<40];3,10**2,3[<-40];3,10**B,5;1,1*$  ^2121-D/48$
^*1,3,5;3,10*A*1,3[<40];3,10**2,3[<-40];3,10*B*2,3[<-40];3,10*$   ^2121-D/49$
^*1,3,5;3,10*A*1,3[<40];3,10**2,3[<-40];3,10*B*2,3,4;3,10*4$   ^2121-D/50$
^*1,3,5;3,10*A*1,3[<40];3,10**2,3[<-40];3,10*B*2,3,4;3,10*$   ^2121-D/51$
^*1,3,5;3,10*A*1,3[<30];1,20**2,3[<-40];3,10*B*2,3[<-40];3,10*$   ^2121-D/52$
^*1,3,5;3,10*4*2,3[<-30];3,10**1,3[<40];3,10**2,3,4;3,10**1,3,5;3,10*B*2,3[<-40]
^*1,3[<40];3,10*A*1,3[<40];1,20**2,3[<-30];3,10*B*2,3[<-40];3,10*$   ^2121-D/54$
^*1,3[<40];3,10*A*1,3[<40];3,10**2,3[<-30];3,10*5$   ^2121-D/55$
^*1,3[<40];3,10*A*1,3[<30];1,20**2,3[<-30];3,10*B*2,3,4;3,10*$   ^2121-D/56$
:neu
^*B,5,1,3;1,12*A*!1,3;1,25**A,4,!2,3;1,25*B*2,3;3,10*$   ^2121-D/57$
^*B,5,1,3;1,12*A*!1,3;1,25**A,4,!2,3;1,25**!1,3;1,25*BA$   ^2121-D/60$
^*B,5,1,3;1,12*A*!1,3;1,25**A,4,!2,3;1,25**!1,3;1,25**B,A;1,2*$   ^2121-D/61$
^*B,5,1,3;1,12*A*1,3;1,25**A,4,2,3;1,25**1,3;1,25*B*2,3;1,25**4;0,1*$  ^2121-D/6
^*B,5,1,3;1,12*A*!2,3;3,10**!1,3;1,15**A,!2,3;1,25**!1,3;1,25*5*2,3;0,4*$  ^2121
^*A,4;1,2**!2,3;1,25**!1,3;1,25**!2,3;1,25*B*A,4,2,3;3,10*$   ^2121-D/64$
```

```
^*A,4;1,2**!1,3;1,25**A,!2,3;1,25**!1,3;1,25**B,5;1,1**A,4,2,3;3,10*$    ^2121-D/6
^*A,4,2,3;1,25**!1,3;1,25*BA*2,3;1,25**!1,3;1,25*BA$    ^2121-D/66$
^*A,4,2,3;1,25**!1,3;1,25*BA*2,3;1,25**!1,25*55$    ^2121-D/67$
^*A,4,2,3;1,25**!1,3;1,25**B,5,A,4;1,3**2,3;1,25**!1,3;1,25*B$    ^2121-D/68$
^*A,4,2,3;1,25**!1,3;1,25*A*2,3;1,25**!1,3;1,25*5*2,3;0,4*$    ^2121-D/69$
^*A,4,2,3;1,25**!1,3;1,25*4*2,3;1,25*5*2,3;0,4*$    ^2121-D/70$
^*A,4,2,3;1,25**!1,3;1,25*4*2,3;1,25**!1,3;1,25*B*2,3;3,10**A;0,1*$    ^2121-D/71$
^*A,4,!2,3;1,25**!1,3;1,25*4*!1,3;1,25*$    ^2121-D/72$
^*A,4,2,3;1,25**!1,3;1,25**A,4,!2,3;1,25*B*2,3;3,10**4;0,1*$    ^2121-D/73$
^*A,4,2,3;1,25**!1,3;1,25**A,4,!2,3;1,25**B,5;1,2*$    ^2121-D/74$
^*A,4,2,3;1,25**!1,3;1,25**A,4,!2,3;1,25*5*2,3;0,4*$    ^2121-D/75$
^*A,4,2,3;1,25**!1,3;1,25**A,4,!2,3;1,25**!1,3;1,25*5*2,3;0,4**4;0,1*$    ^2121-D/
^*A,4,2,3;1,25**!1,3;1,25**A,4,!2,3;1,25**!1,3;1,25*B*A,2,3;3,10*$    ^2121-D/77$
^*A,4,2,3;1,25**!1,3;1,25**A,4,!2,3;1,25**!1,3;1,25*B*2,3;3,10**4;0,1*$    ^2121-D
^*A,4,2,3;1,25**!1,3;1,25**A,4,!2,3;1,25**!1,3;1,25**B,5;1,1**2,3;3,10**4;0,1*$
^*A,4,2,3;1,25**!1,3;1,25**!2,3;1,25*5*2,3;0,4*$    ^2121-D/80$
^*A,4,2,3;1,25**!1,3;1,25**!2,3;1,25*5$    ^2121-D/81$
^*A,4,2,3;1,25**!1,3;1,25**4,!2,3;1,25*5*2,3;0,4*$    ^2121-D/82$
^*A,4,2,3;1,25**!1,3;1,25**!2,3;1,25**!1,3;1,25*BA$    ^2121-D/83$
^*A,4,2,3;1,25**!1,3;1,25**!2,3;1,25**!1,3;1,25*B*A,2,3;3,10*$    ^2121-D/84$
^*5,1,3;1,12*A*2,3;1,25**B,!1,3;1,25**A,2,3;1,25**!1,3;1,25*B*A,2,3;3,10*$    ^212
^*5,1,3;1,12*A*2,3;1,25**!1,3;1,25**4,2,3;1,25**!1,3;1,25*B*2,3;3,10*$    ^2121-D
^*5,1,3;1,12*A*!1,3;1,25**!2,3;1,25*B*2,3;3,10*4$    ^2121-D/87$
^*5,1,3;1,12*A*!1,3;1,25**4,!2,3;1,25**B,5;1,1*$    ^2121-D/88$
^*5,1,3;1,12*A*!1,3;1,25**!2,3;1,25**!1,3;1,25*B*2,3;3,10*$    ^2121-D/89$
^*2,3;1,25**!1,3;1,25*4*!2,3;1,25**!1,3;1,25*B*2,3;3,10*4$    ^2121-D/90$
^*2,3;1,25**!1,3;1,25*4*!1,3;1,25*5$    ^2121-D/91$
^*2,3;1,25**!1,3;1,25**4!2,3;1,25**!1,3;1,25**B,5;1,1**2,3;0,10**A,4;0,1*$    ^21
^*2,3;1,25**!1,3;1,25**!2,3;1,25**B,5;1,1*$    ^2121-D/93$
^*2,3;1,25**!1,3;1,25**!2,3;1,25*5*2,3;0,4*$    2121-D/94$
^*2,3;1,25**!1,3;1,25**!2,3;1,25**!1,3;1,25*B*2,3;3,10*$    ^2121-D/95$
^*2,3;1,25**!1,3;1,25**!2,3;1,25**!1,3;1,25*5*2,3;0,4*$    ^2121-D/96$
^*1,3;1,2*4*2,3;1,25**5,!1,3;1,25**4,2,3;1,25*5*2,3;0,4*$    ^2121-D/97$
^*1,3;1,2*4*2,3;1,25**!1,3;1,25**2,3;1,25*B*2,3;3,10*$    ^2121-D/98$
^*1,3;1,2*4*2,3;1,25**!1,3;1,25**2,3;1,25*5*2,3;0,4*$    ^2121-D/99$
^*1,3;1,2*4*2,3;1,25**!1,3;1,25**4,2,3;1,25**!1,3;1,25*B*2,3;3,10*A$    ^2121-D/10
^*1,3;1,2*4*2,3;1,25**!1,3;1,25**2,3;1,25**!1,3;1,25*B*2,3;3,10**4;0,1*$    ^2121-
^*1,3;1,2*4*!1,3;1,25**4,2,3;1,25**!1,3;1,25*B*2,3;3,10*$    ^2121-D/102$
^*1,3;1,2*4*!1,3;1,25**2,3;1,25*B*2,3;3,10**4;0,1*$    ^2121-D/103$
^*1,3;1,2*4*!1,3;1,25**2,3;1,25*5*2,3;0,4*$    ^2121-D/104$
^*1,3;1,2*4*!1,3;1,25**4,2,3;1,25**1,3;1,25**B,5;1,2*$    ^2121-D/105$
```

^*1,3;1,2*4*!1,3;1,252,3;1,25!1,3;1,25*B*2,3;3,10*$   ^2121-D/106$

^*1,3;1,2*4*!1,3;1,252,3;1,25!1,3;1,25*5*2,3;0,4*$   ^2121-D/107$

^*1,3;1,22,3;1,25!1,3;1,25**2,3;1,25*5*2,3;0,4*$   ^2121-D/108$

:Stern(asterisk)

^A*1,3[<40];3,10*A*2,3[<-20];3,10**1,3[<40];3,10*B*3;3,10*A5$   ^2121-D$

^A*1,3[<30];4,20**2,3[<-30];3,10*B4$   ^2121-D$

^A*1,3[<10];4,20**2,3[<-20];3,10*5*2[<-50];3,10*$   ^2121-D$

^A*2,3[<-30];3,10**1,3[<40];3,10*5A*2,3[<-20];3,10**1,3[<40];3,10*5*2[<-50];3,10

^A*2,3[<-20];3,101,3[<40];3,102,3[<-40];3,10*B4$   ^2121-D$

^A*3;3,10*5*1,3[<40];3,10**2[<-50];3,10*4*2,3[<-40];3,10*5*2[<-50];3,10*4$   ^21

^A*1,3[<30];3,102,3[<-40];3,101[<50];3,10*5*1[<50];3,10*$   ^2121-D$

^A*1,3[<10];3,10*5A*2,3[<-20];3,10**1[<50];3,10*B*2[<-50];3,10*4$   ^2121-D$

^A*2[<-50];3,101,3[<20];3,102,3[<-40];3,10*BA$   ^2121-D$

^A*2,3[<-20];3,101,3[<40];3,102,3[<-30];3,10*B*2,3[<-30];3,10*$   ^2121-D$

^5*1[<50];3,10*A*2,3[<-20];3,10**1,3[<30];3,10*A*2,3[<-40];3,10**1,3[<30];3,10*B

^4*2,3[<-30];4,20**1[<50];3,10*5*1[<50];3,10*$   ^2121-D$

^4*1,3[<40];4,20**44*2[<-50];3,10*5*1[<50];3,10*$   ^2121-D$

^4*1,3[<40];3,102,3[<-30];3,101[<50];3,10*$   ^2121-D$

^4*1,3[<30];3,10*4*1,3[<40];4,20*$   ^2121-D$

^4*1,3[<20];4,202,3[<-40];3,101[<50];3,10*5*1[<50];3,10*$   ^2121-D$

^4*1,3[<20];3,10*4*1,3[<40];4,20*$   ^2121-D$

^4*2[<-50];3,101,3[<40];3,102,3[<-50];3,10*5*1[<50];3,10*$   ^2121-D$

^4*2,3[<-40];3,10**1[<50];3,10*5A*2,3[<-20];3,10**1,3[<40];3,10*BA$   ^2121-D$

^4*2,3[<-20];3,10**1[<50];3,10*5A*2,3[<-20];3,10**1,3[<20];3,10*5*2[<50];3,10*$

^4*2,3[<-20];3,101,3[<40];3,102,3[<-30];3,10**1,3[<30];3,10*$   ^2121-D$

^4*2,3[<-10];3,10**1,3[<40];3,10*BA*2,3[<-30];3,10**1[<50];3,10*B4$   ^2121-D$

^*2,3[<-40];3,101,3[<20];3,102,3[<-30];3,10**1[<50];3,10*$   ^2121-D$

^*1[<50];3,10*A*2,3[<-30];3,101,3[<30];3,102,3[<-40];3,10*B4$   ^2121-D$

^*1[<50];3,10*A*1,3[<50];3,10**2,3[<-40];3,10*5*1[<50];3,10*$   ^2121-D$

^*1[<50];3,10*A*1,3[<40];3,10*4*1,3[<30];3,10*$   ^2121-D$

^*1[<50];3,10*A*1,3[<30];4,202,3[<-20];3,101[<50];3,10*$   ^2121-D$

^*1[<50];3,10*A*1,3[<30];4,202,3[<-20];3,101,3[<40];3,10*$   ^2121-D$   ^2121

^*1[<50];3,10*A*2,3[<-20];3,10**1,3[<40];3,10*5A*2,3[<-20];3,10**1[<50];3,10*BA$

^*1[<50];3,10*4*1,3[<30];3,10**2[<-50];3,10*4*2,3[<-30];3,10**1[<50];3,10*B4$   ^

^A*3,1[<40];3,10**2,3[<-30];3,10*5*2[<-50];3,10*$   ^2121-D$

^A*3,1[<20];3,10*5*1,3[<30];3,10**2,3[<-40];3,10*5$   ^2121-D$

^A*1,3[<40];3,10*BA*2,3[<-10];3,10**1,3[<40];3,10*$   ^2121-D$

^A*3,1[<40];3,10*A*2,3[<-20];3,10*5*3,2[<-30];3,10*$   ^2121-D$   ^2121-D$

^A*3,1[<20];3,10*5A*2,3[<-30];3,10**1,3[<30];3,10*B*2[<-50];3,10*$   ^2121-D$

^A*2,3[<-30];3,10*5*1[<50];3,10*A*2,3[<-40];3,10*B*2[<-50];3,10*$   ^2121-D$

^A*2,3[<-20];3,10**1[<50];3,10*BA*2,3[<-30];3,10*B4*2[<-50];3,10*$   ^2121-D$

```
^5*1[<50];3,10*A*3;3,10*5*1[<50];3,10*A*3,1[<30];3,10*B*2[<-50];3,10*$   ^2121-D
^5*1[<50];3,10*A*3,1[<30];3,10*BA*2,3[<-40];3,10*5$  ^2121-D$
^5*1[<50];3,10*A*3,1[<20];3,10*BA*2,3[<-30];3,10**1[<50];3,10*B4$  ^2121-D$
^5*1[<50];3,10*A*3,1[<20];3,10*5*1[<50];3,10*A*3,1[<20];3,10*5$  ^2121-D$
^5*1[<50];3,10*A*2,3[<-20];3,10**1[<50];3,10*5A*2,3[<-30];3,10**1[<50];3,10*BA*2
^5*1[<50];3,10*A*1[<50];3,10*5*1,3[<40];3,10**2,3[<-40];3,10**1[<50];3,10*B*2[<-
^5*1[<50];3,10*4*2,3[<-20];3,10**1[<50];3,10*A*2,3[<-30];3,10*B4$   ^2121-D$
^4*3,1[<40];3,10*4*3,1[<20];3,10*BA$   ^2121-D$
^4*3,1[<40];3,10**2,3[<-30];3,10*1,3[<30]];3,10*B*1[<50];3,10*A$  ^2121-D$
^4*2[<-50];3,10**1,3[<40];3,10*A*3;3,10*5*2[<-50];3,10*$   ^2121-D$
^4*2,3[<-40];3,10**1,3[<40];3,10*5A*2,3[<-30];3,10**1,3[<40];3,10*5*2[<50];3,10
^4*2,3[<-20];3,10*5*2,3[<-30];3,10**1,3[<40];3,10*5$  ^2121-D$
^4*2,3[<-20];3,10**1[<50];3,10*BA*2,3[<-20];3,10**1,3[<40];3,10*$     ^2121-D$
^4*2,3[<-20];3,10**1[<50];3,10*5*1[<50];3,10*A*2,3[<-30];3,10**1,3[<30];3,10*5*2
^4*2,3[<-10];3,10**1,3[<20];3,10*BA*2,3[<-10];3,10**1[<50];3,10*B*2[<-50];3,10*$
^4*1,3[<30];3,10**2,3[<-30];3,10*5*1[<50];3,10*$   ^2121-D$
^2,3[<-20];3,101,3[<40];3,10**2[<-50];3,10*4*3,1[<40];3,10*$  ^2121-D$
^2,3[<-20];3,101,3[<30];3,10*BA*2,3[<-30];3,10**1[<50];3,10*5$  ^2121-D$
^**1[<50];3,10*A*3,2[<-20];3,10**1,3[<40];3,10*B4*2,3[<-20];3,10**1,3[<30];3,10*B
^**1[<50];3,10*A*3,1[<30];3,10*B4*2,3[<-30];3,10*B4$   ^2121-D$
^**1[<50];3,10*A*3,1[<30];3,10**2[<-50];3,10*A*3,1[<10];4,20*B*1,3[<20];3,10**2[<
^**1[<50];3,10*A*3,1[<20];3,10*5A*2,3[<-30];3,10*B*2[<-50];3,10*$   ^2121-D$
^**1[<50];3,10*A*2,3[<-20];3,10**1[<50];3,10*5A*2,3[<-20];3,10**1[<50];3,10*B4$
^A*3;3,10*5*1,3[<40];3,10**2,3[<-30]3,10*B*2[<-50];3,10*$  ^2121-D$
^A*2,3[<-20];3,10**1[<50];3,10**2,3[<-20];3,10*B*2[<-50];3,10*$  ^2121-D$
^A*1,3[<30];3,10**2,3[<-30];3,10*5*2[<-50];3,10*$    ^2121-D$
^5*1[<50];3,10*A*3,1[<30];4,20**2,3[<-40];3,10**1[<50];3,10*B4$    ^2121-D$
^5*1[<50];3,10*A*3,1[<30];3,10**2[<-50];3,10*B4$  ^2121-D$
^5*1[<50];3,10*A*3,1[<20];3,10*BA*2,3[<-20];3,10*B4$  ^2121-D$
^5*1[<50];3,10*A*1,3[<40];3,10*A4*2,3[<-20];3,10*55$  ^2121-D$
^5*1[<50];3,10*A*1,3[<30];3,10*5*1[<50];3,10*A*2,3[<-20];3,10*B44$  ^2121-D$
^5*1,3[<30];3,10**2[<-50];3,10*A*1,3[<40];3,10**2,3[<-40];3,10**1[<50];3,10*B*2[
^4*3;3,10*5*1[<50];3,10*BA*3,1[<20];3,10*5$   ^2121-D$
^4*3,1[<30];3,10*BA*2,3[<-20];3,10**1,3[<40];3,10*B*2[<-50];3,10*$    ^2121-D$
^4*3,1[<30];3,10*4*3,1[<30];3,10*5*1[<50];3,10*$   ^2121-D$
^4*3,1[<30];3,10*4*2,3[<-20];3,10**1,3[<30];3,10*B4*2[<-50];3,10*$  ^2121-D$
^4*3,1[<20];3,10*5A*2,3[<-10];3,10**1,3[<50];3,10*$   ^2121-D$
^4*2[<-50];3,10**1[<50];3,10*5*1,3[<20];3,10**2,3[<-40];3,10*55$  ^2121-D$
^4*2[<-50];3,10**1,3[<40];3,10*BA*2,3[<-10];3,10**1,3[<30];3,10*B4$  ^2121-D$
^4*2,3[<-30];3,10**1[<50];3,10*B4*2,3[<-30];3,10**1,3[<30];3,10*5*2[<-50];3,10*$
^4*2,3[<-30];3,10**1,3[<30];3,10**2,3[<-40];3,10*B*1,3[<20];3,10**2,3[<-40];3,10
```

```
^4*2,3[<-20];3,10**1,3[<50];3,10*4*3,1[<30];3,10*5*2[<-50];3,10*$   ^2121-D$
^4*2,3[<-20];3,10**1,3[<40];3,10*4*3,1[<30];3,10*5$   ^2121-D$
^*2[<-50];3,10*4*2,3[<-20];3,10**1[<50];3,10*5*1[<50];3,10**2,3[<-30];3,10*B*1,3
^*2,3[<-20];3,10**1[<50];3,10*5A*3,2[<-30];3,10**1,3[<30];3,10*B*2[<-50];3,10*$
^*1[<50];3,10*A*3,1[<20];3,10**2,3[<-30];3,10*B*1[<50];3,10**2[<-50];3,10*$  ^21
^*1[<50];3,10*A*2,3[<-10];3,10**1,3[<40];3,10**2,3[<-40];3.10**1,3[<30];3,10*B4$
^*1[<50];3,10*4*3,1[<20];3,10*BA*3,2[<-10];3,10**1,3[<30];3,10*B*2[<-50];3,10*$
^*1[<50];3,10**2,3[<-40];3,10**1,3[<20];3,10**2[<-50];3,10*4*2,3[<-10];3,10*B*3,
^*1,3[<40];3,10*A*3,1[<20];3,10**2,3[<-40];3,10*B*3,2[<-30];4,20*$   ^2121-D$

:------------------------------------------------------------------------
:AUS 4
:------------------------------------------------------------------------
^*2,3[<25];6,30**2,4,A;1,6**2,3[<20];3,40*$    ^141-V/2$    : 4 : 2
^*2,3,1(=1)[<25];6,40*A*2,3,1(=1)[<20];2,60*$    ^141-V/3$   : 4 : 3
^*2,3,1(=1)[<25];6,40**2,4,A;1,4**5,1;0,6**2,3,1(=1)[<20];3,40*$    ^141-V/4$
^*!1,5(=1),3[<25];6,40**2,3,!4,A;2,5**1,3;3,20*$    ^141-V/5$    : 4 : 1
^*!1,3[<25];5,30**2,4,A;1,4**1,3[<20];3,20*$    ^141-V/6$    : 4 : 1
^*!1,3,5(=1),B[<25];5,20*2*2,3;2,20**4,5(=1),B,2,1;1,5**1,3[<20];2,20*$    ^14
^*1,3,5(=1),B[<25];5,20**!4,5(=1),!B,2,1;1,5**2,3[<20];8,40*$    ^141-V/8$   :
^*!1,3,5(=1),B[<25];4,20**!2,3[<20];3,20**4,5(=1),B,2,1;1,6**!1,3;3,15**2,3;1,4*
^*!1,3,2(=1)[<25];6,40**4,A,!2,3;3,20**!1,3[<20];4,30*$    ^141-V/10$    : 4 :
^*!1,3,2(=1)[<25];6,15**2,!4,A;1,6**!2,3,1(=1)[<20];4,40*$    ^141-V/11$    :
^*!1,3,2(=1)[<25];6,15**!2,3;1,5**2,!4,A;1,6**2,3,1(=1)[<20];4,40*$    ^141-V
^*!1,3[<25];6,60**2,4(=1);1,5**!1,!3[<20];3,40*$    ^141-V/3$    : 4 : 1

^B*1,3[<10];1,20*4*2,3[<20*$    ^141-V/14$
^*1,3;1,20*B*2[<-50];1,20*4*1,3[<10];1,20**2[<-50];1,20*$    ^141-V/15$
^*2,3[<-30];1,20**1,3[<30];1,20*$   ^141-V/16$
^*1,3[<40];1,20*4*1,3[<20];1,20*$   ^141-V/17$
^*1,3[<30];1,30**2[<-50];1,20*A*3;1,20*$   ^141-V/18$
^*1,3[<30];1,20*4*1,3[<30];1,20*$   ^141-V/19$
^*1,3[<30];1,20**2[<-50];4,20*A*1,3[<20];1,20*$   ^141-V/20$
^*1,3[<30];1,20**2[<-50];4,20*A*1,3[<30];1,20*$   ^141-V/21$
^*1,3[<30];1,20*B*1,3[<20];1,20*4*1,3[<20];1,20*$  ^141-V/22$
^*1,3[<30];1,20*4*1,3[<10];1,20*$   ^141-V/23$
^*1,3[<30];1,20**2[<-50];1,20*A*3;1,20*$   ^141-V/24$
^*1,3[<30];1,20**2[<-50];1,20*A$   ^141-V/24$
^*1,3[<30];1,20*B*2,3[<-40];1,20**1,3[<20];1,20**2,3[<-30];1,20*$  ^141-V/26$
^*!1,3[<30];4,20**!2;1,20*4*1,3[<20];1,20**2;1,20*$    ^141-V/27$
^*1;1,20*B*2,3[<-40];1,20*4*1,3[<10];1,20**2[<-50];1,20*$  ^141-V/28$
```

^*1,3;4,20*4*1,3[<40];1,20*$  ^141-V/29$

^*1,3[<40];1,20*4*1,3[<30];1,20*$  ^141-V/30$

^*1,3[<40];1,20*4*1,3[<30];1,20*$  ^141-V/31$

^*1,3[<40];1,20**2;4,20*A*1,3[<30];4,20*$  ^141-V/32$

^*1,3[<40];1,20**2,3[<-40];1,20*A*1,3[<20];1,20*$  ^141-V/33$

^*1,3[<40];1,20*B*2,3[<-30];1,20*4*1,3[<10];1,20*$  ^141-V/34$

^*1,3[<40];1,20*4*1,3[<40];1,20*$  ^141-V/35$

^*1,3[<40];1,20**2;4,20*A*1,3[<40];1,20*$ ^141-V/36$

^*1,3[<40];1,20**2,3[<-30];4,20*4*1,3[<30];4,20*$  ^141-V/37$

^*1,3[<40];1,20**2;4,20*A*1,3[<40];1,200;1,201,3[<30];4,20*$  ^141-V/38$

^*1,3[<30];1,30*A*1,3[<30];1,10*$  ^141-V$

^*1,3,5;1,10*B*3,1[<10];1,20**2,3[-40];1,10*4*3,2[<-20];3,10*$ ^141-V$

^*1,3[<40];1,10*B*3,2[-30];1,10*4*3,1[<15];4,20*$  ^141-V$

:---------------------------------------------------------------

:AUS 5

:---------------------------------------------------------------

^A*2,3;1,10*4*2,3;1,10**1,3;1,10*B*2,3;1,10*4$  ^12152-F/3$   : 5 : 1

^B*1,3;1,20*4*1,3;1,10*B*2,3;1,10*$  ^12152-F/4$  : 5 : 1

^B*1,3;1,20**2,3,4;1,10*5*2,3;1,47*$  ^12152-F/5$  : 5 : 1

^4*0;1,10**1,3;1,20*4*2,3;1,10**1,3;4,20*5$  ^12152-F/6$  : 5 : 1

^*5;1,22,3;1,201,3;1,20*B*2,3;1,10*$  ^12152-F/7$  : 5 : 1

^*5;1,21,3;1,100;1,10**1,3;1,10*4*2,3;1,10**1,3;4,20*B*2,3;1,10*$  ^1215

^*5;1,20;1,102,3;1,20*B*2,3;1,10*$  ^12152-F/9$  : 5 : 2

^*5;1,20;1,102,3;1,20*B*1,3;1,20**2,3;1,10*$  ^12152-F/10$  : 5 : 1

^*5;1,20;1,102,3;1,20*B$  ^12152-F/11$  : 5 : 1

^*5;1,20;1,102,3;1,20*5*2,3;1,10*$  ^12152-F/12$  : 5 : 1

^*5;1,20;1,102,3;1,20**1,3;4,20*5$  ^12152-F/13$  : 5 : 1

^*5;1,20;1,101,3;1,20*4*2,3;1,10*5*2,3;1,10*$  ^12152-F/14$  : 5 : 1

^*5;1,20;1,101,3;1,20*4*2,3;1,10**1,3;4,20*5*2,3;1,10*$  ^12152-F/15$  :

^*5;1,20;1,101,3;1,20*4*2,3;1,101,3;4,205;1,2*$  ^12152-F/16$  : 5

^*5;1,20;1,101,3;4,20**2,3;1,10*B$  ^12152-F/17$  : 5 : 1

^*5;1,20;1,101,3;4,20**2,3;1,10*5$  ^12152-F/18$  : 5 : 1

^*5;1,20;1,101,3;4,20*4*2,3;1,10**1,3;4,20*5$  ^12152-F/19$  : 5 : 1

^*5;1,20;1,101,3;1,10*4*2,3;1,10**1,3;1,10*B*2,3;1,10*$  ^12152-F/20$

^*5,1,B[>45];1,8!1,3[<25];2,20!2,3,4(=1),A(=1);5,30**!1,3,5(=1)[>25];4,20*$

^*5,1,B[>45];1,6B;1,20;1,10!1,3[<25];0,20!2,3,4(=1),A(=1);5,30**B,1;1,2*

:raus wegen 9

:^*5,1,B[>45];1,6!1,3[<25];4,202,!A;1,3!1,3;4,20B,1;1,2**2,4;1,4*$  ^

^*5,1,B[>45];1,6!1,3[<25];4,20!2,3!4,A;4,20B,1;1,22,4;1,4*$  ^12152

:raus wegen 9

:^*5,1,B[>45];1,6!1,3[<25];1,20!2,3,4(=1),A;5,30!B,1;1,2!2,4(=1),A(=1);1

:^*5,1,B[>45];1,6!1,3[<25];0,20!2,3,4(=1),A(=1);5,30B,1;1,22,3,4(=1),A(=

^*5,1,B[>45];0,6B;0,20;0,10!1,3[<25];0,20!2,3,!4,A(=1);5,30B,1,5;1,2

^*5,1,3;1,20*A*1,3;1,20*B*2,3;1,10*$      ^12152-F/28$    : 5 : 1

^*5,1,3;1,20*A*1,3;1,10*5B*2,3;1,10*$     ^12152-F/29$    : 5 : 1

^*5,1,3;1,20*4*2,3;1,10*5*2,3;1,10*$      ^12152-F/30$    : 5 : 3

^*5,1,3;1,20*4*2,3;1,10**5;1,2*$   ^12152-F/31$    : 5 : 5

^*5,1,3;1,20*4*2,3;1,10**1,3;1,10*5*2,3;1,10*$     ^12152-F/32$    : 5 : 5

^*5,1,3;1,20*4*2,3;1,20*B*2,3;1,10*4$     ^12152-F/33$    : 5 : 1

^*5,1,3;1,20*4*2,3;1,20*5*2,3;1,10*$      ^12152-F/34$    : 5 : 1

^*5,1,3;1,20*4*2,3;1,20**5;1,2*$   ^12152-F/35$    : 5 : 2

^*5,1,3;1,20**2,3;1,10*B$     ^12152-F/36$    : 5 : 1

:raus wegen 9(out for reasons of 9)

:^*5,1,3;1,20**2,3;1,10*A*2,3;1,10**1,3;1,20*B*2,3;1,10*$    ^12152-F/37$    : 5

^*5,1,3;1,20**2,3;1,10*A*2,3;1,10**1,3;1,20*B*1,3;1,20**2,3;1,10*$     ^12152-

^*5,1,3;1,20**2,3;1,10*A*2,3;1,10**1,3;1,20*B*1,3;1,10*4$     ^12152-F/39$    : 5

^*5,1,3;1,20**2,3;1,10*A*2,3;1,10**1,3;4,20*5*2,3;1,10*$     ^12152-F/40$    : 5

^*5,1,3;1,20**2,3;1,10*A*2,3;1,101,3;4,105;1,2**5,1,3;1,10*$     ^12152-F/4

^*5,1,3;1,20**2,3;1,10*5$     ^12152-F/42$    : 5 : 4

^*5,1,3;1,20**2,3;1,10*4*3,5;1,10**2,3;1,10*$     ^12152-F/43$    : 5 : 1

^*5,1,3;1,20**2,3;1,10*4*2,3;1,10*5*2,3;1,10*$    ^12152-F/44$    : 5 : 2

^*5,1,3;1,20**2,3;1,10*4*2,3;1,10*5$      ^12152-F/45$    : 5 : 3

^*5,1,3;1,20**2,3;1,10*4*2,3;1,10**5,1,3;4,20*5*2,3;1,10*$    ^12152-F/46$    :

^*5,1,3;1,20**2,3;1,10*4*1,3;4,20*5$      ^12152-F/47$    : 5 : 1

^*5,1,3;1,202,3;1,101,3;1,10*A*1,3;4,20*5*2,3;1,10*$     ^12152-F/48$    : 5

^*5,1,3;1,202,3;1,101,3;4,20*5*2,3;1,10*$     ^12152-F/49$    : 5 : 2

^*5,1,3;1,200;1,102,3;1,20*5*2,3;1,10*$     ^12152-F/50$    : 5 : 1

^*5,1,3;1,200;1,102,3;1,10**1,3;4,20*5$     ^12152-F/51$    : 5 : 1

^*5,1,3;1,200;1,101,3;1,20*B*2,3;1,10*$     ^12152-F/52$    : 5 : 1

^*5,1,3;1,200;1,101,3;1,20**2,3;1,20*5$     ^12152-F/53$    : 5 : 1

^*5,1,3;1,200;1,101,3;1,20**2,3;1,10*4*2,3;1,10*5*2,3;1,10*$    ^12152-F/5

^*5,1,3;1,200;1,101,3;1,20**2,3;1,10*4*2,3;1,10**1,3;1,20*B*2,3;1,10*$

^*5,1,3;1,200;1,101,3;1,10*4*1,3;1,20*$     ^12152-F/56$    : 5 : 1

^*5,1,3;1,6!1,3;4,20!2,3,4,A(=1);4,20!1,3;4,201,5;1,4**2,4;1,4*$    ^12

^*5,!1,3;8,40!2,3;2,20!5,1;1,4*$      ^12152-F/58$    : 5 : 1

^*5,!1,3;4,30!2,3,4(=3);6,30!1,3,5(=3);0,30B,1,3;1,5!2,3,4(=1),A,1(=1);1

^*2,3;1,100;1,102,3;1,20**1,3;4,20*$     ^12152-F/60$    : 5 : 1

^*2,3;1,100;1,101,3;1,20**2,3;4,20*B*2,3;1,10*$     ^12152-F/61$    : 5 : 1

^*1,3;1,20*A*2,3;1,10**1,3;4,20*5$      ^12152-F/62$    : 5 : 1

^*1,3;1,20*4*4,2,3;1,10*5*2,3;1,10*$      ^12152-F/63$    : 5 : 1

^*1,3;1,20*4*2,3;1,10*B*2,3;1,10*$     ^12152-F/64$    : 5 : 1

^*1,3;1,20**2,3;1,10*B*1,3;1,10**2,3;1,10*4*2,3;1,10*$    ^12152-F/65$    : 5

^*1,3;1,20**2,3;1,10*5*2,3;1,10*$      ^12152-F/66$    : 5 : 1

```
^*1,3;1,20**2,3;1,10*4*2,3;1,20**1,3;1,20*B$    ^12152-F/67$    : 5 : 1
^*1,3;1,20**2,3;1,10*4*1,3;1,10**5;1,2*$        ^12152-F/68$    : 5 : 1
^*1,3;1,20**2,3;1,10**1,3;1,20**2,3;1,20*B*2,3;1,10*4$     ^12152-F/69$    : 5
^*1,3;1,20**2,3;1,10**1,3;1,20**2,3;1,10*B*2,3;1,10*$      ^12152-F/70$    : 5 : 1
^*1,3;1,20**2,3;1,10**1,3;1,10**2,3;1,10**1,3;1,10*B*2,3;1,10*$    ^12152-F/7
^*1,3;1,10**0;1,20**1,3;1,20*4*2,3;1,10**1,3;1,10*B*2,3;1,10*$     ^12152-F/72$
^*1,3;1,10**0;1,10**2,3;1,20**1,3;4,20*5$       ^12152-F/73$    : 5 : 1
^*1,3;1,10**0;1,10**2,3;1,10*B*2,3;1,10*$       ^12152-F/74$    : 5 : 1
^*1,3;1,10**0;1,10**2,3;1,10*4*2,3;1,10*B*2,3;1,10*$    ^12152-F/75$   : 5 : 1
^*1,3;1,10**0;1,10**1,3;1,20*4*1,3;4,20*5$      ^12152-F/76$    : 5 : 1
^*1,3;1,10**0;1,10**1,3;1,20**2,3;1,10*A*1,3;4,20**5;1,2*$    ^12152-F/77$
^*1,3;1,10**0;1,10**1,3;1,20**2,3;1,10**1,3;1,20**2,3;1,10*B$    ^12152-F/78$
^*0;1,10*4*2,3;1,10**1,3;1,10*5$    ^12152-F/79$    : 5 : 1
^*0;1,10**1,3;1,20*4*2,3;1,10*5*2,3;1,10*$    ^12152-F/80$    : 5 : 1
^*0;1,10**1,3;1,20*4*2,3;1,10**5;1,2*$    ^12152-F/81$    : 5 : 1
^*0;1,10**1,3;1,20*4*2,3;1,10**1,3;1,20*5$    ^12152-F/82$    : 5 : 1
^*0;1,10**1,3;1,20*4*2,3;1,20*5$    ^12152-F/83$    : 5 : 1
^*0;1,10**1,3;1,20**2,3;1,10*4*2,3;1,10**1,3;1,10*5$    ^12152-F/84$    : 5 : 1
^*0;1,10**1,3;1,20**2,3;1,10**1,3;1,10*B*2,3;1,10*$    ^12152-F/85$    : 5 : 2
^*!5,B,1;1,4**1,!3;3,60**!2,3,4(=1),A;8,40**!5,B,1;3,1,4**!2,3,4(=1),A;2,6*$
^*!5,B,0;1,6**!1,!3;1,5**2,4(=1),A;1,5**1,3;3,5*B*2,4(=1),A;1,4*$    ^12152-F/
^*!5,2;1,4**!1,!3;8,40**4,2;1,3**!2,3;2,20**!5,2;1,4*$    ^12152-F/88$    : 5
^*!5,1,3;3,5**!2,3,4(=1),A;10,60*B*!2,3,4(=1),A;2,20*$    ^12152-F/89$    : 5

^B5*1,3[<30];1,10**2;1,10*4*2,3[<-20];1,10**1;1,10*B*2,3[<-30];1,10*$    ^12152-F/
^A*0;1,10**1,3[<40];1,10**2;1,10*5*2,3;1,10*$    ^12152-F/91$
^55*1,3[<10];1,20*B*2;1,10*$    ^12152-F/92$
^5*2,3[<-30];1,10**1,3[<20];1,20**2,3[<-40];1,20**1;1,10*BA$    ^12152-F/93$
^5*1;1,10**0;1,10**1,3[<30];1,10**2,3[<-40];1,10*A*2;1,10**1;1,10*B*2;1,10*$    ^1
^5*1,3[<40];1,10*4*2,3[<-30];1,10*5B*1;1,10*$    ^12152-F/95$
^5*1,3[<40];1,10*4*2,3[<-30];1,10**1,3[<30];1,10**0;1,10**2;1,10*$    ^12152-F/96$
^5*1,3[<40];1,10**2;1,10**0;1,10**1,3[<40];1,10*$    ^12152-F/97$
^5*1,3[<30];1,20*B*2;1,10*$    ^12152-F/98$
^5*1,3[<30];1,20*4*1,3[<20];1,10*B$    ^12152-F/99$
^5*1,3[<30];1,10*4*1,3[<10];1,10*B*2,3[<-40];1,10*$    ^12152-F/100$
^5*1,3[<30];1,10**2;1,10*5*2;1,10*$    ^12152-F/101$
^5*1,3[<30];1,10**2,3[<-40];1,10*4*2,3[<-20];1,10**1;1,10*5*2;1,10*A$    ^12152-F/
^5*1,3[<30];1,10**2,3[<-30];1,10**1;1,10*BA$    ^12152-F/103$
^5*1,3[<30];1,10**2,3[<-30];1,10**1;1,10*A*1;1,10*$    ^12152-F/104$
^5*1,3[<20];1,20*B*2,3[<-40];1,10*$    ^12152-F/105$
^5*1,3[<20];1,10*A4*2,3[<-20];1,10**1,3[<30];1,10*B*2;1,10*$    ^12152-F/106$
```

^5*1,3[<20];1,10**2,3;1,10*BABA$  ^12152-F/107$

^5*1,3[<10];1,20*B*2,3[<-40];1,10*$  ^12152-F/108$

^5*0;1,20**2,3[<-40];1,20*B*2,3[<-30];1,10*$  ^12152-F/109$

^5*0;1,10**2,3[<-30];1,10*A*2,3[<-40];1,10*B*2;1,10*$  ^12152-F/110$

^4*0;1,102,3[<-10];1,201;1,10*$  ^12152-F/111$

^4*0;1,101,3[<30];1,102;1,10*A*1;1,10*5$  ^12152-F/112$

^4*0;1,101,3[<30];1,102;1,10*44*2,3[<-40];1,10**1;1,10*B*2;1,10*$  ^12152-F/

^*2;1,100;1,101,3[<40];1,10*4*2,3[<-30];1,10*5$  ^12152-F/114$

^*1;1,10*4*2,3[<-20];1,101;1,100;1,10*$  ^12152-F/115$

^*1;1,10**0;1,10*4*2,3[<-20];1,10**1,3[<40];1,10*B4$  ^12152-F/116$

^*1;1,100;1,101,3[<20];1,10*4*2,3[<-30];1,10*5$  ^12152-F/117$

^*1,3;1,20*4*1,3[<20];1,10*B*2,3[<-40];1,10*$  ^12152-F/118$

^*1,3[<40];1,202;1,100;1,10**1,3[<20];1,10*5*1;1,10*$  ^12152-F/119$

^*1,3[<40];1,10*4*1,3[<30];1,10**0;1,10*$  ^12152-F/120$

^*1,3[<40];1,10**2;1,10*4*2,3[<-10];1,10**1;1,10*5$  ^12152-F/121$

^*1,3[<40];1,102;1,100;1,10**2,3[<-40];1,10*$  ^12152-F/122$

^*1,3[<30];1,202;1,100;1,102,3[<-30];1,101,3;1,10*$  ^12152-F/123$

^*1,3[<30];1,10**2;1,10*4*2,3[<-20];1,10*5*2;1,10*4$  ^12152-F/124$

^*1,3[<30];1,102;1,100;1,10**2,3[<-40];1,10*B*1,3[<20];1,10**2;1,10*$  ^1215

^*1,3[<30];1,10**2,3[<-40];1,10*B*2,3[<-30];1,20*$  ^12152-F/126$

^*1,3[<30];1,100;1,102,3[<-20];1,10*5*1;1,10*$  ^12152-F/127$

^*1,3[<20];1,102,3[<-40];1,201;1,10*BA$  ^12152-F/128$

^*1,3[<10];1,20*B*2,3[<-10];1,10*4$  ^12152-F/129$

^*0;1,201,3[<30];1,102,3[<-40];1,10*5$  ^12152-F/130$

^*0;1,10**3;1,10*B*2,3[<-30];1,10*$  ^12152-F/131$

^*0;1,10**2,3[<-20];1,10*B$  ^12152-F/132$

^*0;1,10**1,3[<30];1,20*$  ^12152-F/133$

^*0;1,10**1;1,10*4*2,3[<-30];1,10**1;1,1085*2;1,10*$  ^12152-F/134$

^*0;1,101,3[<40];1,102;1,100;1,101,3[<740];1,10*$  ^12152-F/135$

:neu (new)

^*5;1,21,3;5,202,3;4,20**1,3;1,20*$  ^12152-F$

^*5;1,21,3;5,200;1,20**1,3;1,20*4*2,3;1,20**1,3;1,20*B*2,3;1,20*$  ^12152-F

^*5;1,21,3;5,204,2,3;4,20**1,3;1,20*B*2,3;1,20*$  ^12152-F$

^*5;1,21,3;5,204,2,3;4,20**1,3;1,20*B*1,3;1,20*4$  ^12152-F$

^*5;1,21,3;5,200;1,202,3;1,201,3;1,20*5$  ^12152-F

:falsche 5 , stoert bei 8

:^*5;1,21,3;1,204,2,3;4,205,1,3;1,202,3;1,6*$  ^12152-F/100a$

^*5;1,21,3;5,204,2,3;4,20**1,3;1,20*B*2,3;1,20*$  ^12152-F$

^*5;1,21,3;5,204,2,3;4,201,3;1,20B,A;1,3*$  ^12152-F$

^*5;1,21,3;5,204,2,3;4,20**1,3;1,20*5*2,3;1,6*$  ^12152-F/100b$

```
^*5;1,2**1,3;5,20**5;1,1*$    ^12152-F$

^*5;1,2**!1,3;5,20**!2,3;4,20**!1,3;3,20*B*2,3;1,20*$   ^12152-F$

^*5;1,2**!1,3;4,20**!2,3;4,20**!B,A;1,3*$  ^12152-F$

^*5;1,2**!1,3;4,20**!2,3;4,20*B*3;1,20*4$   ^12152-F$

^*5;1,2**0;1,20**!1,3;5,20*4*!2,3;4,20*B*2,3;1,20*$   ^12152-F$

^*5,1,3;5,20**4,!2,3;4,20**!1,3;1,20*B*2,3;1,20*$   ^12152-F$

^*!1,3;5,20**0;1,20*4*!2,3;4,20**!1,3;1,20*B4$    ^12152-F$

^*!1,3;4,20**!2,3;4,20*B*1,3;1,20*4$   ^12152-F$

^*!1,3;5,20**4,!2,3;4,20**!1,3;1,20*B*2,3;1,20*$   ^12152-F$

^*!1,3;5,20**4,!2,3;4,20**!1,3;1,20*5$    ^12152-F$

^*!1,3;5,20**!2,3;2,20*B*2,3;1,20*4$   ^12152-F$

^*!1,3;5,20**!2,3;2,20**1,3;1,20**B,A;1,2*$    ^12152-F$

^*0;1,20**4,!2,3;2,20**B,5;1,1*$   ^12152-F$

:-----------------------------------------------------------------------

:AUS 6

:-----------------------------------------------------------------------

:^*1,3[<50];10,60**2;1,3**1,3;2,20**2,1,3;2,6*$    ^12-6/2$    : 6 : 1

^*1,3,2(=1)[<50];10,40**2,3,4,A;3,5*$    ^12-6/1$    : 6 : 5

^*!1,!3;10,60*2*1,3;4,60**!2,3;1,6*$    ^12-6/3$    : 6 : 1

^*1,3[<40];1,20**2;1,10**1,3;1,10**2,3;1,10*$   ^12-6/4$

:^*0;1,10**1,3[<20];1,20**2;1,10*$    ^12-6/7$

:-----------------------------------------------------------------------

:AUS 7

:-----------------------------------------------------------------------

:neu Hand

^*4;1,3**1,3,2(=1);6,30*$   ^2541-7/a1$

^*1,3(>20);3,10*A*1,3;4,20*$    ^2541-7/a3$

^*!1,!3(>20),5;4,8*A*!1,3,4[<30];6,30*$   ^2541-7/a3b$

^A*1,3[<20];10,60**2,3[<20];7,40*$   ^2541-7/17$    : 7 : 2

^4*1,2,3(=1);6,60*$   ^2541-7/20$    : 7 : 5

^*4;1,4**1,3;10,60*$   ^2541-7/21$    : 7 : 1

^*4,2;0,4**2,1,3(=1)[<-20];4,30**1,2,3(=1);2,20*$   ^2541-7/22$    : 7 : 1

^*4,2,3;4,5**1,!3;8,40*$    ^2541-7/23$   : 7 : 8

^*3;0,2**5,1;0,4**A,4,2[>-80];1,3**2,3[<-20];4,30**1(=1),2,3;2,40*$   ^2541-7$

^*3;0,2**5,1,3;1,5**A,4,2[>-80];1,3**1,2,3(=1);4,30*$   ^2541-7/24$   : 7 :

^*2,3;8,40**!1,!3;8,40**!1,!3;8,40*$    ^2541-7/25$    : 7 : 1

^*1;0,1**2,4,A;1,5**2,3;1,20**1,3;1,40**1,2;1,2*$    ^2541-7/26$    : 7 :

^*1,3;1,6**A,4[>-80];1,4**1,2,3(=1);2,30*$   ^2541-7/27    : 7 : 1

^*1,3,5(=1),B[>65];1,8*A*!1,3;3,40*$   ^2541-7/29$   : 7 : 1

^*!5,!B,1;1,4**1,3;1,6**2,4(=1),!A;1,4**1,3;10,60*$   ^2541-7/30$    : 7 : 1

^*2,4,A,3[>75];1,6**1,3;3,60*$    ^2541-7/31$   : 7 : 1
```

```
^*4,2,3;4,5**1,!3;8,40*$        ^2541-7/32$    : 7 : 5
^5*1,3;1,10**4,A;1,2**2,3;1,10**1,3;3,20*$   ^2541-7/33$
^5*1,3;1,10**4,A;1,2**1,3;3,20*$    ^2541-7/34$
^5*1,3;1,10**4,A;1,2**1,3;1,20**2,3;1,10**1,3;3,20*$   ^2541-7/35$
^5*1,3;1,10**2;1,10**1,3;3,20*$   ^2541-7/42$
^A*2,3;1,20**1,3;3,20**2;1,10*$   ^2541-7/8$
^A*2,3;1,20**1,3;3,20*$   ^2541-7/11$
^A*2,3;1,10**1,3;1,20*$   ^2541-7/10$
^A*1,3;3,20**2;1,10**1,3;3,20*$   ^2541-7/21$
^A*1,3;3,20*$   ^2541-7/24$
^A*1,3;1,20**2,3;1,10**1,3;3,20*$   ^2541-7/18a$
^*B,A;1,2**1,3;1,10**2,3;1,10*$   ^2541-7/15$
^*4,A;1,2**2,3;1,10**1,3;3,20*$   ^2541-7/46$
^*4,A;1,2**1,3;1,10**5,B;1,2**2;1,10**1,3;3,20**2;1,10**1,3;3,20*$   ^2541-7/44$
^*2;1,10**4,A;1,2**1,3;3,20*$   ^2541-7/115$
^*2,3;1,20*81,3;3,20*$   ^2541-7/118$
^*2,3;1,20**1,3;3,20**2,3;1,10**1,3;3,20*$    ^2541-7/120$
^*1,3;3,20**4,!A;1,2**2,3;1,20**1,3;3,20*$   ^2541-7/148$
^*1,3;3,10**4,!A;1,2**2,3;1,20**1,3;3,20**2;0,3*$   ^2541-7/142$
^*1,3;3,10**4,!A;1,2**2,3;1,20**1,3;1,20*$   ^2541-7/146$
^*1,3;3,10**4,!A;1,2**2,3;1,20*$   ^2541-7/149$
^4*2;2,10**1,3;4,30**2;1,10*$   ^2541-7/165$
^*4;0,2**2,3;1,10**1,3;4,30**2;0,2*$   ^2541-7/166$
^A*3,2[<-20];1,10**3;1,20*$    ^2541-7$
^A*3,1[<20];1,30*$    ^2541-7$
^A*2,3[<-30];1,10**1,3[<20];1,20*$   ^2541-7$
^A*2,3[<-20];1,10**3;1,20*$   ^2541-7$
^A*3,1[<40];1,30*$   ^2541-7$
^A*1[<50];1,10*A*1,3[<50];1,10*$   ^2541-7$
^ABA*1,3[<30];1,20**2,3[<-30];1,10**1,3[<30];1,10*$   ^2541-7$
^A*3;1,10*$   ^2541-7$
^A*3;1,10*5*2,3[<-10];1,10*$   ^2541-7$
^A*3,2[<-10];1,10*$    ^2541-7$
^A*3,1[<40];1,30*$   ^2541-7$
^A*1,3[<30];1,10*5*2,3[<20];1,10**1,3[<30];1,10*$    ^2541-7$
^5*1[<50];1,10*A*3,2[<-10];1,10**1,3[<20];1,20*$    ^2541-7$
^5*1[<50];1,10*A*3,1[<40];1,10*$   ^2541-7$
^5*1[<50];1,10*A*3,1[<20];1,20**2,3[<-20];1,10**1,3[<40];1,10*$    ^2541-7$
^5*1[<50];1,10*A*3,1[<20];1,20**2[<-50];1,10**1,3[<20];1,10*$   ^2541-7$
^5*1[<50];1,10*A*3,1[<20];1,10*(2,3[<-20];1,10*$    ^2541-7$
^5*1,3[<30];1,10*A*3,1[<20];1,20*$   ^2541-7$
```

^44*2,3[<-30];1,201,3[<20];1,102[<-50];1,10**1,3[<30];1,10*$ ^2541-7$

^44*2,3[<-20];1,101,3[<20];1,102,3[<-30];1,10**1,3[<30];1,10*$ ^2541-7$

^4BA*2,3[<-10];1,101,3[<30];1,103,1[<20];1,10*$ ^2541-7$

^4*3,1[<30];1,20**3,1[<20];1,10*$ ^2541-7$

^4*3,1[<30];1,102,3[<-30];1,101,3[<40];1,10*$ ^2541-7$

^4*3,1[<20];1,20**3;1,10*$ ^2541-7$

^*2[<-50];1,10*4*3,1[<30];1,102[<-50];1,101[<50];1,102[<-50];1,101,3[<40

^*2[<-50];1,10*4*3,1[<20];1,10*$ ^2541-7$

^*1[<5-];1,10*A*3,1[<10];1,20*$ ^2541-7$

^*1[<50];1,10*A*2,3[<-20];1,203,2[<-10];1,201,3[<30];1,10*$ ^2541-7$

^*1[<50];1,10*A*2,3[<-20];1,20*$ ^2541-7$

^*1[<50];1,10*A*2,3[<-20];1,10**1,3[<30];1,10*$ ^2541-7$

^*1,3[<40];1,10*A*1,3[<30];1,10*$ ^2541-7$

^*1,3[<30];1,10*A*3;1,10*5*1[<50];1,10*$ ^2541-7$

^*1,3[<30];1,10*A*1[<50];1,101,3[<30];1,102,3[<-30];1,10**1,3[<40];1,10*$ ^

:----------------------------------------------------------------------

:AUS 8

:----------------------------------------------------------------------

^*1,3,5;1,20**2,3,4;1,20*$ ^1212-8/2$ : 8 : 5

^B*1,3;1,52;11,3;1,52;1,31,3;1,20**2,3;1,10*$ ^1212-8/3$ : 8 : 1

^*A,4;12,3;0,8!1,3;1,8*B*!2,3,4;1,20!1,3;1,20!2,3,4;1,20*$ ^1212-8/4

^*2,3;2,20**1,3;2,20*B*!1,3;2,20!2,3;2,20!1,3;2,20**!2,3,4(=1),A;2,20*$

^*1,3;0,6*A*2,3;0,8**!1,3;0,8*B*!2,3,4;1,20!1,3;1,20!2,3,4;1,20*$ ^1212

^B*1,3;1,202;1,201,3;1,202;1,201,3;1,20**2;1,20*$ ^1212-8/7$

:^*5;1,21,3;1,202,3;1,20*5*1,3;1,20**2;1,20*$ ^1212-8/8$

^*5;1,22,3;1,205,1,3;1,20**2,3;1,20*$ ^1212-8/9$

^*5;1,2**1,3;1,20*5,1,3;1,202,3;1,201,3;1,20**2;1,20*$ ^1212-8/10$

^*5;1,21,3;1,202,3;1,20**1,3;1,20*5*1,3;1,20**2,3;1,20*$ ^1212-8/11$

^*5;1,21,3;1,202,3;3,201,3;3,202,3;1,20*$ ^1212-8/12$

^*5;1,21,3;3,102,3;3,10B,5,1,3;3,102,3;3,10**4;0,1*$ ^1212-8/14$

^*5;1,21,3;3,102,3;3,10B,5,1,22,3;3,10**4;0,1*$ ^1212-8/13a$

^*5;1,21,3;1,202,3;1,20**5,1,3;1,20*4$ ^1212-8/14$

^*4,A;1,2**2;1,20*B*2,3;1,20*5*1,3;1,20**2;1,20*$ ^1212-8/15$

^*4,A;1,2**2;1,20*B*1,3;1,20**2;1,20*5*1,3;1,20**2;1,2*$ ^1212-8/16$

^*1,3;1,20*B*1,3;1,202,3;1,201,3;1,20**2;1,2*$ ^1212-8/17$

^*2,3;1,20*5*1,3;1,20**2,3;1,20*$ ^1212-8/18$

^*1,3;1,20*B*2,3;1,201,3;1,202;1,20*$ ^1212-8/19$

^*2;1,20B,5;1,21,3;1,202;1,201,3;1,20**2;1,20*$ ^1212-8/20$

^*2;1,20*B*1,3;1,20*5*1,3;1,20**2,3;1,20*$ ^1212-8/21$

^*2;1,20*B*1,3;1,202;1,201,3;1,20**2;1,20*$ ^1212-8/22$

```
^*2,3;1,20**B,5;1,2**1,3;1,20**2,3;1,20**1,3;1,20**2,3;1,20*$     ^1212-8/23$
^*2,3;1,20*5*2,3;1,20**5,1,3;1,20**2,3;1,20*$     ^1212-8/24$
^*2,3;1,20**B,1,3;1,20**2,3;1,20**1,3;1,20**2;1,20*$  ^1212-8/25$
^*2,3;1,20*B*2,3;1,20**1,3;1,20**2,3;1,20*$   ^1212-8/26$
^*!2,3;1,20**!B,1,3;1,20**!2,3;1,20**5,!1,3;1,20**!2,3;1,20*$   ^1212-8/27$
^*1,3;3,20*A*5,!1,3;4,20**!2;3,20*$    ^1212-8/28$
^*!1,3;1,20*5*!1,3;1,20**!2,3;3,10**!1,3;3,10**!2,3;2,10**4;0,1*$    ^1212-8/29$
^*1,3;1,20**2;3,20**1,3;3,20**2;3,20**5,1,3;1,20**2;1,20*$    ^1212-8/30$
^*1,3;1,20**2,3;1,20**5,1,3;1,20**2,3;1,20*$    ^1212-8/31$
^*1,3;1,20*AB*1,3;1,20**2,3;1,20**5,1,3;1,20**2;1,20*$    ^1212-8/32$
^*1,3;1,20*A*1,3;1,20*5*1,3;1,20**5,1,3;1,20**2,3;1,20*$    ^1212-8/33$
^*1,3;1,20**2;1,20*5*1,3;1,20**2,3;1,20*$    ^1212-8/34$
^*1,3;1,20**2;3,20**1,3;3,20**2;3,20**1,3;1,20**2,3;1,20*$    ^1212-8/35$
^*1,3;1,20**2,3;1,20*5*1,3;1,20**2,3;1,20*$    ^1212-8/36$
^*1,3;1,20**2,3;1,20**1,3;1,20**2;1,20*4;0,1*$    ^1212-8/37$
^*1,3;1,20**2,3;1,20**5,1,3;1,20**2,3;1,20*$    ^1212-8/38$
^*1,3;1,20**2,3;1,20**1,3;1,20**4;1,1*$    ^1212-8/39$
^*1,3;1,20**2,3;1,20**1,3;1,20**2,3;1,20**4;0,1*$    ^1212-8/40$
^*1,3;1,20**2,3;1,20*5*1,3;1,20*4$    ^1212-8/41$
^*1,3;1,20**2,3;1,20*5*1,3;1,20**2,3;1,20*4*2;1,20*$    ^1212-8/42$
^*1,3;1,20**2,3;1,20**1,3;1,20**2;1,20*5*1,3;1,20**2,3;1,20*$    ^1212-8/43$
^*1,3;1,20**2,3;1,20**1,3;1,20**2,3;1,20*$    ^1212-8/44$
^*1,3;1,20*B*1,3;1,20*A*1,3;1,20*B*2,3;1,20*A$    ^1212-8/45$
^*1,3;4,20**2;4,20**5,1,3;4,20**2,3;4,20**4;0,1*$    ^1212-8/46$
^*1,3;1,20**2,3;1,20*A*1,3;1,20*5*1,3;1,20**2,3;1,20*$    ^1212-8/47$
:----------------------------------------------------------------------
:AUS 9
:----------------------------------------------------------------------
^*5,B,1,3;1,3**!1,3;1,20**4,2;1,4**1,3[<<20];2,20*$    ^1241-9/3$     : 9 : 2
^*5,1,3;1,20**4,2,3,A[<>-45];1,6**1,3[<<20];8,60*$    ^1241-9/4$     : 9 : 7
^*5,1,3,B;1,20**4,2,3,A[<>-45];1,6**1,3[<<20];6,30*B*2,3,4(=1),A;1,8*$    ^1241-
^*5,!1,3;1,20**4,!2,3;1,20*A*1,3[<<20];1,15,60**5;0,1**2,3;0,4*$    ^1241-9/6$
^*5,!1,3;1,15**4,!2,3;1,6**1,3[<<20];2,20*B*2,3;1,15*$    ^1241-9/7$     : 9 : 1
^*!1,3,5(=1),B;1,15,60**!2,4,A,1,3;8,40**!1,!1,3;1,15,60*$    ^1241-9/8$     : 9

^*5;0,2**!1,3;1,20**!2,3,4;1,20**1,3;0,20*B*!2,3;1,10**4;0,1*$   ^1241-9/9a$
^*5;0,2**!1,3;2,30**!2,3;1,15*A*2,3;1,15*B*2,3;1,15*4$   ^1241-9/9$
^*5;0,2**!1,3;2,30**!2,3;1,15*A*2;1,20**1,3;1,20*$   ^1241-9/10$
^*5;0,2**!1,3;2,30**2,3;1,15*A*2,3;3,20*B$   ^1241-9/11$
^*5;0,2**!1,3;2,15*4*!1,3;6,30*$   ^1241-9/12$
^*5;0,2**!1,3;2,15*4*1,3;3,15*B*2;1,15*$   ^1241-9/13$
```

```
^*5;0,2**!1,3;2,15**2;1,15*4*1,3;3,30*$    ^1241-9/14$

^*5;0,2**!1,3;2,15*4*2;1,15**1,3;3,15*B*2;1,15*$   ^1241-9/15$

^*5;0,2**!1,3;2,15**!2;1,15*A*2,3;3,20*5$    ^1241-9/16$

^*5;0,2**!1,3;2,15**!2;1,15*A*1,3;3,20*$    ^1241-9/17$

^*5;0,2**!1,3;2,15**!2;1,15*4*1,3;3,15**2,3;1,15*B*2;1,15*$    ^1241-9/18$

^*5;0,2**!1,3;2,15**!2,3;1,15*4*2,3;3,30**1,3;3,15*5$    ^1241-9/19$

^*5;0,2**!1,3;2,15**!2;1,15*A*2,3;1,15**B,5;1,1**2;0,15*$    ^1241-9/20$

^*2;1,6*B*!1,3;2,15**!2;1,15*4*!1,3;3,20*$    ^1241-9/21$

^*2;1,6*B*!1,3;2,15*4*!1,3;3,20*$    ^1241-9/22$

^*2;1,6*B*!1,3;2,15**2;1,15*A*!1,3;3,30*B*2;1,15*$    ^1241-9/23$

^*2;1,2*5*!1,3;2,30**2;1,15*A*!1,3;3,30*BA$    ^1241-9/24$

^*2,3;1,6*B*!1,3;2,15*4*!1,3;3,30*$    ^1241-9/25$

^*2,3;1,6*B*!1,3;2,15**2,3;1,15*A*!1,3;3,30*$    ^1241-(/26$

^*!1,3;2,15*A*!1,3;2,15*B*2,3;1,15*A*2,3;1,15*B*!1,3;3,15**2;1,15*4$    ^1241-9/

^*!1,3;2,15**2;1,15*4*!1,3;2,30*B*2;1,15*4$    ^1241-9/28$

^*!1,3;2,30*4*!1,3;2,15*B*2,3;1,15*$    ^1241-9/29$

^*!1,3;2,30*4*2,3;1,15**!1,3;3,15*B*2;1,15*$    ^1241-9/30$

^*!1,3;2,30**2;1,15*AA*2,3;1,15**!1,3;3,15*B*2,3;1,15*$    ^1241-9/31$

^*!1,3;2,30**2;1,15*A*!1,3;3,15*5$    ^1241-9/32$

^*!1,3;2,30**2;1,15*A*!1,3;3,15*B*2;1,15*$    ^1241-9/33$

^*!1,3;2,30**2,3;1,15*A*!1,3;3,15**B,5;0,1*$    ^1241-9/34$

^*!1,3;2,15*4*2,3;3,30*B$    ^1241-9/35$

^*!1,3;2,15*4*!1,3;3,15**B,5**2;1,15**4;0,1*$    ^1241-9/36$

^*!1,3;2,15**2;1,15*A*!1,3;3,15*B*2,3;1,15*4;0,1*$    ^1241-9/37$

^*!1,3;2,15**2;1,15*4*!1,3;3,15*$    ^1241-9/38$

^*!1,3;2,15**!2,1,15*4*!2,3;3,15**!1,3;4,15*$    ^1241-9/39$

^*!1,3;2,15**2,3;1,15*A*2,3;1,15**!1,3;3,15*B*2,3;1,15*4$    ^1241-9/40$

^*!1,3;2,15**2,3;1,15*A*!1,3;3,15*B*2;1,15*$    ^1241-9/41$

^*!1,3;2,15**2,3;1,15*A*!1,3;3,15**B,5;1,1*$    ^1241-9/42$

^*!1,3;2,30*4*!1,3;3,15*B$    ^1241-9/43$

^*!1,3;2,30**2;1,15*A*!1,3;3,15*B*2;1,15*4$    ^1241-9/44$

^*!!1,3;2,30**!2;4,15*4*!!1,3;4,30*$    ^1241-9/45$

^*!1,3;2,15*A*!1,3;4,20*5$    ^1241-9/46$

^*!1,3;2,15*4*!1,3;3,30*B*2,3;1,15*$    ^1241-9/47$

^*!1,3;2,15**2;1,15*A*2,3;1,15**B,5;1,1**2;1,15*$    ^1241-9/48$

^*!1,3;2,15**2;1,15*A*2,3;4,15**5;0,1*$    1241-9/49$

^*!1,3;2,15**2;1,15*4*!1,3;30*$    ^1241-9/50$

^*!1,3;2,15**2,3;1,15*A*2,3;1,15*B*2,3;0,15*$    ^1241-9/51$

^*!1,3;2,15**2,3;1,15*4*!1,3;2,15**2,15**!1,3;2,15*B*2;1,15*$    ^1241-9/52$

^*!1,3;2,30**2,3;1,15**4,A;1,2**!1,3;3,30*B$    ^1241-9/53$

^*!1,3;2,15**2;1,15*A*!1,3;3,15*B*2,3;1,10*4$    ^1241-9/54$
```

^*!1,3;2,15**2;1,15*4*2,3;3,30**!1,3;4,20*5$  ^1241-9/55$

:Stern(asterisk)

^5*1,3[<40];1,20**2,3[<-30];1,10*A*3,1[<20];1,20*B4$  ^1241-9$

^5*1,3[<40];1,10**2[<-50];1,10*A*1,3[<20];1,10*B*2[<-50];1,10*$  ^1241-9$

^5*1,3[<30];1,10**2[<-50];1,10*A*3,1[<20];1,20*B*2[<-50];1,10*$  ^1241-9$

^5*1,3[<30];1,10**2[<-50];1,10*A*2,3[<-20];1,10**1[≦50];1,10*B*2[<-50];1,10*$  ^

^5*1,3[<30];1,10**2[<-50];1,10*A*1,3[<20];1,10*B*3,2[<-30];1,10*4$  ^1241-9$

^5*1,3[<30];1,10**2,3[<-40];1,10*4*3,2[<-10];1,20**1[<50];1,10*5$  ^1241-9$

^5*1,3[<20];1,10!A,!5;3,32,3[<-20];1,10**1[<50];1,10*B*2[<-50];1,10*$  ^1214

^5*1,3[<20];1,10**2[<-50];1,10*A*3,1[<10];1,10*B*2[<-50];1,10*4$  ^1241-9$

^*1,3[<40];1,20**2,3[<-40];1,10*A*3,1[<10];1,10*B4$  ^12141-9$

^*1,3[<40];1,20**2,3[<-40];1,10*A*3,1[<10];1,10*B4$  ^12141-9$

^*1,3[<40];1,10*4*3,1[<20];1,10*B4*2[<-50];1,10*$  ^1241-9$

^*1,3[<40];1,10*4*2,3[<-20];1,10*5*2[<-50];1,10*4$  ^1241-9$

^*1,3[<40];1,10**2[<-50];1,10*A*2,3[<-30];1,10**1[<50];1,10*BA$  ^1241-9$

^*1,3[<40];1,10**2[<-50];1,10*4*3,2[<-10];1,20**1[<50];1,10*B4$  ^1241-9$

^*1,3[<40];1,10**2,3[<-40];1,10*A*3,1[<10];1,20*B*2,3[<-40];1,10*$  ^1241-9$

^*1,3[<40];1,10**2,3[<-40];1,10*A*2,3[<-20;1,10**1[<50];1,10*B*3,2[<-30];1,10*4

^*1,3[<40];1,10**2,3[<-30];1,10*A*3,1[<20];1,10*B4$  ^1241-9$

^*1,3[<30];1,20*4*3,1[<20];1,10*B4$  ^1241-9$

^*1,3[<30];1,20**2[<-50];1,10*A*3,2[<-10];1,10**1,3[<40];1,10*B*2[<-50];1,10*$

^*1,3[<30];1,10*4*3,1[<10];1,10*B*1[<50];1,10*A*2[<-50];1,10*$  ^12141-9$

^*1,3[<30];1,10**2[<-50];1,10*4*3,2[<-10];1,10**1,3[<40];1,10*B4$  ^1241-9$

^*1,3[<30];1,10**2[<-50];1,10*4*3,1[<20];1,20*B*3;1,10*4$  ^12141-9$

^*1,3[<30];1,10**2,3[<-40];1,10*A*3,2[<-10];1,20*B4$  ^12141-9$

^*1,3[<30];1,10**2,3[<-40];1,10*A*3,2[<-10];1,10**1,3[<30];1,10*B*2[<-50];1,10*$

^*1,3[<30];1,10**2,3[<-40];1,10*A*3,1[<20];1,10*B4$  ^12141-9$

^*1,3[<20];1,20**2,3[<-20];1,10*A*1,3[<10];1,20*B4$  ^12141-9$

^*1,3[<20];1,10**2[<-50];1,10*A*3,1[<20];1,20*B4$  ^12141-9$

:================================================================

:Neueinsaetze ab hier(New entrance from here on)

:================================================================

^B*0;1,20**3,1[20];1,30*$  ^141-E$

:-----------------------------------

^*4,!2,3;2,15!1,3,5;1,204,2;1,4*$  ^1412-Z$

^*5,1;1,4*A*!1,20**4,2;1,4*$  ^1412-Z$

^*1;0,2A,4;1,12,3;1,15!1,3,5;4,254,2;1,4*$  ^1412-Z$

^B*!A,2;1,1!1,3,5;4,254,2;1,4*$  ^1412-Z$

^A*2,3;1,20**1;1,10*B*1,3;1,10**2;1,10*$  ^1412-Z$

^5*1;1,10*A*3,1;1,30*A*2;1,10*$  ^1412-Z$

```
^5*1;1,10*A*3,1;1,10*5A*2;1,10*$    ^1412-Z$

^5*1;1,10*A*3,1;1,20*B4*3,2;1,10*$    ^1412-Z$

^5*1;1,10*A*3,1;1,20*5*1,3;1,10*$    ^1412-Z$

^5*1;1,10*A*3,1;1,10*B4*2;1,10*4$    ^1412-Z$

^5*1,3;1,10*A*3,1;1,10*5*1;1,10*5A$    ^1412-Z$

^5*1,3;1,10**2;1,10*A*3,1;1,10*5*1;1,10*5$    ^1412-Z$

^4*3;1,10*5*1;1,10*$    ^1412-Z$

^4*2,3;1,10**1;1,10*55*1;1,10*$    ^1412-Z$

^4*2,3;1,10**1,3;1,10*55*1;1,10*$    ^1412-Z$

^4*2,3;1,10**1,3;1,10*5A*2;1,10*$    ^1412-Z$

^4*2,3;1,10*5*1,3;1,10**2;1,10*A*2;1,10*$    ^1412-Z$

^*2,3;1,20**1;1,10*5*1;1,10*$  ^1412-Z$

^*1;1,10*A*3,1;1,20*5*1;1,10*$   ^1412-Z$

^*1;1,10*A*3,1;1,20**2,3;1,10*$   ^1412-Z$

^*1;1,10*A*3,1;1,20**2,3;1,10*4$   ^1412-Z$

^*1;1,10*A*3,1;1,20*5*2,3;1,10*$   ^1412-Z$

^*1;1,10*4*3,1;1,10*B*1,3;1,10**2;1,10*$   ^1412-Z$

^*1;1,10*4*3,1;1,10*5*1,3;1,10*$    ^1412-Z$

^*1,3;1,10*A*1,3;1,10*5*1;1,10*A*2;1,10*$    ^1412-Z$

:------------------------------------------------------------------------
^*4;0,3**!2,3;2,15**!1,3;2,15**B,5,1;1,4**A,4,2;1,3**!2,3;2,15**5,1;1,5**2;0,1*$
:------------------------------------------------------------------------

^*1,3;4,20**2,3;6,20**1,3;1,10*$    ^141-V$

^*!1,3,B;4,20**!4,2;1,2**!1,3;1,10*$    ^141-V$

^*!1,3;4,20*AB*!1,3;1,10*$    ^141-V$

^B*3,2;1,10*4*2,3;1,10*$    ^141-V$

^B*3,1;1,20**2;1,10*A*1,3;1,10*$    ^141-V$

^B*3,1;1,10*4*3,1;1,20*$    ^141-V$

^B*3,1;1,10**2;1,10*A*3,1;1,10*$    ^141-V$

^B*1,3;1,10**2,3;1,10**1,3;1,10*$    ^141-V$

^B*1,3;1,10*4*3,1;1,20*$    ^141-V$

^*3;1,10*B*3,2;1,20**1,3;1,10*$    ^141-V$

^*3;1,10*B*3,2;1,10*4*2,3;1,10**1,3;1,10*$    ^141-V$

^*3,2;1,10*4*2;1,10**1,3;1,10*$    ^141-V$

^*3,1;1,20**2;1,10*4*2,3;1,10**1;1,10*$    ^141-V$

^*3,1;1,20**2;1,10**1;1,10*A*3,1;1,10*$    ^141-V$

^*3,1;1,10*B*3;1,10*4*3,1;1,20**2,3;1,10*$    ^141-V$

^*3,1;1,10*B*3,1;1,10*4*3,1;1,20*$    ^141-V$

^*3,1;1,10*B*1,3;1,10**2;1,10*4*3,1;1,20*$    ^141-V$

^*3,1;1,10*4*3,1;1,10**2,3;1,10*$    ^141-V$
```

^*3,1;1,10**2,3;1,10*4*2,3;1,10**1,3;1,10*$  ^141-V$

^*3,1;1,20**2,1;1,10*A*3,1;1,10**2,1;10*$  ^141-V$

^*3,1;1,202,3;1,101;1,10*A*3,1;1,10*$  ^141-V$

^*3,1;1,10*4*3,1;1,102,3;1,101,3;1,10*$  ^141-V$

^*1;1,10*B*3,1;1,10*4*3,1;1,20*$  ^141-V$

^*1;1,10*B*1,3;1,20**2,1;10*A*3,1;1,10*$  ^141-V$

^*1;1,10*B*1,3;1,10*4*1,3;1,20**2,3;1,10*$  ^141-V$

^*1;1,10*B*1,3;1,10*4*3,1;1,20*$  ^141-V$

^*1;1,10**2,3;1,10*4*3,1;1,10**2,3;1,10*$  ^141-V$

^*1,3;1,20*44*3,1;1,10**2,3;1,10*$  ^141-V$

^*1,3;1,20**2,3;1,10*4*3,1;1,10*$  ^141-V$

^*1,3;1,202,3;1,101,3;1,10*$  ^141-V$

^*1,3;1,10*5*1,3;1,10*4*3,1;1,10*$  ^141-V$

^*1,3;1,10**2;1,10*4*3,1;1,10**2,1;10*$  ^141-V$

^*1,3;1,20**2;1,10*A*3,1;1,10**2,3;1,10*$  ^141-V$

^*1,3;1,202;1,101,3;1,10*$  ^141-V$

^*1,3;1,10*B*1,3;1,10**2;1,10*A*3,1;1,10*$  ^141-V$

^*1,3;1,102,3;1,101,3;1,10*$  ^141-V$

^*1,3;1,10*B*3,1;1,20**2;1,10*A*1,3;1,20*$  ^141-V$

:------------------------------------------------------------------------

^5*!1,3;1,10**2,3;4,15*BA$  ^12152-F$

^B*1,3;1,10*4*2;1,10*5$  ^12152-F$

^B*1,3;1,102,3;1,101;1,10*5*2;1,10*$  ^12152-F$

^B*1,3;1,10**2;1,10*4*3,2;1,10**1;1,10*B*3,2;1,10*$  ^12152-F$

^B*1,3;1,102,3;1,101;1,10*B*3,2;1,10*$  ^12152-F$

^55*1;1,102,3;1,201,3;1,10*$  ^12152-F$

^55*1;1,100;1,101;1,10*4*2;1,10**1,3;1,10*B*3,2;1,10*$  ^12152-F$

^55*1,3;1,10**2;1,10*A*3,2;1,10**1,3;1,10*B*2;1,10*$  ^12152-F$

^55*1,3;1,10**2,3;1,10*5*2;1,10*$  ^12152-F$

^55*1,3;1,102,3;1,201,3;1,10*5$  ^12152-F$

^55*1,3;1,20*B*3,2;1,10*$  ^12152-F$

^5*1;1,10*5*1,3;1,102,3;1,201;1,10*$  ^12152-F$

^5*1;1,10*5*1,3;1,10**2,3;1,10*5*2;1,10*$  ^12152-F$

^5*1;1,100;1,103,2;1,10**1;1,20*5$  ^12152-F$

^5*1;1,100;1,102,3;1,20*B*3,2;1,10*$  ^12152-F$

^5*1;1,100;1,101,3;1,102,3;1,101;1,10*B*3,2;1,10*$  ^12152-F$

^5*1,3;1,20*4*2,3;1,10**1;1,10*5$  ^12152-F$

^5*1,3;1,20**2;1,10*A*3,1;1,10*55$  ^12152-F$

```
^5*1,3;1,10*4*3,2;1,10*B*1;1,10*$  ^12152-F$
^5*1,3;1,10*4*2;1,10**1;1,10*5$  ^12152-F$
^5*1,3;1,10*4*2,3;1,10**1;1,10*5$  ^12152-F$
^5*1,3;1,10*4*2,3;1,10**1,3;1,10*5$  ^12152-F$
^5*1,3;1,10*4*2,3;1,10**1;1,10*55$  ^12152-F$
^5*1,3;1,10*4*2,3;1,10**1;1,10*B4$  ^12152-F$
^5*1,3;1,10**2;1,10*44*3,2;1,10**1;1,10*5$  ^12152-F$
^5*1,3;1,10**2;1,10*4*2,3;1,10*5*1;1,10*5*2;1,10*$  ^12152-F$
^5*1,3;1,10**2,3;1,20*5$  ^12152-F$
^5*1,3;1,10**2,3;1,20*5*2;1,10*$  ^12152-F$
^5*1,3;1,10**2,3;1,20*5$  ^12152-F$
^5*1,3;1,10**2,3;1,10*B*1,3;1,10**2;1,10*$  ^12152-F$
^5*1,3;1,10**2,3;1,10**1;1,10*5*2;1,10*$  ^12152-F$
^5*1,3;1,10**2,3;1,10**1;1,10*$  ^12152-F$
^5*1,3;1,20*4*3,1;1,10*B4$  ^12152-F$
^5*1,3;1,20**2;1,10*4*2,3;1,10**1;1,10*4$  ^12152-F$
^5*1,3;1,20**2;1,10*4*2,3;1,10**1;1,10*5$  ^12152-F$
^5*1,3;1,20**2;3,1,10*5*3,2;1,10*$  ^12152-F$
^5*1,3;1,10*B*3,2;1,10*4*3,1;1,10*B*2,3;1,10*$  ^12152-F$
^5*1,3;1,10*B*1,3;1,10**2;1,10*$  ^12152-F$
^5*1,3;1,10*4*2,3;1,10**1,3;1,10*5$  ^12152-F$
^5*1,3;1,10**2;1,10*A*2,3;1,10**1;1,10*5*1;1,10*$  ^12152-F$
^5*1,3;1,10**2;1,10*4*2,3;1,10**1;1,10*5$  ^12152-F$
^5*1,3;1,10**2;3,1,10*A*2,3;1,10**1;1,10*B*2;1,10*$  ^12152-F$
^5*1,3;1,10**2;3,1,10**1;1,10*5$  ^12152-F$
^5*1,3;1,10**2;3,1,10*5*3,2;1,10*$  ^12152-F$
^5*1,3;1,10**2;3,1,10**1;1,10*5A*1;1,10*$  ^12152-F$
^5*1,3;1,10**2;3,1,20*B4$  ^12152-F$
^5*1,3;1,20*4*2,3;1,10**1,3;1,10*5$  ^12152-F$
^5*1,3;1,20**2;1,10*A*3,1;1,10*B4$  ^12152-F$
^5*1,3;1,20*$  ^12152-F$
^5*1,3;1,10*A*2,3;1,10**1,3;1,10*B*2;1,10*$  ^12152-F$
^5*1,3;1,10*44*3;1,10*B*1,3;1,10**2;1,10*$  ^12152-F$
^5*1,3;1,10**2;1,10*44*2,3;1,10**1;1,10*55$  ^12152-F$
^5*1,3;1,10**2,3;1,20*5*2;1,10*$  ^12152-F$
^5*1,3;1,10**2,3;1,10*B*3;1,10*4$  ^12152-F$
^5*0;1,10**3,2;1,20*B4$  ^12152-F$
^5*0;1,10**3,1;1,10*4*2,3;1,10**1;1,10*55$  ^12152-F$
^5*0;1,10**1,3;1,10**2,3;1,10*B4$  ^12152-F$
^5*0;1,10**1,3;1,10*4*2;1,10*B*3,2;1,10*$  ^12152-F$
^4*0;1,10**1,3;1,10*4*2,3;1,10**1;1,10*5$  ^12152-F$
```

^*2;1,10*B*1,3;1,10*4*2,3;1,10*5*2;1,10*$    ^12152-F$

^*2;1,10*5*1;1,10**2;1,10*4*2,3;1,10**1;1,10*5*2;1,10*$    ^12152-F$

^*2;1,100;1,103,2;1,20**1,3;1,10*B*2,3;1,10*$    ^12152-F$

^*1;1,10*5*1;1,100;1,103,1;1,10**2;1,10*4*2,3;1,10**1;1,10*5*3,2;1,10*$    ^1

^*1;1,10*5*1,3;1,102,3;1,201;1,10*5$    ^12152-F$

^*1;1,10*4*0;1,101;1,102;1,10*A*1,3;1,10*5*2;1,10*$    ^12152-F$

^*1;1,102,3;1,201;1,10*5$    ^12152-F$

^*1;1,10**0;1,10*4*2,3;1,10**1,3;1,10*B44$    ^12152-F$

^*1,3;1,10*4*2,3;1,10**1,3;1,10*BA$    ^12152-F$

^*1,3;1,10**2,3;1,10*5*1;1,10*$    ^12152-F$

^*1,3;1,10*4*2,3;1,10*B4$    ^12152-F$

^*1,3;1,10**2;1,10*44*2,3;1,10*5$    ^12152-F$

^*1,3;1,10**2;1,10*4*2,3;1,20**1,3;1,10*B4$    ^12152-F$

^*1,3;1,20*A*2;1,10*B*1,3;1,10**2;1,10*$    ^12152-F$

^*1,3;1,10*B*3,2;1,10*$    ^12152-F$

^*1,3;1,10*44*2,3;1,10*5$    ^12152-F$

^*1,3;1,10*4*2,3;1,10*BA$    ^12152-F$

^*1,3;1,10*4*2,3;1,10**1;1,10*BA$    ^12152-F$

^*1,3;1,10**2;1,10*A*3,2;1,10**1;1,10*B*2;1,10*$    ^12152-F$

^*1,3;1,10**2;1,10*A*2,3;1,10**1;1,10*5$    ^12152-F$

^*1,3;1,10**2;1,10*44*2,3;1,10**1;1,10*B4$    ^12152-F$

^*1,3;1,10**2;1,10*4*2,3;1,10*B4$    ^12152-F$

^*1,3;1,10**2;1,10*4*2,3;1,10**1;1,10*5$    ^12152-F$

^*1,3;1,20**2;1,10*A*3,2;1,10**1,3;1,10*B*2;1,10*$    ^12152-F$

^*1,3;1,20**2;1,10*44*2,3;1,10**1;1,10*55*2;1,10*$    ^12152-F$

^*1,3;1,10**2;1,10*44*2,3;1,10**1;1,10*5*1,3;1,10**2;1,10*$    ^12152-F$

^*1,3;1,10**2;1,10*4*2,3;1,10*55$    ^12152-F$

^*1,3;1,10**2;1,10*4*2,3;1,10**1;1,10*5*1;1,10*$    ^12152-F$

^*1,3;1,10**2;1,10*4*2,3;1,10**1;1,10*5*1;1,10**2;1,10*$    ^12152-F$

^*1,3;1,10*4*2,3;1,10**1;1,10*B4$    ^12152-F$

^*1,3;1,102;1,101,3;1,10*A*2,3;1,10**1;1,10*5$    ^12152-F$

^*0;1,10*5*1,3;1,10**2,3;1,10*5$    ^12152-F$

^*0;1,10**3,2;1,10*B4$    ^12152-F$

^*0;1,10**1;1,10*4*3,1;1,10*$    ^12152-F$

:------------------------------------------------------------

^*!1,3;4,30*4*2,3;2,10**1,5;1,4*$    ^12-6$

^*!1,3;4,30*21*2,3;2,10*4$    ^12-6$

;------------------------------------------------------------

^*5;1,22,!A;1,4!1,3;4,30*$    ^2541-7$

:------------------------------------------------------------

^5*1,3;2,20*25*1,3;2,20**2,3;1,10*$    ^1212-8$

```
:^*5,!1,3;2,15**4,!2,3;3,15*5,!1,3;3,15**4,2,3;1,15*$    ^1212-8$

:..........

:Summe zur Probe(sum to be proved)

^*A,4;0,1**B,5;0,2**!1,3,5,B;2,10**!2,3;2,10**B,1,3,5;1,10**2,3;1,10**A,4;0,1*$

^*1,3;1,10*A*1,3;1,10*B*2,3;1,10**1,3;1,10*5*1,3;1,10**2,3;1,10*$    ^1212-8$
^*1,3;1,10*A*3,1,3;1,10*B*1,3;1,10**2,3;1,10**1,3;1,10**2,3;1,10*$    ^1212-8$
^*A,4;0,1**B,5;0,2**B,1,3;1,10**2,3;1,10**1,3;1,10**2,3;1,10**1,3;1,10**2,3;1,10
^*1,3;1,10**2,3;1,10**1,3;1,10**2,3;1,10**1,3;0,10**2,3;0,10*$    ^1212-8$
^*2,3;1,10**1,3;1,10*B*1,3;1,10**2,3;1,10**1,3;1,10**2,3;1,10*A*1,3;1,10*$    ^1
^*2,3;1,10*B*1,3;1,10**2,3;1,10**1,3;1,10*4$    ^1212-8$
^*1,3;1,10**2,3;1,10**1,3;1,10**2,3;1,10**1,3;0,10*4$    ^1212-8$
^4*2,3;1,10*B*1,3;1,10**2,3;1,10**1,3;1,20**2,3;1,10*$    ^1212-8$
^4*2,3;1,10*B*!1,3;1,10*B*2,3;1,10*$    ^1212-8$
^4*3;1,10*B*3,1,3;1,10*B*1,3;1,10**2,3;1,10*$    ^1212-8$
^*1,3;1,10*A*1,3;1,10*B*1,3;1,20**2,3;1,10*$    ^1212-8$
^*1,3;1,20*A*2,3;1,10*B*1,3;1,10**2,3;1,10*$    ^1212-8$

:..........................

^B*1,3;1,10**2,3;1,10**1,3;1,10**2,3;1,10*$    ^1212-8$
^B*1,3;1,10**2,3;1,10**1,3;1,20**2,3;1,10*4$    ^1212-8$
^B*1,3;1,10**2,3;1,10**1,3;1,10**2,3;1,10*$    ^1212-8$
^B*1,3;1,10**2,3;1,10**1,3;1,10*5*1,3;1,10**2,3;1,10*$    ^1212-8$
^B*1,3;1,10**2,3;1,10*5*1,3;1,10**2,3;1,10*$    ^1212-8$
^A*3;1,10*5*3,2,3;1,10**1,3;1,10**2,3;1,10*$    ^1212-8$
^55*1,3;1,10**2,3;1,10**1,3;1,20**2,3;1,10*$    ^1212-8$
^5*1,3;1,10*B*1,3;1,10**2,3;1,10**1,3;1,10**2,3;1,10*$    ^1212-8$
^5*1,3;1,20**2,3;1,10**1,3;1,20**2,3;1,10*$    ^1212-8$
^5*1,3;1,10**2,3;1,10*B*1,3;1,10**2,3;1,10*$    ^1212-8$
^5*1,3;1,10**2,3;1,10**1,3;1,10**2,3;1,10*$    ^1212-8$
^5*1,3;1,10**2,3;1,10**1,3;1,10**2,3;1,10**1,3;1,10**2,3;1,10*$    ^1212-8$
^5*1,3;1,10**2,3;1,10**1,3;1,10**2,3;1,10*$    ^1212-8$
^5*1,3;1,10**2,3;1,10**1,3;1,10*5*1,3;1,10**2,3;1,10*4$    ^1212-8$
^5*1,3;1,10**2,3;1,10**1,3;1,10**2,3;1,10*$    ^1212-8$
^5*1,3;1,10**2,3;1,10**1,3;1,10*$    ^1212-8$
^5*1,3;1,10**2,3;1,10*5*1,3;1,10**2,3;1,10*4$    ^1212-8$
^5*1,3;1,10**2,3;1,10**1,3;1,20**2,3;1,10*$    ^1212-8$
^5*1,3;1,10**2,3;1,10**1,3;1,10*5*1,3;1,10**2,3;1,10*4$    ^1212-8$
^5*1,3;1,10**2,3;1,10**1,3;1,10**2,3;1,10*$    ^1212-8$
^5*1,3;1,10**2,3;1,10*55*1,3;1,10**2,3;1,10*$    ^1212-8$
```

^5*1,3;1,10**2,3;1,10*5*1,3;1,10**2,3;1,10*$   ^1212-8$

^4*3;1,10*B*3,1,3;1,10*B*1,3;1,10**2,3;1,10*$   ^1212-8$

^4*3;1,10*B*1,3;1,102,3;1,101,3;1,10**2,3;1,10*$   ^1212-8$

^4*2,3;1,10*B*1,3;1,102,3;1,101,3;1,20**2,3;1,10*$   ^1212-8$

^4*2,3;1,10*B*1,3;1,10*B*1,3;1,10**2,3;1,10*$   ^1212-8$

^*2,3;1,10**1,3;1,10*B*1,3;1,102,3;1,101,3;1,10**2,3;1,10*A*1,3;1,10*$   ^12

^*2,3;1,10**0;1,10*$   ^1212-8$

^*2,3;1,10*B*1,3;1,102,3;1,101,3;1,10*4$   ^1212-8$

^*1,3;1,10*B*1,3;1,102,3;1,101,3;1,102,3;1,101,3;1,10**2,3;1,10*$   ^121

^*1,3;1,10*B*1,3;1,102,3;1,101,3;1,10**2,3;1,10*$   ^1212-8$

^*1,3;1,10*B*1,3;1,10**2,3;1,10*5*1,3;1,20**2,3;1,10*$   ^1212-8$

^*1,3;1,10*A*3,1,3;1,10*B*3,2,3;1,10**1,3;1,10*5*1,3;1,10**2,3;1,10*$   ^1212-8$

^*1,3;1,10*A*3,1,3;1,10*B*3,1,3;1,20**2,3;1,10*$   ^1212-8$

^*1,3;1,10*A*3,1,3;1,10*B*1,3;1,102,3;1,101,3;1,10**2,3;1,10*$   ^1212-8$

^*1,3;1,10*5*1,1;1,102,3;1,101,3;1,10**2,3;1,10*4$   ^1212-8$

^*1,3;1,10*5*1,3;1,102,3;1,101,3;1,20**2,3;1,10*$   ^1212-8$

^*1,3;1,202,3;1,101,3;1,10*5*1,3;1,10**2,3;1,10*4$   ^1212-8$

^*1,3;1,10**2,3;1,10*5*1,3;1,10**2,3;1,10*4$   ^1212-8$

^*1,3;1,102,3;1,101,3;1,102,3;1,101,3;1,10**2,3;1,10*$   ^1212-8$

^*1,3;1,10**2,3;1,10*5*1,3;1,10**2,3;1,10*A$   ^1212-8$

^*1,3;1,100;1,101,3;1,20**2,3;1,10*$   ^1212-8$

^*1,3;1,20*A*2,3;1,10*B*3,1,3;1,10**2,3;1,10*$   ^1212-8$

^*1,3;1,102,3;1,101,3;1,102,3;1,101,3;1,10*4$   ^1212-8$

^*1,3;1,10**2,3;1,10*5*1,3;1,10**2,3;1,10*4$   ^1212-8$

:--------------------------------------------------------

^*!1,3;4,15,*42*!1,3;5,25*$    ^12141-9$

:.........

:Summe zur Probe(sum to be proved)

^*5;0,2!1,3(>30),5;3,20!2(>50),3;1,10A,4;0,2A,2,3,4[<-30];4,10**B,1,3,5;

^*5;0,2!1,3(>30),5;3,20!2(<50),3;1,10A,4;0,2B,5,1,3[<30];0,10**A,4,2,3;4

^*5;0,2!1,3(>30),5;3,20A,4;1,2A,2,3,4[<-30];4,10B,1,3,5;0,20**A,4,2,3;0,

^*5;0,2!1,3(>30),5;3,20A,4;1,2B,5,1,3[<30];0,10A,4,2,3;4,20**B,1,3;0,10*

:...............

^55*1,3[<40];1,10**2[<-50];1,10*4*2,3[<-30];1,10**1,3[<30];1,20*$   ^12141-9$

^5*1[<50];1,10*5*1,3[<20];1,10**2[<-50];1,10*A*1,3[<20];1,20*$   ^12141-9$

^5*1,3[<40];1,20**2[<-50];1,10*A*3,1[<20];1,10**2[<-50];1,10*$   ^12141-9$

^5*1,3[<40];1,20**2[<-50];1,10*A*3,1[<10];1,10**2[<-50];1,10*$   ^12141-9$

^5*1,3[<40];1,20**2,3[<-30];1,10*A*3,1[<20];1,20*B4$    ^12141-9$

^5*1,3[<40];1,10*A*3,1[<20];1,20**0;1,10*$    ^12141-9$

```
^5*1,3[<40];1,10**2,3[<-40];1,10*4*3,1[<30];1,10*$  ^12141-9$

^5*1,3[<30];1,20**2[<-50];1,10*A*3,1[<20];1,30*$  ^12141-9$

^5*1,3[<30];1,20**2[<-50];1,10*A*1,3[<30];1,20**0;1,10*$  ^12141-9$

^5*1,3[<30];1,20**2[<-50];1,10*4*3,1[<20];1,20**2[<-50];1,10*$  ^12141-9$

^5*1,3[<30];1,10*4*3,1[<20];1,20*B4$  ^12141-9$

^5*1,3[<30];1,10**2[<-50];1,10*A*3,1[<20];1,20**2[<-50];1,10*$  ^12141-9$

^5*1,3[<30];1,10**2[<-50];1,10*A*3,1[<20];1,10*B4$  ^12141-9$

^5*1,3[<30];1,10**2[<-50];1,10*A*2,3[<-10];1,20*$  ^12141-9$

^5*1,3[<30];1,10**2,3[<-40];1,10*A*3,2[<-20];1,10**1[<50];1,10*5$  ^12141-9$

^5*1,3[<30];1,10**2,3[<-40];1,10*4*3,2[<-10];1,20**1[<50];1,10*5$  ^12141-9$

^5*1,3[<20];1,10**2[<-50];1,10*A*2,3[<-20];1,10*B*1[<50];1,10*$  ^12141-9$

^*3;1,10*5*1,3[<40];1,20*4*3,1[<20];1,20*$  ^12141-9$

^*1[<50];1,10*5*1,3[<30];1,10**2[<-50];1,10*A*1,3[<20];1,20*$  ^12141-9$

^*1[<50];1,10**2,3[<-30];1,10*4*3,2[<-10];1,20*5$  ^12141-9$

^*1,3[<40];1,20**2,3[<-40];1,10*A*1,3[<20];1,10**0;1,20*$  ^12141-9$

^*1,3[<40];1,10*4*3;1,20*B*1[<50];1,20*$  ^12141-9$

^*1,3[<40];1,10*4*2,3[<-30];1,20**1[<50];1,10*55$  ^12141-9$

^*1,3[<40];1,10*4*2,3[<-20];1,10*5*2[<-50];1,10*4$  ^12141-9$

^*1,3[<40];1,10**2[<-50];1,10*A*3,1[<10];1,10*B4*2[<-50];1,10*$  ^12141-9$

^*1,3[<40];1,10**2[<-50];1,10*4*2,3[<-30];1,10**1[<50];1,10*$  ^12141-9$

^*1,3[<40];1,10**2[<-50];1,10*4*2,3[<-30];1,10**1[<50];1,10*$  ^12141-9$

^*1,3[<30];1,20**2[<-50];1,10*A*3,1[<20];1,20**0;1,20*$  ^12141-9$

^*1,3[<30];1,20**2[<-50];1,10*A*2,3[<-10];1,10**1,3[<40];1,10*BA$  ^12141-9$

^*1,3[<30];1,20**2,3[<-40];1,10*A*2,3[<-20];1,20*5*2[<-50];1,10*$  ^12141-9$

^*1,3[<30];1,10*4*3;1,20*B*3,2[<-40];1,10*$  ^12141-9$

^*1,3[<30];1,10*4*3;1,10*BA$  ^12141-9$

^*1,3[<30];1,10*4*3,2[<-10];1,10*B4$  ^12141-9$

^*1,3[<30];1,10*4*3,1[<20];1,20*B4$  ^12141-9$

^*1,3[<30];1,10*4*2,3[<-10];1,10*B*1[<50];1,10*$  ^12141-9$

^*1,3[<30];1,10**2[<-50];1,10*A*3,2[<-20];1,10**1[<50];1,10*5*1[<50];1,10*$  ^1

^*1,3[<30];1,10**2[<-50];1,10*A*3,2[<-10];1,20**1[<50];1,10*5$  ^12141-9$

^*1,3[<30];1,10**2[<-50];1,10*A*3,1[<30];1,10**2,3[<-20];1,10*B*2[<-50];1,10*$

^*1,3[<30];1,10**2[<-50];1,10*A*3,1[<20];1,20*B*2,3[<-30];1,10**1[<50];1,10*$

^*1,3[<30];1,10**2[<-50];1,10*A*2,3[<-20];1,10**1[<50];1,10*5$  ^12141-9$

^*1,3[<30];1,10**2[<-50];1,10*A*2,3[<-10];1,20**1,3[<40];1,10*5$  ^12141-9$

^*1,3[<30];1,10**2[<-50];1,10*A*2,3[<-10];1,20**1,3[<30];1,10*BA$  ^12141-9$

^*1,3[<30];1,10**2[<-50];1,10*4*2,3[<-30];1,10**1[<50];1,10*BA$  ^12141-9$

^*1,3[<30];1,10**2,3[<-40];1,10*A*3,1[<10];1,10*BA$  ^12141-9$

^*1,3[<30];1,10**2,3[<-40];1,10*A*2,3[<-30];1,10*5$  ^12141-9$

^*1,3[<30];1,10**2,3[<-40];1,10*A*2,3[<-20];1,10**1[<50];1,10*5$  ^12141-9$

^*1,3[<30];1,10**2,3[<-40];1,10*A*2,3[<-20];1,10**1[<50];1,10*5$  ^12141-9$
```

```
^*1,3[<30];1,10**2,3[<-40];1,10*4*3,1[<10];1,10*5*2[<-50];1,10*$    ^12141-9$
^*1,3[<30];1,10**2,3[<-30];1,10*A*3,2[<-20];1,10*BA$   ^12141-9$
^*1,3[<20];1,20**2,3[<-40];1,10*A*3,2[<-10];1,20*$     ^12141-9$
^*1,3[<20];1,10**2[<-50];1,10*A*3,2[<-10]1,20**1[<50];1,10*B*2[<-50];1,10*$
^*1,3[<20];1,10**2[<-50];1,10*4*3,2[<-10];1,20*5$   ^12141-9$
^*1,3[<20];1,10**2,3[<-40];1,10*A*3,2[<-10];1,10**1[<50];1,10*5$    ^12141-9$

:------------------
: Vier-Bau(four architectural)
^5*1,3[<40];1,20*A*3,1[<20];1,10*$      ^141-V$
^5*1,3[<40];1,20*4*2,3[<-20];1,10**1,3[<20];1,10*$    ^141-V$
^5*1,3[<40];1,10*BA*1,3[<30];1,10**2,3[<-30];1,10**1,3[<20];1,10*$   ^141-V$
^*3;1,10*5*1,3[<40];1,10*4*3,1[<30];1,10*$   ^141-V$
^*3,1[<30];1,10*5*1,3[<40];1,10*A*1,3[<30];1,10*$   ^141-V$
^*1[<50];1,10*5*1,3[<50];1,10*4*3,1[<20];1,10*$    ^141-V$
^*1,3[<40];1,10*5*1,3[<50];1,10*4*3,1[<30];1,10*$    ^141-V$
^*1,3[<30];1,10*5*1,3[<40];1,20*A*3,1[<20];1,20*$    ^141-V$ :::::::::::::::::::::::::::::::::::::::::::::::::::::::::::::::::::::
:::::::::::::::::::::::::::::::::::::::::::::::::::::::::::::::::
+
^
$
```

APPENDIX F

Translation H.Tab

: HINTEN

| | |
|---|---|
| 44 | 4 |
| 434 | 4 |
| 444 | 4 |
| 4444 | 4 |
| 55 | 5 |
| 535 | 5 |
| 555 | 5 |
| 5555 | 5 |
| 24 | 4 |
| 34 | 4 |
| 224 | 4 |

| | |
|---|---|
| 234 | 4 |
| 45 | AB |
| 54 | BA |
| 15 | 5 |
| 35 | 5 |
| 115 | 5 |
| 135 | 5 |
| 4A | A |
| A4 | A |
| 44A | A |
| A44 | A |
| 5B | B |
| B5 | B |
| 55B | B |
| B55 | B |
| ^BA | ^A |

:::::::::::::::::::::::::::::::::::::::::::::::::::::::::

:zur Abwehr, Hand,neu(for defense, main, new)

^4*2,3;3,201,3[<30];10,602;0,2*$     ^1451-7/3a$     : 7 : 1

^*!2,3,4(=1);2,60**!1,3,5(=1);2,60*$ ^21-0/1$      : 0 : 172
^*4;0,2!2,!3;2,60!1,3;1,60**5;2,2*$    ^21-0/2$    : 0 : 12
:-------------------------------------------------------------
^*2;0,1**1,3[<25];4,60*$    ^1-E/1$    : 1 : 68
^*1,3[<30];1,60*2*1,3[<25];1,60*$ ^1-E/2$       : 1 : 26
^*1,3,B[<30];4,60*$     ^1-E/3$    : 1 : 28
^*2,3[<-25];4,60*$      ^1-E/4$    : 1 : 28
^*1,3,2(=1)[<25];4,60*$    ^1-E/5$    : 1 : 25
:-------------------------------------------------------------
^*2,3,4(=1),A;1,201,3[>20];6,602,4(=1),A;2,6*$    ^21421-Z/1$ : 2,117
^*2,3,4(=1),A;1,201,3[>20];6,604,A;1,3*$    ^21421-Z/1a$ : 2,117
^*4,A,2,3;1,61,3[>20];6,604,A,5,B,1;2,8*$    ^21421-Z/2$     : 2,83
^*2,3;1,81,3[>20];4,60!2,!3,!1,!4,!A,!5,!B;3,6*$    ^21421-Z/3$ : 2,11
:-------------------------------------------------------------
^*!2,3,4(=1),A;5,40!1,3,5(=1);4,40!2,3,4(=1);4,40!1,3,5;4,405;0,2*$ ^212
:absichtlich geteilt(split with intention)
^*A,4,2;6,15!1,3,5(=1);4,40!2,3,4(=1);6,40!1,3,5;6,405;0,2*$ ^2121-D/1a$
^*A,!4;2,4!1,3,5(=1);4,40!2,3,4(=1);6,40!1,3,5;2,405;0,2*$ ^2121-D/1a2$
^*!A,4,2;1,4!1,3,5(=1);4,40!2,3,4(=1);6,40!1,3,5;2,405;0,2*$ ^2121-D/1a$
^*!2,3,4(=1),A;5,401,3,5(=1);4,402,3,4(=1);2,401,3,5;2,405;0,2*$ ^2121-
^*A,4,2;1,41,3,5(=1);4,402,3,4(=1);6,401,3,5;6,405;0,2*$ ^2121-D/2a$

```
^*!2,3,4(=1),A;4,40**1,3,5(=1);4,40**2,3,4(=1);4,40**1,3,5;4,40**5;0,2*$   ^2121-
^*A,!4,2;1,4**!1,3,4(=1);6,40**!2,3,4(=1);6,40**!1,3,5;6,40**5;0,2*$   ^2121-D/2b
^*!2,3;2,10**!1,3;2,15**!2,3;2,15**!1,3;2,15*5$       ^2121-D/3$    : 3,30
:absichtlich geteilt
^*4,2;2,3**!2,3;1,10**!1,3;4,15**!2,3;4,15**!1,3,5(=1);4,15*$   ^2121-D/4$   : 3,
^*4;1,3**!2,3;1,10**!1,3;4,15**!2,3;4,15**!1,3,5(=1);4,15*$   ^2121-D/4a$   : 3,2
:------------------------------------------------------------------------------
^*1,3[<40];1,10*A*1,3[<30];1,10**A,2;0,1**B,5,1,3[<30];1,20**2,3[<-20];0,10*$
^*1,3[<30];1,20*A*1,3[<30];1,20*$        ^1451-V/3$    : 4 : 11

^*1,3[<30];1,20**A,B;1,2**1,3[<20];1,20*$        ^1451-V/2$    : 4 : 5
:^*!1,!3,4(=1),!A,5(=1),!B;3,6**1,3[<20];10,60*$        ^1451-V/4$    : 4 : 12
:------------------------------------------------------------------------------
^*5;1,2**1,3;1,20*4*2,3;1,20**1,3;1,20**5;1,2*$    ^1421-F/1$    : 5 : 72
^*5;1,2**1,3;1,20*4*2,3;1,20**1,3;1,20*$    ^1421-F/2$    : 5 : 41
^*!5,B,1,3;1,**B;0,2*0;0,10**1,3;0,20**2,3;0,5**!2,!3;1,20**!1,3;1,20*$
^*5;1,2**1,3;1,20**4;1,2**2,3;1,20**1,3;1,20*$   ^1421-F/4$   : 5 : 35
^*2,4(=1),A;1,3**B;1,2**1,3;0,10**!1,3,5(=1),B;1,20**!2,3,4(=1),A(=1);1,20**!1,3
^*!5,B,1,3;1,20**B;0,2**0;0,10**!2,!3;0,5**!1,3,5(=1),B;1,20*$    ^1421-F/6$
^*!5,B,1,3;1,8**B;0,2**0;0,10**!1,3,5(=1),B;1,20**!2,3,4(=1),A;1,20**!1,3,5(=1),
^*2,4(=1),A;1,3**B;1,2**1,3;0,10**!1,3,5(=1),B;1,20**!2,3,4(=1),A(=1);1,20**!1,3
^*5;1,2**1,3;1,20*4*2,3;1,20**5;1,2*$       ^1421-F/8a$    : 5 : 11
^*!5,1,3;1,4**1,3,5;2,20*$        ^1421-F/9$    : 5 : 10
:------------------------------------------------------------------------------
:zur Abwehr hierher(for defense to this place)
^*1,3;3,15*2*1,3;3,15*$      ^1-E/6c$    : 1 : 1

^*1,3[<50];10,60**4,A,2,3;2,6**1,3;2,20**5,B,1,3;1,4*$     ^142-6/1$   : 6 : 57
^*5;0,2**!1,!2,3(=1)[<50];3,40*A*2,3;1,6**1,3;1,8*$      ^142-6/2$    : 6 : 18
^*5;0,1**1,3[<50];6,30**2,4;2,6**1,3;4,15**5;0,2*$     ^142-6/3$   : 6 : 15
^*5,1,3[<50];10,60**4,A,2,3;2,6**1,3;9,40*$      ^142-6/4$    : 6 : 15
^*!1,5(=1),B,3[<50];9,40*A*!2,3;5,20**!1,3,5(=1),B;2,15*$       ^142-6/5$    : 6
:------------------------------------------------------------------------------
^*4,2,A;1,6**1,3;3,20**1,2,3(=1);4,20*$       ^1451-7/1$    : 7 : 90
^*2,1,3(=1);2,30*$     ^1451-7/2$    : 7 : 12
^A*!2,1,3(=1);2,30**!1,3[<25];4,20*$      ^1451-7/2$    : 7 : 12
:------------------------------------------------------------------------------
^*!2,3,4;4,35**!1,3,5;4,15**!2,3,4;4,35**!1,3,5;2,15*$        ^2121-8/1$    : 8 :
:------------------------------------------------------------------------------
^*2,1,3;1,15**1,3;10,60*$    ^21-9/1$   : 9 : 1
:::::::::::::::::::::::::::::::::::::::::::::::::::::::::::::::::::::::::::::::
```

:AUS 0(AUS = FROM)

:------------------------------------------------------------------

^*!2,3;1,60*1*!2,3;1,60**!1,3;1,60*$  ^21-0/3$      : 0 : 4

^*!1,3;1,4A,4;1,2!1,3;10,60*$    ^21-0/4$   : 0 : 1

:neu

^A*2,3;1,15**1,3;1,15*$   ^21-0/5$

^*2,3;1,10**1,3;1,10*B$  ^21-0/6$

^*2,3;1,10*B*1,3;1,10*A*1;1,10*B*3,2;1,10*AB$   ^21-0/7$

^*2,3;1,10**1,3;1,*B*2;1,10*$   ^21-0/8$

^*2,3;1,**1;1,10*B*3,2;1,10*$   ^21-0/9$

^*2,3;1,10**1,3;1,10*B$   ^21-0/10$

^*1;1,10*A*3,1;1,10*B*3,2;1,10*$  ^21-0/11$

^*1;1,10*A*3,1;1,10*B*1;1,10*A*1;1,*$   ^21-0/12$

:------------------------------------------------------------------

:AUS 1

:------------------------------------------------------------------

^*1,3;3,20**2,3;3,20*$    ^1-E/6a$    : 1 : 1

^*2,3;3,20**1,3;3,20*$    ^1-E/6b$    : 1 : 1

^2*1,3;6,30*2$       ^1-E/6b$    : 1 : 1

^*1,3;1,30*2$     ^1-E/6d$    : 1 : 1

^*1,3;1,30*$      ^1-E/6d$    : 1 : 1

:------------------------------------------------------------------

:AUS 2

:------------------------------------------------------------------

^*2,3;1,81,3;4,602,3;1,4B;1,11;0,3*$   ^21421-Z/4$    : 2 : 8

^*2,3;1,8**1,3;4,60*4*B,1;1,3*5$   ^21421-Z/4$    : 2 : 8

^*2,3;1,81,3[>20];4,60!2,!3,!1,!4,!A;3,5(=1),B*$   ^21421-Z/4$   : 2 : 8

^2*1,3;2,6*2*1,3[>20];9,402,4,A;2,41,3;2,4*$    ^21421-Z/5$   : 2 : 1

^*4;0,22,3;1,101,3,5(=1),B[>20];8,604,A,2;0,41,5(=1),B;1,3*$  ^21421-Z/

^*4,A,2,3;1,81,3[>20];4,60!2,!3,!1,!4,!A,!5,!B;3,6*$    ^21421-Z/7$   : 2

^*4,A,2,3;1,61,3[>20];8,60A,4;1,21,3;1,155,1,3;1,4*$  ^21421-Z/8$

^*4,A,2,3;1,61,3[>20];8,602,3,4,A;2,8*$  ^21421-Z/9$   : 2 : 1

^*4,2;1,3!2,3;1,10!1,3,5(=1)[>20];8,60**!4,A,2;1,4*$   ^21421-Z/10$    :

^*4,2;1,3!2,3;1,10!1,3,5(=1)[>20];8,60**4,!A,2;1,4*$   ^21421-Z/10$    :

^*4,2;1,3!2,3;1,10!1,3,5(=1)[>20];8,60**4,A,!2;4,10*$   ^21421-Z/10$   :

^*4,2,3;2,61,3,5(=1),B[>20];10,602,3,4(=1),A;1,5*1$   ^21421-Z/11$   : 2

:raus wegen 7(out, reason 7)

:^*4,!2,3;6,20!1,3,5,B[>25];6,404,!A,2;1,4**5,B,1;3,1,6*$   ^21421-Z/12$

^*2,3;9,401,3[>20];9,40A,4;1,2**5,B,1;1,4*$    ^21421-Z/13$   : 2 : 2

```
^*2,3;4,8**1,3[>20];4,8**A,4;1,2**1,5(=1),B;1,3*$        ^21421-Z/14$       : 2 : 2
^*2,3;4,8**1,3[>20];10,60**2,4,!A,3;2,6**1,5(=1),B;1,4*$     ^21421-Z/15$    : 2
^*2,3;2,6**1,3[>20];10,60*4$      ^21421-Z/16$     : 2 : 1
^*2,3;2,20**1,3,5(=1),B[>20];9,40**A,4;1,2**1,5,3;2,6*$   ^21421-Z/17$          : 2
^*2,3,4(=1),A;1,20**1,3[>20];10,60**A,4;1,2**2,3;1,6**1,3;1,4*$   ^21421-Z/18$
^*2,3,4(=1),A;1,20**1,3[>20];10,60**A,4;1,2**2,3;1,6*$    ^21421-Z/19$      : 2
^*!2,3;6,20**!1,3;9,40**A,4;1,2**1,3;2,20*$    ^21421-Z/20$    : 2 : 2
^*!2,3;2,30**!1,3,2(=1)[>20];9,40**2,3;1,4**!A,4;1,2**1,3;1,3*$   ^21421-Z/21$
^*!2,3;2,20**!1,3,2(=1)[>20];9,40**2,!4,A;1,4*B*!1,3,5(=1);0,6*$   ^21421-Z/22$

^*2,3,4[-20];1,10**1,3,5[20];1,10*AB$    ^21421-Z/23$

^*1,3,5[40];1,20*4$    ^21421-Z/24$

^*1,3,5[10];1,20*AB$    ^21421-Z/25$

^*2,3,4[-20];1,10**1,3,5[40];4,10*4$    ^21421-Z/26$

^*2,3,4[-20];1,10**1,3,5[30];4,20**2,3,4[-40];1,10*A*1,3,5;1,10*$   ^21421-Z/27$
:neu(new)
^*3,2;3,20**1,3;4,20*AB$   ^21421-Z/28$

^*3,1;4,20*AB$    ^21421-Z/29$

^*!2,3;3,20**!1,3;4,30**!2,3;4,15**4;1,1*$    ^21421-Z/30$

^*2,3;3,20**!1,3;4,30**A,4;1,1*$    ^21421-Z/31$

:aus Stern(from asterisk)
^*3,2[<-20];1,10**1,3;6,20*AB$    ^21421-Z/32$

^*2,3[<-20];1,10**1;4,20*4*2;2,20**B,4;1.2*$   ^21421-A/32$

^*2,3[<-20];1,10**1,3;1,10*5*1,3;1,10*4$    ^21421-Z/34$

^*2,3[<-30];1,15**1,3[30];1,15**2;1,15**1,3[<30];1,20*A*1;1,5*$   ^21421-Z/35$

^*2,3[<-30];1,10**1,3[<20];1,20**2[<-50];1,10*4$    ^21421-Z$

^*2,3[<-10];1,20**1,3[<40];1,10**2[<-50];1,10*4$    ^21421-Z$

^*2,3[<-20];1,10**1[<50];1,10*5*1,3[<30];1,10**2[<-50];1,10*4$    ^21421-Z$

:-----------------------------------------------------------------
:AUS 3
:-----------------------------------------------------------------

^*!2,3;5,20**!1,3;5,20**!2,3;4,6**B;1,1**1;0,4*$      ^2121-D/5a$    : 3 : 2
^*!2,3;5,20**!1,3;5,20**!2,3;4,6**B;0,1**1;1,4*$      ^2121-D/5b$    : 3 : 2
^*!2,3;5,20**!1,3;5,20*4*B,1;4,6**1,5;1,3*$       ^2121-D/5c$    : 3 : 2
^*!2,3;5,20**!1,3;5,20*4*!B,1;1,6**1,5;3,3*$      ^2121-D/5c$    : 3 : 2
^4*2,3[<-40];1,20**1;1,20**2,3[<-40];1,20**1;1,2*$     ^2121-D/5$    : 3 : 2
^*!4,A,1,5(=1);0,2**!2,3,4(=1),A;4,40**!1,3,5(=1);2,40**!2,3,4(=1);2,40**5;1,2*$
^*4,!A,1,5(=1);0,2**!2,3,4(=1),A;4,40**!1,3,5(=1);2,40**!2,3,4(=1);2,40**5;1,2*$
```

^*4,3,2[<-40];1,201,3[<50];1,202,3[<-40];1,20**1;4,20*$    ^2121-D/7$    : 3

^*2,4;2,61,3;1,11,3;2,15A,4;1,22,3;9,40**5,1,3;2,6*$    ^2121-D/8$    :

^*!2,!4;1,3!1,3;2,20!2,3;2,20!1,3,5(=1);2,204,0,2*$    ^2121-D/9$    :

^*2,4;0,32,3,4(=1);2,201,3;2,205,3,4;2,52,3,4;2,201,3,5(=1);2,204,2;

^*2,!4,A;1,3B;1,2!1,3,5(=1);5,20!2,3,4(=1);5,20!1,3,5(=1),B;5,20**2;0,4*

:raus stoert(out is bothering)

:^*2,4,!A;1,3B;1,2!1,3,5(=1);5,20!2,3.4(=1);5,20!1,3,5(=1),B;5,20**2;0,4

^*!2,3[<-40];4,20!1,3[<40];4,254,2,3[<-40];4,20**!1,5;3,20*$    ^2121-D/12$

^*!2,3[<-40];1,2!1,3[<40];1,154,2,3[<-40];1,20!1;1,65;1,1*$    ^2121-D/13

^*!2,3[<-40];1,15**!1,3[<40];1,20*4*2,3[<-40];1,15**1;1,3*$    ^2121-D/14$

^*!2,3[<-40];1,15!1,3[<40];1,202;1,1*5*1,3[<40];1,152,3[<-40];1,151,3[<4

^*5,1;1,24,A;1,2!2,3,4(=1);1,40!1,3,5(=1);2,40!2,3,4(=1);2,40**5;0,2*$

^*4,A;1,2!2,3,4(=1);1,40!1,3,5(=1);2,40!2,3,4(=1);2,405;0,2*$    ^2121-D/1

^*!2,3,4(=1);1,40!1,3,5(=1);2,40!2,3,4(=1);2,40**5;1,2*$    ^2121-D/16b$

^*!2,3;1,6!1,3;3,15!2,3;3,15**!1;2,4*$    ^2121-D/17$    : 3 : 6

^*!2,3[<-30];1,10!1,3[<40];1,20!2;1,10*44*2,3[<-40];1,10**!1;1,10*5$    ^2121-

^*1,3[<10];1,102,3[<-40];1,101[<50];1,10*5$    ^2121-D/19$

:Stern

^*2,3[,-30];1,101,3[,40];1,102,3[,-40];1,10*81[,50];1,10*B$    ^2121-D/20$

:------------------------------------------------------------------
:AUS 4
:------------------------------------------------------------------

^*1,3[<30];4,20A,4;1,21,3,5(=1),B[<30];4,204,2;1,45,1;0,4**2,3,1(=2)[<30

^*!1,3[<40];2,20*A*!1,3;4,30*$    ^1451-V/52$    :4,8

^*1,3[<40];1,20*A*1,3;4,20*5*1,3;4,20*$    ^1451-V/54$    :4,7

^*1,3;1,20*A*1,3;4,20A,B;1,21,3;1,20*$    ^1451-V/82$    :4,7

^*1,3[<30];1,15A,4;1,21,3[<30];9,402,4(=1),A,5(=1),B,1;1,61,3[<30];6,40*

^*1,3,5(=1),B[<30];1,15A,4;1,21,3[<30];1,204,2;1,61,3,5(=1),B,2(=1)[<30]

^*1,3[<40];1,20*A*1,3;1,20A,B;1,21,3;1,20*$    ^1451-V/50$

^*1,3[<30];9,402,4(=1),A,5(=1),B,1,62,3[<-20];1,20*$    ^1451-V/14$    :

^*3,1[<30];1,20*$    ^1451-V/10$    : 4 : 8

^*1,3[<30];1,20*A*1,3;4,20**2,3;1,20*$    ^1451-V/63$    :4,6

^*1,3[<30];6,154,2;0,45,B,1;1,6**1,3[<30];3,20*$    ^1451-V/14$    : 4 : 5

^A*1,3[<30];1,20*AB*1,3;1,20*$    ^1451-V/46$    :4,2

^5*1,3;1,20*A*1,3[<30];1,20*AB*1,3[<10];1,20*$    ^1451-V/47$    :4,2

^*3,4,A;1,31,3[<30];4,152,3;1,6**1,3[<30];4,60*$    ^1451-V/9$    : 4 : 3

^*2,3[<-30];1,20*A*1,3[<30];1,202;1,201;1,20**2,3[<-20];1,20*$    ^1451-V/36$

```
^*2,3;1,20*A*1,3[<40];1,20*$   ^1451-V/49$    :4,2

^*1;1,20*A1,3[<30];1,20*A*1;1,20*5*1;1,20**2,3[<-20];1,20*$  ^1451-V/41$   :4,1

^*1,3[<40];1,20*A*1,3[<30];1,20*AB*1,3[<30];1,20*$   ^1451-V/37$   :4,2

^*1,3[<40];1,20*A*1,3;4,20*AB*1,3;4,20*$   ^1451-V/55$   :4,3

^*1,3[<40];1,20*A*1,3;4,20**2,3;1,20*5*1,3;1,20*$              : 4 : 4

^*1,3[<30];6,30*AB*1,3[<30];6,30*$         : 4 : 1

^*1,3[<30];1,20*A*1,3[<30];4,20*AB*1,3;3,20**2,3;1,20*$         : 4 : 3

^*1,3[<30];1,20*A*1,3[<30];1,20*A*1;1,20*B*1,3[<30];1,20**2,3[<-30];1,20*$

^*1,3[<30];1,20*A*1,3[<30];1,20**2;1,20*B*2,3[<-15];1,20*$       : 4 : 1

^*1,3[<30];1,20*A*1,3[<30];1,20**2;1,20**B,5;1,1**1,3[<30];1,20*$    : 4 :

^*1,3[<30];1,20*A*1,3[<30];1,20*$       : 4 : 1

^*1,3[<30];1,20*A*1,3;1,20*5*1,3;1,20*$       : 4 : 2

^*1,3[<30];1,15**A,4;1,2**1,3[<30];9,40**2,4(=1),A,5(=1),B,1;1,6**2,3[-<30];6,40

^*1,3[<30];1,15**A,4;1,2**1,3[<30];9,40**2,4(=1),A,5(=1),B,1;1,6**1,3[<30];1,20*

^*1,3[<30];1,10*A*1,3[<30];1,10**A,B;1,2**2,3[<-20];1,10**1,3[<30];1,10*$

^*1,3[<30];0,15**A,4;1,2**1,3[<30];1,20**4;0,2**5,1;0,6**2,3,1[=2)[<-20];3,10*$

^*1,3;1,20*A*1,3[<30];4,20*AB*1,3;1,20*B*1,3;1,20*$         : 4 : 1

^*1,3;1,20*A*1,3[<30];4,20**2,3;1,20*B*1,3;1,20**2,3;1,20*$        : 4 : 1

^*1,3;1,20*A*1,3[<30];4,20**2,3;1,20*B*1,3;1,20*$       : 4 : 2

^*1,3;1,20*A*1,3[<30];4,20**2,3;1,20*$        : 4 : 1

^*1,3;1,20*A*1,3[<30];1,20*AB*1,3[<30];1,20**2,3;1,20*$         : 4 : 2

^*1,3;1,20*A*1,3;4,20*5*1,3;1,20*$        : 4 : 3

^*1,3;1,20*A*1,3;4,20**2,3;1,20*AB*1,3[<30];1,20**2,3[<-30];1,20*$      : 4 :

^*1,3;1,20*A*1,3;2,20*5*1,3;1,20*$        : 4 :2

^*1,3,2(=2)[<30];10,60**A,4;1,2**1,3[<30];10,60*$     : 4 : 1

^*1,3,2(=2)[<30];1,60*A*1,3[<30];4,60**A,B;1,3**1,3[<30];2,30*$     : 4 : 1

^*1,3[<40];1,20*A*1,3[<30];1,20**2,3[<-40];1,10*$   ^1451-V/6$   : 4 : 6

^*5;0,1**1,3[<30];1,10**A;0,1**1,3[<30];1,10**A,B;1,2**1,3[<10];1,20*$    ^1451

:zu komplex, getrennt(to complex run)

:^2*2,4(=1),A,3,1(=1);10,60*$   ^1451-V/7$   : 4 : 1

^2*2,4(=1),A,3;10,60$   ^1451-V/7$    : 4 : 1

^*3;1,20*A*1,3[<30];1,10*A*1,3[<30];1,20*$   ^1451-V/8$   : 4 : 1

^*2,3[<-20];3,15**A,4;1,2**1,3[<30];9,40**2,4(=1),A,5(=1),B,1;1,6**2,3[<-20];1,2

^*1,3[<30];6,30*AB*1,3[<30];6,30*$    ^1451-V/13$    : 4 : 7

^*1,3[<30];4,30**A,4;1,2**1,3[<30];2,20*AB*1,3[<30];6,30*$   ^1451-V/15$   :

^*1,3[<30];2,20**A,4;1,2**1,3[<30];9,40**2,3,4(=1),A;1,5*B*1,3[<30];9,40*$   ^

^*1,3[<30];10,60**1,2.4,A,5(=1),B;1,4**2,3,2(=1)[<30];10,60*$    ^1451-V/17$

^*1,3[<30];1,15**A,4;1,2**1,3[<30];9,40**2,4(=1),A,5(=1),B,1;1,6**2,3[-<30];6,40
```

^*1,3[<30];1,15A,4;1,21,3[<30];9,402,4(=1),A,5(=1),B,1;1,61,3[<30];1,20*

^*1,3[<30];0,15A,4;1,21,3[<30];1,204;0,25,1;0,6**2,3,1(=2)[<-20];3,20*$

^*!1,3[<30];4,15A,4;1,2!1,3[<30];3,20*$    ^1451-V/24$   : 4 : 1

^*1,3[<30];1,60*$    ^1451-V/25$   : 4 : 1

^*1,3[<30];1,10*A*1,3[<30];1,102,1,3[<30];1,101,3[<30];1,10**2,3[<-40];0,10*

^*1,3[<30];1,10**2,1,3[<30];1,10*5*1,3[<30];1,10*$    ^1451-V/27$  ·: 4 : 3

^*1,3[<30];1,20A,B;1,22,3[<-20];1,101,3[<30];1,102,3[<-20];1,10*$

^*!1,3[<30];3,10*A*!2,3[<30];3,10**!1,3[<30];3,20*$    ^1451-V/29$   : 4 : 1

^*1,3[<30];1,10*A*1,3[<40];1,202,1,3[<30];1,10A,B;1,21,3[<30];1,202,3[<-

^*1,3[<30];1,10*A*1,3[<30];1,10*A*2,3[<-30];1,101,3[<30];1,102,1,3[<30];1,10

^*1,3[<30];1,10*A*1,3[<30];1,10A,B;1,22,3[<-20];1,10**1,3[<30];1,10*$

^*1,3,2(=2)[<30];10,60A,4;1,21,3[<30];10,60$    ^1451-V/34$   : 4 : 2

^*1,3,2(=2)[<30];1,60*A*1,3[<30];4,60A,B;1,31,3[<30];2,30*$   ^1451-V/35$

:^*1,3[<30];1,20*A*1,3[<30];1,20*A*1;1,20*B*1,3[<30];1,20**2,3[<-30];1,20*$  ^14

^*2,3[<-20];1,20*A*1,3[<30];1,20*A*1;1,20*B*1,3[<30];1,20**2,3[<-30];1,20*$  ^14

^*1;1,20*A*1,3[<30];1,20*A*1,3[<30];1,20*$   ^1451-V/40$

^*1;1,20*A*1,3[<40];1,20*A*1,3[<10];1,20**2,3[<-20];1,20*$   ^1451-V/42$

^*1,3[<40];1,20*A*1,3[<30];1,20*AB*1,3[<30];1,20*$   ^1451-V/43$

^*1,3[<30];1,20*A*1,3[<30];1,202;1,20B,5;1,1**1,3[<30];1,20*$   ^1451-V/44$

^*1,3[<30];1,20*A*1,3[<30];1,20**2;1,20*B*2,3[<-15];1,20*$   ^1451-V/45$

^A*1,3[<30];1,20*$    ^1451-V/47$

^*2,3[<-30];1,20**1,3[<30];1,20*A*1,3[<30];1,20**2,3;1,20*5*1,3[<40];1,20*$  ^14

^*1,3[<40];1,20*A*1,3;4,20*AB*1,3;4,20*$    ^1451-V/53$

^*1,3[<40];1,20*A*1,3;4,20*A*1,3;1,20**2,3;1,20*$   ^1451-V/56$

^*1,3[<40];1,20*A*1,3;4,20**2,3;1,20*5*1,3;1,20*$   ^1451-V/57$

^*1,3[<40];1,20*A*1,3;4,20*5*1,3;1,20*$   ^1451-V/58$

^*1,3[<30];1,20*AB*2,3;4,201,3;1,202,3;1,20*$   ^1451-V/59$

^*1,3[<30];1,20*AB*1,3;4,20**2,3;1,20*$   ^1451-V/60$

^*1,3[<30];1,20*A*1,3;4,20*AB*1,3;1,20*$   ^1451-V/61$

^*1,3[<30];1,20*A*1,3;4,20*A*1,3;1,20*$   ^1451-V/62$

^*1,3[<30];1,20*A*1,3;4,20*$   ^1451-V/64$

^*1,3[<30];1,20*A*1,3[<30];4,20*AB*2,3[<-20];4,20*$   ^1451-V/65$

^*1,3[<30];1,20*A*1,3[<30];4,20*AB*1,3;3,200;1,201,3[<30];1,20*$   ^1451-V/66

^*1,3[<30];1,20*A*1,3[<30];4,20*AB*1,3;4,20*$   ^1451-V/67$

^*1,3[<30];1,20*A*1,3[<30];4,20*AB*1,3;3,20**2,3;1,20*$   ^1451-V/68$

^*1,3[<30];1,20*A*1,3[<30];4,20*AB*1,3;3,20**2,3;1,20*8*1,3;1,20*$   ^1451-V/69$

^*1,3[<30];1,20*A*1,3[<30];4,20*4*1,3;3,20*B*1,3;1,20**2,3;1,20*$   ^1451-V/70$

^*1,3[<30];1,20*A*1,3[<30];4,20**2,3;3,20*B*1,3;1,20*$   ^1451-V/71$

^*1,3[<30];1,20*A*1,3[<30];4,20*AB*2,3;4,20*$   ^1451-V/72$

^*1,3[<30];1,20*A*1,3[<30];4,20*5*1,3;1,20*$   ^1451-V/73$

^*1,3[<30];1,20*A*1,3[<30];4,202,3;1,201,3;1,20**2,3;1,20*$   ^1451-V/74$

```
^*1,3[<30];1,20*A*1,3[<30];4,20**2,3;1,20**1,3;1,20**2,3;1,20*$   ^1451-V/75$
^*1,3[<30];1,20*A*1,3;1,20*5*1,3;1,20*$   ^1451-V/76$
^*1,3[<30];1,20*A*1,3[<30];1,20**2,3;1,20*B*2,3;1,20*$   ^1451-V/77$
^*1,3[<30];1,20**2,3[<-30];4,20**1,3;2,20**2,3;2,20*$   ^1451-V/78$
^*1,3[<30];1,20*A*1,3[<30];4,20*AB*1,3;1,20**2,3;1,20*$   ^1451-V/79$
^*1,3[<30];1,20*A*1,3[<30];4,20*AB*2,3;1,20*$   ^1451-V/80$
^*1,3[<10];1,20*A*1,3[<30];4,20*AB*1,3;1,20**2,3;1,20*$   ^1451-V/81$
^*1,3;1,20*A*1,3;4,20*5*1,3;1,20*$   ^1451-V/84$
^*1,3;1,20*A*1,3;4,20**2,3;1,20*AB*1,3[<30];1,20**2,3[<-30];1,20*$   ^1451-V/85$
^*1,3;1,20*A*1,3;4,20*$   ^1451-V/86$
^*1,3;1,20*A*1,3[<30];4,20*AB*1,3;1,20*$   ^1451-V/87$
^*1,3;1,20*A*1,3[<30];4,20*AB*1,3;1,20**2,3;1,20*$   ^1451-V/88$
^*1,3;1,20*A*1,3[<30];4,20*AB*1,3;1,20*B*1,3;1,20*$   ^1451-V/89$
^*1,3;1,20*A*1,3[<30];4,20*A*1,3;1,20*$   ^1451-V/90$
^*1,3;1,20*A*1,3[<30];4,20*A*1,3;1,20*B*1,3[<30];1,20*$   ^1451-V/90$
^*1,3;1,20*A*1,3[<30];4,20**2,3;1,20*$   ^1451-V/91$
^*1,3;1,20*A*1,3[<30];4,20**2,3;1,20*B*1,3;1,20**2,3;1,20*$   ^1451-V/92$
^*1,3;1,20*A*1,3[<30];4,20**2,3;1,20*B*1,3;1,20*$   ^1451-V/93$
^*1,3;1,20*A*1,3[<30];4,20*$   ^1451-V/94$
^*1,3;1,20*A*1,3;[<30];1,20*AB*1,3[<30];1,20**2,3;1,20*$   ^1451-V/95$
^*1,3;1,20*A*1,3;2,20*5*1,3;1,20*$   ^1451-V/96$
```

---

:AUS 5

:-------------------------------------------------------------------

```
^*B,5;1,2**1,3;1,20*4*2,3;1,20**1,3;1,20*$   ^1421-F/10$    : 5 : 1
^*B,5;1,2**1,3;1,20*4*2,3;1,20**2,3;1,20**5;1,2*$   ^1421-F/11$    : 5 : 2
^*5;1,2**1,3;1,20*4*2,3;1,20**1,3;1,20*5*1,3;1,20*5*1,3;1,20*$   ^1421-F/12$
^*5;1,2**1,3;1,20**4;1,2**2,3;1,20**1,3;1,20**5;1,2*$   ^1421-F/13$    : 5 : 6
^*5;1,2**1,3;1,20**2,3;1,20*4*2,3;1,20**1,3,1,20**5;1,2*$   ^1421-F/14$    : 5
^*5;1,2**1,3;1,20**2,3;1,20*A4*2,3;1,20**1,3;1,20*$   ^1421-F/15$    : 5 : 1
^*5;1,2**1,3;1,20**2,3;1,20*4*2,3;1,20**5;1,2*$   ^1421-F/16$    : 5 : 1
^4*2,3;1,20*B*2,3;1,20**1,3;1,20*$   ^1421-F/17$    : 5 : 1
^4*2,3;1,20*B*1,3;1,20**2,3;1,20**4;1,2**2,3;1,20**1,3;1,20*$   ^1421-F/18$
^15*1,3,5;2,20**4,2,3;2,20**1,3;2,20**2,3;0,4*$   ^1421-F/19$    : 5 : 4
^*5;1,3**!1,!3(>45);9,40**!2,3,4(=1),A;9,40**!1,3,5(=1),B;2,20*$   ^1421-F/20$
^*5;1,2**2,3;1,20*5*1,3;1,20*$   ^1421-F/21$    : 5 : 2
^*5;1,2**1,3;1,20*A*2,3;1,20**1,3;1,20*$   ^1421-F/22$    : 5 : 3
^*5;1,2**1,3;1,20*4*2,3;1,20**1,3;1,20*5*1,3;1,20*$   ^1421-F/23$    : 5 : 8
^*5;1,2**1,3;1,20**4;1,2**1,3;1,20**2,3;1,20**1,3;1,20**5;1,2*$   ^1421-F/24$
^*5;1,2**1,3;1,20**2,3;1,20*4*2,3;1,20*4*2,3;1,20**1,3;1,20**5;1,2*$   ^1421-F
^*5;1,2**1,3;1,20**2,3;1,20*4*2,3;1,20**5;1,2*$   ^1421-F/25$    : 5 : 3
```

```
^*5;1,2**1,3;1,20**2,3;1,20**5;1,2*$        ^1421-F/27$      : 5 : 4
^*5;1,2**1,3;1,20**2,3;1,20**1,3;1,20**5;1,2*$    ^1421-F/28$   : 5 : 3
^*5,1,3;10,60**B;0,2**0;0,10**2,4,3;8,40**1,3,5;10,60*$    ^1421-F/29$    : 5 :
^*5,1,3;9,40**!4,A,!2,3;1,6**!1,3;9,40*$    ^1421-F/30$    : 5 : 2
^*2,3;1,4**B,5;1,2**2,3;1,20*4*2,3;1,20*4*2,3;1,20**1,3;1,20**5;1,2*$        ^142
^*2,3;1,4**B,5;1,2**1,3;1,20**0;1,20**2,3;1,30**1,3;1,20*$    ^1421-F/32$    :
^*2,3;1,4**B,5;1,2**1,3;1,20**2,3;1,20**1,5;1,20*$      ^1421-F/33$    : 5 : 1
:Krueppel(invalid)
:^*2,3;1,4*B*!1,3;4,20**!2,3;4,20**!1,3;4,20*$        ^1421-F/34$    : 5 : 2
^*2,3;1,4*B*1,3;4,20*$        ^1421-F/35$    : 5 : 1
^*2,4(=1),A;1,3**!5,B,1,3;1,2**!1,3;1,35**!2,3,5(=1),B;9,40**1,3,4(=1),A;1,4*$
^*1,3;1,20*B*1,3;1,20*4*2,3;1,20**1,3;1,20*$       ^1421-F/37$    : 5 : 2
^*1,3;1,20**5;1,2**1,3;1,20**2,3;1,20*4*2,3;1,20**1,20**5;1,2*$    ^1421-F/38$
^*1,3[<50];10,60*4*2,3;1,8**1,3;1,8*$    ^1421-F/39$    : 5 : 2
^*!5,B,3,!1,3;2,20**2,3;2,60**1,3;1,8*$    ^1421-F/40$    : 5 : 2
^*!5,B,3,!1,3;10,60**2,3;1,8*$    ^1421-F/41$    : 5 : 1
^*!5,B,1,3;2,30**4,2,3;1,4**5,1,3;2,30**2,3,4(=1),A;2,30**1,5(=1),B;2,30*$    ^1
^*!5,B,1,3;1,35**!2,3,4(=1),A;10,60**!1,3,5(=1),B;2,20*$    ^1421-F/43$    : 5 :
^*!5,B,1,3;0,8**B;0,2**0;0,10**!1,3,5(=1),B;1,20**!2,3,4(=1),A;1,20**!1,3,5(=1),
^*!5,B,1,2(=1),3,!4,A;2,10**B;0,2**0;0,10**2,3;1,20**1,3,5(=1),B;1,20*$    ^14
^*!5,1,3;1,7**4,2,3;2,20**1,3;1,20**2,3;0,4**1,3;0,2*$    ^1421-F/46$    : 5 :
^*B,5;1,2**1,3;1,10**2,3;1,10**1,3;1,10*$    ^1421-F/47$
^AB*2,3;1,20**1,3;1,10*B*2,3;1,10*$  ^1421-F/48$
^AB*2,3;1,20**1,3;1,10*$  ^1421-F/49$
^AB*1,3;1,20*44*2,3;1,10*5$  ^1421-F/50$
^AB*1,3;1,10**2,3;1,10*5$  ^1421-F/51$
^*5;1,2**1,3;1,10**0;1,10**2,3[<-10];1,20**1,3;1,10*$  ^1421-F/52$
^*5;1,2**0;1,10**1,3;1,20*$  ^1421-F/53$
^4*0;1,10**2,3;1,20**1,3;1,10*$  ^1421-F/54$
^4*0;1,10**1,3;1,10**2,3;1,10**1,3;1,10*5$  ^1421-F/55$
^*2,3;1,10*B*0;1,10**1,3;1,10**2,3;1,20**1,3;1,10*$  ^1421-F/56$
^*1,3;1,10**0;1,20**1,3;1,10*4*2,3;1,10**1,3;1,10*$  ^1421-F/57$
^*1,3;1,10**0;1,10**1,3;1,10**2,3;1,10*4*2,3;1,10**1,3;1,10*$  ^1421-F/58$
^*1,3;1,10**0;1,10**1,3;1,10**2,3;1,10**1,3;1,10*$  ^1421-F/59$
^*1,3;1,10**0;1,10**1,3;1,10*4*2,3;1,10**1,3;1,10*$  ^1421-F/60$
^*1,3;1,10*4*2,3;1,10**1,3;1,10*5$  ^1421-F/61$
^*0;1,10*4*2,3;1,10**1,3;1,10*$  ^1421-F/62$
^*0;1,10**1,3;1,10**2,3;1,10*5$  ^1421-F/63$
^*5,1,3;10,60**B;0,2**0;0,10**2,4,3;8,40**1,3,5;10,60*$        ^1421-F/64$    : 5 :
:neu(new)
^*A,B;1,2**1,3;1,20**2,3;1,20**1,3;1,20*$  ^1421-F$
```

^AB*1,3;1,20*4*2,3;1,20**1,3;1,20*BAB$ ^1421-F$

^AB*1,3;1,20*A4*2,3;1,20**1,3;1,20*5*1,3;1,20*$ ^1421-F$

^AB*1,3;1,204,2,3;1,201,3;1,20*$ ^1421-F$

^AB*1,3;1,20*4*2,3;1,20**1,3;1,20*5*1,3;1,20*$ ^1421-F$

^AB*1,3;1,20**2,3;1,20*5$ ^1421-F$

^AB*1,3;1,204,2,3;1,201,3;1,20*5$ ^1421-F$

^*5;1,2*5*1,3;1,204,2,3;1,201,3;1,20*5*1,3;1,20*$ ^1421-F$

^*5;1,21,3;1,200;1,201,3;1,202,3;1,20*A*2,3;1,8*55$ ^1421-F$

^*5;1,2**1,3;1,20*4*0;1,201,3;1,205;0,1*$ ^1421-F$

^*5;1,21,3;1,202,3;1,200;1,203;1,20*A$ ^1421-F$

^*5;1,21,3;1,202,3;1,200;1,202,3;1,201,3;1,205;0,1*$ ^1421-F$

^*5;1,20;1,202,3;1,20*A*2,3;1,20**1,3;1,20*$ ^1421-F$

^4*2,3;1,20*B*1,3;1,20*4*2,3;1,201,3;1,200;1,20*AB$ ^1421-F$

^4*2,3;1,200;1,201,3;1,20*44*2,3;1,20**1,3;1,20*$ ^1421-F$

^*2,3;1,20!B,5;1,22,3;1,6**1,3;1,20*$ ^1421-F$

^*2,3;1,20*B*1,3;1,20*4*2,3;1,20*5$ ^1421-F$

^*2,3;1,200;1,202,3;1,20**1,3;1,20*$ ^1421-F$

^*2,3;1,200;1,201,3;1,20A,4,2,3;1,201,3;1,20*$ ^1421-F$

^*0;1,20*5*1,3;1,202,3;1,201,3;1,20*$ ^1421-F$

^*0;1,20**1,3;1,20*$ ^1421-F$

^*0;1,20**1,3;1,20*4*0;1,20**1,3;1,20*$ ^1421-F$

:------------------------------------------------------------------------

:AUS 6

:------------------------------------------------------------------------

^*5;1,2**1,3;4,60*A*2,3;1,8**1,3,5;1,6*$ ^142-6/6$ : 6 : 1

^*5;0,11,3;6,302,4,B;2,61,3;1,201,5;0,3*$ ^142-6/7$ : 6 : 2

^*1,3;10,604,A,2,3;2,61,3;9,40**5,B,1,3;1,3*$ ^142-6/8$ : 6 : 1

^*1,3;10,604,A,2,3;2,201,3;2,6*$ ^142-6/9$ : 6 : 1

^*1,3;10,604,A,2,1,3;1,331,3;1,6*$ ^142-6/10$ : 6 : 5

^*1,3;1,30**2;1,10*$ ^142-6/11$

^*2;1,10*5*1,3;1,20*4*2,3;1,10**1,3;1,10*B*3;1,10*A*1;1,10*$ ^142-6/12$

^*1,3;1,30*A*1;1,10*$ ^142-6/13$

^*1,3;1,20*4*2,3;1,10**1,3;1,10*5*1,3;1,10*$ ^142-6/14$

^*2,3;1,10*B*1,3;1,20*4*2,3;1,10**1;1,10*$ ^142-6/15$

^*1,3;4,102,3;2,101,3;1,10*$ ^142-6/16$

^*5;1,2**1,3;1,20*A4*2,3;1,10**1,3;1,10*$ ^142-6/17$

^*5;1,2*5*1,3;1,20*AA*1;1,10*5$ ^142-6/18$

^*1;1,10*5*1,3;1,20*A*1;1,10*A*1,3;1,10*55$ ^142-6/19$

^*1,3;1,30**2;1,10*$ ^142-6/20$

^*1,3;1,20*A$ ^142-6/21$

^*2,3;1,10**1;1,10*B*1,3;1,10*4*2,3;1,10**1;1,10*$ ^142-6/22$

```
^*1,3;1,10*AB*3;1,10*A*1,3;1,10*$   ^142-6/23$

^*1,3;1,20*AB*1;1,10*A*1;1,10*$   ^142-6/24$

^*5;1,2**1,3;1,20*4*2;1,10*B*3;1,10*A*1;1,10*$   ^142-6/25$

^*2;1,10*B*1,3;1,20*A*1;1,10*A*1;1,10*$   ^142-6/25$

:--------------------------------------------------------------------

:AUS 7

:--------------------------------------------------------------------

:USA,new(new)

^AB*3,1;1,20*$    ^1451-7/3a$

^4*1,3;1,20*$    ^1451-7/3b$

^*2,3;1,10**3,1;1,20*$   ^1451-7/3c$

^*!2,3;4,10**!1,3;8,30**!2,3;4,10*$    ^1451-7/3d$

^*4;1,2¯*2,3;1,10**1,3;4,30**2;0,2*$    ^1451-7/3d$

^4*2,3;7,60**1,3;1,3**2,3;1,3**2,1,3;10,60$    ^1451-7/3$    : 7 : 1

^*4;0,2**2,1,3(=1);2,30*$    ^1451-7/4$    : 7 : 6

^*4,A,2,3;1,4**1,3;4,60*$      ^1451-7/5$    : 7 : 1

^*4,2,3;2,4**2,3;9,40**1,3;2,20*$    ^1451-7/6$   : 7 : 1

^*4,2,3;1,6**1,2,3(=1);3,60*$     ^1451-7/7$    : 7 : 3

^*!4,2,A;1,6**1,3;3,20*$    ^1451-7/8$    : 7 : 1

^*1,3(=1);1,5**A,2,1,3;1,5**1,3;4,35**1,2,3(=1);4,20*$        ^1451-7/9$    : 7 : 1

^*2,3;1,3**1,3;6,35**2,3;1,3**1,3;6,35*$     ^1451-7/10$    : 7 : 1

^*2,3;9,40**1,3;9,40*$     ^1451-7/11$    : 7 : 1

^*!2,3;4,20**!1,3;4,20*$    ^1451-7/12$    : 7 : 2

^*2,3;1,20**1,3;1,20*$    ^1451-7/14$    : 7 : 1

^*!A,4,B;1,6**1,3;1,20*$      ^1451-7/17$

^4*2,3;1,20**1,3;1,20*$   ^1451-7/18$

^4*2,3;1,20**1,3;1,20**2;1,20**1,3;4,20*$   ^1451-7/19$

^4*2,3;1,20**1,3;1,20**1,31,20**2;1,20*5$   ^1451-7/20$

^4*2,3;1,20**1,3;1,20*$    ^1451-7/21$

^4*2,3;1,20**1,3;1,20**2;1,20**1,3;4,20*$   ^1451-7/22$

^4*1,3;1,20**2;1,20**1,3;4,20*$    ^1451-7/24$

^*2;3,20**A,B;1,2**1,3;1,20*$    ^1451-7/26$

^*2;3,20*A*1,3;1,20**2,3;1,20**1,3;4,20**A,B;1,2**1,31,20**2,3;1,20**1,3;1,20*$

^*2;3,20*A*1,3;1,20*$    ^1451-7/27$

^*2;3,20*A*1,3;1,20**2;1,20**1,3;4,20*$   ^1451-7/28$

^*2;1,20*4*2,3;1,20**1,3;1,20*$   ^1451-7/29$

^*2;3,20**1,3;1,20*A*1,31,20*$    ^1451-7/31$

^*2,3;3,20*A*1,3;1,20*$    ^1451-7/32$

^*2,3;3,20**1,3;1,20**2;1,20**1,3;4,20*$    ^1451-7/33$

^A*1,3[<40];1,20**2[<-50];1,10**1,3[<30];1,20*$    ^1451-7$
```

^A*1,3[<40];1,20*$   ^1451-7$

^44*2,3[<-30];1,10**1,3[<30];1,20*$   ^1451-7$

^4*2,3[<-30];1,10**1,3[<40];1,20*$   ^1451-7$

^4*2,3[<-20];1,30*$   ^1451-7$

^*3;1,10*A*1[<50];1,102,3[<-30];1,101,3[<20];1,20*$   ^1451-7$

^*2[<-50];1,10*AB*3,1[<40];1,20*$   ^1451-7$

^*2[<-50];1,10*A*3,1[<30];1,102,3[<-30];1,101,3[<20];1,102,3[<-20];1,101

^*2[<-50];1,10*A*2,3[<-20];1,10**1,3[<30];1,20*$   ^1451-7$

:------------------------------------------------------------------
:AUS 8
:------------------------------------------------------------------

:geaendert   solch ein Krueppel

^*1,3;1,8**2,3,4;1,8*A*!2,3,4;0,8!1,3,5;1,20B;0,1!2,3,4;1,20!1,3,5;1,20*

^*1,3;1,8**!2,3,4;0,8*A*!2,3,4;1,8!1,3,5;1,20B;0,1!2,3,4;1,20!1,3,5;1,20

^*1,3;0,8**!2,3,4;1,8*A*!2,3,4;1,8!1,3,5;1,20B;0,1!2,3,4;1,20!1,3,5;1,20

^*1,3;1,8**!2,3,4;0,8*A*!2,3,4;1,8!1,3,5;1,20B;0,1!2,3,4;1,20!1,3,5;1,20

^*!2,3;1,2**!1,3;1,7*5*1,3;1,3!2,3;1,61,3;1,1*$   ^2121-8/3$   : 8 : 1

^*!2,3,4;1,35!1,3,5;1,15!2,3,4;1,35**!1,3,5;3,15*$   ^2121-8/4$   : 8 :

:verrueckt. ausgestellt

:^*!1,3;0,8**!2,3;0,8*B*2,3;0,6**!1,3;0,6*A*!1,3,5;1,20!2,3,4;1,20!1,3,5;1,2

^*5;1,21,3;1,20A,B;1,2*1,31,202,3;1,201,3;1,20*$   ^2121-8/6$

^*5;1,2**1,3[10];1,20*A*1,31,202,3;1,201,31,20*$   ^2121-8/7$

^4*2,3;1,20*5*2,3;1,20**1,3;1,20*5$   ^2121-8/8$

^4*2,3;1,20**1,31,20*5*1,3;1,20*A*2,3;1,20**1,31,20*5$   ^2121-8/9$

^*2;1,20*B*2,3[-10];1,20A,B;1,21,31,202,3[-10];1,201,31,20*$   ^2121-8/1

^*2,3;1,20*B*3;1,20*A*1,3;1,20*$   ^2121-8/11$

^*2,3;1,20**1,31,20*B*2,3;1,20**1,31,20*$   ^2121-8/12$

^*2,3;1,20**1,31,20*B*2,3;1,20*A*1,31,202,3;1,201,31,20*$   ^2121-8/13$

^*2,3;1,20*5*2,3[-10];1,20**1,31,20*$   ^2121-8/14$

^*2,3;1,20*5*2,3;1,20**1,31,20*$   ^2121-8/15$

:------------------------------------------------------------------
:AUS 9
:------------------------------------------------------------------

^*5;1,2**1,3;1,20*A*1,3;1,20**5;0,1*$   ^21-9/2$

^*5;1,2**1,3;1,20*A*1,31,202;1,201,3;1,20*$   ^21-9/3$

^*2;1,20*B*1,3;1,20*A*1,3;1,30*$   ^21-9/4$

^*2;1,20*B*1,3;1,20*4*1,3;1,20*$   ^21-9/5$

^*!2,3;2,20!1,3;2,202,3;6,20*$   ^21-9/5a$

^*!2,3;1,20!1,3;1,202,3;1,20*BA*1,3;1,20*5$   ^21-9/6$

^*2,3;1,20**1,31,20*B*1,3;1,20*A*1,3;1,20*$   ^21-9/7$

```
^*2,3;1,20**1,31,20**2,3[-10];1,20**1,31,20**2,3[-10];1,20*$    ^21-9/8$
^*2,3;1,20**1,3;1,20**2,3;1,20**1,31,20*B$    ^21-9/9$
^*2,3;1,20**1,3;1,20**2,3;1,20**1,3;1,20**2,3;1,20**1,3;1,20*$    ^21-9/10$
:================================================================
:Neueinsaetze ab hier(new start from here on)
:================================================================
^*4;1,2**!2,3[<-25];1,10**!1,10**5;1,2*$    ^21-0/01$
^*4;0,1**2,3[<-40];1,10**5;1,2*$    ^21-0/02$
^*!2;1,10**1,3[<30];1,10**2,3[<-20];1,10**1;1,10*5$    ^21-0/03$
^*2,3[<-30];1,10**1;1,10*5*1;1,10*5$    ^21-0/04$
^*1;1,10**2,3[<-40];1,10**1,3;1,10*$    ^21-0/05$
---------------------------------------------------------------

:---------------------------------------------------------------
^*4;0,1**!2,3;4,20**!1,3,5;4,30**2,4,3;1,3*$    ^21421-Z$
^*4;0,1**!2,3;4,20**!1,5;2,4*B*A,2;1,3*B$    ^21421-Z$

^*4;0,1**!2,3;1,20**!1,3,5;1,10**A,4,!2,3;1,10**B,1,3,5;0,10**4;0,1*$    ^21421-Z
^*4;0,1**!2,3;1,20**!1,3,5;1,10**A,!4,2,3;1,10**B,1,3,5;0,10**4;0,1*$    ^21421-Z
^*4;0,1**!2,3;1,20**!1,3,5;1,10**!A,4,2,3;1,10**B,1,3,5;0,10**4;0,1*$    ^21421-Z
^*4;0,1**!2,3;1,10**!1,3;1,10**0;1,10**5,1,3;1,10**2,3,A;1,6**B,5;0,2*$    ^21421
:---------------------------------------------------------------
:---------------------------------------------------------------

:---------------------------------------------------------------
^*B,!1,3;4,20**4,2;1,2**2,3;3,15**!1,3,5;2,20*$    ^1421-F$

^B*3,1[<30];1,10*A*2,3[<-20];1,10**1[<50];1,10*$    ^1421-F$
^ABB*3,2[<-30];1,20*5$    ^1421-F$
^AB*3,1[<20];1,10*44*2,3[<-30];1,10**1[<50];1,10*55$    ^1421-F$
^AB*3,1[<20];1,10*4*2,3[<-40];1,10*5$    ^1421-F$
^AB*1[<50];1,10*A*2,3[<-30];1,10**1[<50];1,10*5$    ^1421-F$
^AB*1[<50];1,10*5*2,3[<-20];1,20**1[<50];1,10*$    ^1421-F$
^AB*1[<50];1,10*4*2,3[<-30];1,10**1[<50];1,10**0;1,10*$    ^1421-F$
^AB*1,3[<40];1,10*4*2,3[<-10];1,10**1[<50];1,10**0;1,10*$    ^1421-F$
^AB*1,3[<40];1,10**2[<-50];1.10*44*2,3[<-20];1,10*5*1[<50];1,10*$    ^1421-F$
^AB*1,3[<30];1,10*4*2,3[<-40];1,10*5$    ^1421-F$
^A*1[<50];1,10*B*3,1[<20];1,10*4*2,3[<-30];1,10**1,3[<40];1,10*5$    ^1421-F$
^55*1[<50];1,10*5*3,2[<-30];1,20**1,3[<40];1,10*5$    ^1421-F$
```

```
^5*3,1[<20];1,10**2,3[<-30];1,10*A*2,3[<-30];1,10**1[<50];1,10*$    ^1421-F$
^5*1,3[<40];1,10**2[<-50];1,10**0;1,10**3;1,10*A5$   ^1421-F$
^*2[<-50];1,10*B*3,2[<-30];1,30**1[<50];1,10*$   ^1421-F$
^*2[<-50];1,10*B*3,1[<40];1,10*44*2,3[<-20];1,10**1[<50];1,10*5$   ^1421-F$
^*2[<-50];1,10*B*3,1[<30];1,10*4*2,3[<-30];1,10**1[<50];1,10*5$   ^1421-F$
^*2[<-50];1,10*B*3,1[<30];1,10*4*2,3[<-20];1,10**1,3[<40];1,10*$   ^1421-F$
^*2[<-50];1,10*B*3,1[<30];1,10**2,3[<-30];1,20**1,3[<40];1,10*$   ^1421-F$
^*2[<-50];1,10*B*3,1[<30];1,10**2,3[<-20];1,10**1,3[<20];1,10**2,3[<-30];1,20**1
^*2[<-50];1,10*B*3,1[<20];1,20*44*2,3[<-30];1,10**1,3[<40];1,10*5$   ^1421-F$
^*2[<-50];1,10*B*3,1[<20];1,20**2[<-50];1,10*4*2,3[<-40];1,10*5$   ^1421-F$
^*2[<-50];1,10*B*3,1[<20];1,10*4*2,3[<-40];1,10**1[<50];1,10*5$   ^1421-F$
^*2[<-50];1,10*B*3,1[<20];1,10*4*2,3[<-40];1,10**1,3[<40];1,10*5$   ^1421-F$
^*2[<-50];1,10*B*3,1[<20];1,10*4*2,3[<-30];1,10**1[<50];1,10*55$   ^1421-F$
^*2[<-50];1,10*B*3,1[<20];1,10*4*2,3[<-30];1,10**1,3[<40];1,10*$   ^1421-F$
^*2[<-50];1,10*B*3,1[<20];1,10*4*2,3[<-20];1,10**1[<50];1,10*5$   ^1421-F$
^*2[<-50];1,10*B*3,1[<10];1,10*4*2,3[<-30];1,10**1,3[<40];1,10*$   ^1421-F$
^*2[<-50];1,10*B*3,1[<10];1,10**2[<-50];1,10*4*2,3[<-40];1,10**1,3[<20];1,10*5*1
^*2[<-50];1,10*B*1,3[<40];1,10*4*2,3[<-30];1,10**1,3[<40];1,10*5$   ^1421-F$
^*2[<-50];1,10*B*1,3[<40];1,10**2[<-50];1,10*4*2,3[<-40];1,10**1,3[<40];1,10*$
^*2[<-50];1,10*B*1,3[<40];1,10**2[<-50];1,10*4*2,3[<-30];1,10**1[<50];1,10*$
^*2[<-50];1,10*B*1,3[<40];1,10**2,3[<-40];1,10**1,3[<40];1,10*$   ^1421-F$
^*2[<-50];1,10*B*1,3[<30];1,20**2,3[<-30];1,10**1,3[<40];1,10*$   ^1421-F$
^*2[<-50];1,10*B*1,3[<30];1,10*4*2,3[<-30];1,10**1,3[<40];1,10*5$   ^1421-F$
^*2[<-50];1,10*B*1,3[<30];1,10*4*2,3[<-20];1,10**1,3[<30];1,10*$   ^1421-F$
^*2[<-50];1,10*B*1,3[<30];1,10**2[<-50];1,10*4*2,3[<-40];1,10**1[<50];1,10*$  ^1
^*2[<-50];1,10*B*1,3[<30];1,10**2,3[<-30];1,10**1,3[<40];1,10*$   ^1421-F$
^*2[<-50];1,10*B*1,3[<10];1,10**2,3[<-30];1,10**1,3[<40];1,10*$   ^1421-F$
^*2,3[<-20];1,10*B*3,1[<10];1,10**2,3[<-30];1,10**1,3[<40];1,10*5$   ^1421-F$
^*1[<50];1,10*5*1,3[<40];1,10*4*2,3[<-40];1,10**1,3[<40];1,10*55*1[<50];1,10*$
^*0;1,10*4*2,3[<-30];1,10**1[<50];1,10*5$   ^1421-F$
:--------------------------------------------------------
^*1,3;4,20*24*2,3;1,10**1,3;4,20*$    ^142-6$

^5*1;1,10*5*1;1,10*4*2,3;1,10**1;1,10*B4$    ^142-6$
^5*1;1,10**2,3;1,10**1;1,10**2,3;1,10**1,3;1,10**$    ^142-6$
^5*1,3;1,10*A*2,3;1,10*B*3;1,10*$     ^142-6$
^*3,1;1,20*AB*3,2;1,10*4$   ^142-6$
^*2;1,10*B*1,3;1,10*4*2,3;1,10**1,3;1,10*$   ^142-6$
^*2;1,10*B*1,3;1,10**2,3;1,10**1,3;1,10*$   ^142-6$
^*2;1,10*B*1,3;1,10*4*2,3;1,10**1,3;1,10*$   ^142-6$
^*2;1,10*5*1,3;1,20*A*2,3;1,10*5$    ^142-6$
```

^*2,3;1,10*B*1,3;1,20*4*2,3;1,10**1,3;1,10*5$   ^142-6$

^*1;1,10*5*1,3;1,20*4*2,3;1,10*5$   ^142-6$

^*1,3;1,20*A*2,3;1,10**1;1,10*55$   ^142-6$

^*1,3;1,20*A*2,3;1,101,3;1,102;1,10**1,3;1,10*$   ^142-6$

^*1,3;1,10*A*2,3;1,10**1,3;1,10*$   ^142-6$

^*1,3;1,20*ABA*3,1;1,10*B*3;1,10*A*1;1,10*$   ^142-6$

^*1,3;1,20*ABA*3,1;1,10*$   ^142-6$

^*1,3;1,20*AB*1,3;1,10*A*1;1,10*B$   ^142-6$

^*1,3;1,20*A$   ^142-6$

^*1,3;1,20*A*3;1,10*B*3;1,10*A*1;1,10*$   ^142-6$

^*1,3;1,20*A*3,1;1,10*B*1,3;1,20*4$   ^142-6$

^*1,3;1,20*A*3,1;1,10*5$   ^142-6$

^*1,3;1,20*A*2,3;1,10**1,3;1,10*$   ^142-6$

^*1,3;1,20*4*2,3;1,10*5$   ^142-5$

^*1,3;1,10*A*2,3;1,10*B*3;1,10*4$   ^142-6$

^*1,3;1,10*A*2,3;1,10**1,3;1,10*B*3,2;1,10*4$   ^142-6$

^*1,3;1,10*A*2,3;1,10**1;1,10*5$   ^142-6$

^*1,3;1,10*A*2,3;1,10**1;1,10*$   ^142-6$

^*1,3;1,10*4*2,3;1,10**1,3;1,10*$   ^142-6$

^*1,3;1,10*4*2,3;1,10**1,3;1,10*B*3;1,10*A*1;1,10*$   ^142-6$

^*1,3;1,102,3;1,101,3;1,10*$   ^142-6$

^*1,3;1,20*A*2,3;1,10**1;1,10*$   ^142-6$

^*1,3;1,20*A*2,3;1,10*5$   ^142-6$

^*1,3;1,20*A*2,3;1,10**1;1,10*$   ^142-6$

^*1,3;1,20*A*2,3;1,10**1,3;1,10*$   ^142-6$

^*1,3;1,10*AA*3,1;1,10*$   ^142-6$

^*1,3;1,10*A*2,3;1,10**1,3;1,10*$   ^142-6$

^*1,3;1,10*A*2,3;1,10**1;1,10*$   ^142-6$

:-----------------------------------------------------------------------

:-----------------------------------------------------------------------

^*2,3;3,20*5*2,3;2,20**1,3;2,20*$   ^2121-8$

^AB*1;1,10*5*3,2;1,10**1;1,10*$   ^2121-8$

^A*3,1;1,10*B*3,2;1,20**1;1,10*$   ^2121-8$

^A*1;1,10*B*3,2;1,20**1;1,10*$   ^2121-8$

^A*1;1,10*5*3,1;1,10*5*1,3;1,102,3;1,101,3;1,10*$   ^2121-8$

^55A*1;1,10*5*1,3;1,102,3;1,101;1,10*$   ^2121-8$

^5A5*1;1,102,3;1,101;1,10*$   ^2121-8$

^5A*2,3;1,101,3;1,202,3;1,10**1;1,10*$   ^2121-8$

^5A*1;1,10*55*1;1,10*5*1,3;1,102,3;1,101;1,10*$   ^2121-8$

```
^5A*1,3;1,30*$  ^2121-8$

^5*3;1,10*A*1,3;1,10*2,3;1,10**1;1,10*$  ^2121-8$

^5*1;1,10*A*1,3;1,20**2,3;1,10*5$  ^2121-8$

^5*1,3;1,10*AB*1;1,10**2,3;1,10**1,3;1,10*$   ^2121-8$

^5*1,3;1,10*A*1;1,10*5*1,3;1,10**2,3;1,10**1;1,10*5$  ^2121-8$

^4*2;1,10**1,3;1,20**2,3;1,20**1;1,10*$  ^2121-8$

^4*2,3;1,10**1;1,10*5*1,3;1,10*A*2,3;1,10**1;1,10*5$   ^2121-8$

^4*2,3;1,10**1,3;1,20**2,3;1,20**1;1,10*$  ^2121-8$

^*3,1;1,10**2,3;1,10**1,3;1,10**2,3;1,10*5$   ^2121-8$

^*2;1,10*B*3,2;1,10*A*1;1,10**2,3;1,10**1;1,10*$   ^2121-8$

^*2;1,10*B*3,2;1,10*AB*1;1,10**2,3;1,20**1;1,10*$   ^2121-8$

^*2;1,10*B*1;1,10*A*1;1,10**2,3;1,10**1;1,10*$  ^2121-8$

^*2;1,10*A55*1;1,10*5*1,3;1,10**2,3;1,10**1,3;1,10*$   ^2121-8$

^*2;1,10**1;1,10*5*1;1,10*5*1,3;1,10**2,3;1,20**1;1,10*$   ^2121-8$

^*2;1,10**1;1,10*5*1;1,10**2,3;1,10**1;1,10*$   ^2121-8$

^*2;1,10**1;1,10**2;1,10**1,3;1,10**2,3;1,10**1;1,10*5$   ^2121-8$

^*2;1,10**1,3;1,10*5*1;1,10**2,3;1,10**1;1,10*$   ^2121-8$

^*2;1,10**1,3;1,10**2,3;1,20**1;1,10*$   ^2121-8$

^*2,3;1,10*B*3;1,10*A5*3,1;1,20*$   ^2121-8$

^*2,3;1,10*B*1,3;1,10*A5*3,1;1,20*$   ^2121-8$

^*2,3;1,10**1;1,10*B*3,2;1,20**1;1,10*$   ^2121-8$

^*2,3;1,10**1;1,10*B*3,2;1,10*A*1;1,10**2,3;1,10**1;1,10*$   ^2121-8$

^*2,3;1,10**1;1,10*B*2,3;1,10**1,3;1,20*$   ^2121-8$

^*2,3;1,10**1;1,10*B*1,3;1,10**2;1,10*4*2,3;1,10**1;1,10*$   ^2121-8$

^*2,3;1,10**1;1,10*5*3,2;1,10**1;1,10*$   ^2121-8$

^*2,3;1,10**1;1,10*5*1,3;1,10**2,3;1,10**1;1,10*$   ^2121-8$

^*2,3;1,10**1,3;1,10*B4*2,3;1,10*5$   ^2121-8$

^*2,3;1,10**1,3;1,10*5*3,2;1,20**1;1,10*$   ^2121-8$

^*2,3;1,10**1,3;1,10*5*1;1,10**2,3;1,10**1;1,10*BA$   ^2121-8$

^*2,3;1,10**1,3;1,10**2,3;1,20**1;1,10*$   ^2121-8$

^*2,3;1,10*5*3,2;1,20**1;1,10*$   ^2121-8$

^*2,3;1,10**1;1,20**2,3;1,10*B4$   ^2121-8$

^*2,3;1,10**1;1,10*5*3,2;1,10**1;1,10*5$   ^2121-8$

^*2,3;1,10**1;1,10*5*3,2;1,20**1;1,10*$   ^2121-8$

^*2,3;1,10**1;1,10*5*1;1,10**2,3;1,20**1;1,10*$   ^2121-8$

^*2,3;1,10**1;1,10*5*1,3;1,10*A*2,3;1,10**1,3;1,10*5$   ^2121-8$

^*2,3;1,10**1;1,10*5*1,3;1,10**2,3;1,10**1;1,10*$   ^2121-8$

^*2,3;1,10**1;1,10**2,3;1,20**1;1,10*$   ^2121-8$

^*2,3;1,10**1,3;1,20**2,3;1,10**1;1,10*$   ^2121-8$

^*2,3;1,10**1,3;1,10*5*3,2;1,20**1;1,10*$   ^2121-8$

^*2,3;1,10**1,3;1,10*5*1;1,10**2,3;1,20**1;1,10*$   ^2121-8$
```

```
^*2,3;1,10**1,3;1,10*5*1,3;1,10**2,3;1,10**1;1,10*$     ^2121-8$

^*2,3;1,10**1,3;1,20**2,3;1,10**1;1,10*$    ^2121-8$

^*2,3;1,10**1,3;1,10*5*1,3;1,10**2,3;1,10**1;1,10*$     ^2121-8$

^*2,3;1,20**1;1,10*5*2,3;1,20**1;1,10*$    ^2121-8$

^*2,3;1,10*5*1;1,10**2,3;1,20**1;1,10*$    ^2121-8$

^*2,3;1,10**1;1,20**2,3;1,20**1;1,10*$    ^2121-8$

^*2,3;1,10**1;1,10*B*3,2;1,20**1;1,10*$    ^2121-8$

^*2,3;1,10**1;1,10*AB*2,3;1,10**1;1,10*$    ^2121-8$

^*2,3;1,10**1;1,10*5*3,2;1,20**1;1,10*$    ^2121-8$

^*2,3;1,10**1;1,10*5*1,3;1,10**2,3;1,20**1;1,10*$    ^2121-8$

^*2,3;1,10**1,3;1,10**2,3;1,20**1;1,10*$    ^2121-8$

^*2,3;1,10**1,3;1,10*B*3;1,10*4*1;1,10**2,3;1,10**1,3;1,10*$     ^2121-8$

^*2,3;1,10**1,3;1,10*5*1;1,10**2,3;1,10**1;1,10*$    ^2121-8$

^*2,3;1,10**1,3;1,20**2,3;1,20**1;1,10*$    ^2121-8$

^*2,3;1,10**1,3;1,10*5*3,2;1,20**1;1,10*$    ^2121-8$

^*2,3;1,10*5*1,3;1,10**2,3;1,10**1;1,10*$    ^2121-8$

^*2,3;1,10**1,3;1,10*5*1,3;1,10**2,3;1,20**1;1,10*$    ^2121-8$

^*2,3;1,10**1,3;1,10**2,3;1,20**1;1,10*$    ^2121-8$

^*1;1,10*A*1;1,10*B*3,2;1,20**1;1,10*$    ^2121-8$

^*1;1,10*A*1;1,10**2,3;1,20**1,3;1,10*5$    ^2121-8$

^*1;1,10*A*1,3;1,10**2,3;1,10**1;1,10*5$    ^2121-8$

^*1,3;1,10*A*1,3;1,10**2,3;1,10**1,3;1,10*$    ^2121-8$

^*1,3;1,10**2,3;1,10**1,3;1,10**2,3;1,10**1;1,10*$    ^2121-8$

^*1,3;1,10**2,3;1,10**1;1,10*5*1;1,10**2,3;1,10*5$    ^2121-8$

:------------------------------------------------------

^55*1;1,10*A*1,3;1,30**2;1,10*$    ^21-9$

^5*1;1,10*A*1,3;1,30*$    ^21-9$

^*2;1,10*B*1;1,10*4*2;1,10**1,3;1,20*$    ^21-9$

^*2;1,10**1,3;1,10**2,3;1,20*$    ^21-9$

^*2,3;1,10*A*1,3;1,10**2,3;1,10**1,3;1,10*$    ^21-9$

^*2,3;1,10**1;1,10**2,3;1,10**1,3;1,30*4$    ^21-9$

^*2,3;1,10**1;1,10**2,3;1,10**1;1,10**2,3;1,10*$    ^21-9$

^*2,3;1,10**1,3;1,10**2,3;1,20**1;1,10*$    ^21-9$

^*2,3;1,10**1;1,10**2,3;1,20**1;1,10*$    ^21-9$

^*1;1,10*A*1,3;1,10**2,3;1,10**1,3;1,20*$    ^21-9$

^*1;1,10*5*1,3;1,10*A*3,1;1,10**2,3;1,10**1,3;1,20*$    ^21-9$

^*1,3;1,10*A*2,3;1,10**1,3;1,30*$    ^21-9$

:------------------------------------------------------

^A*3,1[<30];1,10*4*2[<-50];1,10*B*3,1[<30];1,10*$    ^1451-V$

^A*1,3[<40];1,10*4*2[<-50];1,10*B*3,1[<20];1,10*$    ^1451-V$

^A*1,3[<40];1,10*4*1[<50];1,10*B*3,1[<30];1,10*$    ^1451-V$
```

^*3,1[<30];1,10*A*1,3[<40];1,20*A*1[<50];1,10*B*1,3[<30];1,10*$    ^1451-V$
^*3,1[<20];1,20*A5*3,1[<10];1,10*$    ^1451-V$
^*3,1[<20];1,10*A5*1,3[<20];1,10*$    ^1451-V$
^*2,3[<-10];1,10**1[<50];1,10*AB*1,3[<30];1,10*$    ^1451-V$
^*1[<50];1,10*A*3,1[<30];1,20**2[<-50];1,10*AB*3,1[<20];1,10*$    ^1451-V$
^*1[<50];1,10*A*1,3[<30];1,10*4*1[<50];1,10*B*1,3[<30];1,10*$    ^1451-V$
^*1[<50];1,102,3[<-20];1,101,3[<20];1,10*AB*1,3[<20];1,10*$    ^1451-V$
^*1,3[<40];1,102,3[<-20];1,101,3[<30];1,10*A5*1,3[<20];1,10*$    ^1451-V$
^*1,3[<30];1,208*4*2,3[<-30];1,10*A5*3,1[<10];1,10*$    ^1451-V$
^*1,3[<20];1,102,3[<-30];1,101,3[<20];1,102[<-50];1,101,3[<30];1,10*$

::::::::::::::::::::::::::::::::::::::::::::::::::::::::::::::::::

::::::::::::::::::::::::::::::::::::::::::::::::::::::::::::::::::
+
$
^

APPENDIX G

UMTAB.C

```
1    /*
2    **    Umtab.c
3    **            functions to translate a low-level pixel description to a
4    **            high-level recognition string
5    **
6    */
7
8    #include <z_erk.h>
9    #include <math.h>
10
11   #define xrealloc(p,s) p
12
13   #define ZAEHLER_UEBERLAUF (-1) (counter overflow)
14
15   #define KLEINER        1 (smaller)
16   #define GROESSER       2 (bigger)
17   #define PLUS           1 (plus)
18   #define MINUS          2 (minus)
19
20   #define SPRUNG_RECHTS 3 (jump right)
21   #define SPRUNG_LINKS  3 (jump left)
22
```

```
23   #define KANTEN(border) 0
24   #define VORNE(front) 1
25   #define HINTEN(back) 2
26   #define GRUPPEN(groups) 3
27
28
29   char    *wildstr(char *s1, char *s2, int * anz);
30   char    *check_wild(char * s1, char * s2, int *ac);
31
32   struct umtab
33   {
34           char * string ;
35           int    zahl ; (number)
36           char * new ; (new)
37   } ;
38
39
40   struct winkel
41   {
42           int w1;
43           int w2;
44           int g1;
45           int g2;
46           int xd;
47           int yd;
48           int v1;
49           int v2;
50   };
51
52   /*** globals zum testen ***/ (totals to test)
53   int w_count = 0;
54   int z_count = 0;
55   long w_zeichen = 0;
56   int w_changed = 0;
57   int w_flag;
58
59   int     c_line = 0;
60   int     c_pro_line = 0;
61
62
63   /*
```

```
64      **  umtab_ein
65      **      read the translation table from the file into memory
66      **
67      */
68
69      struct umtab * umtab_ein(char * datei)
70      {
71              FILE *      fp ;
72              struct umtab *  um ;
73              int             n = 0 ;
74              char       s[200] ;
75              char *     ps ;
76              int                      lines=0;
77              int         synfehler = 0;
78
79              if (debug > 99)
80                      printf("umtab_ein: anfang: %ld\n",farcoreleft()) ;
81
82              um = farmalloc(sizeof)struct umtab) * (line_count(datei)+1) ) ;
83              if (debug > 99)
84                      printf("umtab : %p\n",um) ;
85              fp = fopen(datei,"r") ; (file)
86              if (fp == NULL)
87                      return(NULL) ; (NULL = ZERO)
88
89              while (lies_zeile(s,sizeof(s),fp) && um)
90                  {
91                      lines++;
92                      /* check the syntax of one line in the convert table */
93
94                      if (syn_check(s) < 0)
95                          {
96                              printf("Syntaxfehler(syntax fault) %s in %
        eile %d Datei %s\n",s,lines,datei);
97                              synfehler++; (syn fault)
98                          }
99
100                     ps = strtok(s," \t\n") ;
101                     if (ps && *ps!='#')
102                         {
103                             (um+n)->string = strdup(ps) ;
```

```
104                    if ( !(um+n)->string)
105                            return(NULL(zero));
106                ps = strtok(NULL(zero)," \t\n") ;
107                if (ps && *ps!='#')
108                {
109                        (um+n)->zahl(number) = *ps ;
110                        (um+n)->neu(new) = strdup (ps) ;
111                }
112                else
113                {
114                        (um+n)->zahl = 0 ;
115                        (um+n)->neu = "" ;
116                        if (debug == 99)
117                            printf("Syntaxfehler Gruppe fehlt in Zeile(group missing in row file) %d Datei %s\n",lines,dates);
118                }
119                if ( !(um+n)->neu)  (new)
120                        return(NULL(zero)) ;
121                n++ ;
122                um = xrealloc(um,(n+1)*sizeof(struct umtab)) ;
123            }
124        }
125        if (um)
126        {
127            (um+n) -> zahl(number) = 0 ;
128            (um+n) -> string = NULL(zero) ;
129            (um+n) -> neu = NULL(zero) ;
130        }
131        fclose(fp) ;
132        if (synfehler)(syn fault)
133            return(NULL);
134
135        if (debug > 99)
136            printf("umtab_ein(on): ende(end): %ld\n",farcoreleft()) ;
137        return(um) ;
138    }
139
140    /*
141    ** umtab_sch
```

```
142     **      this is the process of translating the output of the
143     **      scanprocess to the recognition string. It's done
144     **      for every point of view( front, rear and top)
145     */
146     char *  umtab_sch(struct umtab * um,char * str,int was)
147     {
148             char *   ps ;    /* auf den String(to the string) */
149             char *   pa ;    /* auf den Anfang(to the start) */
150             int      lneu ;
151             static   int             anz_zeichen(symbol);
152             int      changed;
153             int      first = 1;
154             char     * vptr;
155             char     ta[200];
156             char     *tptr;
157
158             /*** for the complete translation table ***/
159             for (um ; um->string ; um++)
160             {
161                     anz_zeichen(symbol) = 0;
162                     pa = str ;
163                     changed = 0;
164                     tptr = ta;
165
166                     /*** for the complete low-level string ***/
167                     while (ps = wildstr(pa,um->string,&anz_zeichen))
168                     {
169                             changed = 1;
170                             lneu = strlen(um->neu(new)) ;
171                             if (lneu > anz_zeichen)
172                             {
173                                     memset(tptr,'\0',sizeof(ta));
174                                     memcpy(tptr,ps,strlen(ps));
175                                     memcpy(ps+lneu-anz_zeichen,tptr,strlen(tptr));
176                             }
177                             memcpy(ps,um->neu,lneu) ;
178                             pa = ps + lneu ;
179                             if (strchr(um->string,'*'))
180                             {
181                                     if(anz_zeichen(symbol) < strlen
```

```
(um->neu))
182                              anz_zeichen(symbol) =
     strlen(um->neu)+2;
183                      }
184                      strcpy(pa,ps + max(anz_zeichen(symbol),lneu))
     ;
185                      anz_zeichen(symbol = 0;
186              }
187
188          if (changed)
189          {
190                  if (debug > 9)
191                          printf("%s  ->  %s\n",um->string,str)
     ;
192          }
193      }
194
195      return(str) ;
196  }
197
198
199  /*
200  **      char    * wildstr(char *s1, char *s2, int anz)
201  **
202  **      This function tries to translate the low-level classification
     string
203  **      into a high-level recognition string.
204  **      The output is a high-level recognition string, if the input was
     found in the converting
205  **      table.
206  */
207
208  char    * wildstr(char *s1, char *s2, int * anz)
209  {
210  char    * p1;
211  char    * p2;
212  char    * rc;
213  int     ac=0;
214
215
216          p1 = s1;
```

```
217            p2 = s2;
218
219        while(*p1)
220            {
221                if(*p1 == *p2) /* das erste Zeichen stimmt ueberein(the first mark is on) */
222                    {
223                        rc = p1; /* position fr return merken */
224                        while (*p2 && (*p1 == *p2 || *p2 == '?' || *p2 == '*'))
225                            {
226                                if (*p2 == '*')  /* kommt jetzt ein wildcardausdruck(now comes a wildcard) */
227                                    {
228                                        /* Es ist schon ein wildcardstring ersetzt */ (wildcard string replaced)
229                                        if (w_flag == 99)
230                                            return(NULL);
231                                        if ((p1 = check_wild (p1,p2,&ac)) == NULL)
232                                            {
233                                                return(NULL);
234                                                /* break; */
235                                            }
236                                        else
237                                            {
238                                                p2++;
239                                                p2 = strchr (p2,'*');
240                                                p2++;
241                                            }
242                                    }
243                                else    /* normaler v ergleich(normal) */
244                                    {
245                                        ac++;
246                                        p1++;
247                                        p2++;
248                                    }
249                            }
250
```

```
251                         if(*p2 == '\0') /* Treffer(hit) und versenkt
     */
252                                {
253                                        *anz = ac;
254                                        if (w_flag)
255                                                w_flag = 99;
256                                        return(rc);
257                                }
258
259                                p1 = rc;                /* es geht
     weider von vorne los(it starts again from beginning) */
260                                p1++;           /* bzw. 1 Position
     weiter */
261                                rc = p1;
262                                p2 = s2;
263                                ac = 0;                 /* treffer
     (hit) count zurcksetzen */
264                        }
265                        else
266                                p1++;   /* Startposition durchfahren(go
     through start position) */
267                }
268                return(NULL);
269  }
270
271
272  /*
273  **      char * check_wild(char *s1, char *s2, int *ac)
274  **              ebrprfden, ob wildcardstring s2 in s1 enthalten ist
     (wildcard string contained in s1)
275  **
276  **      return NULL     Wildstring s2 nicht in s1 en thalten (wildcard
     string not contained in s1)
277  **              sonst   Zeiger aug neue startposition in s1 (pointer
     to new start position)
278  **
279  **      The smallest unit of a recognition string has the following
280  **      components:
281  **
282  **      *[a]X1,[a]X2,..,[a]Xn;YS,YE*
283  **
```

```
284     **      Xn         :       allowed Elements of the recognition string
285     **      [a]        :       optional classifier wich can be
286     **                 !       :       this string must be there
287     **                 %       :       this string can not be the last
288     **
289                        [Range of Steigung in Degrees]
290     **                 [max. No. of the Sign]    :
291     */
292
293     char *   check_wild(char * s1, char * s2, int * ac)
294     {
295     int                      count=1;
296     char                     ende_buff[100];
297     char                     * eptr;
298     char                     * rca = NULL;
299     int                      aca = 0;
300     int                      start = 0;
301     int                      ende*end) = 0;
302     char                     zeichen(symbol)[100];
303     char                     treffer(hit)[100];
304     char                     letzter(last)[20];
305     char                     steigung(climbing)[30];
306     int                      scount;
307     int                      lflag = 0;
308     char                     last;
309     static                   struct  winkel winkel;
310
311
312             w_flag = 0;
313
314             memset(zeichen,'\0',sizeof(zeichen(symbol)));
315             memset(treffer,'\0',sizeof(treffer(hit)));
316             memset(letzter,'\0',sizeof(letzter(last)));
317             memset(ende_buff,'\0',100);
318             memset(steigung,'\0',sizeof(steigung(climbing)));
319             eptr = ende_buff;
320
321             fill_zeichen(s2,zeichen,treffer(symbol, hit));          /*
        hole gltige zeichen */
322             get_letzter(s2,letzter)(last);
323
```

```
324             get_winkel(s2,&winkel(angle));
325
326        start = get_start(s2);
327        ende = get_ende(end)(s2);
328
329        s2++;
330        s2 = strchr(s2,'*');             /* erstes Zeichen nach
     dem Stern(symbol after asterisk) */
331        s2++;                     /* eines hintee dem abschluÅstern(one
     after the end) */
332
333        while(*s2 && *s2 != '*')         /* gibts vielleicht
     noch einen wildcardstring */ (maybe there is still a wildcard string)
334             *(eptr++) = *(s2++);
335
336      count = 0;
337
338      while(count <= ende)    /* In den angebenen Grenzen(in given
     limits) */
339        {
340             scount = 0;
341                     if (scount = in_zeichen (symbol)
     (s1,zeichen,treffer,steigung))    /* Prfe ob gltige Zeichenkette */
342                     {
343                             /* Zuerst die Winkel(first the angle)
     */
344                             if (winkel.g1 != 0 && scount == 1)
345                                     inc_winkel(& winkel,s1);
346
347
348                             /* Nach dem letzten zeichen kommt noch
     ein gltiges(after the last symbol still coes another valid symbol) */
349                             if (lflag && (*s1 != *letzter))
350                                     lflag = 0;
351
352                             /* Vorlufig letztes zeichen(for new
     last symbol) */
353                             if (*s1 == *letzter(last))
354                                     lflag =1;
355
356                             s1 += scount;
```

```
357                                 *ac += scount;
358                                 if (count+1 >= start)
359                                 {
360                                     if((strncmp(ende_buff,s1,
    strlen(ende_buff)) == 0 || strlen(ende_(end)buff) == 0) &&
    check_treffer(treffer))
361                                     {
362                                         rca = s1;
363                                         aca = *ac;
364
365                                         /* Sonderfall Abbruch
    wegen berlauf Gleichheitszeichen(break off, Equal Symbol overflows) */
366                                         if (check_steigung
    (zeichen,steigung) (symbol, climbing) == ZAEHLER_UEBERLAUF) (counter
    overflow)
367                                         {
368
    if (winkel(angle).g1 != 0 && scount == 1)
369
        dec_winkel(&winkel,*s1);
370
    if (check_winkel(&winkel)) (angle)
371
    {
372
            s1 -= scount;
373
            *ac -= scount;
374
            w_flag = 1;
375
            return(s1);
376
    }
377
    else
378
    {
379
            return(NULL);
```

```
380                    }
381                                                        }
382                                                    }
383                                                }
384                                            }
385                                        else
386                                        {
387                                            /* Bei Zeichenketten, die mit der Lnge
     Null starten(for strings starting with length of zero) */
388                                            /* wird nicht mehr auf Treffer usw.
     geschaut(no more check of hits) */
389                                            if (count == 0 && start == 0)
390                                            {
391                                                w_flag = 1;
392                                                return(s1);
393                                            }
394
395                                            /* Vorlaeufig gibt's nur letzte
     zeichen der lnge 1(for the moment, there are symbols of length 1) */
396                                            if (lflag)
397                                            {
398                                                last = *(s1-1);
399                                                while(*(s1-1) == last)
400                                                {
401                                                    dec_treffer(hit)
     (*(s1-1),zeichen (symbol),treffer (hit));
402                                                    dec_winkel(angle)
     (&winkel,last);
403                                                    s1--;
404                                                    rca--;
405                                                    (*ac)--;
406                                                    aca--;
407                                                    count--;
408                                                }
409                                            }
410
411                                            if (count >= start)
412                                            {
413
414
```

```
415                                if((strncmp(ende_buff,s1,
    strlen(ende_buff)) == 0 || strlen(ende_buff) == 0) && check_treffer
    (treffer) && (check_steigung(zeichen,steigung) == 1))
416                                     {
417                                          if (check_winkel
    (&winkel))
418                                              {
419
    if (s1 != NULL)
420
            w_flag = 1;
421
    return(s1);
422                                              }
423                                          else
424
    return(NULL);
425                                     }
426                                     else
427                                     {
428                                          if (check_treffer
    (hit) (treffer) && (check_steigung(zeichen,(check climbing
    symbol)steigung == 1))
429                                              {
430
    if (check_winkel(angle)(&winkel))
431
    {
432
            *ac = aca;
433
            if (rca != NULL) (zero)
434
                    w_flag = 1;
435
            return(rca);
436
    }
437
    else
```

```
438                    return(NULL);
439                                                            }
440                                                        else
441        return(NULL);
442                                                        }
443                                                    }
444                                                else
445                                                    return(NULL);
446                                                }
447
448    /***
449                                            }
450    ****/
451                    count++;
452            }
453            /* Vorlaeufig gibt's nur letzte zeichen der lnge 1(for the
    moment, there are only symbols of length 1) */
454            if (lflag)
455            {
456                    last = *(s1-1);
457                    while(*(s1-1) == last)
458                    {
459                            dec_treffer(hit)(*s1-1),zeichen(symbol),
    treffer(hit));
460                            dec_winkel(&winkel,last);
461                            s1--;
462                            rca--;
463                            (*ac)--;
464                            acc--;
465                            count--;
466                    }
467                    rca++;
468            }
469
470            if (check_treffer(treffer) ** (check_steigung (climb)
    (zeichen,steigung) == 1))
471            {
472                    if (check_winkel(angle)(&winkel))
473                    {
```

```
474                         *ac = aca;
475                         *ac -= 1;
476                         if ((rca-1) != NULL)
477                                 w_flag = 1;
478                         return(rca-1);
479                 }
480             else
481                     return(NULL);
482         }
483     else
484         return(NULL);
485 }
486
487
488 int dec_treffer(char c , char * s2, char * treffer)
489 {
490     int     flag=0;
491     int     pos=0;
492     int     flag_pos = 0;
493
494         while(*s2 != ';')
495         {
496                 if(*s2 == '!')
497                 {
498                         flag = 1;
499                         flag_pos = pos;
500                 }
501                 else
502                         if(flag && c == *s2)
503                         {
504                                 (*(treffer+flag_pos))--;
505                                 return(0);
506                         }
507                         else
508                             if (*s2 != '%')
509                                     flag = 0;
510
511                 pos++;
512                 s2++;
513         }
514         return(1);
```

```
515    }
516
517
518
519
520    /*
521    **      int in_zeichen(symbol)(char * c, char * s, char * treffer(hit))
522    **
523    **      Prft ob Zeichenkette c in s enthalten ist(check if data string c is contained in s)
524    **
525    **      return(0)      Zeichenkette ist nicht enthalten(string is not contained)
526    **                                      (Syntaxfehler) (syntax error)
527    **              sonst      Lnge der gefundenen Zeichenkette (otherwise length of the obtained data string)
528    **
529    **
530    */
531
532
533    int in_zeichen(symbol)(char * c, char * s, char * treffer(hit), char * steigung(climb(rise))))
534    {
535    int     i;
536    char    * pos;
537    char    * t;
538    char    * tpos;
539    char    * spos;
540    int     tflag=0;
541    int     count = 0;
542    int     match = 0;
543    int klauf=0;(krun = 0)
544
545            pos = c;
546            t = tpos = treffer(hit);
547
548            for(i=0; i<strlen(s); )
549            {
```

```
550                   /* Sonderbehandlung Ausrufezeichen(special treatment
      exclamation symbol) */
551                   /* Diese Zeichenkette muß vorkommen(this data string
      must be there) */
552                   if (*(s+i) == '!')
553                   {
554                           tflag = 1;
555                           tpos = t;
556                           t++;
557                           i++;
558                   }
559
560                   if (*(s+i) == ',')
561                   {
562                           i++;
563                           t++;
564                   }
565
566
567                   while(*(s+i) != ',' && *(s+i) != '\0' && (*c == *(s+i)
      || *(s+i) == '?' ||
568                                           *(s+i) == '%' ||
      *(s+i) == '(' ||
569                                           *(s+i) == ')' ||
      *(s+i) == '<' ||
570                                           *(s+i) == '>' ||
      klauf))(|krun))
571                   {
572                           if (!klauf(krun) && *(s+i) == *c || *(s+i) ==
      '?')
573                           {
574                                   if (match == 0)
575                                           spos = steigung + i;
576                                   if (*(s+i) == *c)
577                                   {
578                                           /* Steigungs zaehler(climb
      counter(or rise)) */
579                                           (*spos) ++;
580                                   }
581                                   c++;
582                                   count++;
```

```
583                         match++;
584                     }
585                     if (*(s+i) == '(')
586                         klauf = 1(krun = 1);
587
588                     i++;
589                     t++;
590                 }
591                 klauf = 0(krun = 0);
592
593                 /* Eine gltige Zeichenkette wurde gefunden(A valid data
    string was found) */
594                 if (match && (*(s+i) == ',' || *(s+i) == '\0'))
595                 {
596                     /* treffer flag setzen(position hit flag) */
597                     if(tflag)
598                         (*tpos)  ++;
599                     return(count);
600                 }
601                 else
602                 {
603                     if (*(s+i) == ',')
604                     {
605                         i++;
606                         t++;
607                     }
608                     match = 0;
609                     if (*(s+i) != '!')
610                     {
611                         /* Zeiger auf nchste Zeichenkette
    (pointer to next data string) */
612                         while(*(s+i) != ',' && *(s+i))
613                         {
614                             i++;
615                             t++;
616                             count = 0;
617                         }
618                     }
619                 }
620                 /* Trefferflag zurcksetzen(reset hit flag) */
621                 tflag = 0;
```

```
622             }
623             c = pos;
624             return(0);
625     }
626
627     /*
628     **      int fill_zeichen(symbol)(char * s, char *w, char * treffer,
        char * steigung(climb))
629     **
630     **      Liest gltige Zeichenketten aus dem String s in den String(Reads
        valid data strings from string s into the string)
631     **      w. bertrgt MuÂzeichenketten in den String Treffer(transfers
        must-data strings into the string "hit")
632     **
633     **
634     */
635
636     int fill_zeichen(symbol)(char * s, char *w, char * treffer(hit))
637     {
638     char * hs;
639     char * hw;
640     char * ht;
641
642             hs = s; /* p zeigt auf zeichen nach dem stern(p points to
        symbol after the asterisk) */
643             hs++;
644             hw = w;
645             ht = treffer(hit);
646
647             /* Lesen bis Semikolon oder eckige Klammer fr Winkel(Read until
        hit semicolon or bracket[] for angle) */
648
649             while(*hs != ';' && *hs != '[')
650             {
651                     if (*hs == '!')
652                             *ht = '1';
653                     else
654                             *ht = ' ';
655
656                     *(hw++) = *(hs++);
657                     ht++;
```

```
658                }
659        }
660
661     /*
662     **      get_winkel(angle)( char * s, struct winkel(angle) * w)
663     **
664     **      liest, falls vorhanden, Winkelangabe aus ein em String(reads,
        if existent, angle angle indication from a string)
665     **   in den wert winkel wobei winkel ein int ist(into the angle value,
        whereby angle is a int which is constructed as follows)
666     **   der wie folgt aufgebaut ist
667     **
668     */
669
670     int get_winkel(angle)(char * s, struct winkel(angle) * w)
671     {
672     char    * p;
673     char    zbuff[10];
674     char    * zptr;
675
676             while(*s != ';' && *s != '[' && *s)
677                     s++;
678             if (*s == '[')
679             {
680                             p = s;
681                             w->xd = 0;
682                             w->yd = 0;
683
684                             p++;    /* Jetzt zeigt p auf das < bzw. >
        Zeichen(now p points to the < or > symbol) */
685
686                             switch(*p)
687                             {
688                             case '<' :
689                                     w->g1 = KLEINER(SMALLER);
690                                     p++;
691                                     break;
692                             case '>' :
693                                     w->g1 = GROESSER(LARGER);
694                                     p++;
695                                     break;
```

```
696                default :
697                        w->g1 = 0;
698                        break;
699                }
700
701                switch(*p)
702                {
703                case '+' :
704                        w->v1 = PLUS;
705                        p++;
706                break;
707                case '-' :
708                /*
709                        if (w->g1 == KLEINER(SMALLER))
710                                w->g1 = GROESSER(LARGER);
711                        if (w->g1 == GROESSER(LARGER))
712                                w->g1 = KLEINER(SMALLER);
713                */
714                        w->v1 = MINUS;
715                break;
716                deafult :       /* Wenn nichts angegeben ist(if
        nothing is there) */
717                        w->v1 = PLUS;
718                break;
719
720                }
721
722                zptr = zbuff;
723                while (*p != ')' && *p != '<' && *p != '>' &&
        *p)
724                        *(zptr++) = *(p++);
725                *zptr = '\0';
726
727                w->w1 = atoi(zbuff);
728
729                if (*p == ']')
730                        return(0);
731                else
732                {
733                        switch(*p)
734                        {
```

```
735                             case '<' :
736                                     w->g2 = KLEINER(SMALLER);
737                                     p++;
738                                     break;
739                             case '>' :
740                                     w->g2 = GROESSER(LARGER);
741                                     p++;
742                                     break;
743                             default :
744                                     w->g2 = 0;
745                                     break;
746                             }
747
748                             switch(*p)
749                             {
750                             case '+' :
751                                     w->v2 = PLUS;
752                                     p++;
753                             break;
754                             case '-' :
755                                     /*
756                                             if (w->g2 == GROESSER(LARGER))
757                                                     w->g2 = KLEINER(SMALLER);
758                                             if (w->g2 == KLEINER(SMALLER))
759                                                     w->g2 = GROESSER(LARGER);
760                                     */
761                                     w->v2 = MINUS;
762                             break;
763                             default :         /* Wenn nichts angegeben ist(if nothing is there) */
764                                     w->v2 = PLUS;
765                             break;
766
767                             }
768
769                             zptr = zbuff;
770                             while (*p != ')' && *p)
771                                     *(zptr++) = *(p++);
772                             *zptr = '\0'; .
```

```
773
774                                            w->w2 = atoi(zbuff);
775                                            return(0);
776                                    }
777
778            }
779            else
780            {
781                    memset(w,'\0',sizeof(struct winkel(angle)));
782                    return(-1);
783            }
784
785   }
786
787   int check_winkel(angle)(struct winkel * w)
788   {
789   double winkel;
790   double x;
791   double y;
792
793
794           if (!w->g1)
795                   return(1);
796
797           /* Durch 0 darf nicht dividiert werden(Division by 0 is not
      permitted) */
798           if (!w->yd)
799                   return(1);
800
801           x = w->xd;
802           y = w->yd;
803
804           winkel(angle) = atan(x / y);
805           winkel(angle) = winkel(angle) * 180.0 / 3.1415;
806
807                   switch(w->g1)
808                   {
809                   case GROESSER(LARGER) :
810                           switch(w->v1)
811                           {
812                           case PLUS :
```

```
813                                     if (winkel(angle) < w->w1)
814                                             return(0);
815                                     break;
816                             case MINUS :
817                                     if (winkel(angle) > w->w1)
818                                             return(0);
819                                     break;
820                             }
821                             break;
822                     case KLEINER(SMALLER) :
823                             switch (w->v1)
824                             {
825                             case PLUS:
826                                     if (winkel(angle) > (double) w->w1)
827                                             return(0);
828                                     break;
829                             case MINUS:
830                                     if (winkel(angle) < (double) w->w1)
831                                             return(0);
832                                     break;
833                             }
834                             break;
835                     }
836
837         if (w->g2)
838             {
839                     switch(w->g2)
840                     {
841                     case GROESSER(LARGER) :
842                             switch (w->v2)
843                             {
844                             case PLUS :
845                                     if (winkel(angle) < (double) w->w2)
846                                             return(0);
847                                     break;
848                             case MINUS :
849                                     if (winkel(angle) > (double) w->w2)
850                                             return(0);
851                                     break;
```

```
852                                         }
853                                         break;
854                                 case KLEINER(SMALLER) :
855                                         switch(w->v2)
856                                         {
857                                         case PLUS :
858                                                 if (winkel(angle) > (double) w->w2)
859                                                         return(0);
860                                                 break;
861                                         case MINUS :
862                                                 if (winkel(angle) < (double) w->w2)
863                                                         return(0);
864                                                 break;
865                                         }
866                                         break;
867                                 }
868                         }
869
870     return(1);
871     }
872
873     int inc_winkel(angle)(struct winkel(angle) * w, char * s)
874     {
875             switch(*s)
876             {
877                     case '1' :
878                             w->xd++;
879                             w->yd++;
880                     break;
881                     case '2' :
882                             w->xd--;
883                             w->yd++;
884                     break;
885                     case '3' :
886                             w->yd++;
887                     break;
888                     case '4' :
889                             w->xd -= SPRUNG_RECHTS(JUMP(to)RIGHT);
890                             w->yd++;
```

```
891                 break;
892             case '5' :
893                     w->xd += SPRUNG_LINKS(JUMP(to)LEFT);
894                     w->yd++;
895                 break;
896             default :
897                 break;
898         }
899 }
900
901 int dec_winkel(angle)(struct winkel(angle) * w, char 1)
902 {
903     switch(1)
904     {
905         case '1' :
906                 w->xd--;
907                 w->yd--;
908             break;
909         case '2' :
910                 w->xd++;
911                 w->yd--;
912             break;
913         case '3' :
914                 w->yd--;
915             break;
916         case '4' :
917                 w->xd += SPRUNG-RECHTS(JUMP(to)RIGHT);
918                 w->yd--;
919             break;
920         case '5' :
921                 w->xd -= SPRUNG_LINKS(JUMP(to)LEFT);
922                 w->yd--;
923             break;
924         default :
925             break;
926     }
927 }
928
929
930 /*
931 **      int get_letzter(last)(char *s1, char *s2)
```

```
932     **
933     **      Liest Zeichenketten, die nicht an letzter Position in einem
                (Reads, data strings which must not be in a last position in a
934     **          Wildstring stehen drfen, in den String Letzter ein(wildstring,
                into the string "Letzer" ("Last").
935     **
936     **
937     */
938
939     int get_letzter(last)(char * s1 , char * s2)
940     {
941     char        *rp;
942     char        buff[100];
943     char        *bptr;
944
945             memset(buff,'\0',sizeof(buff));
946             bptr = buff;
947
948             /* ptr steht auf dem startstern(is on the start asterisk) */
949             s1++;
950
951             while(*s1 != '*'
952                     *(bptr++) = *(s1++);
953
954             if (rp = strchr(buff,'%'))
955             {
956                     rp++;
957                     while(*rp != ',' && *rp != ';' && rp != '(' && *rp)
958                             *(s2++) = *(rp++);
959             }
960
961
962             return(0);
963     }
964
965     /*
966     **      int get_start(char * s)
967     **
968     **      Liest aus dem Wildstring s die Startlnge eines gltigen(Reads
                from the wildstring s the start length of a valid string)
969     **      Strings
```

```
970     **
971     */
972
973     int get_start(char * s)
974     {
975     char      * hs;
976     char      start[10];
977     char      * sptr;
978
979               memset(start,'\0',sizeof(start));
980
981               hs = s;
982               sptr = start;
983
984               while(*hs != ';')
985                       hs++;
986               hs++;
987
988               while(*hs != ',')
989                       *(sptr++) = *(hs++);
990
991               return(atoi(start));
992     }
993
994     /*
995     **        int get_ende(char * s)
996     **
997     **        Liest aus dem Wildstring s die maximale Lnge eines(Reads from
          the wildstring s the maximum length of a string)
998     **        Strings
999     **
1,000   */
1,001
1,002
1,003   int get_ende(char * s)
1,004   {
1,005   char      * hs;
1,006   char      ende[10];
1,007   char      * sptr;
1,008
1,009             memset(ende,'\0',sizeof(ende));
```

```
1,010
1,011            hs = s;
1,012            sptr = ende;
1,013
1,014            while(*hs != ';' )
1,015                    hs++;
1,016            while(*hs != ',')
1,017                    hs++;
1,018            hs++;
1,019            while(*hs != '*')
1,020                    *(sptr++) = *(hs++);
1,021
1,022            return(atoi(ende));
1,023    }
1,024
1,025    /*
1,026    **       int syn_check(char * s)
1,027    **
1,028    **       Checkt eine Zeile der Umsetztabelle auf Syntaxfahler(checks one
         line(row) of a transfer table for syntax error(fault))
1,029    **
1,030    */
1,031
1,032    int syn_check(char *s)
1,033    {
1,034    char * p;
1,035    char * sp1;
1,036    char * sp2;
1,037    char * semi;
1,038    int    semiflag = 0;
1,039
1,040            return(0);
1,041            p = s;
1,042            while((sp1 = strchr(p,'*')) != NULL)
1,043            {
1,044                    sp1++;
1,045                    /* sp1 zeight auf den Anfang eines Strings(points to
         the start(beginning) of a string) */
1,046                    if ((sp2 = strchr(sp1,'*')) != NULL)
1,047                    {
1,048                            semi = sp1;
```

```
1,049                    while(*semi != '*')
1,050                    {
1,051                            if (*semi == ';')
1,052                                    semiflag = 1;
1,053                            semi++;
1,054                    }
1,055                    if (!semiflag)
1,056                            return(-1);
1,057            }
1,058            else
1,059                    return(-1);
1,060
1,061            sp2++;
1,062            /* sp2 zeigt auf ein zeichen nach dem
        AbschluÅstern(points to a symbol after the end asterisk) */
1,063            p = sp2;
1,064            /* Falls kein weiterer Stern kommt darf auch
        kein Komma bzw Semikolon kommen(If no further (other) asterisk follows,
        also no comma or semicolon can follow) */
1,065            if (*(sp2) != '*')
1,066            {
1,067                    while(*sp2 && *sp2 != '*')
1,068                    {
1,069                            if(*sp2 == ',' || *sp2 == ';')
1,070                                    return(-2);
1,071                            sp2++;
1,072                    }
1,073            }
1,074    }
1,075    return(0);
1,076 }
1,077
1,078
1,079 /*
1,080 **     check_treffer(hit)(char * s)
1,081 **
1,082 **     return  0 falls noch eine 1 im Treffer string gefunden(if a 1
        is still found in the hit string)
1,083 **             1 alles ok;Alle geforderten Zeichen sind vorhanden(all
        ok; All required symbols are present)
1,084 **
```

```
1,085   **
1,086   */
1,087
1,088   int check_treffer(hit)(char * t)
1,089   {
1,090           while(*t)
1,091           {
1,092                   if(*t == '1')
1,093                           return(0);
1,094                   t++;
1,095           }
1,096           return(1);
1,097   }
1,098
1,099
1,100   int check_steigung(climb(rise))(char * zeichen(symbol), char *
        steigung(climb(rise)))
1,101   {
1,102   char    * z;
1,103   char    * s;
1,104   char    *t;
1,105   int     summe = 0;
1,106   char    verg1;
1,107   char    verg2;
1,108   char    vzahl1[10];
1,109   char    vzahl2[10];
1,110   char    *vptr1;
1,111   char    *vptr2;
1,112   int     def1 = -1;
1,113   int     def2 = -1;
1,114   char    temp[30];
1,115   int             cc=0;
1,116
1,117           if(strchr(zeichen,'(') == NULL)
1,118                   retrun(1);
1,119
1,120           memset(vzahl1,'\0',sizeof(vzahl1));
1,121           memset(vzahl2,'\0',sizeof(vzahl2));
1,122           memset(temp,'\0',sizeof(temp));
1,123           vptr1 = vzahl1;
1,124           vptr2 = vzahl2;
```

```
1,125
1,126            z = zeichen(symbol);
1,127            s = steigung(climb(rise));
1,128            t = temp;
1,129
1,130            while(*z)
1,131            {
1,132                    if (z == zeichen(symbol) || *z-1) == ',')
1,133                    {
1,134                            while(*z == '!' || *z == '%')
1,135                            {
1,136                                    z++;
1,137                                    s++;
1,138                            }
1,139                            summe += (*s);
1,140                    }
1,141                    z++;
1,142                    s**;
1,143            }
1,144
1,145            if (summe > 0)
1,146            {
1,147                    z = zeichen(symbol);
1,148                    s = steigung(climb(rise));
1,149                    t = temp;
1,150
1,151                    while(*z)
1,152                    {
1,153                            if (z == zeichen(symbol) || *(z-1) == ',')
1,154                            {
1,155                                    while(*z == '!' || *z == '%')
1,156                                    {
1,157                                            z++;
1,158                                            s++;
1,159                                            t++;
1,160                                    }
1,161                                    *t = ((*s * 100) / summe(sum));
1,162                            }
1,163                            z++;
1,164                            s++;
1,165                            t++;
```

```
1,166                    }
1,167               }
1,168
1,169
1,170          z = zeichen(symbol);
1,171          s = steigung(climb(rise));
1,172          t = temp;
1,173
1,174          while(*z)
1,175          {
1,176               if(*z == '(')
1,177               {
1,178                    verg1(compare) = *(z+1);
1,179                    z+=2;
1,180                    s--;
1,181                    t--;
1,182
1,183                    cc = 3;
1,184
1,185                    while(*z && *z != '<' && *z != '>' && *z != ')')
1,186                    {
1,187                         *(vptr1++) = *(z++);
1,188                         cc++;
1,189                    }
1,190                    def1 = atoi(vzahl1);
1,191
1,192                    if (*z && *z != ')')
1,193                    {
1,194                         /* Pointer steht auf <>(Pointer is on <>) */
1,195                         verg2 = *z;
1,196                         z++;
1,197                         cc++;
1,198
1,999                         while(*z && *z != ')')
1,200                         {
1,201                              *(vptr2++) = *(z++);
1,202                              cc++;
1,203                         }
1,204                         def2 = atoi(vzahl2);
```

```
1,205
1,206                        }
1,207
1,208
1,209                        switch (verg1)
1,210                        {
1,211                        case '=' :
1,212                                if (*(s) > def1)
1,213                                        return(ZAEHLER_UEBERLAUF)
        (COUNTER OVERFLOW);
1,214                                break;
1,215                        case '>' :
1,216                                if (verg2 == '<')
1,217                                {
1,218                                        if ((*t < def1 || *t > def2) &&
        *t != 0)
1,219                                                return(0);
1,220                                }
1,221                                else
1,222                                        if (*t < def1 && *t != 0)
1,223                                                return(0);
1,224                                break;
1,225                        case '<' :
1,226                                if (verg2 == '>')
1,227                                {
1,228                                        if ((*t > def1 || *t < def2) &&
        *t != 0)
1,229                                                return(0);
1,230                                }
1,231                                else
1,232                                        if (*t > def1 && *t != 0)
1,233                                                return(0);
1,234                                break;
1,235                        }
1,236                        memset(vzahl1,'\0',sizeof(vzahl1));
1,237                        memset(vzahl2,'\0',sizeof(vzahl2));
1,238                        vptr1 = vzahl1;
1,239                        vptr2 = vzahl2;
1,240
1,241                        t+=cc;
1,242                        s+=cc;
```

```
1,243
1,244                          z++;
1,245                          s++;
1,246                          t++;
1,247                  }
1,248              z++;
1,249              s++;
1,250              t++;
1,251          }
1,252          return(1);
1,253  }
```

APPENDIX H

```
LOG.TAB

:------------------------------------------------------------------------
: 0
:I       0-
:II      0-2,8
:III     0-1,3,4

KAK-0          12-0          21-0          KAK-0          12-0          21-0
   KAK-0          12-6          21-0          KAK-0          12-0          21-0
   KAK-0          1412-Z        21-0          KAK-0          12-0          21-0
   KAK-0          2541-7        21-0          KAK-0          12-0          21-0
   KAK-0          1212-8        21-0          KAK-0          12-0          21-0
   KAK-0          12152-F       21-0          KAK-0          12-0          21-0
   KAK-0          12-0          21-0          KAK-0          12-0          21-0
   KAK-0          12-0          21-0          KAK-0          12-0          21-0
   KAK-0          12-0          1451-7        KAK-0          12-0          21-0
   :raus wegen 4
   :KAK-0         12-0          1451-V        KAK-0          12-0          21-0
   :nicht moeglich. Streit 8(not possible - conflict with 8)
   :KAKAK-AC      12-0          21-0          KAK-0          12-0          21-0
   KAK-0          141-E         2121-8        KAK-0          12-0          21-0

:------------------------------------------------------------------------
   SAS-1          141-E         1-E           SAS-1          141-E         1-E
   SAS-1          141-E         21-0          SAS-1          141-E         1-E
   :SAS-1         141-E         2121-D        SAS-1          141-E         1-E

:------------------------------------------------------------------------
   KASL-2         1412-Z        21421-Z       KASL-2         1412-Z        21421-Z
   KASL-2         1412-Z        1451-7        KASL-2         1412-Z        21421-Z
```

| 233 | | | 234 | | |
|---|---|---|---|---|---|
| KASL-2 | 1241-9 | 21421-Z | KASL-2 | 1412-Z | 21421-Z |
| KASL-2 | 2541-7 | 21421-Z | KASL-2 | 1412-Z | 21421-Z |
| KASL-2 | 141-E | 21421-Z | KASL-2 | 1412-Z | 21421-Z |
| KASL-2 | 1412-Z | 2121-D | KASL-2 | 1412-Z | 21421-Z |
| SAS-1 | 1412-Z | 21421-Z | KASL-2 | 1412-Z | 21421-Z |
| SAS-1 | 2541-7 | 21421-Z | KASL-2 | 1412-Z | 21421-Z |
| SKSK-3 | 1412-Z | 21421-Z | KASL-2 | 1412-Z | 21421-Z |
| SKSK-3 | 1412-Z | 21-0 | KASL-2 | 1412-Z | 21421-Z |
| SKSK-3 | 2541-7 | 21421-Z | KASL-2 | 1412-Z | 21421-Z |
| SKAK-SE | 1412-Z | 21-0 | KASL-2 | 1412-Z | 21421-Z |
| :raus wegen 3(:out reason 3) | | | | | |
| :SKSK-3 | 1412-Z | 1451-7 | KASL-2 | 1412-Z | 21421-Z |
| LSAK-5 | 1412-Z | 21421-Z | KASL-2 | 1412-Z | 21421-Z |
| LSAK-5 | 2541-7 | 21421-Z | KASL-2 | 1412-Z | 21421-Z |
| SKAK-SE | 1412-Z | 21421-Z | KASL-2 | 1412-Z | 21421-Z |
| SKAK-SE | 2541-7 | 21421-Z | KASL-2 | 1412-Z | 21421-Z |
| LSLS-SI | 1412-Z | 21421-Z | KASL-2 | 1412-Z | 21421-Z |
| KAKS-9 | 1412-Z | 21421-Z | KASL-2 | 1412-Z | 21421-Z |
| KAK-0 | 1412-Z | 1451-7 | KASL-2 | 1412-Z | 21421-Z |
| :Steve | | | | | |
| KASL-2 | 1412-Z | 21-0 | KASL-2 | 1412-Z | 21421-Z |
| KASL-2 | 1412-Z | 1241-9 | KASL-2 | 1412-Z | 21421-Z |
| ALS-4 | 1412-Z | 21-0 | KASL-2 | 1412-Z | 21421-Z |
| ALS-4 | 1412-Z | 21421-Z | KASL-2 | 1412-Z | 21421-Z |
| LSAK-5 | 1412-Z | 21-0 | KASL-2 | 1412-Z | 21421-Z |
| LSAK-5 | 1412-Z | 1412-Z | KASL-2 | 1412-Z | 21421-Z |
| :----------------------------------------------------------------- | | | | | |
| SKSK-3 | 2121-D | 2121-D | SKSK-3 | 2121-D | 2121-D |
| :nicht noetig.Krueppel(:not needed. Invalid) | | | | | |
| SKSK-3 | 2121-D | 1451-7 | SKSK-3 | 2121-D | 2121-D |
| SKSK-3 | 12152-F | 2121-D | SKSK-3 | 2121-D | 2121-D |
| SKSK-3 | 1412-Z | 2121-D | SKSK-3 | 2121-D | 2121-D |
| SKSK-3 | 2121-D | 2121-8 | SKSK-3 | 2121-D | 2121-D |
| SKSK-3 | 2121-D | 21-0 | SKSK-3 | 2121-D | 2121-D |
| KASL-2 | 2121-D | 2121-D | SKSK-3 | 2121-D | 2121-D |
| KASL-2 | 2121-D | 2121-8 | SKSK-3 | 2121-D | 2121-D |
| :SAS-1 in 7 gewandelt(transformed into 7) | | | | | |
| SAS-1 | 2121-D | 2121-D | SKSK-3 | 2121-D | 2121-D |
| SAS-1 | 2541-7 | 2121-D | SKSK-3 | 2121-D | 2121-D |

| | 235 | | | 236 | |
|---|---|---|---|---|---|
| SAS-1 | 2121-D | 2121-8 | SKSK-3 | 2121-D | 2121-D |
| LSAK-5 | 2121-D | 2121-D | SKSK-3 | 2121-D | 2121-D |
| LSAK-5 | 2121-D | 2121-8 | SKSK-3 | 2121-D | 2121-D |
| SKAK-SE | 2121-D | 2121-D | SKSK-3 | 2121-D | 2121-D |
| LSLS-SI | 2121-D | 2121-D | SKSK-3 | 2121-D | 2121-D |
| LSLS-SI | 2121-D | 2121-8 | SKSK-3 | 2121-D | 2121-D |

---

| | | | | | |
|---|---|---|---|---|---|
| ALS-4 | 141-V | 1451-V | ALS-4 | 141-V | 1451-V |
| ALS-4 | 141-V | 1451-7 | ALS-4 | 141-V | 1451-V |
| ALS-4 | 141-V | 21421-Z | ALS-4 | 141-V | 1451-V |
| ALS-4 | 141-V | 1-E | ALS-4 | 141-V | 1451-V |
| ALS-4 | 141-V | 21-0 | ALS-4 | 141-V | 1451-V |
| ALS-4 | 141-V | 142-6 | ALS-4 | 141-V | 1451-V |
| ALS-4 | 141-V | 2121-D | ALS-4 | 141-V | 1451-V |
| ALS-4 | 2121-D | 1451-V | ALS-4 | 141-V | 1451-V |
| ALS-4 | 141-E | 1451-V | ALS-4 | 141-V | 1451-V |
| ALS-4 | 1412-Z | 1451-V | ALS-4 | 141-V | 1451-V |
| ALS-4 | 1241-9 | 1451-V | ALS-4 | 141-V | 1451-V |
| ALS-4 | 1241-9 | 1-E | ALS-4 | 141-V | 1451-V |
| ALS-4 | 1212-8 | 1451-V | ALS-4 | 141-V | 1451-V |
| ALS-4 | 12-0 | 1451-V | ALS-4 | 141-V | 1451-V |

:Gefahr bei 9(:Danger at 9)

| | | | | | |
|---|---|---|---|---|---|
| ALS-4 | 1241-9 | 21-0 | ALS-4 | 141-V | 1451-V |
| ALS-4 | 1241-9 | 1451-7 | ALS-4 | 141-V | 1451-V |

:Gefahr bei 9(:Danger at 9)

| | | | | | |
|---|---|---|---|---|---|
| :ALS-4 | 1241-9 | 1-E | ALS-4 | 141-V | 1451-V |
| ALS-4 | 12152-F | 1451-V | ALS-4 | 141-V | 1451-V |
| KAK-0 | 141-V | 1451-V | ALS-4 | 141-V | 1451-V |
| KAK-0 | 1241-9 | 1451-V | ALS-4 | 141-V | 1451-V |
| KASL-2 | 141-V | 1451-V | ALS-4 | 141-V | 1451-V |
| SKAK-SE | 141-V | 1451-V | ALS-4 | 141-V | 1451-V |

---

| | | | | | |
|---|---|---|---|---|---|
| LSAK-5 | 12152-F | 1421-F | LSAK-5 | 12152-F | 1421-F |
| LSAK-5 | 12152-F | 142-6 | LSAK-5 | 12152-F | 1421-F |
| LSAK-5 | 1241-9 | 1421-F | LSAK-5 | 12152-F | 1421-F |
| LSAK-5 | 1241-9 | 1421-F | LSAK-5 | 12152-F | 1421-F |
| LSAK-5 | 141-V | 1421-F | LSAK-5 | 12152-F | 1421-F |
| SAS-1 | 12152-F | 1421-F | LSAK-5 | 12152-F | 1421-F |
| KASL-2 | 12152-F | 1421-F | LSAK-5 | 12152-F | 1421-F |
| KASL-2 | 12152-F | 2121-D | LSAK-5 | 12152-F | 1421-F |
| KASL-2 | 12152-F | 1421-F | LSAK-5 | 12152-F | 1421-F |

|  | 237 | | | 238 | |
|---|---|---|---|---|---|
| SKSK-3 | 12152-F | 1421-F | LSAK-5 | 12152-F | 1421-F |
| SKSK-3 | 12152-F | 142-6 | LSAK-5 | 12152-F | 1421-F |
| LSLS-SI | 12152-F | 1421-F | LSAK-5 | 12152-F | 1421-F |
| SKAK-SE | 12-6 | 142-6 | SKAK-SE | 12-6 | 142-6 |
| SKAK-SE | 12-6 | 1421-F | SKAK-SE | 12-6 | 142-6 |
| SKAK-SE | 12-6 | 142-6 | SKAK-SE | 12-6 | 142-6 |
| SKAK-SE | 12-0 | 142-6 | SKAK-SE | 12-6 | 142-6 |
| SKAK-SE | 12-0 | 1421-F | SKAK-SE | 12-6 | 142-6 |
| SKAK-SE | 1212-8 | 142-6 | SKAK-SE | 12-6 | 142-6 |
| :Gefahr bei 4(:Danger at 4) | | | | | |
| SKAK-SE | 12-0 | 1451-V | SKAK-SE | 12-6 | 142-6 |
| SKAK-SE | 141-V | 1421-F | SKAK-SE | 12-6 | 142-6 |
| SKAK-SE | 141-V | 142-6 | SKAK-SE | 12-6 | I42-6 |
| KASL-2 | 12-6 | 142-6 | SKAK-SE | 12-6 | 142-6 |
| KASL-2 | 12-0 | 142-6 | SKAK-SE | 12-6 | 142-6 |
| KASL-2 | 12-0 | 1421-F | SKAK-SE | 12-6 | 142-6 |
| KASL-2 | 12-6 | 1421-F | SKAK-SE | 12-6 | 142-6 |
| KASL-2 | 12-6 | 1451-V | SKAK-SE | 12-6 | 142-6 |
| KASL-2 | 12-0 | 1451-V | SKAK-SE | 12-6 | 142-6 |
| KASL-2 | 12-6 | 1421-F | SKAK-SE | 12-6 | 142-6 |
| KASL-2 | 12-0 | 1421-F | SKAK-SE | 12-6 | 142-6 |
| SKSK-3 | 12-6 | 1421-F | SKAK-SE | 12-6 | 142-6 |
| SKSK-3 | 12-0 | 1421-F | SKAK-SE | 12-6 | 142-6 |
| SKSK-3 | 12-6 | 142-6 | SKAK-SE | 12-6 | 142-6 |
| SKSK-3 | 12-0 | 142-6 | SKAK-SE | 12-6 | 142-6 |
| SKSK-3 | 12-6 | 1421-F | SKAK-SE | 12-6 | 142-6 |
| SKSK-3 | 12-0 | 1421-F | SKAK-SE | 12-6 | 142-6 |
| SKSK-3 | 12-0 | 1451-V | SKAK-SE | 12-6 | 142-6 |
| SKSK-3 | 12-6 | 1421-F | SKAK-SE | 12-6 | 142-6 |
| SKSK-3 | 12-0 | 1421-F | SKAK-SE | 12-6 | 142-6 |
| LSAK-5 | 12-6 | 1421-F | SKAK-SE | 12-6 | 142-6 |
| LSAK-5 | 12-0 | 1421-F | SKAK-SE | 12-6 | 142-6 |
| LSLS-SI | 2541-7 | 1451-7 | LSLS-SI | 2541-7 | 1451-7 |
| LSLS-SI | 2541-7 | 1-E | LSLS-SI | 2541-7 | 1451-7 |
| LSLS-SI | 2541-7 | 21-0 | LSLS-SI | 2541-7 | 1451-7 |
| LSLS-SI | 1412-Z | 1-E | LSLS-SI | 2541-7 | 1451-7 |
| LSLS-SI | 2541-7 | 1421-F | LSLS-SI | 2541-7 | 1451-7 |
| SAS-1 | 2541-7 | 1451-7 | LSLS-SI | 2541-7 | 1451-7 |
| SAS-1 | 2541-7 | 21-0 | LSLS-SI | 2541-7 | 1451-7 |

239 240

| | | | | | |
|---|---|---|---|---|---|
| LSLS-SI | 2541-7 | 1451-V | LSLS-SI | 2541-7 | 1451-7 |
| LSLS-SI | 1412-Z | 21-0 | LSLS-SI | 2541-7 | 1451-7 |

---

| | | | | | |
|---|---|---|---|---|---|
| KAKAK-AC | 1212-8 | 2121-8 | KAKAK-AC | 1212-8 | 2121-8 |
| KAKAK-AC | 1212-8 | 21421-Z | KAKAK-AC | 1212-8 | 2121-8 |
| KAKAK-AC | 12-0 | 2121-8 | KAKAK-AC | 1212-8 | 2121-8 |
| KAKAK-AC | 12-0 | 2121-D | KAKAK-AC | 1212-8 | 2121-8 |
| KAKAK-AC | 1212-8 | 142-6 | KAKAK-AC | 1212-8 | 2121-8 |

:raus.Streit mit 0(:out.Conflict with 0)

| | | | | | |
|---|---|---|---|---|---|
| :KAKAK-AC | 1212-8 | 21-0 | KAKAK-AC | 1212-8 | 2121-8 |
| KAKAK-AC | 1212-8 | 2121-D | KAKAK-AC | 1212-8 | 2121-8 |
| KAKAK-AC | 141-V | 2121-8 | KAKAK-AC | 1212-8 | 2121-8 |
| KAKAK-AC | 141-V | 2121-D | KAKAK-AC | 1212-8 | 2121-8 |
| KAKAK-AC | 12-6 | 2121-D | KAKAK-AC | 1212-8 | 2121-8 |
| KAKAK-AC | 2121-D | 2121-D | KAKAK-AC | 1212-8 | 2121-8 |
| KAKAK-AC | 1212-8 | 21421-Z | KAKAK-AC | 1212-8 | 2121-8 |
| KAKAK-AC | 1412-Z | 21-9 | KAKAK-AC | 1212-8 | 2121-8 |
| KAKAK-AC | 2541-7 | 2121-D | KAKAK-AC | 1212-8 | 2121-8 |

:geht nicht wegen 9(:not possible reason 9)

| | | | | | |
|---|---|---|---|---|---|
| :KAKAK-AC | 12152-F | 2121-D | KAKAK-AC | 1212-8 | 2121-8 |

:0/13  V/27

| | | | | | |
|---|---|---|---|---|---|
| KAK-0 | 141-V | 2121-D | KAKAK-AC | 1212-8 | 2121-8 |
| KAK-0 | 12152-F | 2121-D | KAKAK-AC | 1212-8 | 2121-8 |
| KAK-0 | 1212-8 | 2121-8 | KAKAK-AC | 1212-8 | 2121-8 |
| KAK-0 | 1212-8 | 2121-D | KAKAK-AC | 1212-8 | 2121-8 |
| KAK-0 | 1212-8 | 1421-F | KAKAK-AC | 1212-8 | 2121-8 |
| KAK-0 | 1412-Z | 2121-D | KAKAK-AC | 1212-8 | 2121-8 |
| LSAK-5 | 1212-8 | 2121-8 | KAKAK-AC | 1212-8 | 2121-8 |
| LSAK-5 | 1212-8 | 142-6 | KAKAK-AC | 1212-8 | 2121-8 |
| LSAK-5 | 1212-8 | 2121-D | KAKAK-AC | 1212-8 | 2121-8 |
| LSAK-5 | 1412-Z | 2121-D | KAKAK-AC | 1212-8 | 2121-8 |
| SKAK-SE | 12-6 | 2121-8 | KAKAK-AC | 1212-8 | 2121-8 |
| SKAK-SE | 1212-8 | 2121-D | KAKAK-AC | 1212-8 | 2121-8 |
| SKAK-SE | 1412-Z | 2121-D | KAKAK-AC | 1212-8 | 2121-8 |

---

| | | | | | |
|---|---|---|---|---|---|
| KAKS-9 | 1241-9 | 21-9 | KAKS-9 | 1241-9 | 21-9 |
| KAKS-9 | 1241-9 | 2121-D | KAKS-9 | 1241-9 | 21-9 |
| KAKS-9 | 1241-9 | 2121-8 | KAKS-9 | 1241-9 | 21-9 |
| KAKS-9 | 1241-9 | 21-0 | KAKS-9 | 1241-9 | 21-9 |
| KAKS-9 | 1241-9 | 1451-7 | KAKS-9 | 1241-9 | 21-9 |
| KAKS-9 | 141-V | 21-9 | KAKS-9 | 1241-9 | 21-9 |

241 242

| | | | | | |
|---|---|---|---|---|---|
| KAKS-9 | 141-V | 2121-D | KAKS-9 | 1241-9 | 21-9 |
| KAKS-9 | 141-V | 21-0 | KAKS-9 | 1241-9 | 21-9 |
| KAKS-9 | 141-V | 1451-7 | KAKS-9 | 1241-9 | 21-9 |
| KAKS-9 | 141-V | 2121-D | KAKS-9 | 1241-9 | 21-9 |
| SAS-1 | 1241-9 | 21-9 | KAKS-9 | 1241-9 | 21-9 |
| SAS-1 | 1241-9 | 2121-D | KAKS-9 | 1241-9 | 21-9 |
| SAS-1 | 1241-9 | 2121-8 | KAKS-9 | 1241-9 | 21-9 |
| SAS-1 | 1241-9 | 21-0 | KAKS-9 | 1241-9 | 21-9 |
| SAS-1 | 1241-9 | 1451-7 | KAKS-9 | 1241-9 | 21-9 |
| SAS-1 | 141-V | 21-9 | KAKS-9 | 1241-9 | 21-9 |
| SAS-1 | 141-V | 2121-D | KAKS-9 | 1241-9 | 21-9 |
| SAS-1 | 12152-F | 2121-D | KAKS-9 | 1241-9 | 21-9 |
| SAS-1 | 141-V | 2121-8 | KAKS-9 | 1241-9 | 21-9 |
| SAS-1 | 141-V | 21-0 | KAKS-9 | 1241-9 | 21-9 |
| :raus wegen 4(:out reason 4) | | | | | |
| :SAS-1 | 141-V | 1451-7 | KAKS-9 | 1241-9 | 21-9 |
| LSAK-5 | 1241-9 | 21-9 | KAKS-9 | 1241-9 | 21-9 |
| LSAK-5 | 1241-9 | 2121-D | KAKS-9 | 1241-9 | 21-9 |
| LSAK-5 | 1241-9 | 2121-8 | KAKS-9 | 1241-9 | 21-9 |
| LSAK-5 | 1241-9 | 21-0 | KAKS-9 | 1241-9 | 21-9 |
| LSAK-5 | 1241-9 | 1451-7 | KAKS-9 | 1241-9 | 21-9 |
| LSAK-5 | 141-V | 21-9 | KAKS-9 | 1241-9 | 21-9 |
| LSAK-5 | 141-V | 2121-D | KAKS-9 | 1241-9 | 21-9 |
| LSAK-5 | 141-V | 2121-8 | KAKS-9 | 1241-9 | 21-9 |
| LSAK-5 | 141-V | 21-0 | KAKS-9 | 1241-9 | 21-9 |
| LSAK-5 | 141-V | 1451-7 | KAKS-9 | 1241-9 | 21-9 |
| LSLS-SI | 1241-9 | 21-9 | KAKS-9 | 1241-9 | 21-9 |
| LSLS-SI | 1241-9 | 2121-D | KAKS-9 | 1241-9 | 21-9 |
| LSLS-SI | 1241-9 | 2121-8 | KAKS-9 | 1241-9 | 21-9 |
| :nicht moeglich wegen 7(:not possible reason 7) | | | | | |
| :LSLS-SI | 1241-9 | 21-0 | KAKS-9 | 1241-9 | 21-9 |
| LSLS-SI | 141-V | 21-9 | KAKS-9 | 1241-9 | 21-9 |
| LSLS-SI | 141-V | 2121-D | KAKS-9 | 1241-9 | 21-9 |
| LSLS-SI | 141-V | 21-0 | KAKS-9 | 1241-9 | 21-9 |
| KAKAK-AC | 1241-9 | 2121-9 | KAKS-9 | 1241-9 | 21-9 |
| KAKAK-AC | 1241-9 | 2121-D | KAKS-9 | 1241-9 | 21-9 |
| KAKAK-AC | 1241-9 | 2121-8 | KAKS-9 | 1241-9 | 21-9 |
| KAKAK-AC | 1241-9 | 2121-0 | KAKS-9 | 1241-9 | 21-9 |
| KAKAK-AC | 1241-9 | 1451-7 | KAKS-9 | 1241-9 | 21-9 |
| KAKAK-AC | 141-V | 2121-9 | KAKS-9 | 1241-9 | 21-9 |
| KAKAK-AC | 141-V | 2121-D | KAKS-9 | 1241-9 | 21-9 |

243

| | | | 244 | | |
|---|---|---|---|---|---|
| KAKAK-AC | 141-V | 2121-8 | KAKS-9 | 1241-9 | 21-9 |
| KAKAK-AC | 141-V | 2121-0 | KAKS-9 | 1241-9 | 21-9 |
| KAKAK-AC | 141-V | 1451-7 | KAKS-9 | 1241-9 | 21-9 |
| | | | | | |
| SKSK-3 | 1241-9 | 21-9 | KAKS-9 | 1241-9 | 21-9 |
| SKSK-3 | 1241-9 | 2121-D | KAKS-9 | 1241-9 | 21-9 |
| SKSK-3 | 1241-9 | 2121-8 | KAKS-9 | 1241-9 | 21-9 |
| SKSK-3 | 1241-9 | 21-0 | KAKS-9 | 1241-9 | 21-9 |
| SKSK-3 | 1241-9 | 1451-7 | KAKS-9 | 1241-9 | 21-9 |
| SKSK-3 | 141-V | 21-9 | KAKS-9 | 1241-9 | 21-9 |
| SKSK-3 | 141-V | 2121-D | KAKS-9 | 1241-9 | 21-9 |
| SKSK-3 | 141-V | 2121-8 | KAKS-9 | 1241-9 | 21-9 |
| SKSK-3 | 141-V | 21-0 | KAKS-9 | 1241-9 | 21-9 |
| SKSK-3 | 141-V | 1451-7 | KAKS-9 | 1241-9 | 21-9 |
| | | | | | |
| KAKS-9 | 1241-9 | 1-E | KAKS-9 | 1241-9 | 21-9 |
| KAKS-9 | 1241-9 | 1451-V | KAKS-9 | 1241-9 | 21-9 |
| | | | | | |
| KAKS-9 | 12152-F | 21-9 | KAKS-9 | 1241-9 | 21-9 |
| KAKS-9 | 12152-F | 2121-D | KAKS-9 | 1241-9 | 21-9 |
| KAKS-9 | 12152-F | 21-0 | KAKS-9 | 1241-9 | 21-9 |
| KAKS-9 | 1412-Z | 21-9 | KAKS-9 | 1241-9 | 21-9 |
| KAKS-9 | 1412-Z | 2121-D | KAKS-9 | 1241-9 | 21-9 |
| KAKS-9 | 1412-Z | 21-0 | KAKS-9 | 1241-9 | 21-9 |
| KAKS-9 | 12-0 | 21-9 | KAKS-9 | 1241-9 | 21-9 |
| KAKS-9 | 1241-9 | 1421-F | KAKS-9 | 1241-9 | 21-9 |
| KAKS-9 | 1241-9 | 2121-D | KAKS-9 | 1241-9 | 21-9 |
| LSAK-5 | 1241-9 | 1-E | KAKS-9 | 1241-9 | 21-9 |
| LSAK-5 | 1412-Z | 1421-F | KAKS-9 | 1241-9 | 21-9 |
| :LSAK-5 | 12152-F | 21-9 | KAKS-9 | 1241-9 | 21-9 |
| :LSLS-SI | 12152-F | 2121-D | KAKS-9 | 1241-9 | 21-9 |
| LSLS-SI | 1412-Z | 2121-D | KAKS-9 | 1241-9 | 21-9 |
| LSLS-SI | 1412-Z | 21-9 | KAKS-9 | 1241-9 | 21-9 |
| LSLS-SI | 1241-9 | 21421-Z | KAKS-9 | 1241-9 | 21-9 |
| LSLS-SI | 12152-F | 1451-V | KAKS-9 | 1241-9 | 21-9 |
| KAKAK-AC | 12152-F | 21-0 | KAKS-9 | 1241-9 | 21-9 |
| KAKAK-AC` | 12152-F | 2121-D | KAKS-9 | 1241-9 | 21-9 |

: ----------------------------------------------------------------

APPENDIX I

LOGTAB.C

```
1    /*
2    **    logtab.c
3    **        functions to combine the results of the
4    **        recognition-process for every point of view
5    **
6    */
7
8    #include <z_erk.h>
9
10   #define TRENNER(SPLIT) '%'
11
12
13   struct logtab
14   {
15           char *  gstr ;
16           char *  vstr ;
17           char *  hstr ;
18           char *  glstr ;
19           char *  vlstr ;
20           char *  hlstr ;
21   } ;
22
23   /*
24   **    logtab_ein
25   **        read the table form the disk to the memory
26   */
27   struct logtab * logtab_ein(char * datei)
28   {
29           FILE *  fp ;
30           struct logtab *  log ;
31           int              n = 0 ;
32           char        s[88] ;
33           char *      ps ;
34           int                     lines=0;
35           int             synfehler(syn error) = 0;
36
37           if (debug > 99)
38                   printf("logtab_ein: anfang(start): %ld\n",
       farcoreleft()) ;
39
40           log = farmalloc(sizeof(struct logtab) * (line_count(datei)+1) )
```

```
41  /*       log = farmalloc(sizeof(struct logtab) * 100) ; */
42
43           if (debug > 99)
44                   printf("logtab : %p\n",log) ;
45
46           fp = fopen(datei,"r") ;
47           if (fp == NULL(ZERO))
48           {
49                   free(log);
50                   return(NULL(ZERO)) ;
51           }
52
53           while (fgets(s,sizeof(s),fp) && log)
54           {
55                   (log+n->gstr = NULL(ZERO);
56                   (log+n->vstr = NULL(ZERO);
57                   (log+n->hstr = NULL(ZERO);
58                   (log+n->glstr = NULL(ZERO);
59                   (log+n->vlstr = NULL(ZERO);
60                   (log+n->hlstr = NULL(ZERO);
61                   ps = strtok(s," \n\t") ;
62                   if (ps && *ps!='%' && *ps != ':'
63                   {
64                           (log+n)->gstr = strdup(ps) ;
65                           if (ps = strtok(NULL," \n\t"));
66                                   (log+n)->vstr = strdup(ps) ;
67                           if (ps = strtok(NULL," \n/t"));
68                                   (log+n)->hstr = strdup(ps) ;
69                           if (ps = strtok(NULL," \n\t"));
70                                   (log+n)->glstr = strdup(ps) ;
71                           if (ps = strtok(NULL," \n\t"));
72                                   (log+n)->vlstr = strdup(ps) ;
73                           if (ps = strtok(NULL," \n\t"));
74                                   (log+n)->hlstr = strdup(ps) ;
75                           n++;
76                   }
77
78           }
79           fclose(fp) ;
80
```

```
 81         if (debug > 99)
 82                 printf("logtab_ein: ende(a: end:): %ld\n",
    farcoreleft()) ;
 83         return(log) ;
 84  }
 85
 86
 87  /*
 88  **   logum
 89  **      converting
 90  */
 91
 92  int logum(struct logtab * log, char ** g, char ** v, char ** h)
 93  {
 94  int n = 0;
 95         while(((log+n)->gstr))
 96            {
 97                 if (logcmp(*g,(log+n)->gstr) == 0 || *((log+n)->gstr)
    == TRENNER(SPLIT))
 98                         if (logcmp(*v,(log+n)->vstr) == 0 ||
    *((log+n)->vstr) == TRENNER(SPLIT))
 99                                 if (logcmp(*h,(log+n)-
    >hstr) == 0 || *((log+n)->hstr) == TRENNER(SPLIT))
100                                    {
101                                        if (
    *((log+n)->glstr) != TRENNER(SPLIT))
102
        *g = (log+n)->glstr;
103                                        if (
    *((log+n)->vlstr) != TRENNER(SPLIT))
104
        *v = (log+n)->vlstr;
105                                        if (
    *((log+n)->hlstr) != TRENNER(SPLIT))
106
        *h = (log+n)->hlstr;
107
    return(1);
108                                    }
109                 n++;
110            }
```

```
111             return(0);
112     }
113
114     int logcmp(char * s1, char * s2)
115     {
116             while(*s1 && *s2 && *s1 != '/' && *s2 != '/')
117             {
118                     if (*s1 != *s2)
119                     {
120                             if (*s1 < *s2)
121                                     return(-1);
122                             else
123                                     return(1);
124                     }
125                     s1++;
126                     s2++;
127             }
128             /* Jetzt kommt die Auschluβnummer(now comes the exclusion
        number) */
129             if (*s2 == '/')
130             {
131                     while(*s1 && *s2)
132                     {
133                             if( *s1 != *s2)
134                                     return(1);
135                             s1++;
136                             s2++;
137                     }
138                     return(0);
139             }
140
141             if(*s1 == *s2 || *s1 == '/')
142                     return(0);
143             else
144                     return(s);
145     }
146
```

APPENDIX J

ERK.C

```
1       /*
```

```
2     **   erk.c
3     **        recognize a number from a pixelpattern
4     */
5
6     #include    <z_erk.h>
7
8     static int raus ;
9
10    static FILE * g_fp ;
11    static FILE * v_fp ;
12    static FILE * h_fp ;
13    static FILE * x_fp ;
14
15    static struct erktab * e_erg ;
16    static struct erktab * e_erv ;
17    static struct erktab * e_erh ;
18    static struct erktab * e_erx ;
19    static void *          p_um_g ;
20    static void *          p_um_v ;
21    static void *          p_um_h ;
22    static struct logtab * p_log ;
23
24
25    /*
26    **   kenn_init
27    **        initialize the recognition process
28    */
29    int     kenn_init(int argc, char *argv[])
30    {
31            int    fehler(error) = 0 ;
32
33            if (getenv("RAUS"))
34                    raus(out) = atoi(getenv("RAUS")) ;
35
36            erk_ftext = "" ;
37
38            /*** Options abgrasen(scan) ***/
39            all_options(argc,argv) ;
40
41            /*** Parameter einlesen(read in parameter) ***/
42            if (parm_ein("0011.spa") <0)
```

```
43              {
44                      if (parm_ein("parm.tab") <0)
45                      {
46                              erk_ftext = "Parameterdateifahle"(parameter
    file is missing(missing)) ;
47                              fehler(error(fault)) = 1;
48                      }
49              }
50
51              if (debug) > 99)
52                      fprint(stderr,"Parameter eingelesen("Parameter read
    in") \n";
53              else
54                      fprintf(stderr,".") ;
55
56              /*** Tabellen einlesen(Tables read in) ***/
57              if ((p_um_g=umtab_ein("*0012.sug")) == NULL(ZERO))
58              {
59                      if ((p_um_g=umtab_ein("umsetz-g.tab")) == NULL(ZERO))
60                      {
61                              erk_ftext = "Umsetztabelle G fehlt"("Transorm
    table G missing") ;
62                              fehler(error) = 1 ;
63                      }
64              }
65
66              if ((p_um_v=umtab_ein("0013.suv")) == NULL(ZERO))
67              {
68                      if ((p_um_v=umtab_ein("umsetz-v.tab:)) == NULL(ZERO))
69                      {
70                              erk_ftext = "Umsetztabelle V fehlt"("Transform
    table V missing") ;
71                              fehler(error) = 1 ;
72                      }
73              }
74
75              if ((p_um_h=umtab_ein("0014.suh")) == NULL(ZERO))
76              {
77                      if ((p_um_h=umtab_ein("umsetz-h.tab")) == NULL(ZERO))
78                      {
79                              erk_ftext = "Umsetztabelle H fehlt"("Transform
```

```
                          table H missing") ;
80                            fehler(error) = 1 ;
81                        }
82                    }
83
84            if (debug > 99)
85                    fprintf(stderr,"Umsetztabellen eingelesen\n"("Transform
      tables read in") '
86            else
87                    fprintf(stderr,".") ;
88
89
90            if ((p_log=logtab_ein("0015.slt")) == NULL(ZERO))
91            {
92                    if ((p_log=logtab_ein("log.tab")) == NULL)
93                    {
94                            erk_ftext = "Fehler bei log.tab"
      (Error(fault))
95                            fehler(error) = 1   ;
96                    }
97            }
98
99            if (debug > 99)
100                   fprintf(stderr,"Logtabelle eingelesen/n"(log table read
      in)) ;
101           else
102                   fprintf(stderr,".") ;
103
104           if(zaehlen(counting))
105           {
106                   gzum_ptr = p_um_g;
107                   vzum_ptr = p_um_v;
108                   hzum_ptr = p_um_h;
109           }
110
111
112           if (fehler(error))
113                   return(-1) ;
114           else
115                   return(0) ;
116     }
```

```
117
118     /*
119     **   kenn_do
120     **       recognize a numer
121     **   Ergebnis(result)
122     **       '0' ... '('        die Zahl(the number)
123     **       '*'                nichts zu erkennen(nothing recognized(found))
124     **       '?'                zweideutig (ambiguous(not clear))
125     **       -1                 fataler Fehler(fatal error(big mistake))
126     */
127     int     kenn_do(int xmin, int ymin, int xmax, int ymax, int art)
128     {
129             int     ss, kk, ll, pp , oo ;
130             char *  kz_g ;
131             char *  kz_v ;
132             char *  kz_h ;
133             char *  kz_x ;
134             char    kz_8[100] ;
135             int     iges[ERK_ANZ] ;
136             int     isum[ERK_ANZ] ;
137             int     igesmax ;
138             int     isummax ;
139             int     result = '*' ;
140             int     *pig, *piv, *pih, *pix, *pi8 ;
141             float   schnitt ;
142             int     i ;
143             int     lim_save ;
144             int                 j0, j8, streit_0_8 = 0;
145             int                 ix[ERK_ANZ] ;
146             int                 i8[ERK_ANZ] ;
147             int                 loch_wert ;
148             int                 flag = 0;
149             char                *logptrg;
150             char                *logptrv;
151             char                *logptrh;
152
153             /*** evt. anzeigen(possibly show) ***/
154             if (view)
155                     view_pix(xmin,ymin,xmax,ymax,0) ;
156
157             /*** Glaettung und Ausduennung(smoothing and stretching (or
``` thinning)) ***/

```
158             lim_pix(&xmin,&ymin,&ymax,&ymax) ;
159             for (i=0 ; i<anz_glatt ; i++)
160                     glatt_pix(xmin,ymin,xmax,ymax) ;
161             if (duenn)
162                     duenn_pix(xmin,ymin,xmax,ymax) ;
163             else
164                     glatt_ou(xmin,ymin,xmax,ymax) ;
165             lim_pix(&xmin,&ymin,&xmax,&ymax) ;
166
167             /*** evt. nochmal anzeigen(possibly show once more) ***/
168             if (view)
169             {
170                     view_pix(xmin,ymin,xmax,ymax,320) ;
171                     _settextwindow(13,1,25,80) ;
172             }
173
174             /*** Gruppen machen(Form groups) / Kennziffern ausrechnen
    (calculate identification numbers) ***/
175             grp_make(xmin,ymin,xmax,ymax) ;
176
177             schnitt = grp_schnitt(&ss,&kk,&ll,&pp,&oo) ;
178             grp_loch_fass() ;
179             kz_g = kenn_g(p_um_g) ;
180
181             if (kz_g != NULL(ZERO))
182                     grp_zeile(line or row)_fass() ;
183
184             if (kz_g != NULL(ZERO))
185             {
186                     kz_v = kenn_v(p_um_v,pp,ymin,ymax) ;
187                     if (kz_v != NULL)
188                     {
189                             kz_h = kenn_h(p_um_h,pp,ymin,ymax) ;
190                             if (kz_h != NULL(ZERO))
191                             {
192                                     /*** versuch verbind ung zwischen
    gruppen und kanten herzustellen(attempt to get connection between groups
    and boundaries (borders)) ***/
193                                     logum(p-log,&kz_g,&kz_v,&kz_h);
194                             }
```

```
195                         else
196                         {
197                                 if (extrem)
198                                         extrem = -1;
199                                 return('*');
200                         }
201                 }
202                 else
203                 {       if (extrem)
204                                 extrem = -1;
205                         return('*';
206                 }
207
208         }
209         else
210         {
211                 if (extrem)
212                         extrem = -1;
213                 return('*');
214         }
215
216         if (debug)
217         {
218                 /*** Teilergebnisse anzeigen(indicate partial results) ***/
219                 printf("H  :%s\n",kz_g) ;
220                 printf("I  :%s\n",kz_v) ;
221                 printf("J  :%s\n",kz_h) ;
222         }
223
224
225         if (strichcmp(kz_g,"KAK-0") == 0)
226         {
227                 if (strichcmp(kz_v,"12-0") == 0)
228                 {
229                         if (strichcmp(kz_h,"21-0") == 0)
230                         {
231                                 grp_free();
232                                 if (musik)
233                                         ton(0<<4,5);
234                                 return('0') ;
```

```
235                         }
236                 }
237         }
238
239         if (strichcmp(kz_g,"SAS-1") == 0)
240         {
241                 if (strichcmp(kz_v,"141-E") == 0)
242                 {
243                         if(strichcmp(kz_h,"1-E") == 0)
244                         {
245                                 grp_free();
246                                 if (musik(music))
247                                         ton(tone)(1<<4,5);
248                                 return('1') ;
249                         }
250                 }
251         }
252
253         if (strichcmp(kz_g,"KASL-2") == 0)
254         {
255                 if (strichcmp(kz_v,"1412-Z") == 0)
256                 {
257                         if (strichcmp(kz_h,"21421-Z") == 0)
258                         {
259                                 grp_free();
260                                 if (musik(music))
261                                         ton(tone)(2<<4,5);
262                                 return('2') ;
263                         }
264                 }
265         }
266
267         if (strichcmp(kz_g,"sksk-3") == 0)
268         {
269                 if (strichcmp(kz_v,"2121-D") == 0)
270                 {
271                         if (strichcmp(kz_h,"2121-D") == 0)
272                         {
273                                 grp_free();
274                                 if (musik(music))
275                                         ton(tone)(3<<4,5);
```

```
276                                       return('3') ;
277                                   }
278                               }
279                       }
280
281           if (strichcmp(kz_g,"ALS-4") == 0)
282           {
283                   if (strichcmp(kz_v,"141-V") == 0)
284                   {
285                           if (strichcmp(kz-h,"1451-V") == 0)
286                           {
287                                   grp_free();
288                                   if (musik(music))
289                                           ton(tone)(4<<4,5);
290                                   return('4') ;
291                           }
292                   }
293           }
294
295           if (strichcmp(kz_g,"LSAK-5")  == 0)
296           {
297                   if (strichcmp(kz_v,"12152-F") == 0)
298                   {
299                           if (strichcmp(kz_h,"1421-F") == 0)
300                           {
301                                   grp_free();
302                                   if (musik(music))
303                                           ton(tone)(5<<4,5);
304                                   return('5') ;
305                           }
306                   }
307           }
308
309           if (strichcmp(kz_g,"LSAK-5") == 0)
310           {
311                   if (strichcmp(kz_v,"12152-F") == 0)
312                   {
313                           if (strichcmp(kz_h,"1421-F") == 0)
314                           {
315                                   grp_free();
316                                   if (musik(music))
```

```
                                        ton(tone)(5<<4,5);
                                return('5') ;
                        }
                }
        } if (strichcmp(kz_g,"SKAK-SE") -- 0)
        {
                if (strichcmp(kz_v,"12-6") == 0)
                {
                        if (strichcmp(kz_h,"142-6") == 0)
                        {
                                grp_free();
                                if (musik(music))
                                        ton(tone)(6<<4,5);
                                return('6') ;
                        }
                }
        } if (strichcmp(kz_g,"LSLS-SI") == 0)
        {
                if (strichcmp(kz_v,"2541-7") == 0)
                {
                        if (strichcmp(kz_h,"1451-7") == 0)
                        {
                                grp_free();
                                if (musik(music))
                                        ton(tone)(7<<4,5)
                                return('7') ;
                        }
                }
        } if (strichcmp(kz_g,"KAKAK-AC") == 0)
        {
                if (strichcmp(kz_v,"1212_8") == 0)
                {
                        if (strichcmp(kz_h,"2121-8") == 0)
                        {
                                grp_free();
```

```
                                if (musik(music))
                                        ton(tone)(8<<4,5);
                                return('8') ;
                        }
                }
        } if (strichcmp(kz_g,"KAKS-9") == 0)
        {
                if (strichcmp(kz_v,"1241-9") == 0)
                {
                        if (strichcmp(kz_h,"21-9") == 0)
                        {
                                grp_free();
                                if (musik(music))
                                        ton(tone)(9<<4,5);
                                return('9') ;
                        }
                }
        } if (extrem )
                extrem = -1;

/*** Feierabend(end of day) ***/
        grp_free() ;
        return('?';

} int strichcmp(char * s1, char * s2)
{
        while(*s1 && *s2 && *21 != '/' && *s2 != '/')
        {
                if (*s1 != *s2)
                {
```

```
399                    if (*s1 < *s2)
400                            return(-1);
401                    else
402                            return(1);
403            }
404            s1++;
405            s2++;
406    }
407    if(*s1 == *s2 || *s1 == '/' || *s2 == '/')
408            return(0);
409    else
410            return(2);
411 }
```

I claim:

1. The method of character recognition of characters in a set of characters in which a pattern of pixels in adjacent rows corresponding to the character is provided, which method comprises the steps of encoding the pattern of pixels into a plurality of first strings of digital signals having values dependent upon the shape of a pattern in accordance with the movement of edges of the pattern measured by the relative displacement of the pixels in the adjacent rows to each other to represent the spatial relationship including the connectivity and direction of neighboring ones of said pixels as viewed from a plurality of aspects, translating said first strings into a plurality of second strings of digital signals each representing a different aspect of the different characters in said set such that variations in the shape of the pattern of the same character are included in said second strings, and recognizing the pattern as representing a character in the set when said second strings constitute a combination of second strings corresponding to that character.

2. The method according to claim 1 wherein said recognizing step is carried out by relating said pluralities of second strings to pluralities of third strings which correspond to characters in said set, and recognizing a character in said set when said second strings are related to a plurality of said third strings which correspond to that character.

3. The method according to claim 2 further comprising the step of obtaining said patterns by scanning a page containing said characters to generate said pixels in rows and columns of a matrix in rectangular coordinates, allocating said pixels to different addresses in a memory, selecting different addresses containing pixels for each character to be recognized thereby including each character to be recognized in a frame, and adjusting the coordinates of said frame to compensate for skew of the page while it is being scanned.

4. The method according to claim 1 wherein prior to said encoding step, the step of arranging said pattern and memory in a matrix having rectangular (x and y coordinates) is first carried out.

5. The method according to claim 4 including the step of thresholding said pixels to represent each pixel which has a value greater than a certain value as a single bit representing the presence of a pixel in said pattern.

6. The method according to claim 4 further comprising the step of thinning said pattern in said memory so that it contains data representing pixels along the center line of said pattern.

7. The method according to claim 6 wherein said matrix contains rows and columns along the x and y coordinates thereof, respectively, and said aspects are views of the top, right and left sides of said pattern, said encoding step being carried out by encoding the top view into a string of data signals for each row representing short lines, long lines and holes each by a data signal of different value, and by encoding the left and right sides in accordance with the displacement of pixels in the direction along the columns into strings of data signals of different value in accordance with the amount of such displacement.

8. The method according to claim 7 wherein said displacements for every pixel row for the right and left sides are calculated by computing the displacement delta X in accordance with the equation $$delta\ X = X_{i-1} - X_i$$

where $X_i$ and $X_{i-1}$ are the locations of pixels in adjacent rows containing pixels and said digital signals in said strings for said right and left sides are of different values depending upon delta X.

9. The method according to claim 1 further comprising the step of storing first, second and third tables containing pluralities of said second strings of digital signals, each plurality corresponding to a different character in said set for a different one of said aspects, and said translating step comprises selecting from said tables said second strings corresponding to said first strings.

10. The method according to claim 9 further comprising the step of storing first, second and third tables containing pluralities of said second strings, each corresponding to different ones of said characters in said set for said top, right and left sides, and said translating step comprises selecting different ones of said second strings which correspond to said first strings for said top, right and left sides, respectively.

11. The method according to claim 9 further comprising the step of storing a fourth table containing third strings corresponding to different combinations of said second strings, said third string combinations corresponding to different characters in said set, and said recognizing step is carried out by selecting said combinations of third strings which correspond to said combinations of second strings, and indicating the character of the select combination of third strings as the character depicted by said pattern.

12. The method according to claim 10 further comprising the step of storing a fourth table containing third strings corresponding to different combinations of said second strings, said third string combinations corresponding to different characters in said set, and said recognizing step is carried out by selecting said combinations of third strings which correspond to said combinations of second strings, and indicating the character of the select combination of third strings as the character depicted by said pattern.

13. Apparatus for optical character recognition of characters in a set of characters in which a pattern of pixels in adjacent rows corresponding to the character is provided, which comprises means for encoding the pattern of pixels into a plurality of first strings of digital signals having values dependent upon the shape of the pattern in accordance with the movement of edges of the pattern measured by the displacement of the pixels in the adjacent rows to each other to represent the spatial relationship including the connectivity and direction of neighboring ones of said pixels as viewed from a plurality of aspects, means for translating said first strings into a plurality of second strings of digital signals each representing a different aspect of the different characters in said set such that variations in the shape of the pattern of the same character are included in said second strings, and means for recognizing the pattern as representing a character in the set when said second strings constitute a combination of second strings corresponding to that character.

14. The apparatus according to claim 13 wherein said recognizing means comprises means for relating said pluralities of second strings to pluralities of third strings which correspond to characters in said set, and means for recognizing a character in said set when said second strings are related to a plurality of said third strings which correspond to that character.

15. The apparatus according to claim 14 further comprising means for scanning a page containing said characters to generate said pixels in rows and columns of a matrix in rectangular coordinates, means for allocating said pixels to different addresses in a memory, means for selecting different addresses containing pixels for each character to be recognized thereby including each character to be recognized in a frame, and means for adjusting the coordinates of said frame to compensate for skew of the page while it is being scanned.

16. The apparatus according to claim 13 further comprising computer memory means, and means for arranging said pattern in said memory in a matrix having rectangular (x and y coordinates) is first carried out.

17. The apparatus according to claim 16 including means for thresholding said pixel values to represent each pixel which has a value greater than a certain value as a single bit representing the presence of a pixel i said pattern.

18. The apparatus according to claim 16 further comprising means for thinning said pattern in said memory so that is contains data representing pixels along the center line of said pattern.

19. The apparatus according to claim 18 wherein said matrix contains rows and columns along the x and y coordinates thereof, respectively, and said aspects are views of the top, right and left sides of said pattern, said encoding means comprising means for encoding the top view into a string of data signals for each row representing short liens, long lines and holes each by a data signal of different value, and for encoding the left and right sides in accordance with the displacement of pixels in the direction along the columns into strings of data signals of different value in accordance with the amount of such displacement.

20. The apparatus according to claim 19 wherein said encoding means includes means for calculating the displacements for every pixel row for the right and left sides which the displacement delta X is determined in accordance with the equation $$delta\ X = X_{i-1} - X_i$$

where $X_i$ and $X_{i-1}$ are the locations of pixels in adjacent rows containing pixels and said digital signals in said strings for said right and left sides are of different values depending upon delta X.

21. The apparatus according to claim 13 further comprising means for storing first, second and third tables containing pluralities of said second strings of digital signals, each plurality corresponding to a different character in said set for a different one of said aspects, and said translating means comprises means for selecting from said tables said second strings corresponding to said first strings.

22. The apparatus according to claim 21 further comprising means for storing first, second and third tables containing pluralities of said second strings, each corresponding to different ones of said characters in said set for said top, right and left sides, and said translating means comprises means for selecting different ones of said second strings which correspond to said first strings for said top, right and left sides, respectively.

23. The apparatus according to claim 21 further comprising means for storing a fourth table containing third strings corresponding to different combinations of said second strings, said third string combinations corresponding to different characters in said set, and said recognizing means comprises means for selecting said combinations of third strings which correspond to said combinations of second strings, and means for indicating the character of the select combination of third strings as the character depicted by said pattern.

24. The apparatus according to claim 22 further comprising means for storing a fourth table containing third strings corresponding to different combinations of said second strings, said third string combinations corresponding to different characters in said set, and said recognizing means comprises means for selecting said combinations of third strings which correspond to said combinations of second strings, and means for indicating the character of the select combination of third strings as the character depicted by said pattern.

25. Apparatus for optical character recognition of handwritten characters in a set thereof which comprises means for optically generating and electronically storing a pattern of pixel data items in adjacent rows in two dimensions representing a character to be recognized, means for encoding the pattern into a first group of data bytes representing the pattern in accordance with the movement of edges of the pattern measured by the relative displacement of the pixels in the adjacent rows to each other to represent the geometric relationship including the connectivity and direction of neighboring pixels thereof and where the bytes in the first group are a reduction in number of the data items in the pattern, means for translating and converting different bytes in said first group which are common to certain character shapes into other bytes corresponding to the characters in said set and fewer in number than the number of byes in said first group, and means for recognizing a pattern as representing a character in said set when a plurality of the bytes in said second group constitute, in the order in which they occur in said second group, a combination corresponding to that character.

26. The method for the recognition of handwritten characters in a set thereof which comprises the steps of optically generating and electronically storing a pattern of pixel data items in adjacent rows in two dimensions representing a character to be recognized, then encoding the pattern into a first group of data bytes representing the pattern in accordance with the movement of edges of the pattern measured by the relative displacement of the pixels in the adjacent rows to each other to represent the geometric relationship including the connectivity and direction of neighboring pixels thereof and where the bytes in the first group are a reduction in the number of data items in the pattern, then translating and converting different bytes to said first group which are common to certain shapes common to different characters in said set into other bytes representing said shapes to form a second group of data bytes corresponding to characters in said set and fewer in number than the bytes in said first group, and recognizing the pattern as representing a character in said set when a plurality of the bytes in said second group constitute in the order in which they occur in said second group, a combination corresponding to that character.

27. The method of claim 1 wherein said translating step is carried out to provide said digital signals in said second strings with fewer bytes than the digital signals of said first strings.

28. The apparatus according to claim 13, wherein said translating means includes means for providing said digital signals in said second strings with fewer bytes than said digital signals of said first strings.

* * * * *